US012665403B2

(12) United States Patent
Fisher et al.

(10) Patent No.: US 12,665,403 B2
(45) Date of Patent: Jun. 23, 2026

(54) ELECTRICAL JUNCTION BOX WITH DOOR AND COVER SYSTEM

(71) Applicant: E-LIDS, LLC, Urbandale, IA (US)

(72) Inventors: Chad C. Fisher, Urbandale, IA (US); Justin Dalton, Urbandale, IA (US)

(73) Assignee: E-LIDS, LLC, Urbandale, IA (US)

( * ) Notice: Subject to any disclaimer, the term of this patent is extended or adjusted under 35 U.S.C. 154(b) by 0 days.

(21) Appl. No.: 18/633,147

(22) Filed: Apr. 11, 2024

(65) Prior Publication Data

US 2024/0348029 A1 Oct. 17, 2024

Related U.S. Application Data

(60) Provisional application No. 63/588,348, filed on Oct. 6, 2023, provisional application No. 63/495,480, filed on Apr. 11, 2023.

(51) Int. Cl.
H02G 3/08 (2006.01)

(52) U.S. Cl.
CPC ................................... H02G 3/081 (2013.01)

(58) Field of Classification Search
CPC ........ H02G 3/081; H02G 3/085; H02G 3/086; H02G 3/10
USPC ......................................................... 220/3.8
See application file for complete search history.

(56) References Cited

U.S. PATENT DOCUMENTS

| | | |
|---|---|---|
| 4,591,656 A | 5/1986 | Mohr |
| 4,907,711 A | 3/1990 | Stuchlik, III |

| | | | |
|---|---|---|---|
| 4,927,039 A | 5/1990 | Mcnab | |
| 5,864,091 A | 1/1999 | Sumida | |
| 6,107,567 A * | 8/2000 | Blalock ................... | H02K 5/225 |
| | | | 220/3.9 |
| 6,184,461 B1 * | 2/2001 | Flegel .................... | H01R 13/72 |
| | | | 174/58 |
| 6,418,036 B1 | 7/2002 | Rodrigues | |
| 6,653,566 B2 | 11/2003 | Petak et al. | |
| 6,737,576 B1 | 5/2004 | Dinh | |
| 6,806,426 B1 | 10/2004 | Gretz | |
| 6,878,878 B2 | 4/2005 | Westlake | |
| 7,034,222 B1 | 4/2006 | York | |
| 7,179,994 B2 | 2/2007 | Elberson | |
| 7,214,875 B1 | 5/2007 | Gretz | |

(Continued)

FOREIGN PATENT DOCUMENTS

DE 202007016559 U1 7/2008

*Primary Examiner* — Rafael A Ortiz
(74) *Attorney, Agent, or Firm* — McKee, Voorhees & Sease, PLC

(57) ABSTRACT

Electrical junction boxes are installed during construction or remodeling. Electrical junction boxes include any type of electrical outlet or switch box, including communication boxes for cable, Ethernet, phone, or any other related system. The construction process can create issues in that the junction boxes are installed before drywall. Covers can protect the boxes and help with location, but the junction boxes can also include additional features, such as side or rear access doors for easier access to pigtails or other electrical connections. The boxes can also include easier access into the boxes by way of breakaways. Adjustment of the electrical device or component can be made if the boxes are made larger than previous, which can help with the orientation of the electrical device component. All of these can improve the construction process.

26 Claims, 144 Drawing Sheets

(56) References Cited

U.S. PATENT DOCUMENTS

| | | | |
|---|---|---|---|
| 7,227,079 B2 | 6/2007 | Noest et al. | |
| 7,304,237 B1 | 12/2007 | Shotey et al. | |
| 7,312,396 B1 | 12/2007 | Gorman | |
| 7,390,965 B2 | 6/2008 | Hartwig | |
| 7,626,118 B1 | 12/2009 | Capozzi | |
| 7,943,850 B2 | 5/2011 | Leopold et al. | |
| 7,956,295 B2 | 6/2011 | Arbel | |
| 8,110,743 B2 * | 2/2012 | Drane | H02G 3/14 |
| | | | 174/67 |
| 8,124,872 B2 | 2/2012 | Vigorito et al. | |
| 8,338,706 B2 | 12/2012 | Magno, Jr. | |
| 8,455,759 B2 | 6/2013 | Mortun et al. | |
| 8,933,331 B1 | 1/2015 | Gretz | |
| 9,627,868 B2 | 4/2017 | Mominee et al. | |
| 2008/0053698 A1 | 3/2008 | Purves et al. | |
| 2008/0236859 A1 | 10/2008 | De La Borbolla | |
| 2020/0119535 A1 | 4/2020 | Fioriello | |
| 2022/0302688 A1 * | 9/2022 | Fisher | H02G 3/121 |

* cited by examiner

10

26 112

10

198 122

26

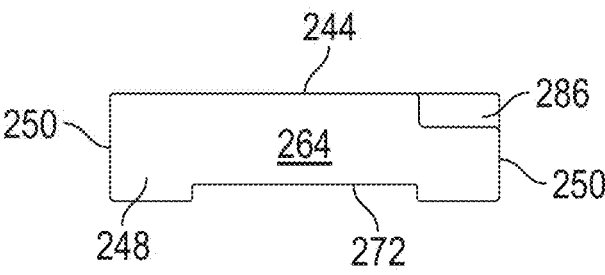
FIG. 14A
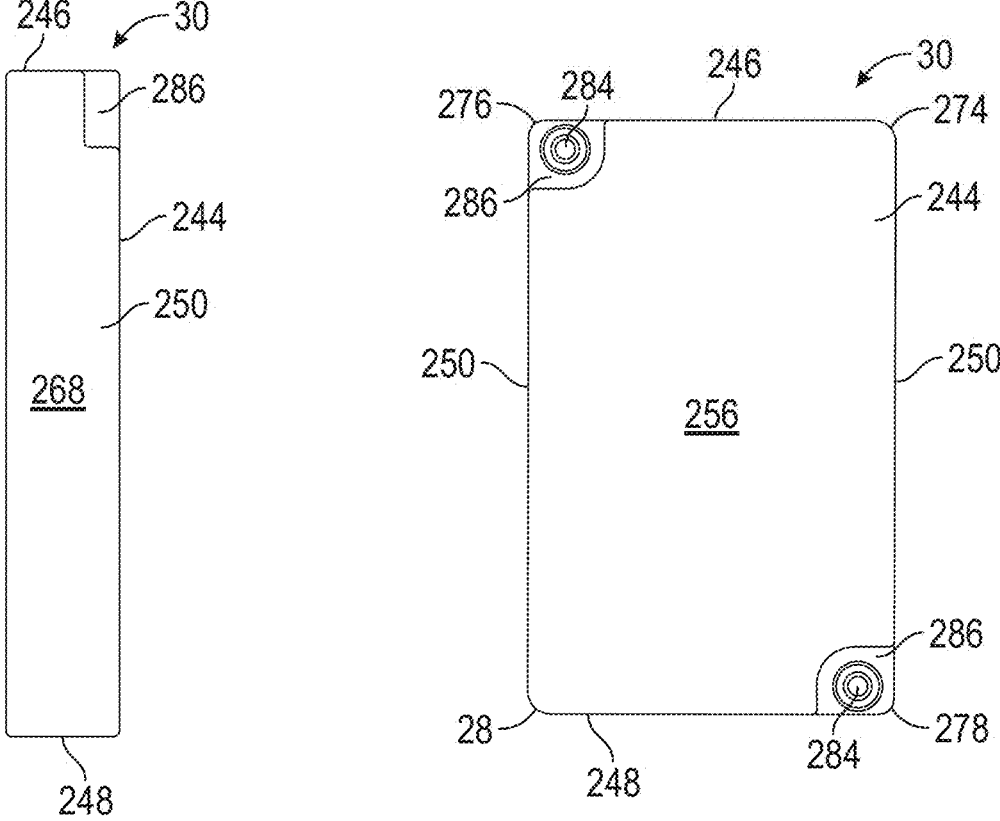
FIG. 14B
FIG. 14C

30

260

256

268

30

286

282

260

284

252

258

250

270

288

272

284  282

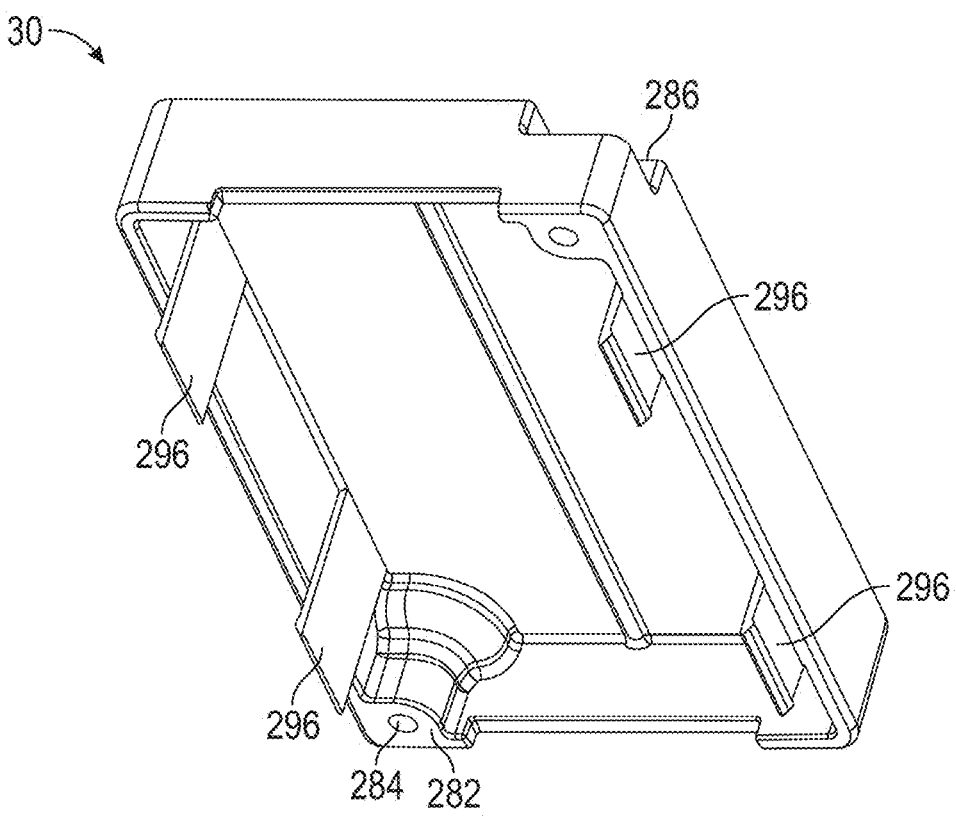
FIG. 16A
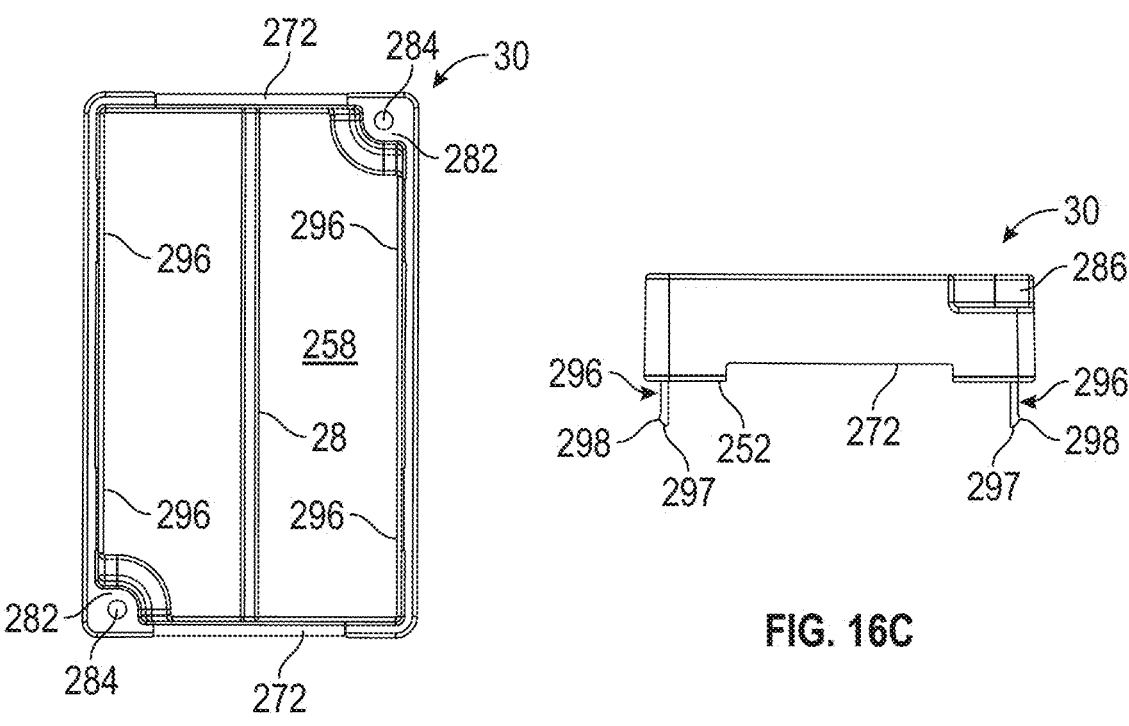
FIG. 16B
FIG. 16C

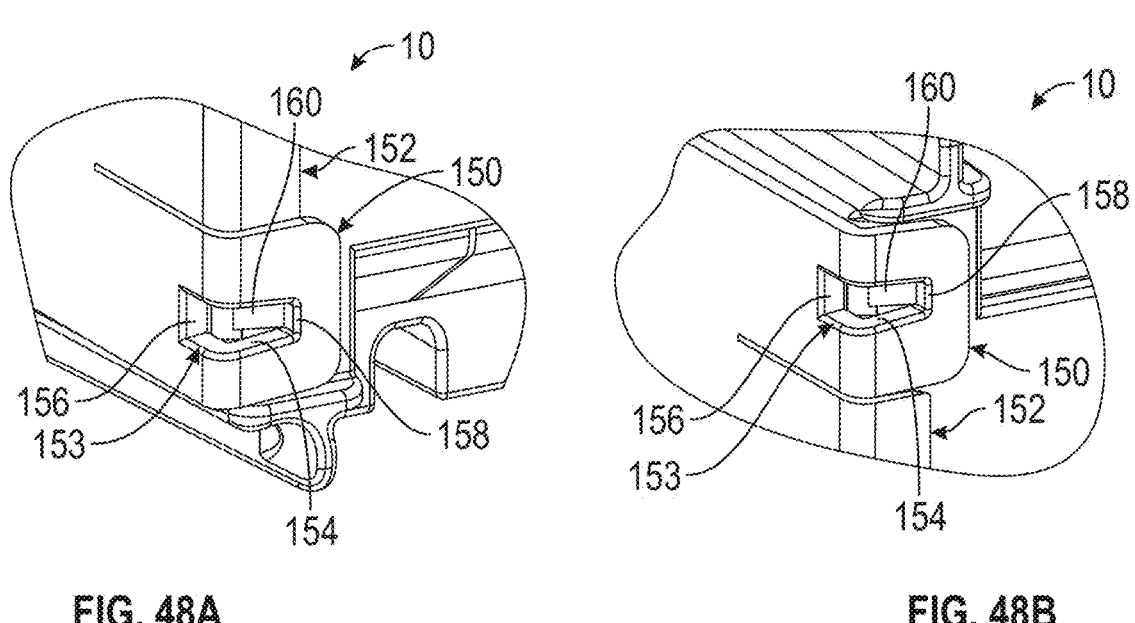
FIG. 48A                    FIG. 48B
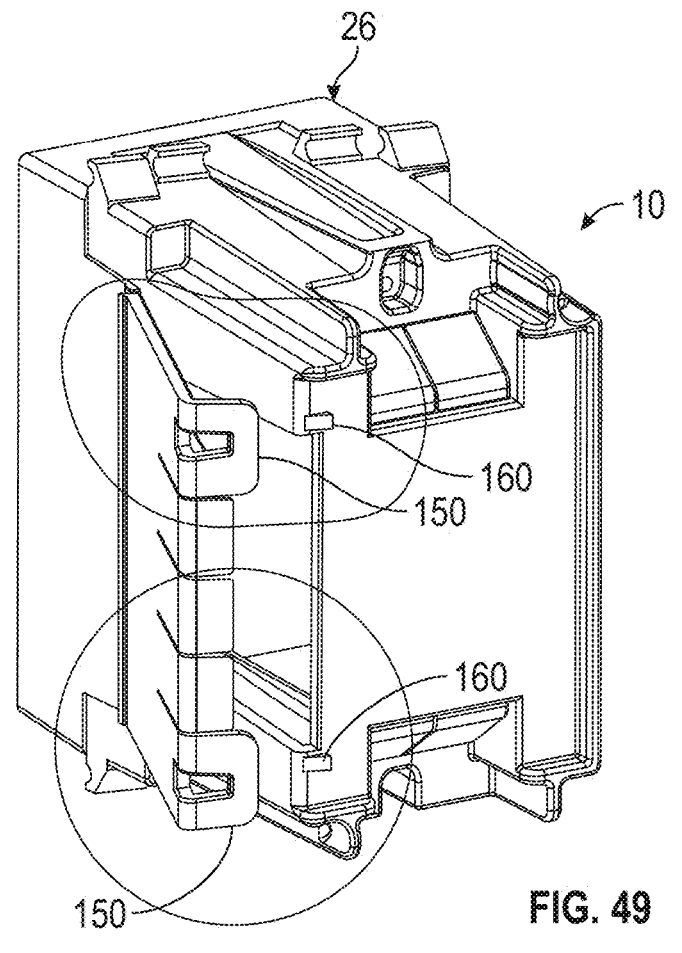
FIG. 49

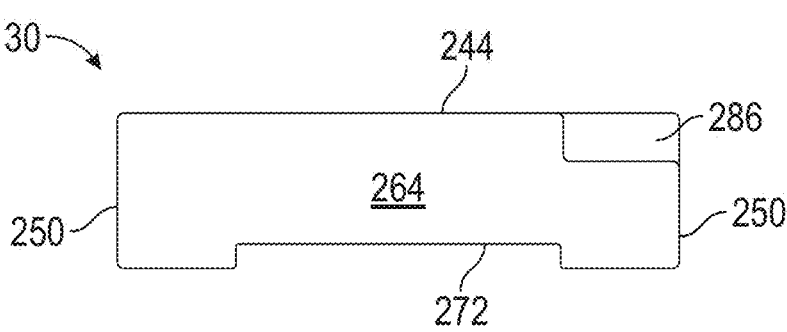
FIG. 73A
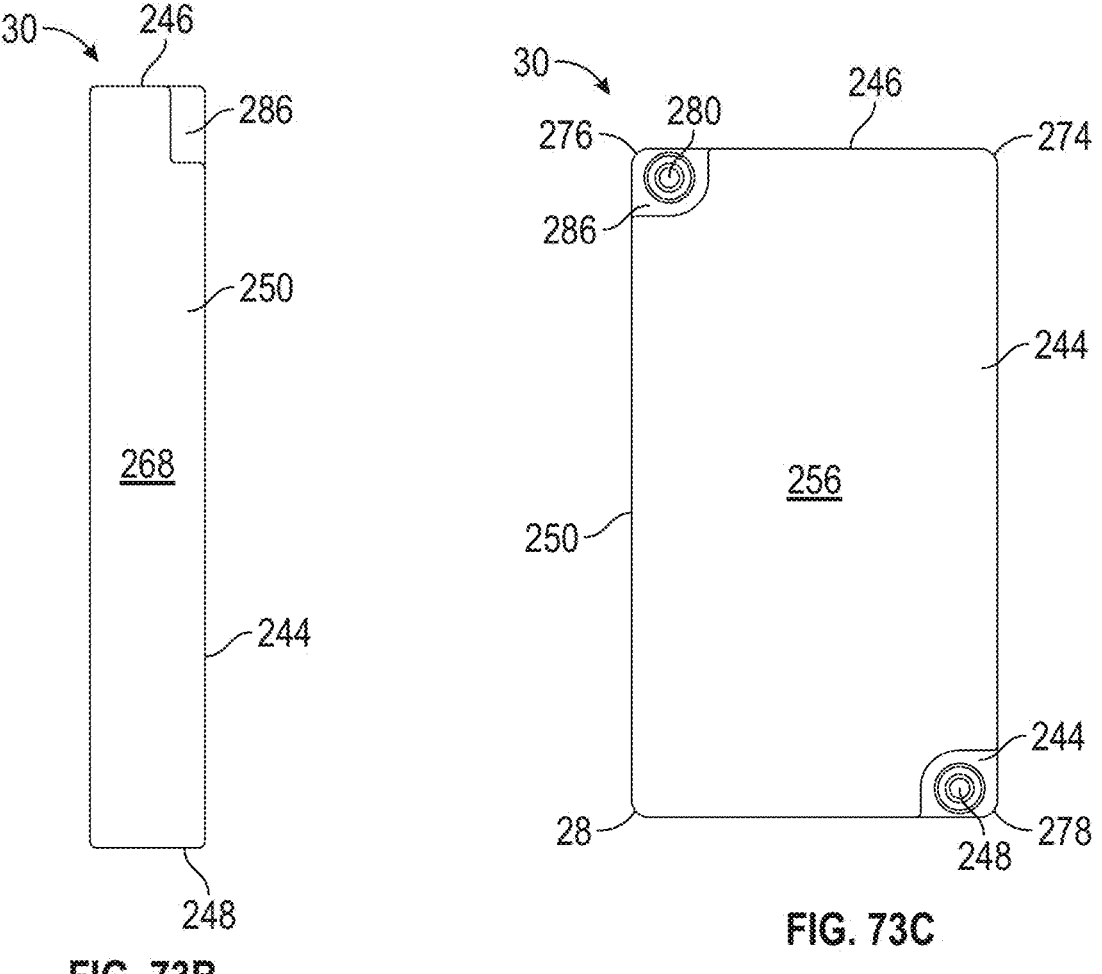
FIG. 73B
FIG. 73C

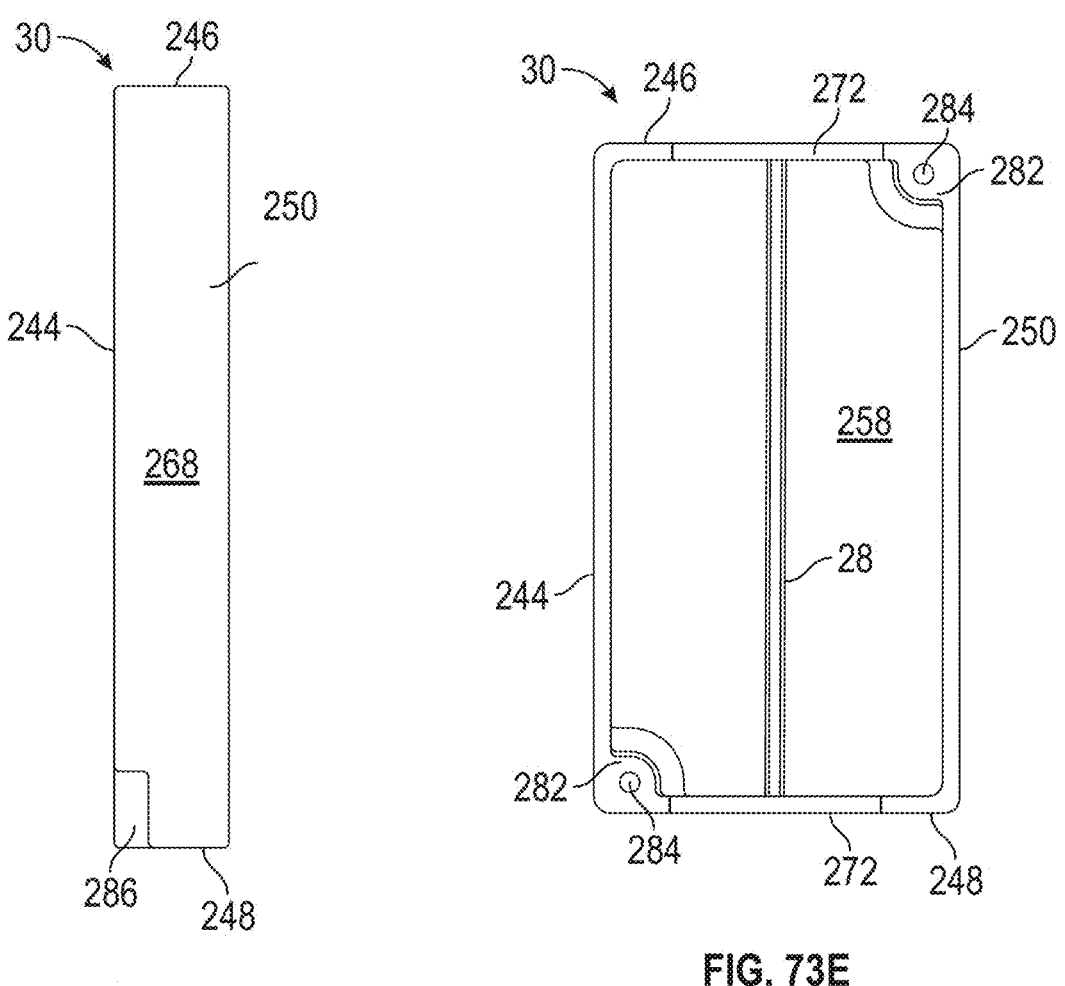
FIG. 73D
FIG. 73E
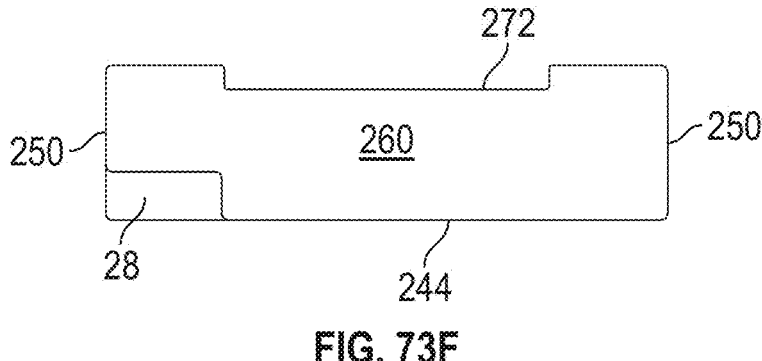
FIG. 73F

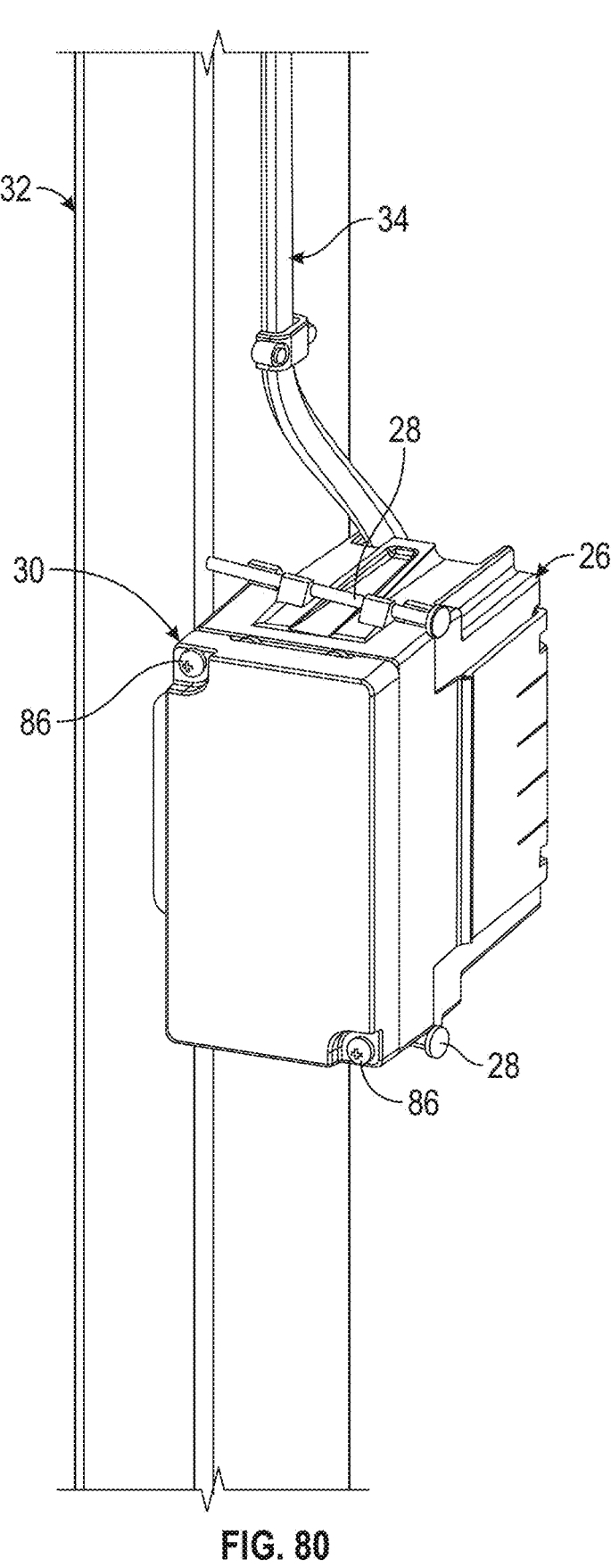
FIG. 80

10

310

10

310
312

310
312

10

10

310

310

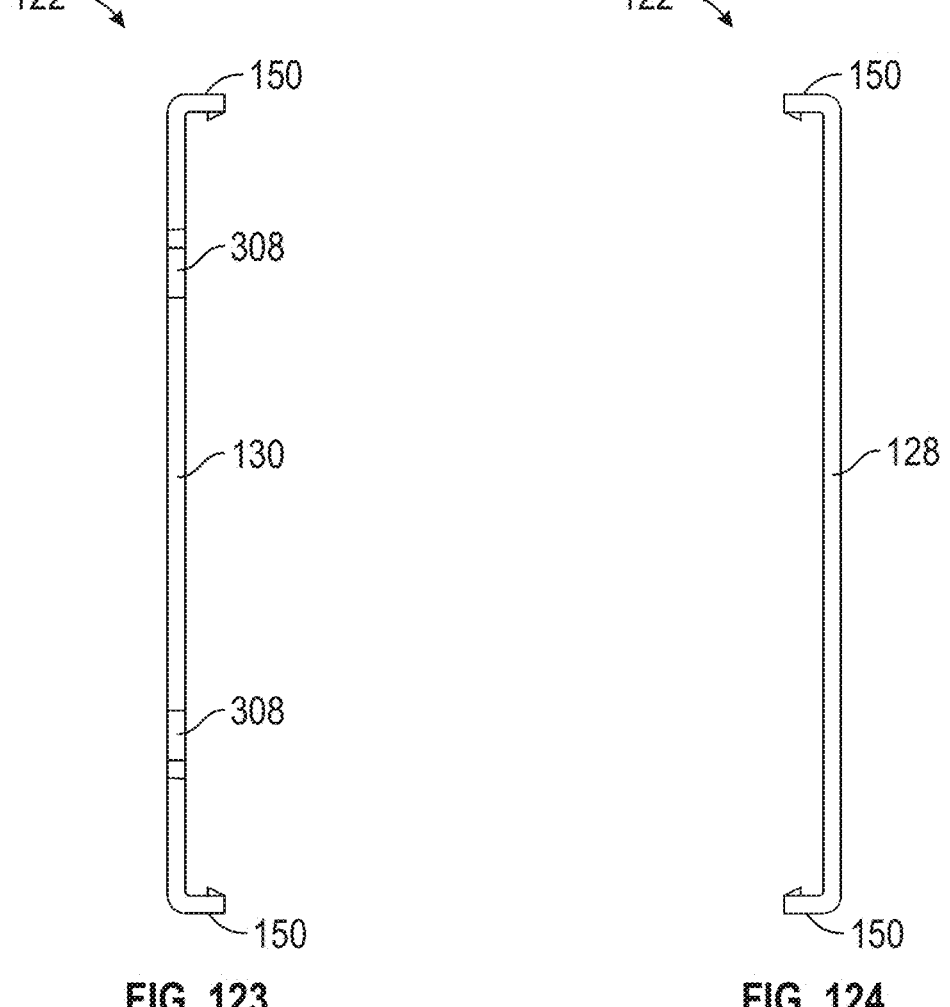
FIG. 123            FIG. 124

ELECTRICAL JUNCTION BOX WITH DOOR AND COVER SYSTEM

CROSS REFERENCE TO RELATED APPLICATIONS

This application claims priority under 35 U.S.C. § 119 to provisional patent applications U.S. Ser. No. 63/495,480, filed Apr. 11, 2023, and U.S. Ser. No. 63/588,348, filed Oct. 6, 2023. The provisional patent applications are herein incorporated by reference in their entirety, including without limitation, the specifications, claims, and abstracts, as well as any figures, tables, appendices, or drawings thereof.

TECHNICAL FIELD

The present disclosure relates generally to an apparatus, system, and/or assembly for use in the construction industry. More particularly, but not exclusively, the disclosure includes reference to devices, systems, and/or assemblies that include one or more of a housing, an electrical device disposed in the housing, a lid or cover for selectively covering the electrical device in the housing, and access points for connecting the electrical device to electrical wiring in the area of construction.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Construction of residential and commercial structures involves multiple phases and trades people. The steps are generally completed in a specific order, and each step may depend on completion of the preceding step. Also, because the construction of such structures inherently involves trades people with different expertise, it is common for separate construction steps to depend on completion of an earlier step and to be performed by completely different personnel.

One example of a construction process involves the following, which is covered in U.S. Pat. Nos. 10,862,285 and 11,303,104, and U.S. patent application Ser. No. 17/691, 019 and any related continuation or divisional applications, the written descriptions and figures of which being hereby incorporated by reference herein.

1) Framers erect the walls, floors, and ceilings of the structure. The walls may be constructed of wood or metal studs, and the floor and ceiling joists of wood or metal beams;

2) After rough framing of walls is complete and before erecting the wall panels, a tradesperson such as an electrician installs dedicated electrical junction boxes for electrical and data communication wiring by attaching the boxes to the wall studs or ceiling joists;

3) The electrician(s) routes wiring from a main electrical panel to each box, depending on the function intended for the box and the access that will be provided to the occupant. The installation is a rough process where the wiring and junctions are not active (i.e., hot). In current practices, wires and cabling with bare terminal ends are capped off, rolled up and pushed back into the box. Thus, terminal ends of the cables are typically not connected to their intended fixture, such as a light switch, electrical outlet, or data port until completion of a later finishing step as described herein;

4) Drywall installers install drywall over the walls and ceilings by attaching the wall panels to the studs and joists. To allow access to the electrical junction boxes, the drywall installers rough cut a hole to accommodate the electrical junction box and remove the resulting cut-out panels from the drywall using a router or other rough-cut tool. The shape of the cut-out opening is meant to roughly match the shape of the electrical junction box, so that the resulting drywall surface will closely surround the junction boxes that are already in place. During drywall installation, it is common that cutting out holes for one or more of the junction boxes is inadvertently missed and the box becomes permanently covered, or temporarily hidden behind the drywall. This typically occurs if the box did not protrude enough from the stud when the box was attached to the stud, which is a common occurrence in conventional carpentry. Also, some cut outs in the drywall may be misplaced or not be properly shaped and will require repairs to the drywall surrounding the protruding junction box. Such repairs are typically performed with dry wall tape and/or joint compound, which is a spreadable sealant commonly referred to as "mud," to fill-in the gaps between the drywall and the junction box as well as clean up the final appearance of the drywall surrounding the junction box. Also, because the drywall installers do not have ultimate responsibility for completing the electrical and data connections, it is common for drywall installers to cut or damage wires and cabling during installation of the drywall panels which causes significant issues for the electricians once they return to finish the job after the drywall has been completed;

5) Once drywall is hung and boxes have been cut out, drywall installers finish seams between the drywall sheets using tape and sealant and typically finish the border around the electrical junction boxes with joint compound to create a sealed border around the periphery of the junction boxes. The drywall installers may also texture the drywall and repair any imperfections in the final wall panels. During this process, extra joint compound and debris is commonly pushed into the previously installed electrical junction boxes and this debris can cover the terminal ends of the wiring and cabling and can damage the wires/cables thereby making future connection of sockets, switches, or data ports more difficult, not to mention the fact that this excess joint compound makes a big mess, requires removal that can take a long time that slows the electrical installation and it is generally an annoying and undesirable task to remove the excess joint compound, furthermore it is impossible to make the junction box and wiring as clean as it was prior to being filled with joint compound;

6) Once the drywall process is completed, which can also include trim and painting, the electrician returns to the job to complete the installation of the outlet, switch or communication fixture intended for the junction box. At this point, the electrician must clean and repair each junction box by hand to remove excess joint compound and debris prior to installing the electrical device such as outlets, switches, and/or other electrical components and connecting the wiring to power thereby making them "hot".

Another challenge confronting the electrician is the need to align the outer edge of the junction box with the planar surface of the drywall. Misalignment of the outer edge of the junction box with the planar surface of the drywall is becoming a bigger issue of late due to various jurisdictions requiring the outer edge of the junction box to be within a specified distance to the planar surface of the drywall, and if that specification is not met, the installation will not pass inspection. When this occurs, the electrician must pull the electrical junction box forward toward the planar surface of the drywall, which is a difficult and time-consuming task, which cannot always be satisfactorily completed. Another challenge confronting the electrician is the need to align the outward facing side of the switch or outlet or other electrical device or component installed in the junction box. Typically, this is done by manually grabbing and bending the metal outlet tabs that are provided on outlets and plugs. However, this can be a difficult and time-consuming task that can cause damage to the drywall at the point of attachment and can result in an unstable connection. Accordingly, these steps require additional manipulations of the junction box that can damage the surrounding drywall or the electrical junction box or the final fixtures.

Still further, during the process of final electrical installation, an electrician may accidentally damage the finished drywall around the box, particularly when manually removing debris and excess joint compound from a large number of junction boxes, resulting in the requirement of additional touch-up work to the drywall surface that has to be done either by the electrician or by a subsequent drywall finishing operation.

Many of these issues are resolved by the disclosure of the '285 and '104 patents, as they disclose junction boxes that can include outlets and a cover that is used to help locate the junction boxes during the installation of drywall, help protect boxes and fixtures/cables during finishing, help to create a more-defined cutout through drywall for the box, and also help mitigate debris and other elements from accumulating in the box during the construction process.

However, additional issues persist. For example, even during installation, there is little room to the rear of the box housings to connect the wires from the electrical panel to the component within the box housing. Damage to wires or even missing connections between the wires and pigtail conductors within the box can occur due to the lack of space. An electrician may fully remove the electrical device from the box, pass the wires through breakaway tabs in the box housing, connect the wires to the pigtails, and then push everything back through the breakaway tabs and/or into the box to reconnect the electrical device in the box housing. This can damage the wires and/or connections, and also adds time and complexity to the process.

Still further, issues may relate to the mounting of the boxes to a framing member, such as the wall studs or ceiling joists. The lumber used for the framing members may not be as straight, planar, or otherwise ideal for mounting a box thereto to have the box and associated electrical element to be oriented properly. In such cases, manipulation is needed to make sure the electrical device is oriented properly even though the box may not be at the ideal angle. Some existing boxes do not allow for the adjustability of the electrical device mounted thereto, which limits the ability to adjust the outlet or other electrical device, giving the appearance that the component is at a less than desired angle/orientation.

Thus, there exists a need in the art for an apparatus, system, and/or assembly that improves on the process of completing dry wall and electrical finishing involves a series of steps by different trades people with different expertise and that can add expenses and delay to a building project.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of any of the aspects of any of the embodiments disclosed to provide better access to electrical housings during construction, including but not limited to, connecting wires and locating the electrical junctions. A junction box is an electrical enclosure that houses one or more wiring connections and should not be limited to any particular shape or design, nor should it be limited to any particular type of electrical connection. The junction box may also be referred to as an electrical housing.

It is another object, feature, and/or advantage of any of the aspects of any of the embodiments disclosed to allow for the adjustment of electrical hookups in construction that may be offset due to building materials.

It is still yet a further object, feature, and/or advantage of any of the aspects of any of the embodiments to protect the contents of an electrical housing during stages of construction.

The apparatus, system, assemblies, and/or methods disclosed herein can be used in a wide variety of applications. For example, the electrical housings/junction boxes are generally used in construction of buildings and dwellings. However, any structure, including fixed structures or non-fixed structures (e.g., RVs, trailers, and the like) that have an electrical hookup could utilize aspects and/or embodiments disclosed.

It is still yet a further object, feature, and/or advantage of any of the aspects of any of the embodiments that the apparatus be safe, cost effective, rigid, long-lasting, and durable. For example, the apparatus, systems, and/or assemblies can be adapted to resist excessive heat, static buildup, corrosion, and/or mechanical failures (e.g., cracking, crumbling, shearing, creeping) due to excessive impacts and/or prolonged exposure to tensile and/or compressive forces acting thereon. The disclosed are also able to withstand debris and other forces that occur routinely in the construction process.

At least some aspects of some embodiments disclosed herein comprise a distinct aesthetic appearance. Ornamental aspects included in such an embodiment can help capture a consumer's attention and/or identify a source of origin of a product being sold. Said ornamental aspects will not impede functionality.

Methods can be practiced which facilitate use, manufacture, assembly, maintenance, and repair of an apparatus, system, and/or assembly disclosed which accomplish some or all of the previously stated objectives.

The apparatus, system, and/or assembly can be incorporated into additional systems or kits which accomplish some or all of the previously stated objectives.

According to some aspects of the present disclosure, an electrical junction box comprises a housing comprising an opening surrounded by a wall, with said wall terminating at a closed end to form an open enclosure with an interior; an access door in the wall of the housing, said access door operatively connected to the wall to move between an open configuration to create an opening through said wall to the interior and a closed configuration; said access door further comprising a releasable connection with the housing in the closed configuration.

According to at least some aspects of some embodiments, the access door connected to the wall of the housing via a hinge.

According to at least some aspects of some embodiments, the hinge comprises a living hinge.

According to at least some aspects of some embodiments, the wall of the housing comprises a plurality of peripheral wall sections and said access door in one of the plurality of peripheral wall sections.

According to at least some aspects of some embodiments, the plurality of peripheral wall sections comprises four peripheral wall sections including two sidewalls, a top wall, and a bottom wall.

According to at least some aspects of some embodiments, the access door is positioned at a sidewall or in a sidewall.

According to at least some aspects of some embodiments, the releasable connection comprises a non-mechanical fastener.

According to at least some aspects of some embodiments, the releasable connection comprises a snap fitting, a snap-fit member, and/or a friction-fit engagement member.

According to at least some aspects of some embodiments, the releasable connection comprises a mechanical fastener such as a latch, hook, spring loaded member or other mechanical fastening mechanism.

According to at least some aspects of some embodiments, the box further comprises a French-door style breakaway tabs at the closed end of the housing.

According to at least some aspects of some embodiments, the box further comprises orientation adjustment guides on an interior of the wall of the housing.

According to at least some aspects of some embodiments, the orientation adjustment guides comprise one or more protrusions extending internally from the wall.

According to at least some aspects of some embodiments, the access door comprises one or more movable tabs to allow for an opening into the interior of the housing when the access door is in the closed configuration.

According to yet additional aspects, a system comprises an electrical junction box comprising a housing comprising an opening surrounded by a wall, with said wall terminating at a closed end to form an open enclosure with an interior; an access door in the wall of the housing, said access door operatively connected to the wall to move between an open configuration to create an opening through said wall to the interior and a closed configuration; said access door further comprising a releasable connection with the housing in the closed configuration; and a cover, wherein the cover being removably connectable to the housing of the electrical junction box and said cover comprising a closed portion and a cover wall extending therefrom, the cover wall corresponding in shape to the wall of the housing of the electrical junction box.

According to at least some aspects of some embodiments, the system further comprises an electrical device connected to and disposed at least partially within housing of the electrical junction box.

According to at least some aspects of some embodiments, the cover wall being substantially the same shape and size as the wall of the housing of the electrical junction box.

According to at least some aspects of some embodiments, the cover being larger than the open enclosure of the housing of the electrical junction box.

According to at least some aspects of some embodiments, the cover comprises a mechanical fastener to removably connect to the housing of the electrical box.

According to at least some aspects of some embodiments, the cover and the electrical junction box comprise aligning apertures to receive a mechanical fastener for removable connection.

According to at least some aspects of some embodiments, the cover comprises a mechanical fastener to removably connect to the housing of the electrical box.

According to at least some aspects of some embodiments, the cover comprises tabs extending interior to and further than the wall of the cover to interact with an interior of the wall of the housing of the electrical junction box for removable connection.

According to at least some aspects of some embodiments, the tabs comprise snap fits.

According to yet additional aspects, a system comprises an electrical junction box comprising an enclosed housing with a wall and closed end opposite an open end, said electrical junction box further comprising an access door hingeably connected to the wall to provide access to an interior of the enclosed housing when in an open configuration; an electrical device connected to and at least partially disposed within the electrical junction box; and a cover for removable connection to the electrical junction box, the cover including a closed end with peripheral wall extending therefrom, said cover engageable with the electrical junction box to substantially cover the electrical device when connected to the electrical junction box.

According to at least some aspects of some embodiments, the cover removably connected to the electrical junction box via mechanical or non-mechanical fastening.

According to at least some aspects of some embodiments, the access door comprises one or more movable tabs to allow for an opening into the interior of the housing when the access door is in a closed configuration.

According to at least some aspects of some embodiments, the enclosed housing of the electrical junction box comprises French-door style breakaway tabs at the closed end.

According to at least some aspects of some embodiments, the system further comprises orientation adjustment guides on an interior of the wall of the housing of the electrical junction box.

According to at least some aspects of some embodiments, the orientation adjustment guides comprise one or more protrusions extending internally from the wall.

According to at least some aspects of some embodiments, the one or more protrusions interact with a tab of the electrical device to adjust the orientation of the electrical device relative to the electrical junction box.

According to at least some aspects of some embodiments, the cover is connected to the electrical junction box via a runner.

According to at least some aspects of some embodiments, the access door connected to the electrical junction box via a living hinge.

According to at least some aspects of some embodiments, said access door further comprising a releasable connection with the enclosed housing in a closed configuration.

According to at least some aspects of some embodiments, the releasable connection comprises a snap fitting.

According to at least some aspects of some embodiments, the access door comprises one or more movable tabs to allow for an opening into the interior of the housing when the access door is in the closed configuration.

According to additional aspects of the present disclosure, an electrical junction box system comprises a housing comprising an opening surrounded by a wall, with said wall terminating at a closed end to form an open enclosure with an interior; an access door in the wall of the housing, said access door operatively connected to the wall to move between an open configuration to create an opening through said wall to the interior and a closed configuration; said access door further comprising a releasable connection with the housing in the closed configuration.

According to at least some aspects of some embodiments, the access door is connected to the wall of the housing via a hinge.

According to at least some aspects of some embodiments, the access door is connected to the wall of the housing via a living hinge.

According to at least some aspects of some embodiments, the wall of the housing comprises a plurality of peripheral wall sections and said access door is positioned in one of the plurality of peripheral wall sections.

According to at least some aspects of some embodiments, the wall of the housing comprises four peripheral wall sections including two sidewalls, a top wall, and a bottom wall.

According to at least some aspects of some embodiments, the access door is positioned at a sidewall.

According to at least some aspects of some embodiments, the releasable connection comprises a non-mechanical fastener.

According to at least some aspects of some embodiments, the releasable connection comprises a mechanical fastener.

According to at least some aspects of some embodiments, the releasable connection comprises a friction-fit fastener.

According to at least some aspects of some embodiments, the releasable connection comprises a snap fitting.

According to at least some aspects of some embodiments, the system further comprises French-door style breakaway tabs at the closed end of the housing.

According to at least some aspects of some embodiments, the system further comprises a pair of tabs connected to the housing and positioned immediately adjacent one another to create a French-Door style access into the housing for wires.

According to at least some aspects of some embodiments, the system further comprises orientation adjustment guides on an interior of the wall of the housing.

According to at least some aspects of some embodiments, the system further comprises orientation adjustment guides on an interior of the wall of the housing wherein the orientation adjustment guides comprise one or more protrusions extending internally from the wall.

According to at least some aspects of some embodiments, the access door comprises one or more movable tabs to allow for an opening into the interior of the housing when the access door is in the closed configuration.

According to at least some aspects of some embodiments, the electrical device is an electrical receptacle.

According to at least some aspects of some embodiments, the electrical device is a switch.

According to additional aspects of the present disclosure, a system comprises an electrical junction box comprising a housing comprising an opening surrounded by a wall, with said wall terminating at a closed end to form an open enclosure with an interior; an access door in the wall of the housing, said access door operatively connected to the wall to move between an open configuration to create an opening through said wall to the interior and a closed configuration; said access door further comprising a releasable connection with the housing in the closed configuration; and a cover, wherein the cover being removably connectable to the housing of the electrical junction box and said cover comprising a closed portion and a cover wall extending therefrom, the cover wall corresponding in shape to the wall of the housing of the electrical junction box.

According to at least some aspects of some embodiments, the system further comprises an electrical device connected to and disposed at least partially within the housing of the electrical junction box.

According to at least some aspects of some embodiments, the cover wall being substantially the same shape and size as the wall of the housing of the electrical junction box.

According to at least some aspects of some embodiments, the cover being larger than the open enclosure of the housing of the electrical junction box.

According to at least some aspects of some embodiments, the cover comprises a mechanical fastener to removably connect to the housing of the electrical box.

According to at least some aspects of some embodiments, the cover and the electrical junction box comprise aligning apertures to receive a mechanical fastener for removable connection.

According to at least some aspects of some embodiments, the cover comprises a mechanical fastener to removably connect to the housing of the electrical box.

According to at least some aspects of some embodiments, the cover comprises a friction fit fastener to removably connect to the housing of the electrical box.

According to at least some aspects of some embodiments, the cover comprises at least one arm to removably connect to the housing of the electrical box.

According to at least some aspects of some embodiments, the cover comprises tabs extending interior to and further than the wall of the cover to interact with an interior of the wall of the housing of the electrical junction box for removable connection.

According to at least some aspects of some embodiments, the cover comprises tabs configured to engage the housing thereby holding the cover onto the housing.

According to at least some aspects of some embodiments, the electrical device is an electrical receptacle.

According to at least some aspects of some embodiments, the electrical device is a switch.

According to additional aspects of the present disclosure, a system comprises an electrical junction box; the electrical junction box comprising a housing with a wall and a closed end opposite an open end; the electrical junction box further comprising an access door; wherein the access door is hingeably connected to the wall of the electrical junction box and configured to provide access to an interior of the housing when the door is in an open configuration; an electrical device; the electrical device connected to and at least partially disposed within the electrical junction box; and a cover; the cover configured to removably connect to the electrical junction box; the cover including a closed end with a peripheral wall extending therefrom; the cover engageable with the electrical junction box and configured to substantially cover the electrical device when the cover is connected to the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the interior of the housing when the access door is in a closed configuration.

According to at least some aspects of some embodiments, the enclosed housing of the electrical junction box comprises French-door style breakaway tabs at the closed end.

According to at least some aspects of some embodiments, the enclosed housing of the electrical junction box comprises a pair of breakaway tabs at the closed end; wherein the pair of breakaway tabs are positioned immediately adjacent one another without any components between the adjacent breakaway tabs.

According to at least some aspects of some embodiments, the enclosed housing of the electrical junction box comprises a pair of breakaway tabs at the closed end; wherein the pair of breakaway tabs are positioned immediately adjacent one another thereby providing unimpeded access into the enclosed housing in the area between the breakaway tabs.

According to at least some aspects of some embodiments, the system further comprises orientation adjustment guides on an interior of the wall of the housing of the electrical junction box.

According to at least some aspects of some embodiments, the system further comprises orientation adjustment guides on an interior of the wall of the housing of the electrical junction box; and wherein the orientation adjustment guides comprise one or more protrusions extending internally from the wall.

According to at least some aspects of some embodiments, the system further comprises orientation adjustment guides on an interior of the wall of the housing of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the system further comprises at least one connection member that is configured to releasably connect the access door to the enclosed housing in a closed configuration.

According to at least some aspects of some embodiments, the access door comprises one or more movable fingers to allow for an opening into the interior of the housing when the access door is in the closed configuration.

According to at least some aspects of some embodiments, the electrical device is an electrical receptacle.

According to at least some aspects of some embodiments, the electrical device is a switch.

According to additional aspects of the present disclosure, a system, comprises an electrical junction box; the electrical junction box having a peripheral edge and a top wall, a bottom wall, a pair of side walls and a rear wall forming a hollow interior; an access door; the access door operatively connected to the electrical junction box; the electrical junction box configured to move between an open position and a closed position; wherein when the access door is in an open position, the access door provides access into the hollow interior of the electrical junction box; an electrical device; the electrical device connected to and at least partially disposed within the electrical junction box; a cover; the cover having a front wall, a top wall, a bottom wall, and a pair of side walls and a peripheral edge forming a hollow interior; the cover configured to removably connect to the electrical junction box thereby covering the electrical device when the electrical device is installed into the electrical junction box.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, the system further comprises at least one conductor wire electrically connected to the electrical device.

According to at least some aspects of some embodiments, the access door provides access to conductor wires connected to the electrical device when the electrical device is installed into the electrical junction box.

According to at least some aspects of some embodiments, the system further comprises at least one conductor wire electrically connected to the electrical device, and wherein the at least one conductor wire is stored within the hollow interior of the electrical junction box prior to use.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at the closed end.

According to at least some aspects of some embodiments, the electrical junction box comprises a pair of breakaway tabs at the closed end; wherein the pair of breakaway tabs are positioned immediately adjacent one another without any components between the adjacent breakaway tabs.

According to at least some aspects of some embodiments, the electrical junction box comprises a pair of breakaway tabs at the closed end; wherein the pair of breakaway tabs are positioned immediately adjacent one another thereby providing unimpeded access into the electrical junction box in the area between the breakaway tabs.

According to at least some aspects of some embodiments, the system further comprises orientation adjustment guides on an interior of the electrical junction box.

According to at least some aspects of some embodiments, the system further comprises orientation adjustment guides on an interior of the electrical junction box; and wherein the orientation adjustment guides comprise one or more protrusions extending internally from the wall.

According to at least some aspects of some embodiments, the system further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, the access door comprises one or more movable fingers to allow for an opening into the hollow interior of the electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, a system comprises an electrical junction box; the electrical junction box having a peripheral edge and a top wall, a bottom wall, a pair of side walls and a rear wall forming a hollow interior; an access door; the access door operatively connected to the electrical junction box; the electrical junction box configured to move between an open position and a closed position; an access opening; the access opening positioned in the electrical junction box; wherein when the access door is in a closed position, the access door covers the access opening; wherein when the access door is in an open position, the access door provides access into the hollow interior of the electrical junction box; an electrical device; the electrical device connected to and at least partially disposed within the electrical junction box; a cover; the cover having a front wall, a top wall, a bottom wall, and a pair of side walls and a peripheral edge forming a hollow interior; the cover configured to removably connect to the electrical junction box thereby covering the electrical device when the electrical device is installed into the electrical junction box.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, the system further comprises at least one conductor wire electrically connected to the electrical device.

According to at least some aspects of some embodiments, the access door provides access to conductor wires connected to the electrical device when the electrical device is installed into the electrical junction box.

According to at least some aspects of some embodiments, the system further comprises at least one conductor wire electrically connected to the electrical device, and wherein the at least one conductor wire is stored within the hollow interior of the electrical junction box prior to use.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at the closed end.

According to at least some aspects of some embodiments, the electrical junction box comprises a pair of breakaway tabs at the closed end; wherein the pair of breakaway tabs are positioned immediately adjacent one another without any components between the adjacent breakaway tabs.

According to at least some aspects of some embodiments, the electrical junction box comprises a pair of breakaway tabs at the closed end; wherein the pair of breakaway tabs are positioned immediately adjacent one another thereby providing unimpeded access into the electrical junction box in the area between the breakaway tabs.

According to at least some aspects of some embodiments, the system further comprises orientation adjustment guides on an interior of the electrical junction box.

According to at least some aspects of some embodiments, the system further comprises orientation adjustment guides on an interior of the electrical junction box; and wherein the orientation adjustment guides comprise one or more protrusions extending internally from the wall.

According to at least some aspects of some embodiments, the system further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, the access door comprises one or more movable fingers to allow for an opening into the hollow interior of the electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, a system comprises an electrical junction box; the electrical junction box having a peripheral edge and a top wall, a bottom wall, a pair of side walls and a rear wall forming a hollow interior; the electrical junction box having an access opening; the electrical junction box having an access door; wherein the access door is configured to selectively cover the access opening; an electrical device; the electrical device connected to and at least partially disposed within the electrical junction box; at least one conductor wire electrically connected to the electrical device; and a cover; the cover removably connect to the electrical junction box; wherein the cover covers the electrical device when the electrical device is installed into the electrical junction box; wherein the access door provides access to the at least one conductor wire when the electrical device is installed into the electrical junction box.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at the closed end.

According to at least some aspects of some embodiments, the electrical junction box comprises a pair of breakaway tabs at the closed end; wherein the pair of breakaway tabs are positioned immediately adjacent one another without any components between the adjacent breakaway tabs.

According to at least some aspects of some embodiments, the electrical junction box comprises a pair of breakaway tabs at the closed end; wherein the pair of breakaway tabs are positioned immediately adjacent one another thereby providing unimpeded access into the electrical junction box in the area between the breakaway tabs.

According to at least some aspects of some embodiments, the system further comprises orientation adjustment guides on an interior of the electrical junction box.

According to at least some aspects of some embodiments, the system further comprises orientation adjustment guides on an interior of the electrical junction box; and wherein the orientation adjustment guides comprise one or more protrusions extending internally from the wall.

According to at least some aspects of some embodiments, the system further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, wherein the access door comprises one or more movable fingers to allow for an opening into the hollow interior of the electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, an electrical junction box system with a preinstalled electrical device and cover comprises an electrical junction box; the electrical junction box having a peripheral edge and a top wall, a bottom wall, a pair of side walls and a rear wall forming a hollow interior; the electrical junction box having an access door; an electrical device; a plurality of conductor wires; the plurality of conductor wires extending a length between a connected end and a free end; wherein the connected end of the plurality of conductor wires are electrically connected to the electrical device; a cover; the cover having a front wall, a top wall, a bottom wall, and a pair of side walls and a peripheral edge forming a hollow interior; the cover configured to removably connect to the electrical junction box; wherein the electrical device with attached conductor wires is installed into the electrical junction box; wherein the cover is installed onto the electrical junction box after the electrical device is installed into the electrical junction box thereby covering the electrical device; wherein the access door provides access to the free ends of the conductor wires when the electrical device is installed into the electrical junction box and when the is cover installed onto the electrical junction box.

According to at least some aspects of some embodiments, the free end of the conductor wires are configured to be pulled out of the hollow interior of the electrical junction box when the access door is opened.

According to at least some aspects of some embodiments, after the electrical junction box is installed onto a structure, the free end of the conductor wires are configured to be pulled out of the hollow interior of the electrical junction box when the access door is opened.

According to at least some aspects of some embodiments, after the electrical junction box is installed onto a structure, the free end of the conductor wires are configured to be pulled out of the hollow interior of the electrical junction box when the access door is opened and electrically connected to an external wire.

According to at least some aspects of some embodiments, after the electrical junction box is installed onto a structure, the free end of the conductor wires are configured to be pulled out of the hollow interior of the electrical junction box when the access door is opened and electrically connected to an external wire and the intersection of the conductor wires and the external wire is configured to be inserted into the hollow interior of the electrical junction box and the access door closed.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at the closed end.

According to at least some aspects of some embodiments, the electrical junction box comprises a pair of breakaway tabs at the closed end; wherein the pair of breakaway tabs are positioned immediately adjacent one another without any components between the adjacent breakaway tabs.

According to at least some aspects of some embodiments, the electrical junction box comprises a pair of breakaway tabs at the closed end; wherein the pair of breakaway tabs are positioned immediately adjacent one another thereby providing unimpeded access into the hollow interior of the electrical junction box in the area between the breakaway tabs.

According to at least some aspects of some embodiments, the system further comprises orientation adjustment guides on an interior of the electrical junction box.

According to at least some aspects of some embodiments, the system further comprises orientation adjustment guides on an interior of the electrical junction box; and wherein the orientation adjustment guides comprise one or more protrusions extending internally from the wall.

According to at least some aspects of some embodiments, the system further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, the access door comprises one or more movable fingers to allow for an opening into the hollow interior of the electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, an electrical junction box system with a preinstalled electrical device and cover comprises an electrical junction box; the electrical junction box having a wall and forming a hollow interior; the electrical junction box having an access door; an electrical device; a plurality of conductor wires; wherein the connected end of the plurality of conductor wires are electrically connected to the electrical device; a cover; the cover configured to removably connect to the electrical junction box; wherein the electrical device with attached conductor wires is installed into the electrical junction box; wherein the cover is installed onto the electrical junction box after the electrical device is installed into the electrical junction box thereby covering the electrical device; wherein the access door provides access to the conductor wires when the electrical device is installed into the electrical junction box.

According to at least some aspects of some embodiments, the free end of the conductor wires are configured to be pulled out of the hollow interior of the electrical junction box when the access door is opened.

According to at least some aspects of some embodiments, after the electrical junction box is installed onto a structure, the free end of the conductor wires are configured to be pulled out of the hollow interior of the electrical junction box when the access door is opened.

According to at least some aspects of some embodiments, after the electrical junction box is installed onto a structure, the free end of the conductor wires are configured to be pulled out of the hollow interior of the electrical junction box when the access door is opened and electrically connected to an external wire.

According to at least some aspects of some embodiments, after the electrical junction box is installed onto a structure, the free end of the conductor wires are configured to be pulled out of the hollow interior of the electrical junction box when the access door is opened and electrically connected to an external wire and the intersection of the conductor wires and the external wire is configured to be inserted into the hollow interior of the electrical junction box and the access door closed.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at a closed end of the electrical junction box.

According to at least some aspects of some embodiments, the electrical junction box comprises a pair of breakaway tabs at a closed end of the electrical junction box; wherein the pair of breakaway tabs are positioned immediately adjacent one another without any components between the adjacent breakaway tabs.

According to at least some aspects of some embodiments, the electrical junction box comprises a pair of breakaway tabs at a closed end of the electrical junction box; wherein the pair of breakaway tabs are positioned immediately adjacent one another thereby providing unimpeded access into the hollow interior of the electrical junction box in the area between the breakaway tabs.

According to at least some aspects of some embodiments, the system further comprises orientation adjustment guides on an interior of the electrical junction box.

According to at least some aspects of some embodiments, the system further comprises orientation adjustment guides on an interior of the electrical junction box; and wherein the orientation adjustment guides comprise one or more protrusions extending internally from the wall.

According to at least some aspects of some embodiments, the system further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, the access door comprises one or more movable fingers to allow for an opening into the hollow interior of the electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, an electrical junction box system with a preinstalled electrical device and cover comprises an electrical junction box; the electrical junction box having a wall and forming a hollow interior; the electrical junction box having an access door; an electrical device; a plurality of conductor wires; wherein the connected end of the plurality of conductor wires are electrically connected to the electrical device; a cover; the cover configured to removably connect to the electrical junction box; wherein the electrical device is installed into the electrical junction box and the cover is installed over the electrical junction box and wherein the access door provides access to the conductor wires when the electrical device is installed into the electrical junction box.

According to at least some aspects of some embodiments, the free end of the conductor wires are configured to be pulled out of the hollow interior of the electrical junction box when the access door is opened.

According to at least some aspects of some embodiments, after the electrical junction box is installed onto a structure, the free end of the conductor wires are configured to be pulled out of the hollow interior of the electrical junction box when the access door is opened.

According to at least some aspects of some embodiments, after the electrical junction box is installed onto a structure, the free end of the conductor wires are configured to be pulled out of the hollow interior of the electrical junction box when the access door is opened and electrically connected to an external wire.

According to at least some aspects of some embodiments, after the electrical junction box is installed onto a structure, the free end of the conductor wires are configured to be pulled out of the hollow interior of the electrical junction box when the access door is opened and electrically connected to an external wire and the intersection of the conductor wires and the external wire is configured to be inserted into the hollow interior of the electrical junction box and the access door closed.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at the closed end.

According to at least some aspects of some embodiments, the electrical junction box comprises a pair of breakaway tabs at the closed end; wherein the pair of breakaway tabs are positioned immediately adjacent one another without any components between the adjacent breakaway tabs.

According to at least some aspects of some embodiments, the electrical junction box comprises a pair of breakaway tabs at the closed end; wherein the pair of breakaway tabs are positioned immediately adjacent one another thereby providing unimpeded access into the electrical junction box in the area between the breakaway tabs.

According to at least some aspects of some embodiments, the system further comprises orientation adjustment guides on an interior of the electrical junction box.

According to at least some aspects of some embodiments, the system further comprises orientation adjustment guides on an interior of the electrical junction box; and wherein the orientation adjustment guides comprise one or more protrusions extending internally from the wall.

According to at least some aspects of some embodiments, the system further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, the access door comprises one or more movable fingers to allow for an opening into the hollow interior of the electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, a preassembled electrical junction box system comprises an electrical junction box having an access door; an electrical device installed into the electrical junction box; a cover installed onto the electrical junction box and covering the electrical device; wherein the access door provides access to conductor wires that are electrically connected to the electrical device when the electrical device is installed into the electrical junction box.

According to at least some aspects of some embodiments, a free end of the conductor wires are configured to be pulled out of a hollow interior of the electrical junction box when the access door is opened.

According to at least some aspects of some embodiments, after the electrical junction box is installed onto a structure, a free end of the conductor wires are configured to be pulled out of the hollow interior of the electrical junction box when the access door is opened.

According to at least some aspects of some embodiments, after the electrical junction box is installed onto a structure, a free end of the conductor wires are configured to be pulled out of the hollow interior of the electrical junction box when the access door is opened and electrically connected to an external wire.

According to at least some aspects of some embodiments, after the electrical junction box is installed onto a structure, a free end of the conductor wires are configured to be pulled out of the hollow interior of the electrical junction box when the access door is opened and electrically connected to an external wire and the intersection of the conductor wires and the external wire is configured to be inserted into the hollow interior of the electrical junction box and the access door closed.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from a peripheral edge of the electrical junction box while simultaneously a body of the electrical junction box protrudes into a hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into a hollow interior of the electrical junction box when the access door is in a closed configuration.

According to at least some aspects of some embodiments, the electrical junction box comprises French-door style breakaway tabs at a closed end.

According to at least some aspects of some embodiments, the electrical junction box comprises a pair of breakaway tabs at a closed end; wherein the pair of breakaway tabs are positioned immediately adjacent one another without any components between the adjacent breakaway tabs.

According to at least some aspects of some embodiments, the electrical junction box comprises a pair of breakaway tabs at a closed end; wherein the pair of breakaway tabs are positioned immediately adjacent one another thereby providing unimpeded access into the electrical junction box in the area between the breakaway tabs.

According to at least some aspects of some embodiments, the system further comprises orientation adjustment guides on an interior of a wall of the electrical junction box.

According to at least some aspects of some embodiments, the system further comprises orientation adjustment guides on an interior of a wall of the electrical junction box; and wherein the orientation adjustment guides comprise one or more protrusions extending into a hollow interior of the electrical junction box from the wall.

According to at least some aspects of some embodiments, the system further comprises orientation adjustment guides on an interior of a wall of the electrical junction box; and wherein the orientation adjustment guides comprise one or more protrusions extending into a hollow interior of the electrical junction box from the wall; wherein the one or more protrusions interact with a tab of the electrical device to adjust the orientation of the electrical device relative to the electrical junction box.

According to at least some aspects of some embodiments, the access door further comprising at least one connection member that is configured to releasably connect the access door in a closed configuration.

According to at least some aspects of some embodiments, the access door comprises one or more movable fingers to allow for an opening into electrical junction box when the access door is in the closed configuration.

According to at least some aspects of some embodiments, the electrical device is an electrical receptacle.

According to at least some aspects of some embodiments, the electrical device is a switch.

According to additional aspects of the present disclosure, a method of installing an electrical device comprise providing an electrical junction box; the electrical junction box having a peripheral edge and a top wall, a bottom wall, a pair of side walls and a rear wall forming a hollow interior and having an access door; the electrical junction box having an electrical device installed into the electrical junction box, the electrical device having a plurality of conductor wires electrically connected to the electrical device; the electrical junction box having a cover installed onto the electrical junction box and covering the electrical device, the cover having a front wall, a top wall, a bottom wall, a pair of side walls and a peripheral edge forming a hollow interior; installing the electrical junction box onto a structure; opening the access door of the electrical junction box; pulling free ends of the conductor wires out of the hollow interior of the electrical junction box after the access door is opened; electrically connecting the free ends of the conductor wires to an external wire; pushing the free ends of the conductor wires back into the hollow interior of the electrical junction box after electrically connecting the free ends of the conductor wires to the external wire; closing the access door after the free ends of the conductor wires are pushed back into the hollow interior of the electrical junction box after the free ends of the conductor wires are electrically connected to the external wire.

According to at least some aspects of some embodiments, the method further comprises the step of drywalling around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of painting around the electrical junction box after mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of removing the cover from the electrical junction box after painting around the electrical junction box after mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of installing a faceplate over the electrical device and electrical junction box after removing the cover from the electrical junction box after painting around the electrical junction box after mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of drywalling around the electrical junction box.

According to at least some aspects of some embodiments, the method further comprises the step of removing the cover after drywall is installed around the electrical junction box.

According to at least some aspects of some embodiments, the method further comprises the step of installing a faceplate over the electrical device after the cover is removed and after drywall is installed around the electrical junction box.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the hollow interior of the electrical junction box when the access door is in a closed configuration.

According to at least some aspects of some embodiments, the electrical junction box comprises French-door style breakaway tabs at a closed end.

According to at least some aspects of some embodiments, the electrical junction box comprises a pair of breakaway tabs at a closed end; wherein the pair of breakaway tabs are positioned immediately adjacent one another without any components between the adjacent breakaway tabs.

According to at least some aspects of some embodiments, the electrical junction box comprises a pair of breakaway tabs at a closed end; wherein the pair of breakaway tabs are positioned immediately adjacent one another thereby providing unimpeded access into the electrical junction box in the area between the breakaway tabs.

According to at least some aspects of some embodiments, the method further comprises orientation adjustment guides on an interior of the electrical junction box.

According to at least some aspects of some embodiments, the method further comprises orientation adjustment guides on an interior of the electrical junction box; and wherein the orientation adjustment guides comprise one or more protrusions extending internally into the hollow interior of the electrical junction box.

According to at least some aspects of some embodiments, the method further comprises orientation adjustment guides on an interior of the electrical junction box; and wherein the orientation adjustment guides comprise one or more protrusions extending internally into the hollow interior of the electrical junction box; wherein the one or more protrusions interact with a tab of the electrical device to adjust the orientation of the electrical device relative to the electrical junction box.

According to at least some aspects of some embodiments, the cover is connected to the electrical junction box via a runner.

According to at least some aspects of some embodiments, the access door is connected to the electrical junction box via a living hinge.

According to at least some aspects of some embodiments, the access door further comprising at least one connection member that is configured to releasably connect the access door in a closed configuration.

According to at least some aspects of some embodiments, the access door comprises one or more movable fingers to allow for an opening into the hollow interior of the into the hollow interior of the electrical junction box when the access door is in the closed configuration.

According to additional aspects of the present disclosure, a method of installing an electrical device comprises providing an electrical junction box having an access door in a side of the electrical junction box and an electrical device installed into the electrical junction box and a cover installed onto the electrical junction box and covering the electrical device; installing the electrical junction box onto a structure; opening the access door of the electrical junction box; pulling free ends of the conductor wires out of the hollow interior of the electrical junction box after the access door is opened; electrically connecting the free ends of the conductor wires to an external wire; pushing the free ends of the conductor wires back into the hollow interior of the electrical junction box; closing the access door after the free ends of the conductor wires are pushed back into the hollow interior of the electrical junction box.

According to at least some aspects of some embodiments, the method further comprises the step of drywalling around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of painting around the electrical junction box after mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of removing the cover from the electrical junction box after painting around the electrical junction box after mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of installing a faceplate over the electrical device and electrical junction box after removing the cover from the electrical junction box after painting around the electrical junction box after mudding around the electrical junction box after drywall is installed around the electrical junction box after the access door is closed which is after the free ends of the conductor wires are pushed back into the hollow interior of the electrical junction box after the free ends of the conductor wires are electrically connected to the external wire.

According to at least some aspects of some embodiments, the method further comprises the step of drywalling around the electrical junction box.

According to at least some aspects of some embodiments, the method further comprises the step of removing the cover after drywall is installed around the electrical junction box.

According to at least some aspects of some embodiments, the method further comprises the step of installing a faceplate over the electrical device after the cover is removed and after drywall is installed around the electrical junction box.

According to at least some aspects of some embodiments, the access door is connected to the electrical junction box by a hinge.

According to at least some aspects of some embodiments, the access door is connected to the electrical junction box by a living hinge.

According to at least some aspects of some embodiments, when the electrical device is installed into the electrical junction box, a face of the electrical device protrudes forward from the peripheral edge of the electrical junction box while simultaneously a body of the electrical junction box protrudes into the hollow interior of the electrical junction box.

According to at least some aspects of some embodiments, the cover is removably connected to the electrical junction box by mechanical fasteners.

According to at least some aspects of some embodiments, the cover is removably connected to the electrical junction box by one or more screws.

According to at least some aspects of some embodiments, the cover is removably connected to the electrical junction box by non-mechanical fastening.

According to at least some aspects of some embodiments, the cover is removably connected to the electrical junction box by friction fit members.

According to at least some aspects of some embodiments, the access door comprises one or more movable tabs to allow for an opening into the electrical junction box when the access door is in a closed configuration.

According to at least some aspects of some embodiments, the electrical junction box comprises French-door style breakaway tabs at a closed end.

According to at least some aspects of some embodiments, the electrical junction box comprises a pair of breakaway tabs at a closed end; wherein the pair of breakaway tabs are positioned immediately adjacent one another without any components between the adjacent breakaway tabs.

According to at least some aspects of some embodiments, the electrical junction box comprises a pair of breakaway tabs at a closed end; wherein the pair of breakaway tabs are positioned immediately adjacent one another thereby providing unimpeded access into the electrical junction box in the area between the breakaway tabs.

According to at least some aspects of some embodiments, the method further comprises orientation adjustment guides on an interior of the electrical junction box.

According to at least some aspects of some embodiments, the method further comprises orientation adjustment guides on an interior of the electrical junction box; and wherein the orientation adjustment guides comprise one or more protrusions extending internally from the wall.

According to at least some aspects of some embodiments, the method further comprises orientation adjustment guides on an interior of the electrical junction box; and wherein the orientation adjustment guides comprise one or more protrusions extending internally from the wall; wherein the one or more protrusions interact with a tab of the electrical device to adjust the orientation of the electrical device relative to the electrical junction box.

According to at least some aspects of some embodiments, the cover is connected to the electrical junction box via a runner.

According to at least some aspects of some embodiments, the access door is connected to the electrical junction box via a living hinge.

According to at least some aspects of some embodiments, the method further comprises comprising at least one connection member that is configured to releasably connect the access door in a closed configuration.

According to at least some aspects of some embodiments, the access door comprises one or more movable fingers to allow for an opening into the interior of the electrical junction box when the access door is in the closed configuration.

According to at least some additional aspects of the disclosure, a method of installing an electrical junction box that complies with building and electrical codes from authorities having jurisdiction, which comprises an electrical junction box; the electrical junction box having a peripheral edge and a top wall, a bottom wall, a pair of side walls and a rear wall forming a hollow interior; an access opening; the access opening positioned in the electrical junction box; an access door; the access door configured to removably connect to the electrical junction box; wherein when the access door is connected to the electrical junction box, the access door covers the access opening; wherein when the access door is removed from the electrical junction box, the access door provides access into the hollow interior of the electrical junction box through the access opening; an electrical device; the electrical device connected to and at least partially disposed within the electrical junction box; a cover; the cover having a front wall, a top wall, a bottom wall, and a pair of side walls and a peripheral edge forming a hollow interior; the cover configured to removably connect to the electrical junction box thereby covering the electrical device when the electrical device is installed into the electrical junction box.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views, unless stated otherwise. The drawings are presented for exemplary purposes and may not be to scale unless otherwise indicated.

An artisan of ordinary skill in the art need not view, within isolated figure(s), the near infinite distinct combinations of features described in the following detailed description to facilitate an understanding of the present disclosure.

Figure 1A:
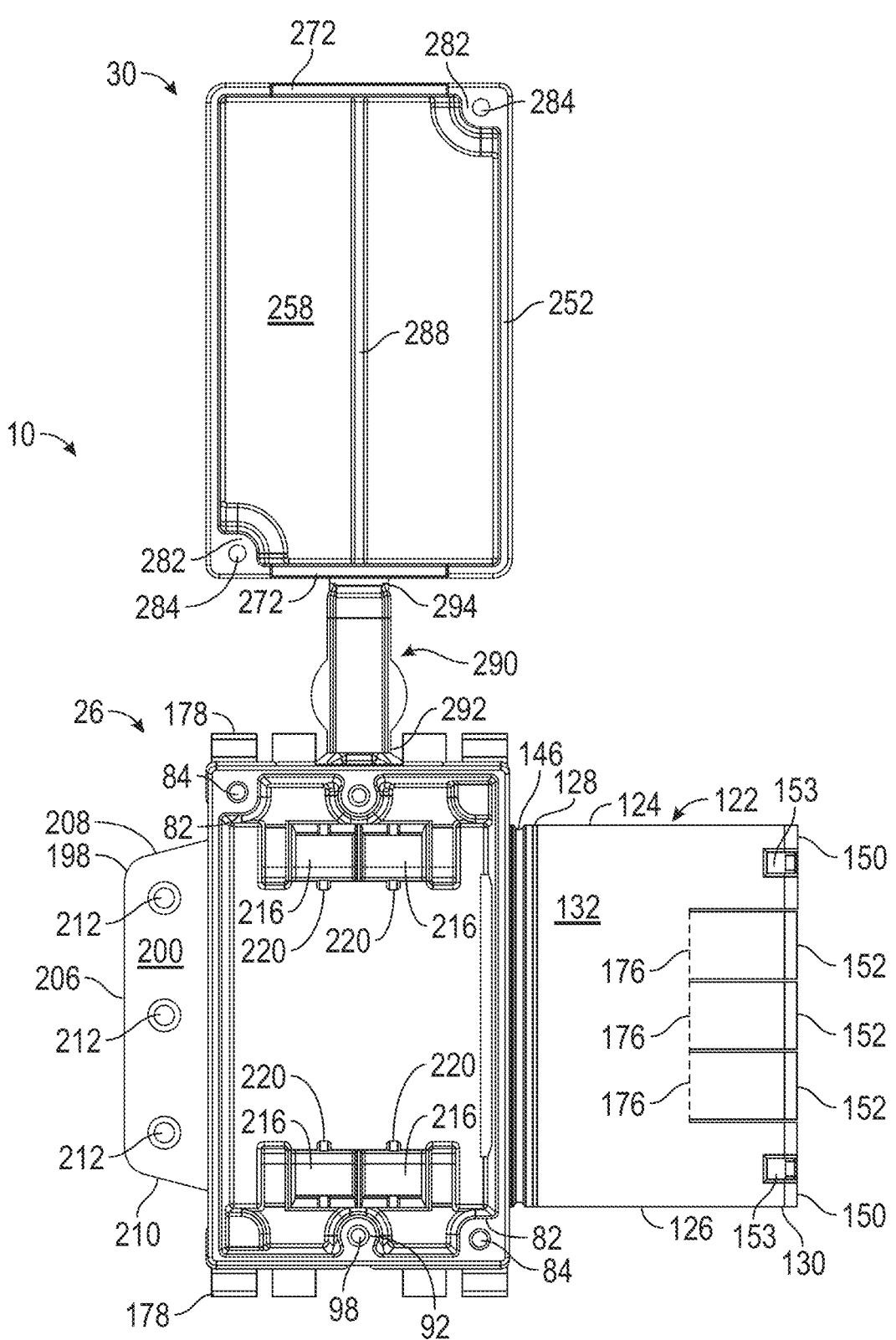
Figure 1B:
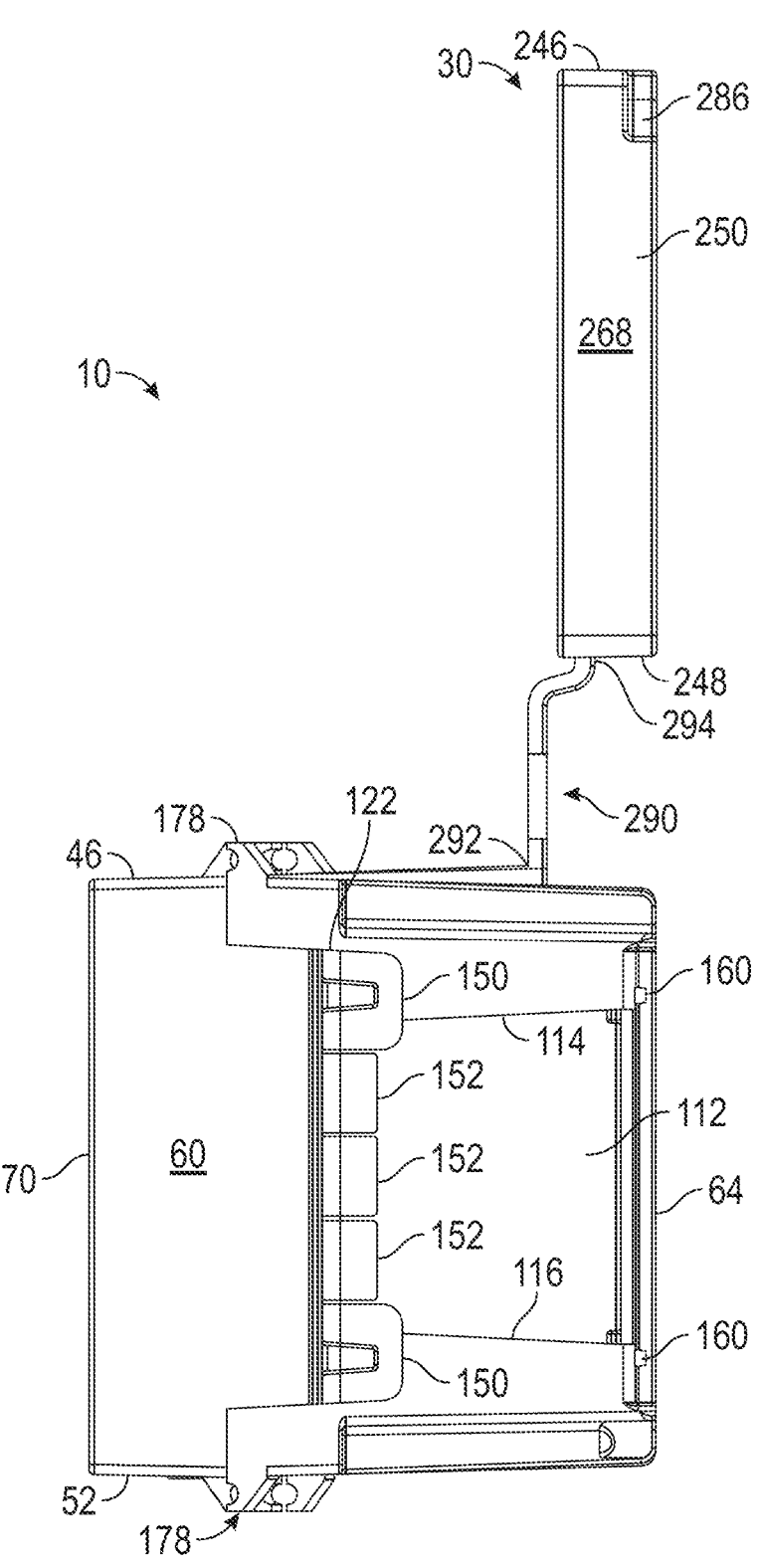
Figure 2A:
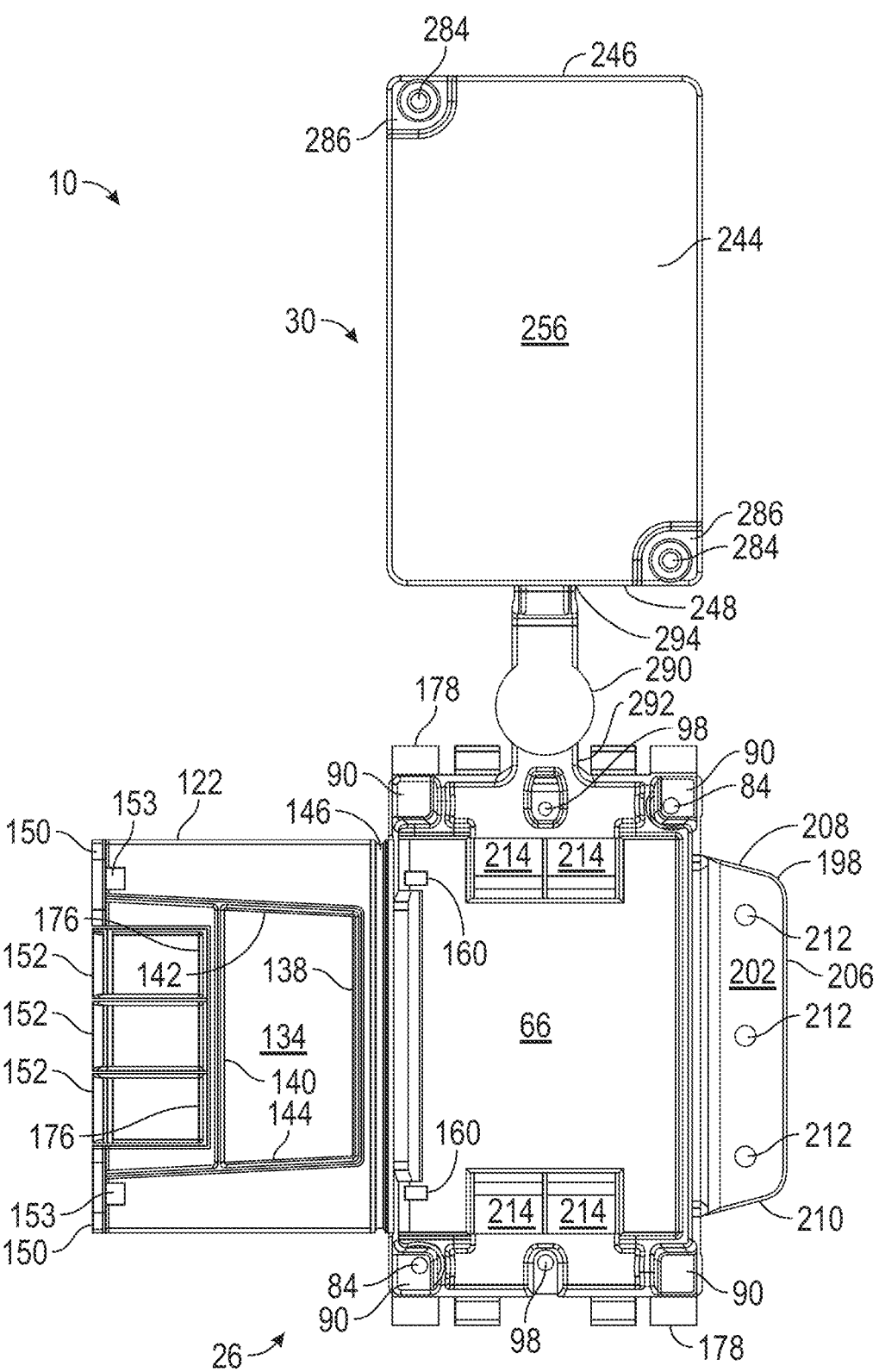
Figure 2B:
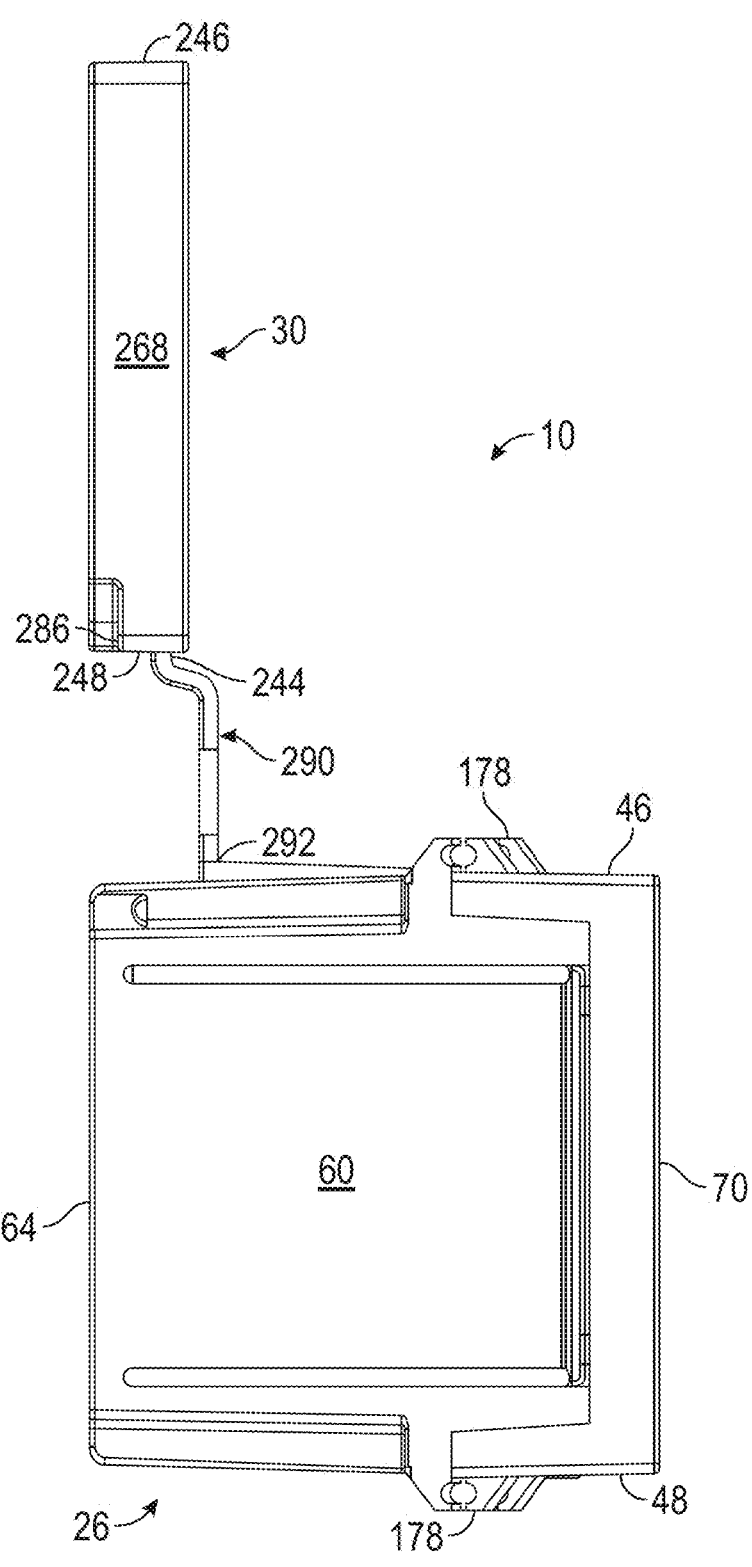
Figure 3A:
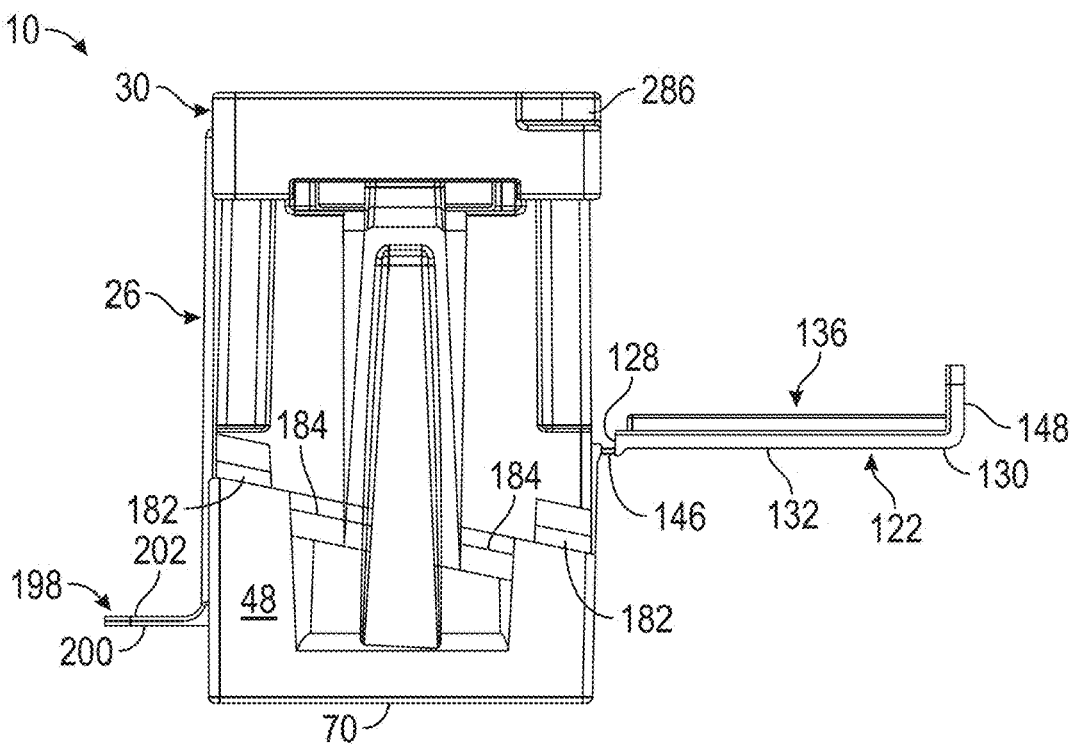
Figure 3B:
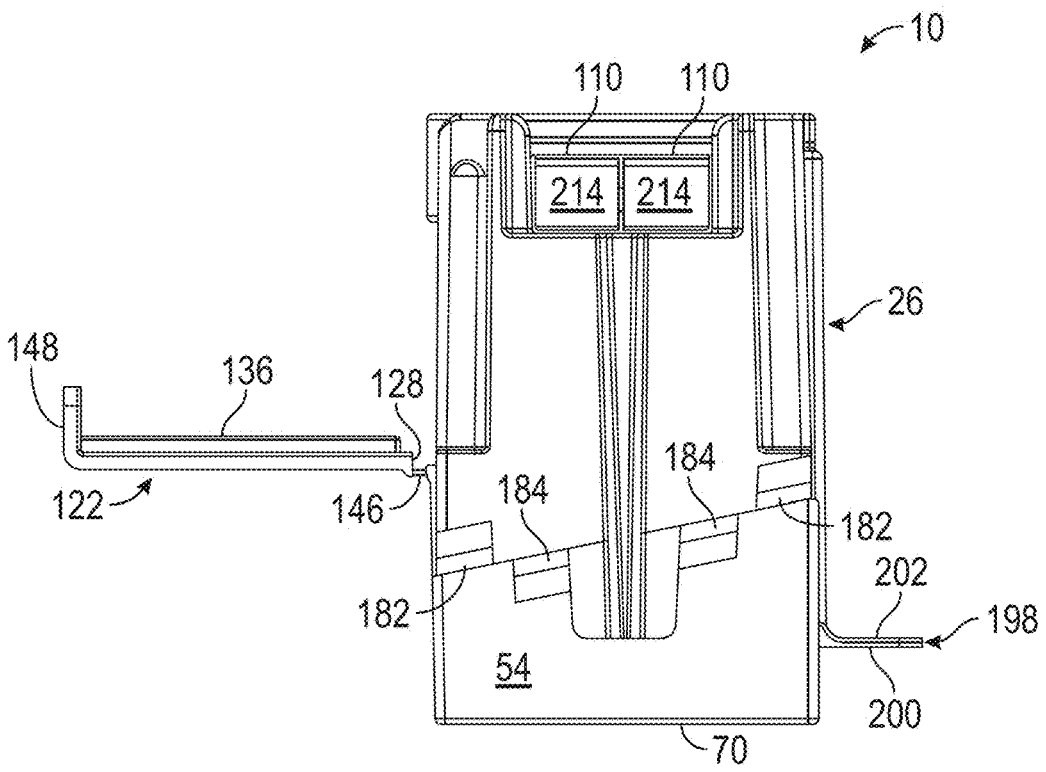
Figure 4A:
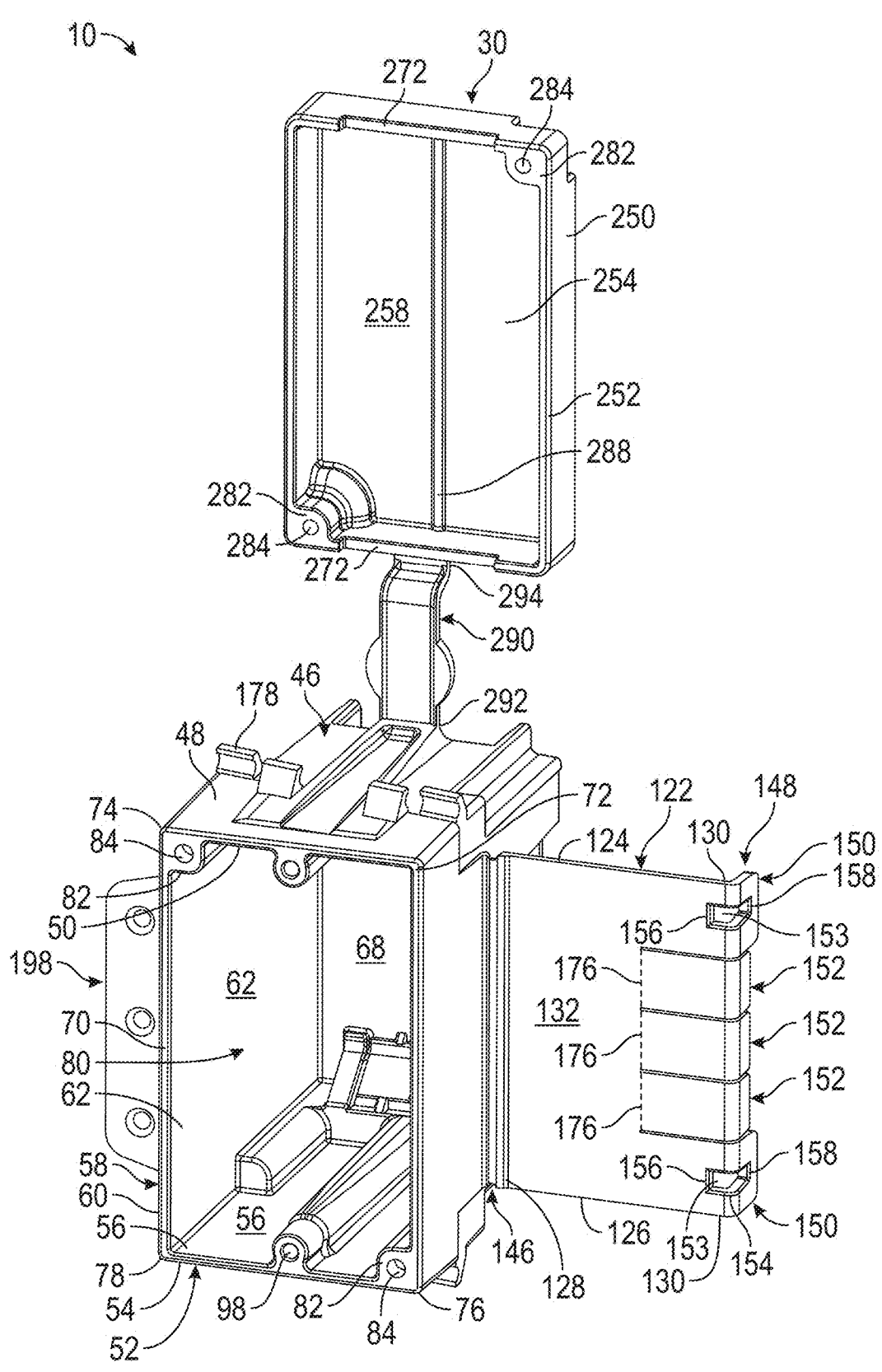
Figure 4B:
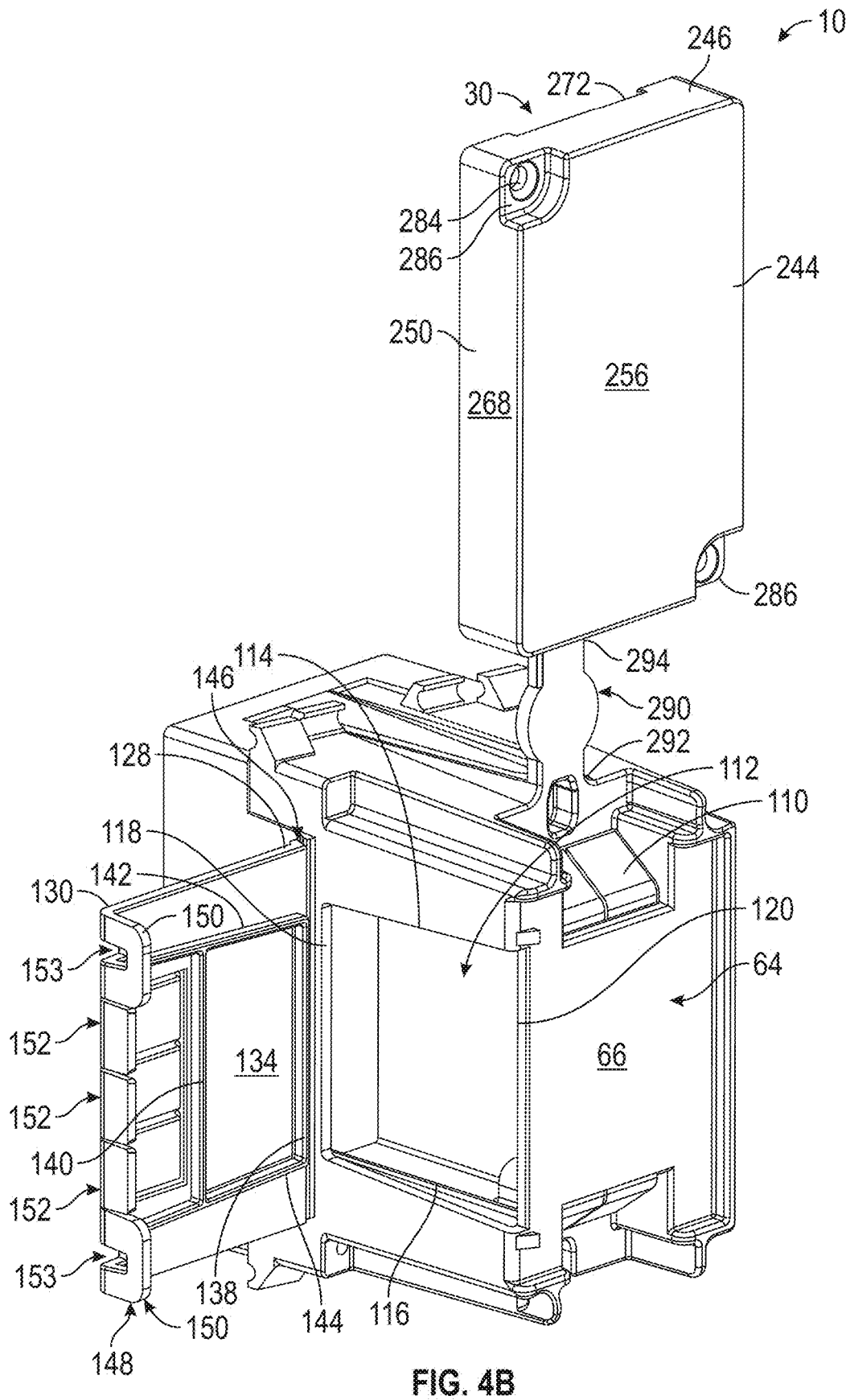
Figure 5A:
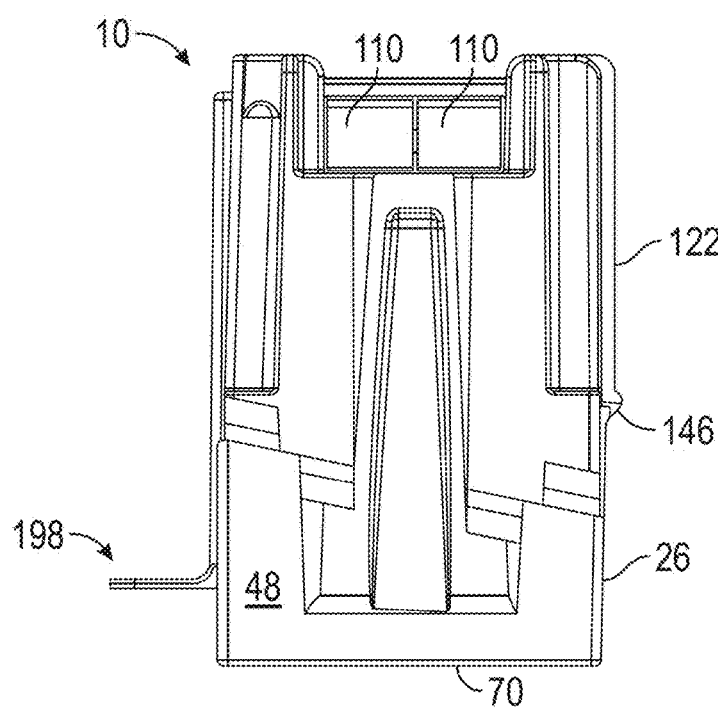
Figure 5B:
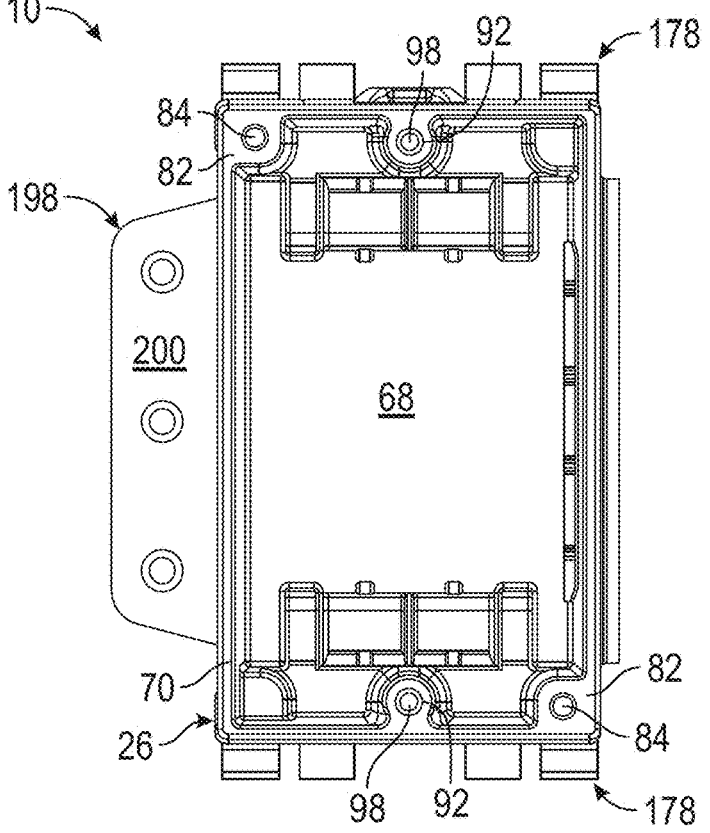
Figure 5C:
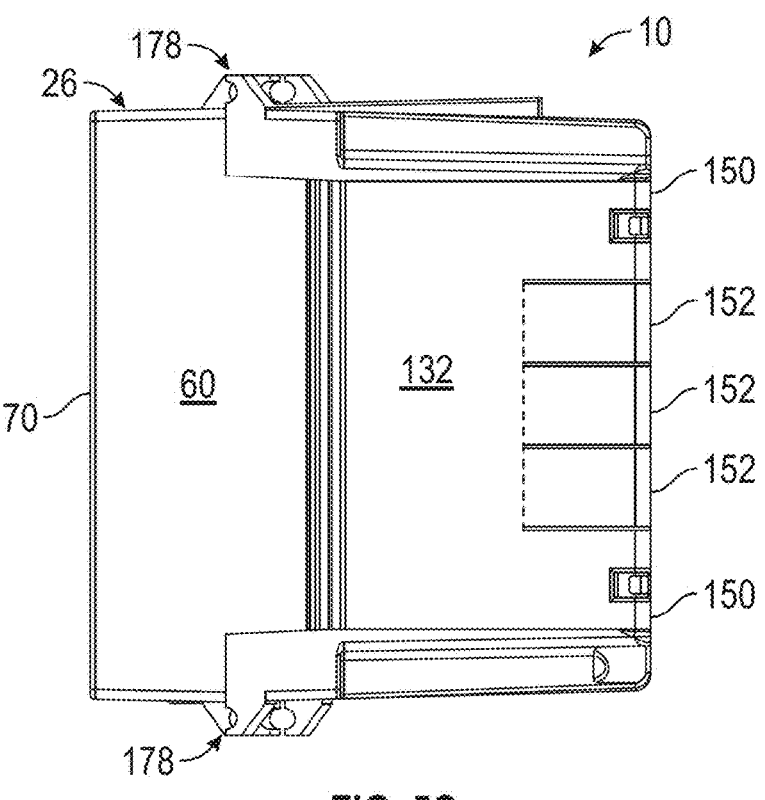
Figure 6A:
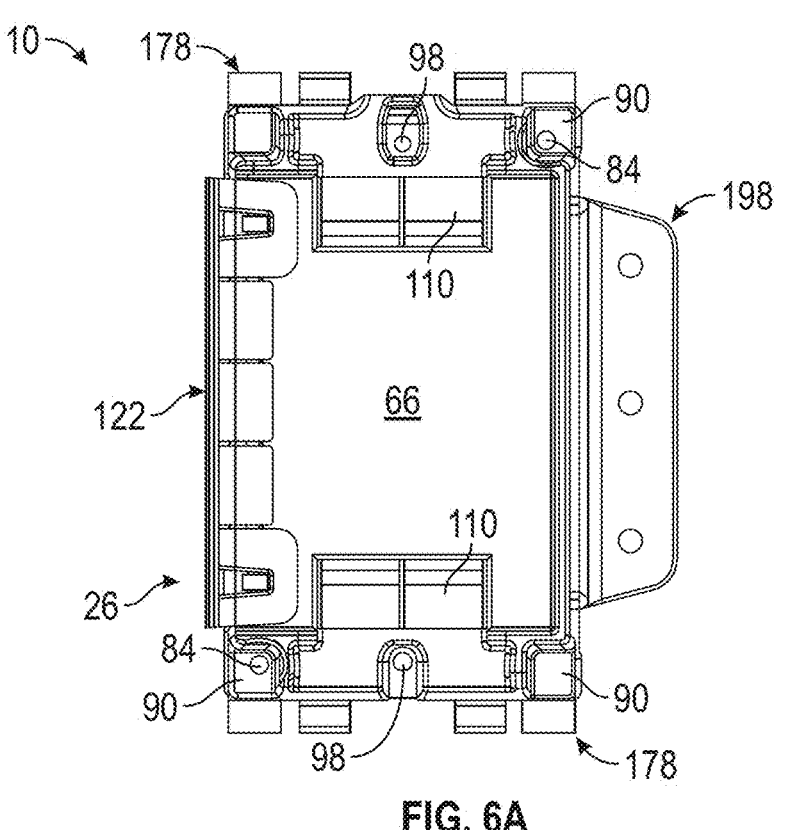
Figure 6B:
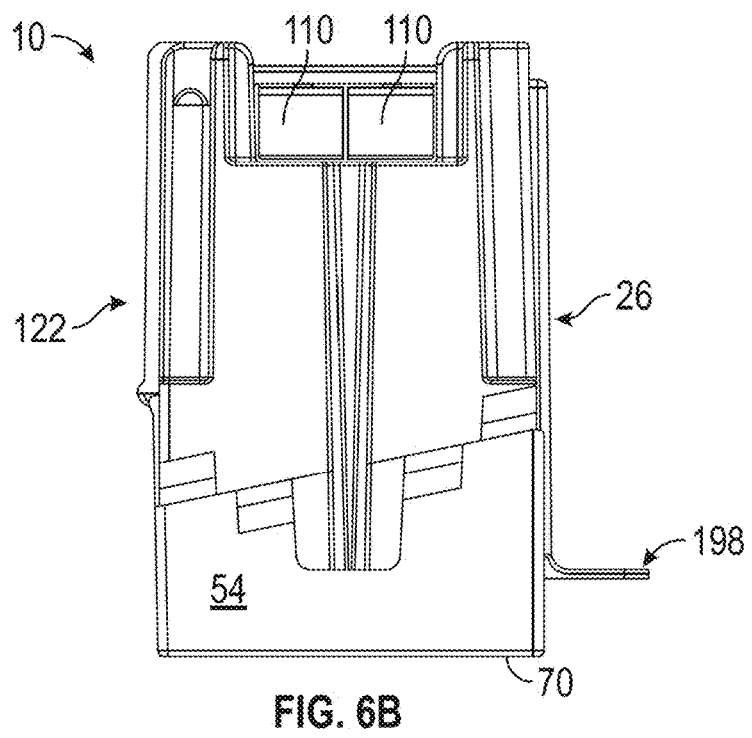
Figure 6C:
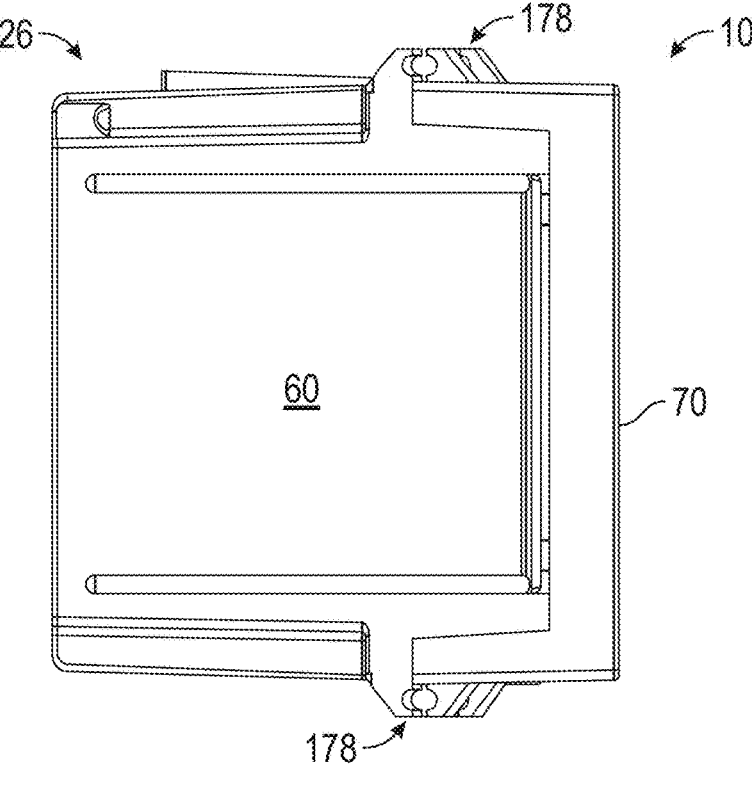
Figures 7A, 7B:
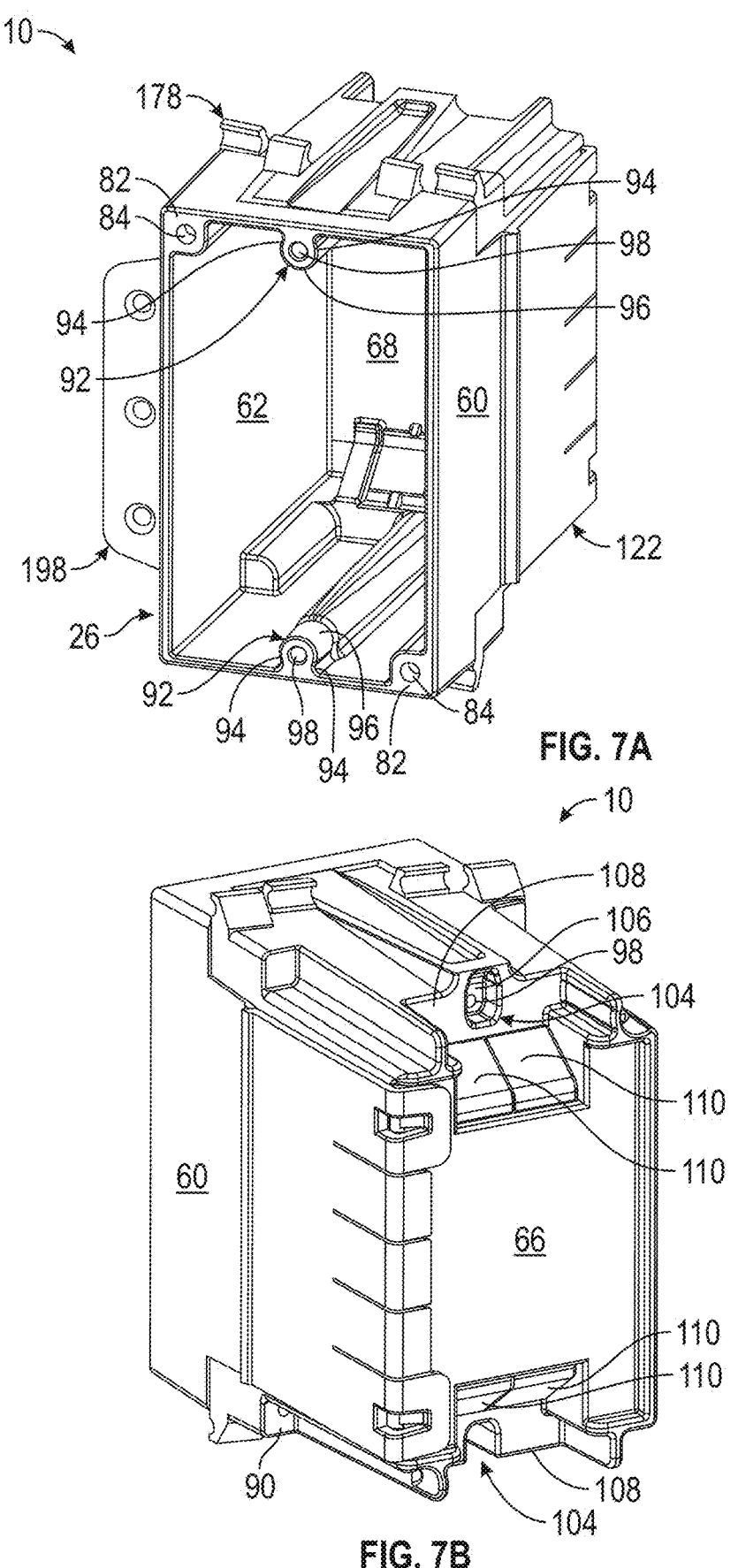
Figure 7C:
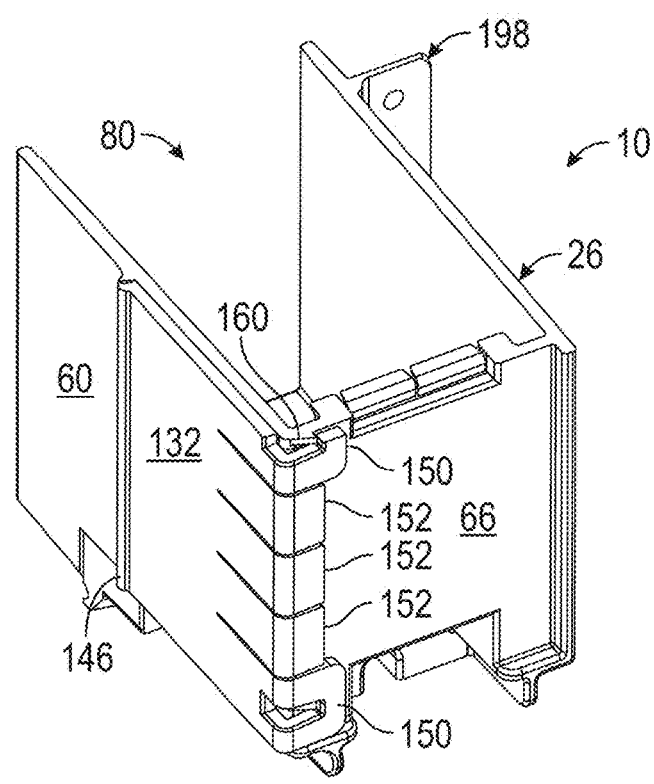
Figure 7D:
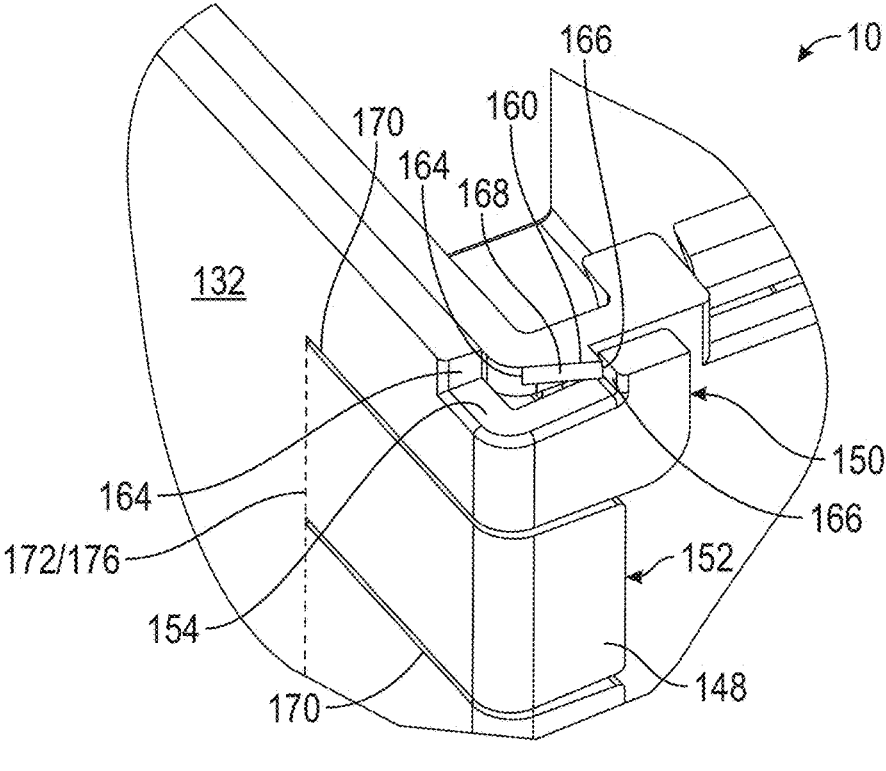
Figure 8A:
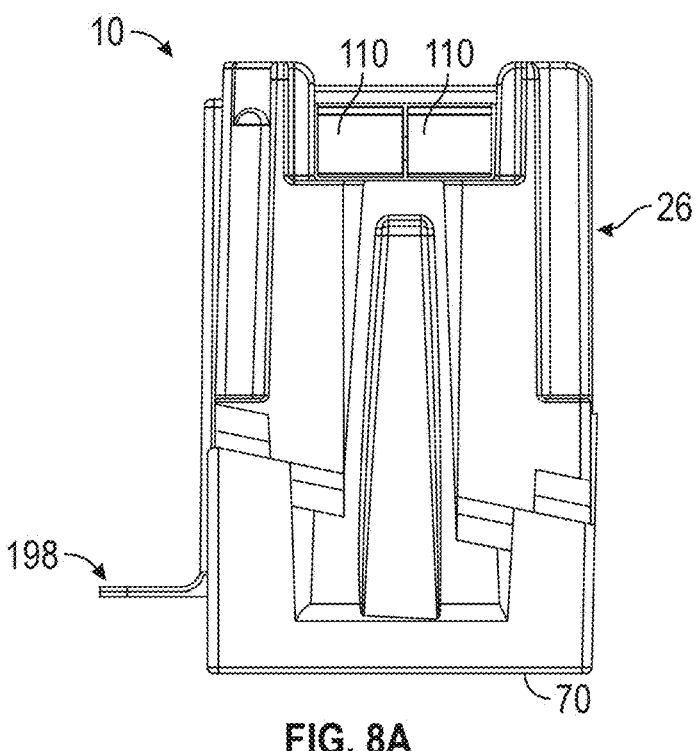
Figure 8B:
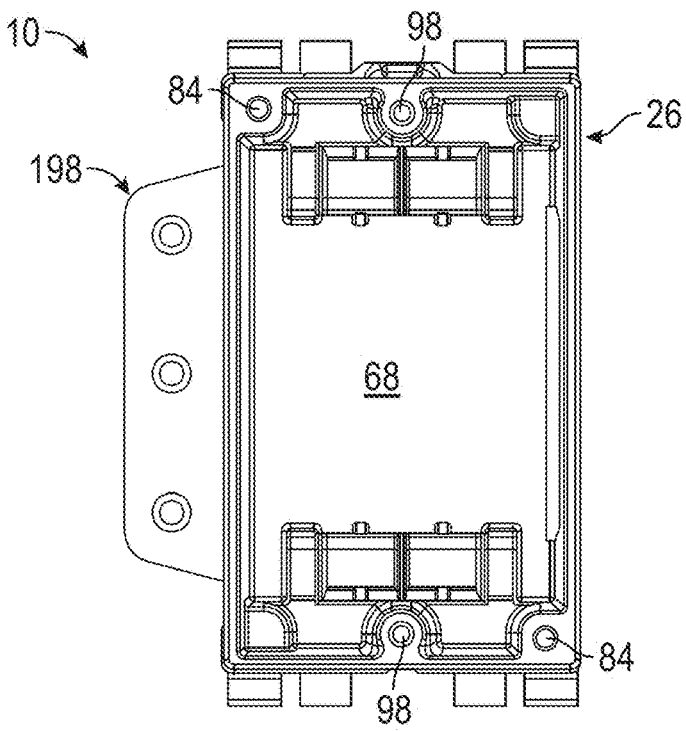
Figure 8C:
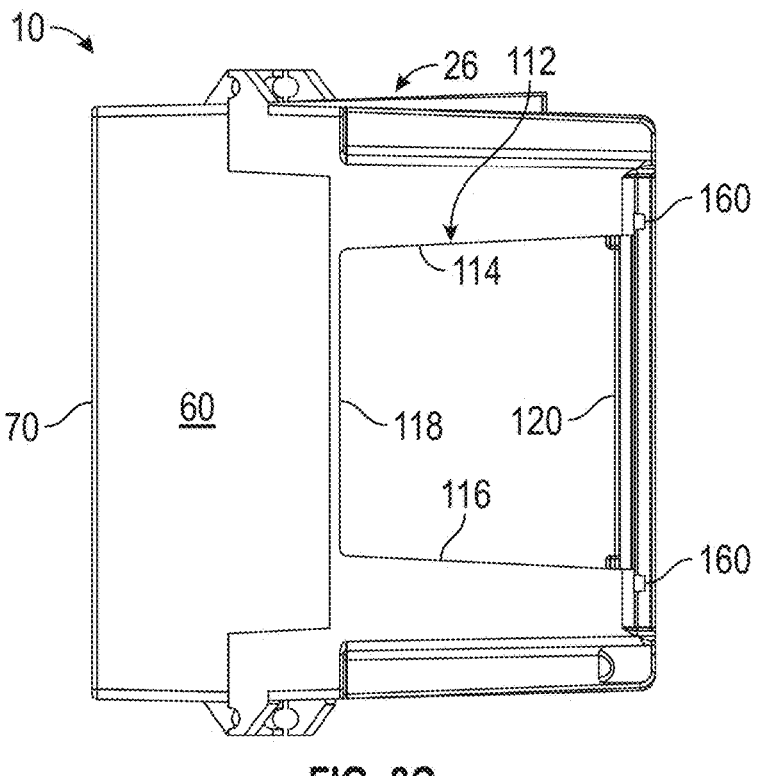
Figure 8D:
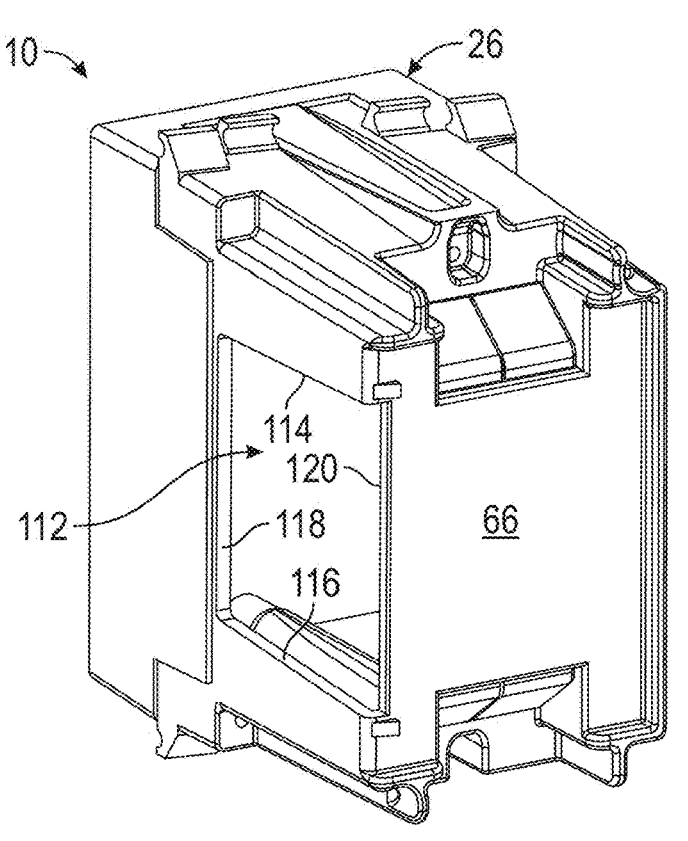
Figure 9A:
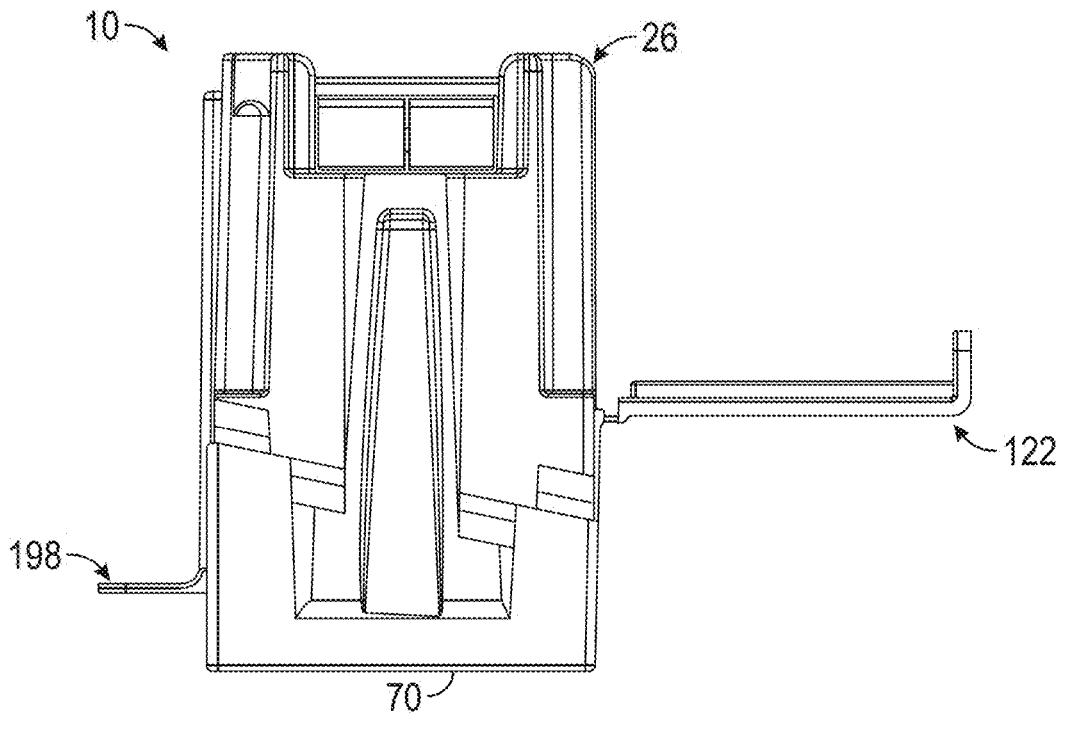
Figure 9B:
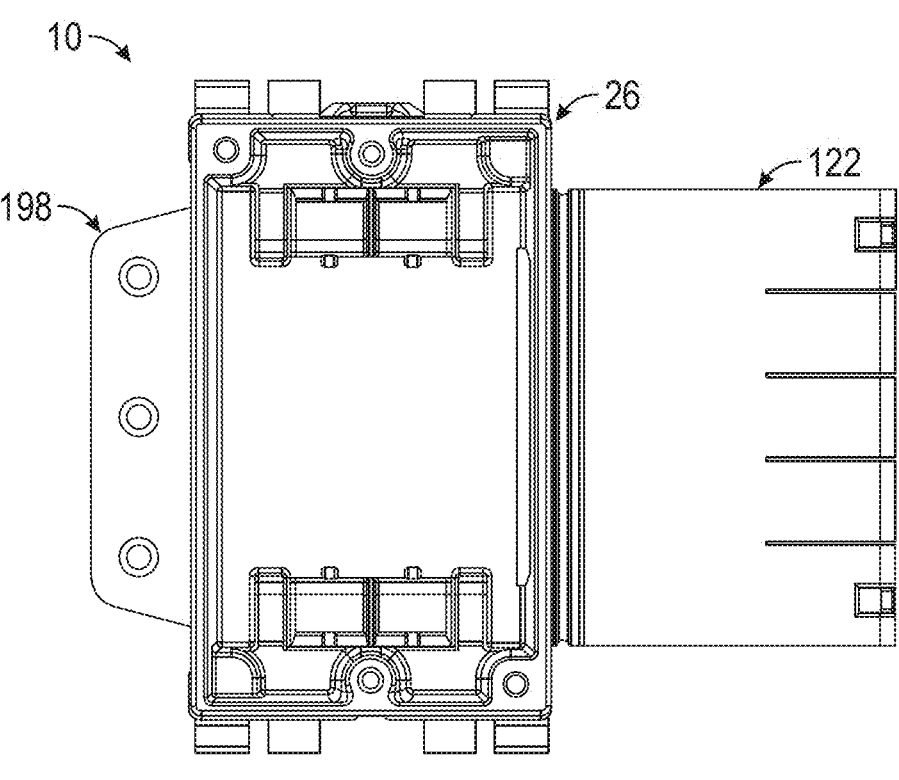
Figure 9C:
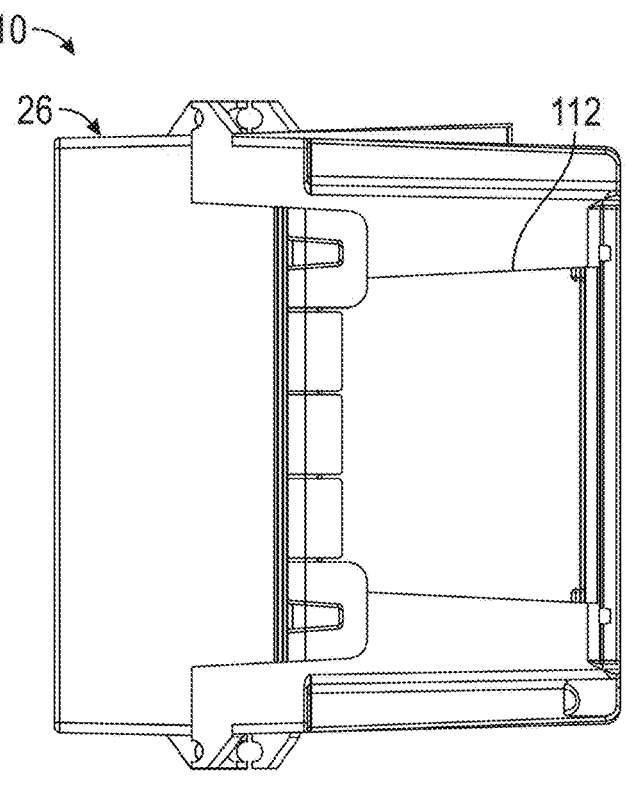
Figure 9D:
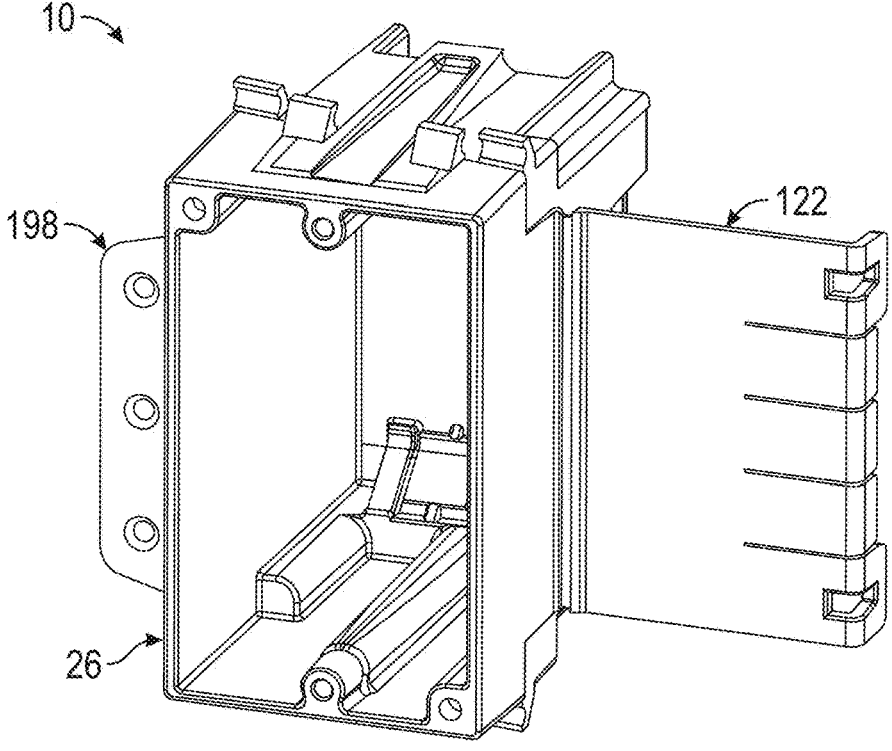
Figure 10A:
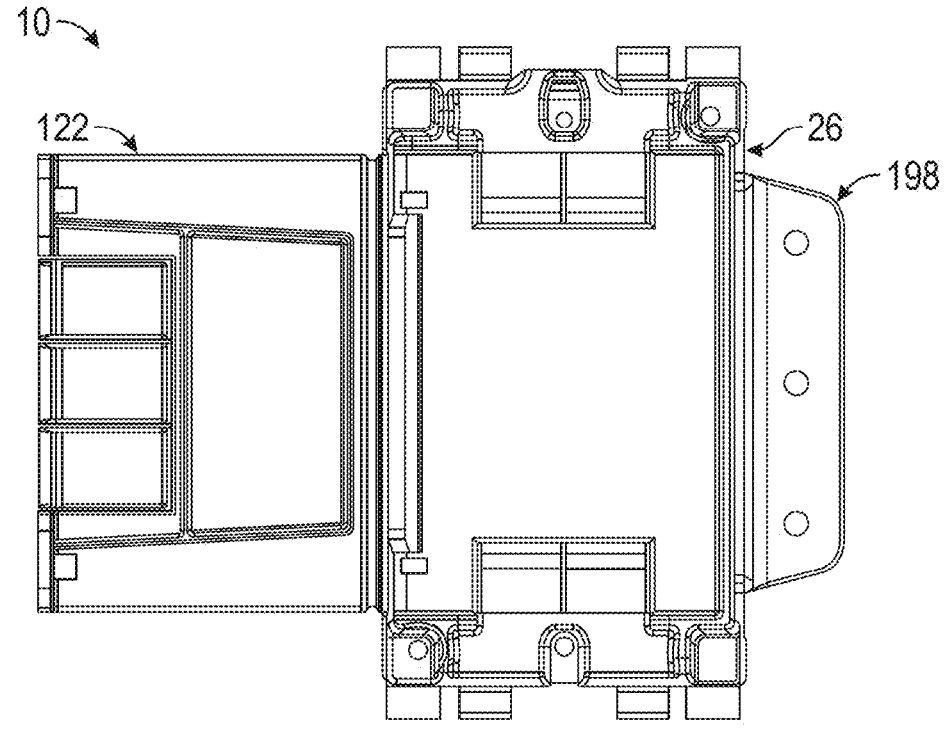
Figure 10B:
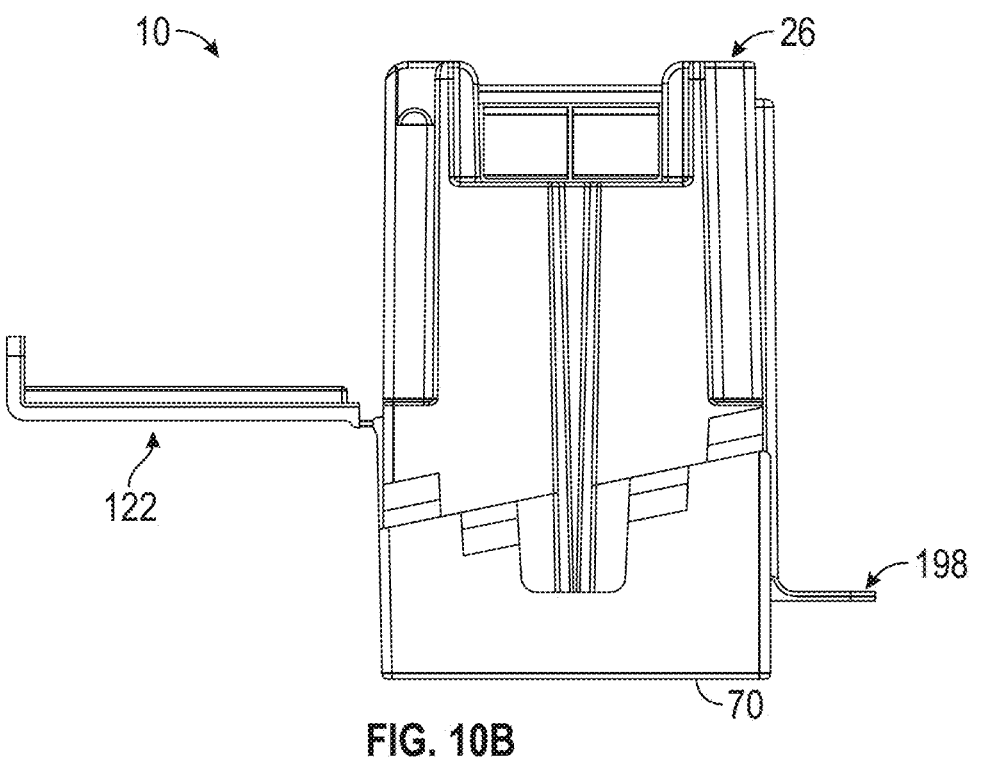
Figure 10C:
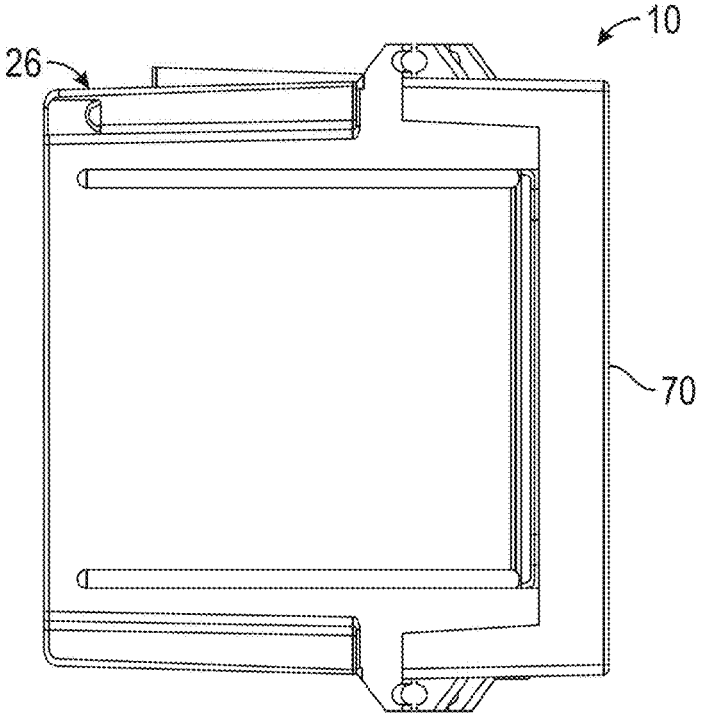
Figure 10D:
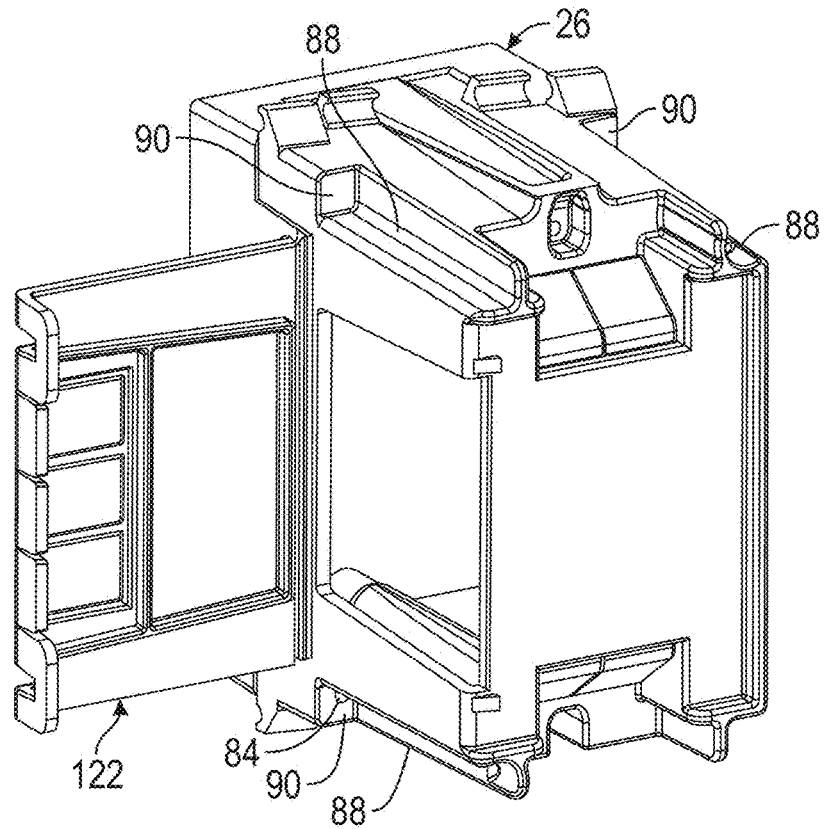
Figure 11A:
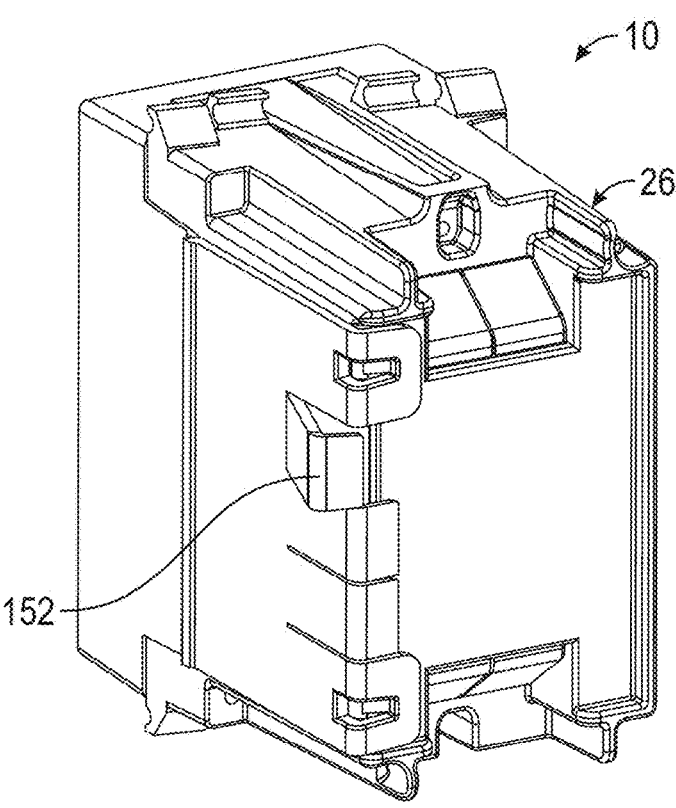
Figure 11B:
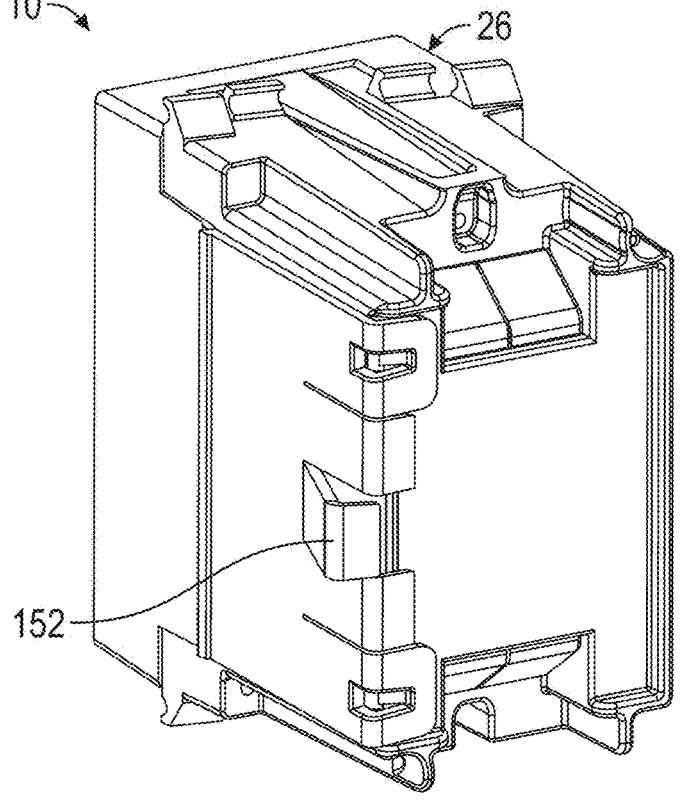
Figure 11C:
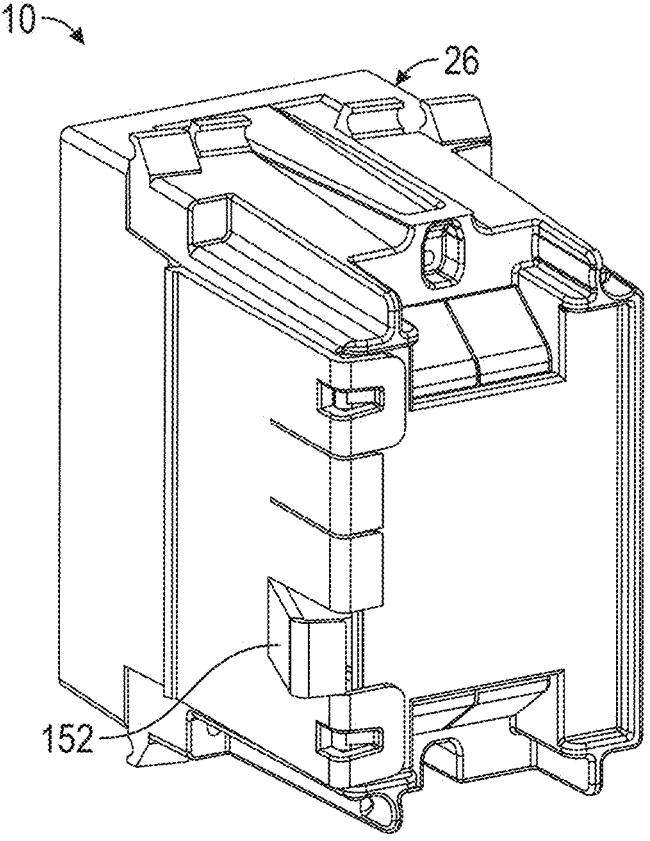
Figures 12A, 12B:
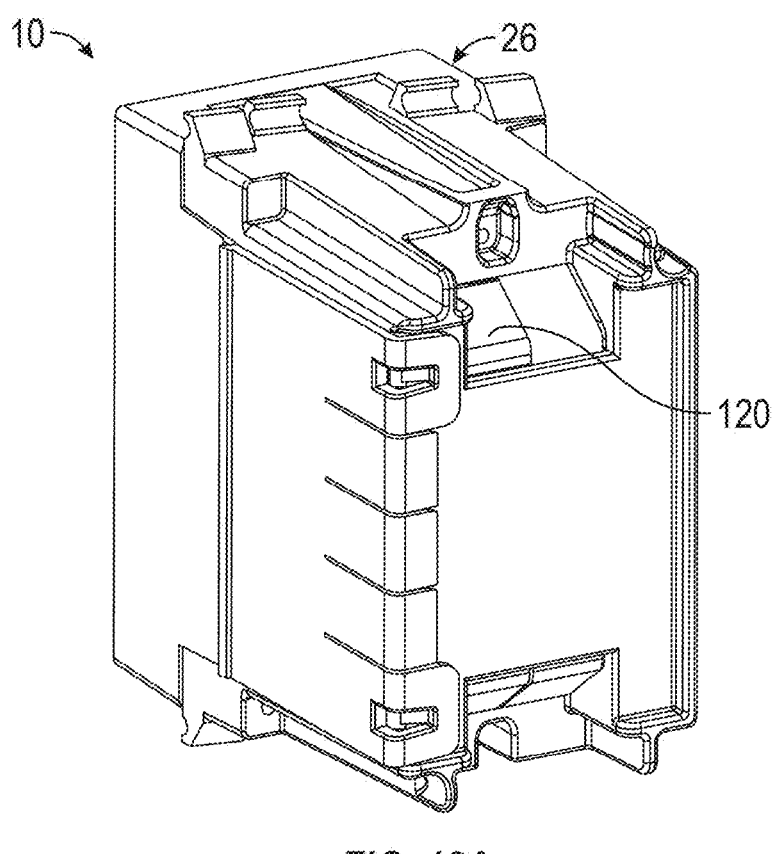
Figure 12C:
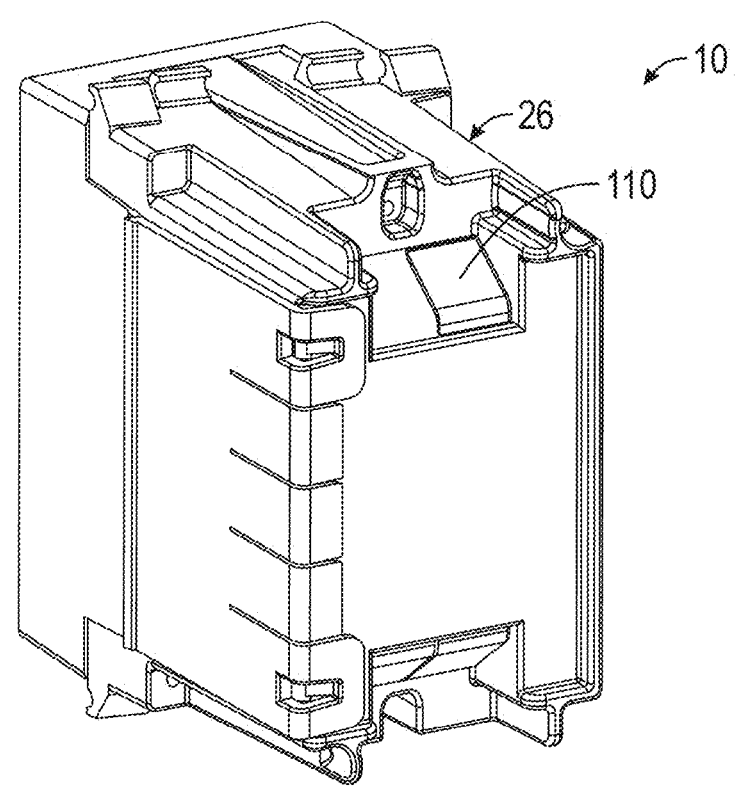
Figure 12D:
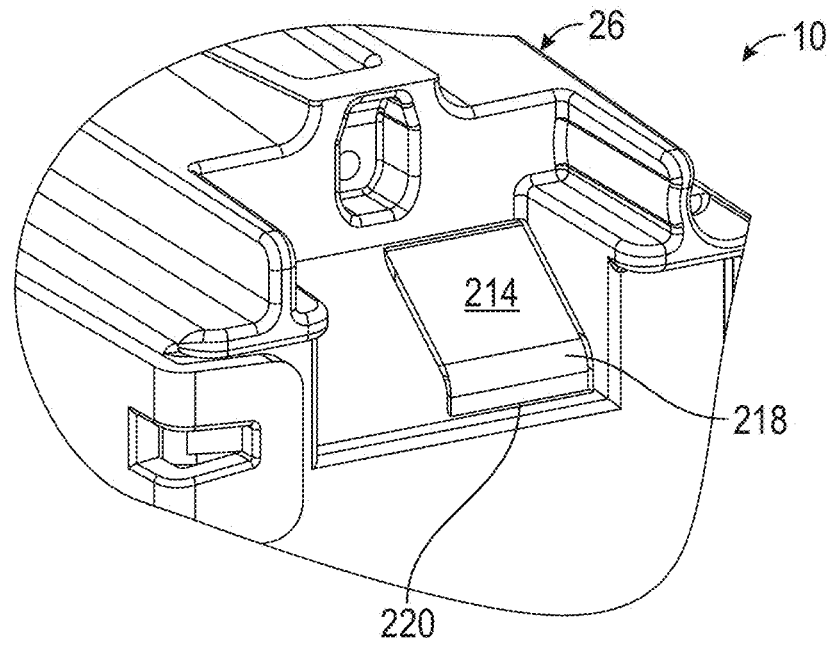
Figure 13A:
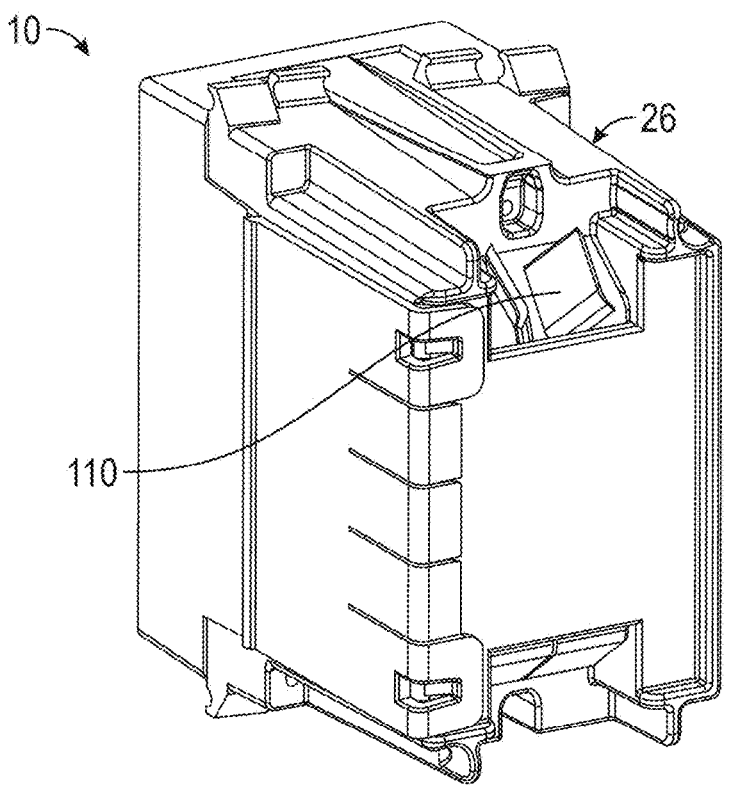
Figure 13B:
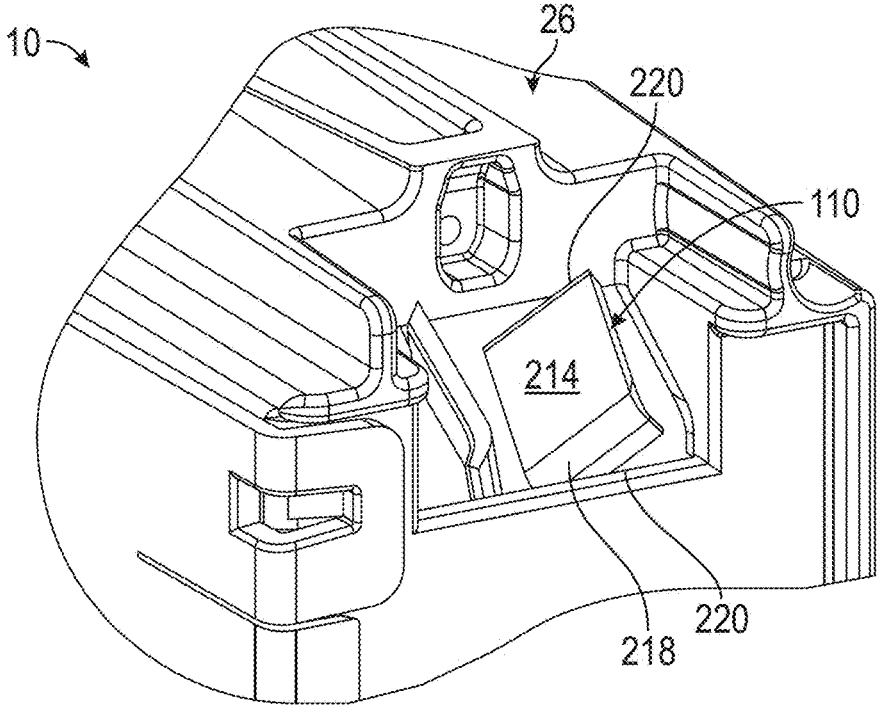
Figure 13C:
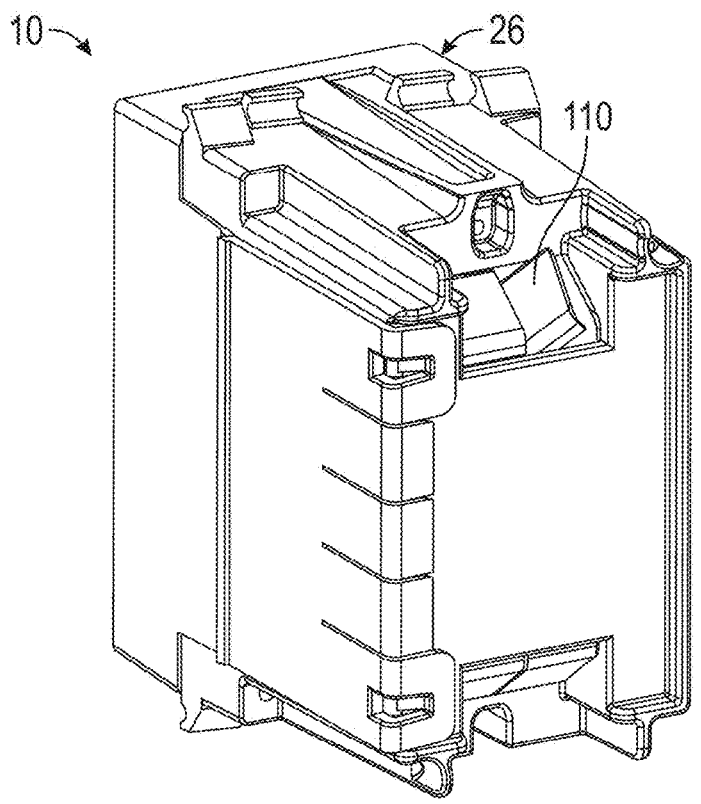
Figure 13D:
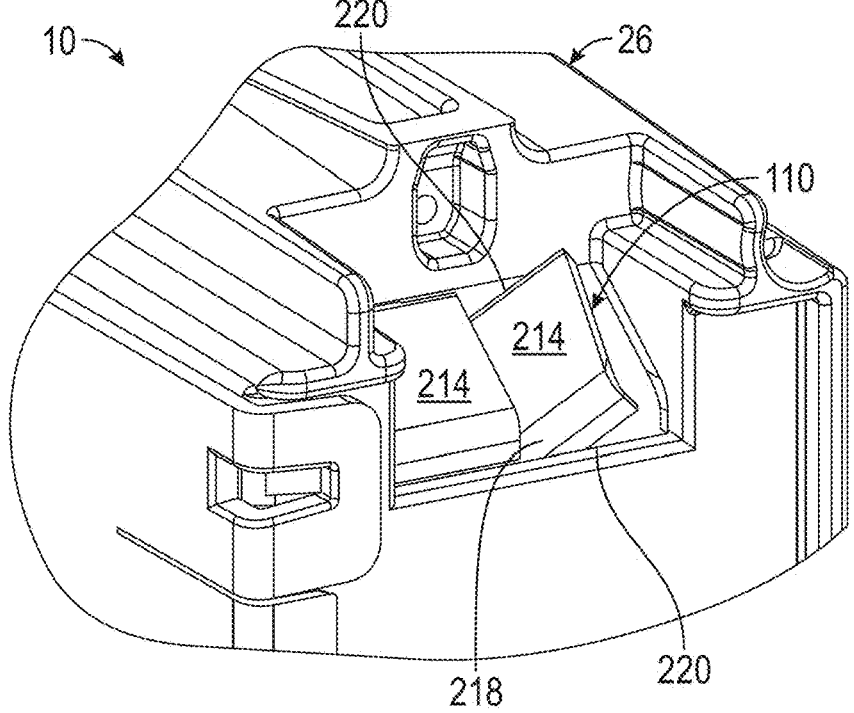
Figures 14D, 14E, 14F:
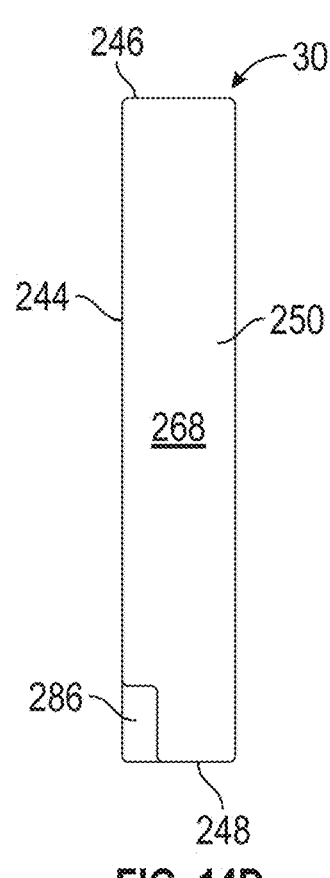
Figure 15A:
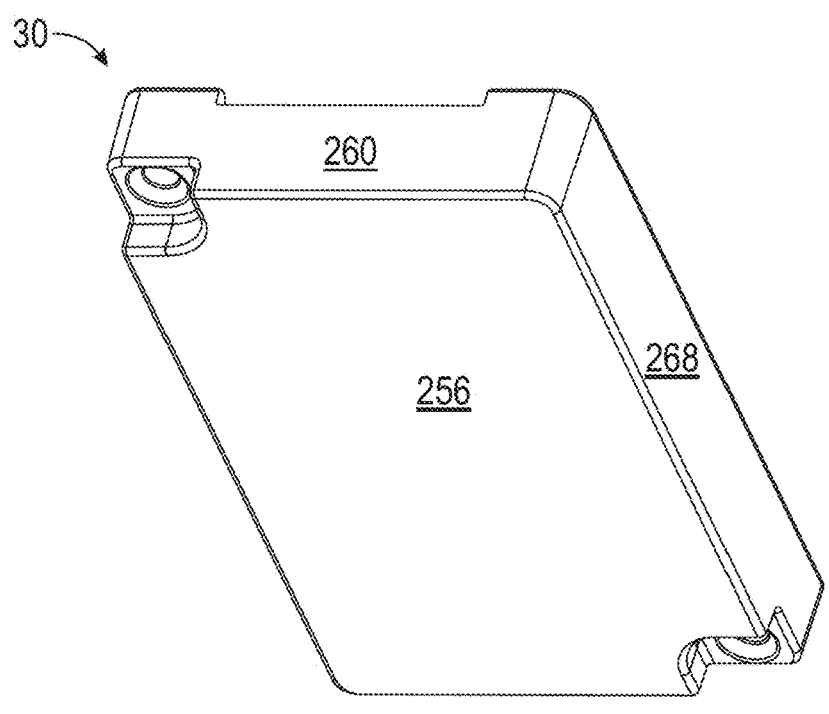
Figure 15B:
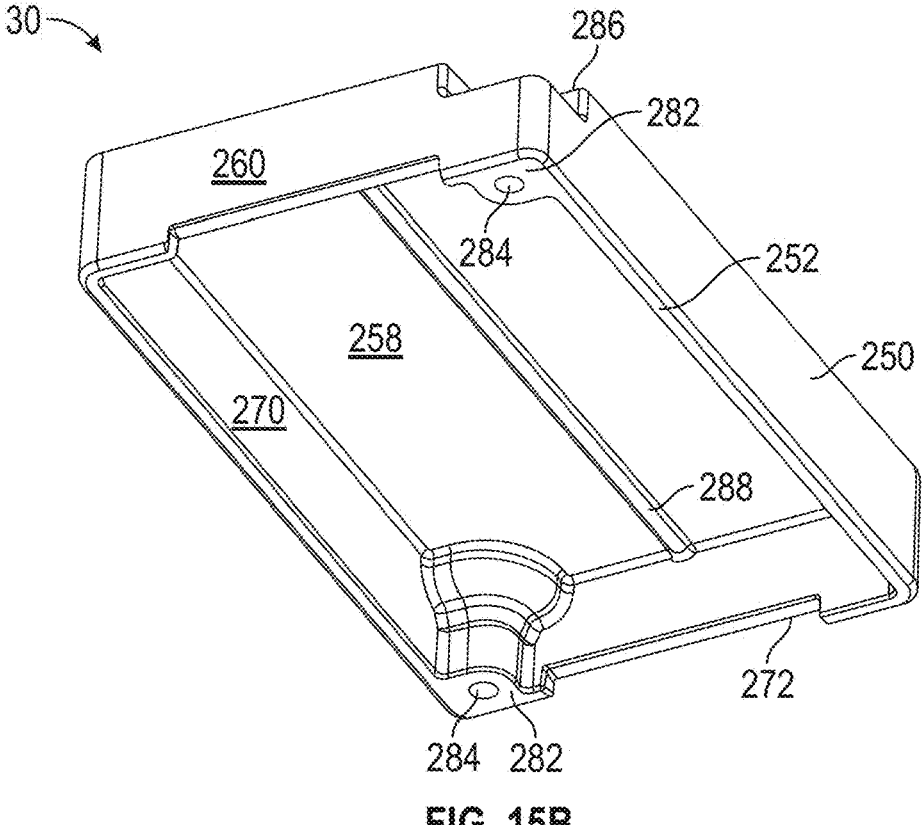
Figure 17A:
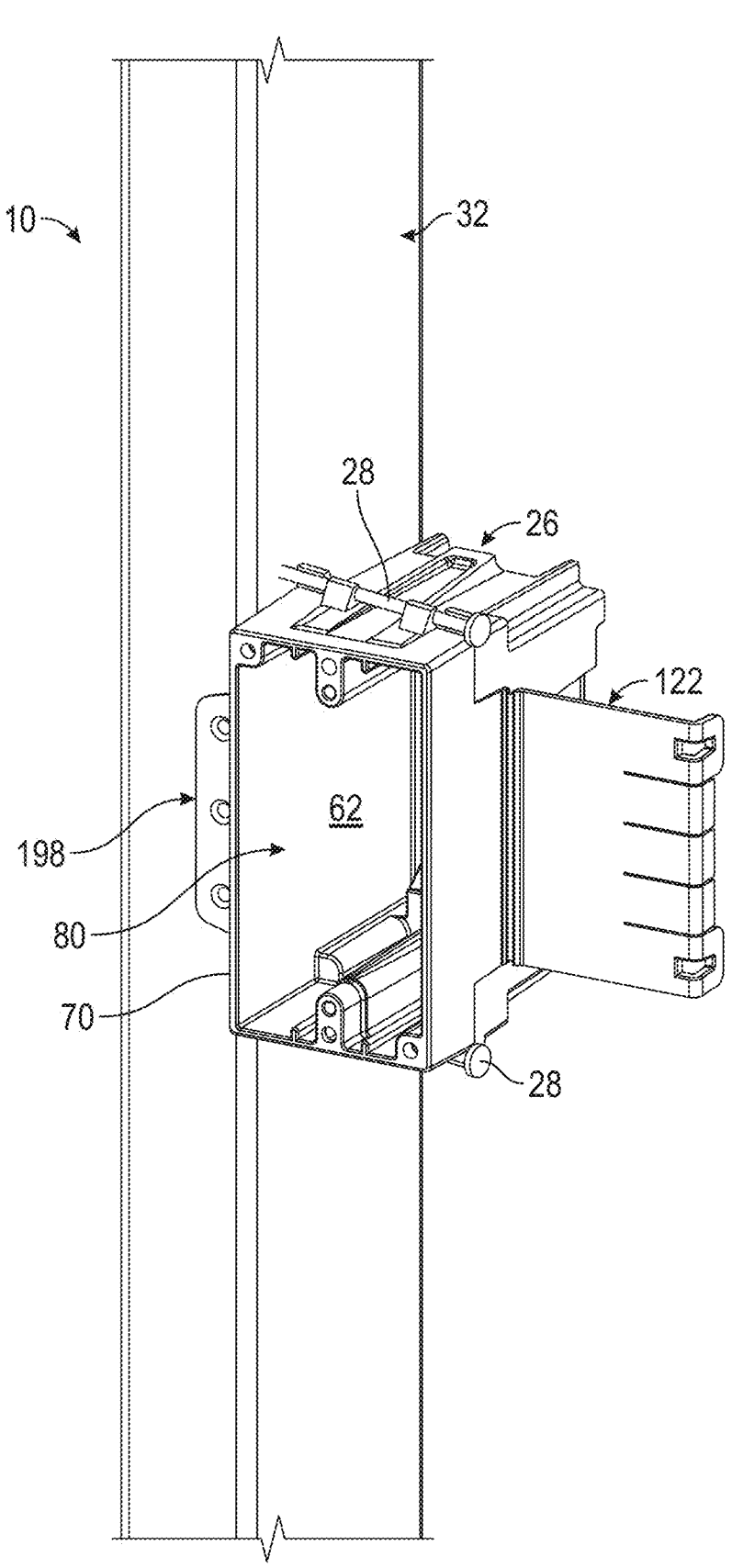
Figure 17B:
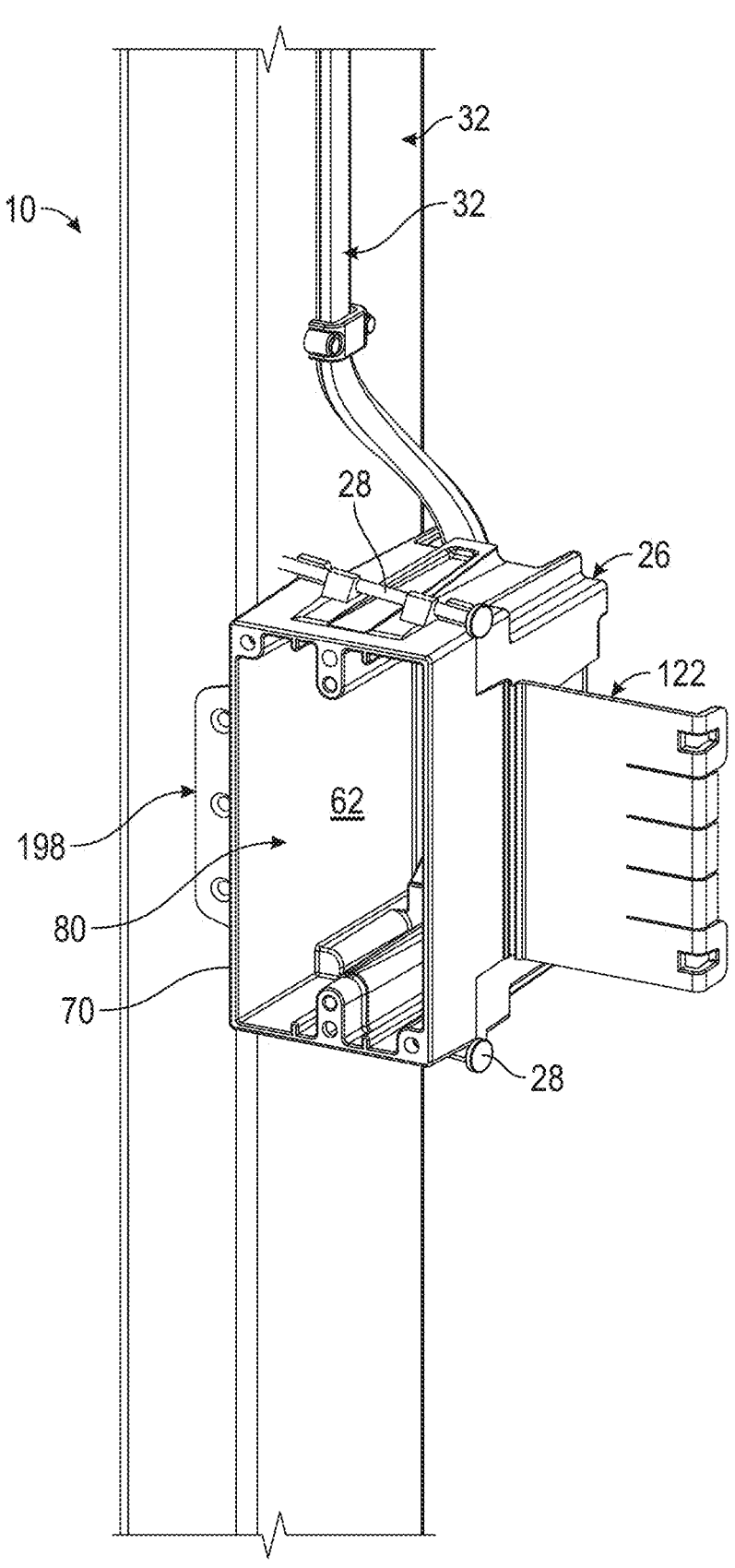
Figure 18A:
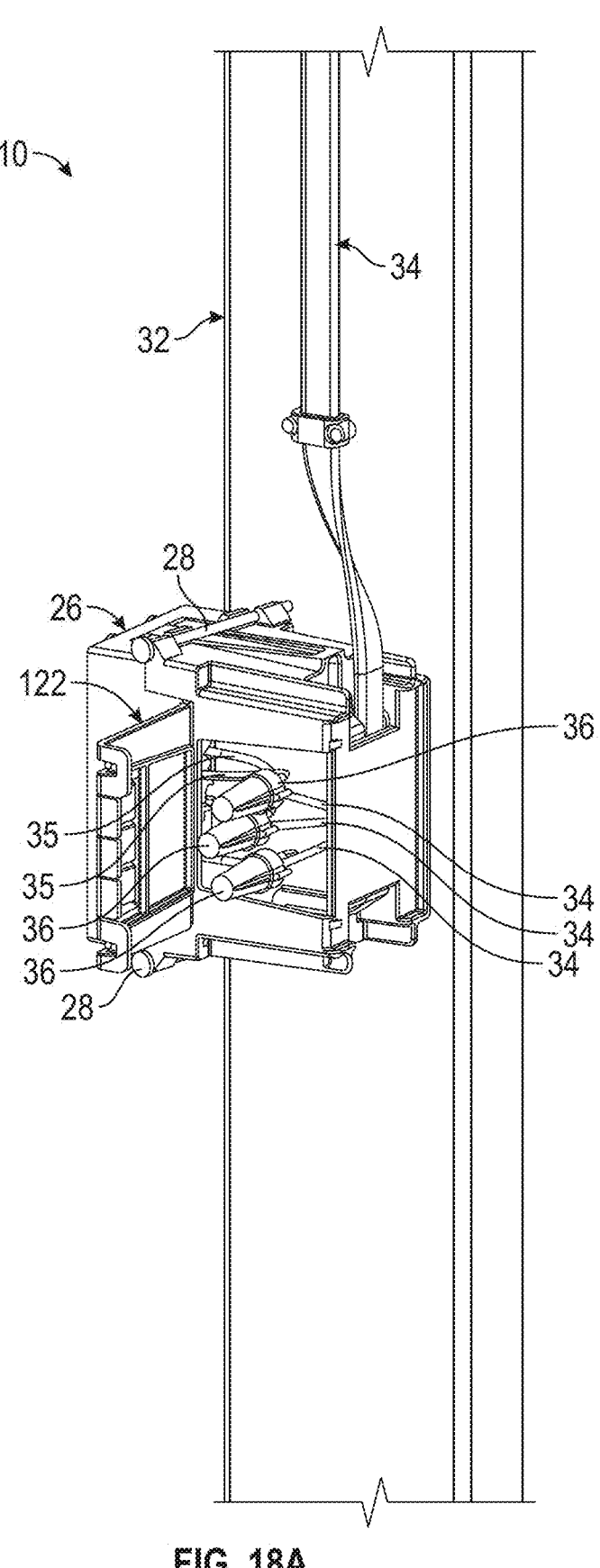
Figure 18B:
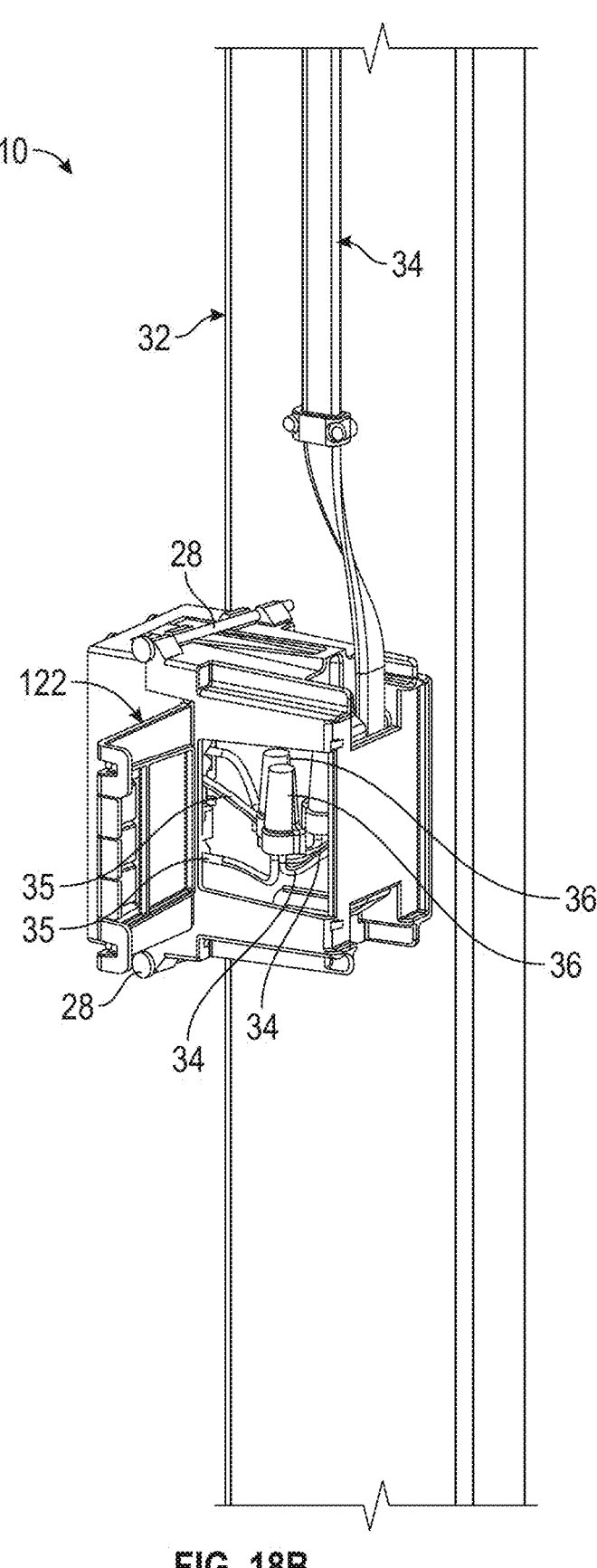
Figure 19A:
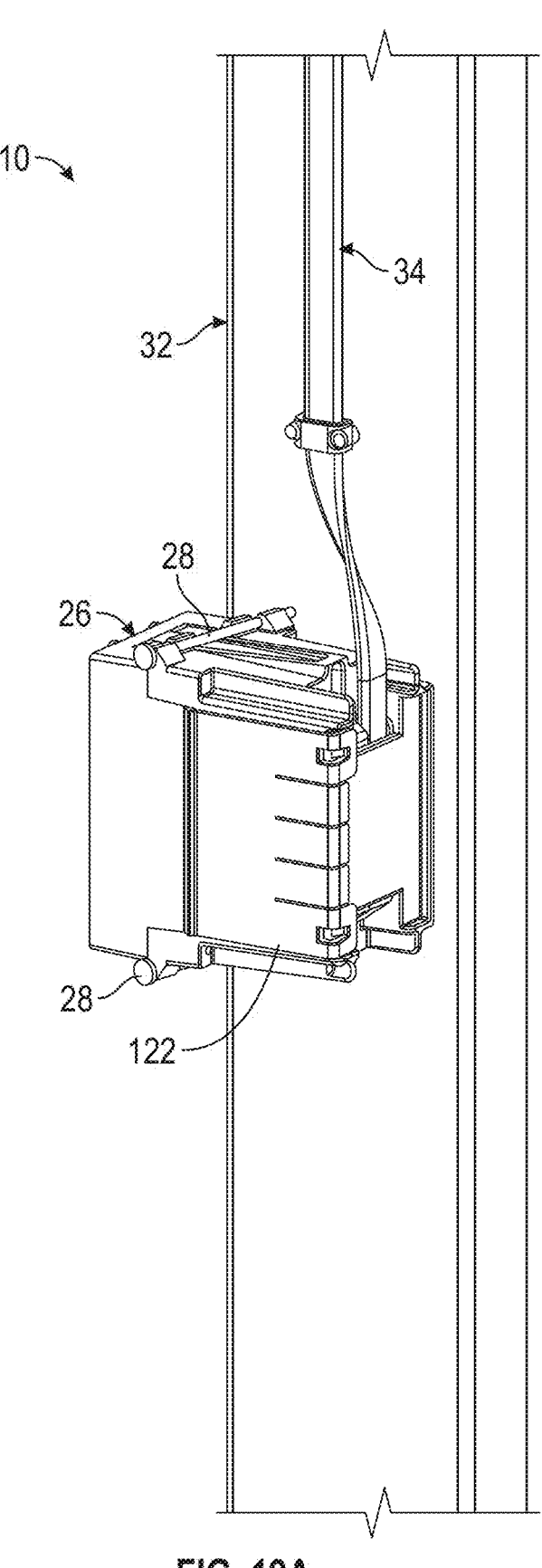
Figure 19B:
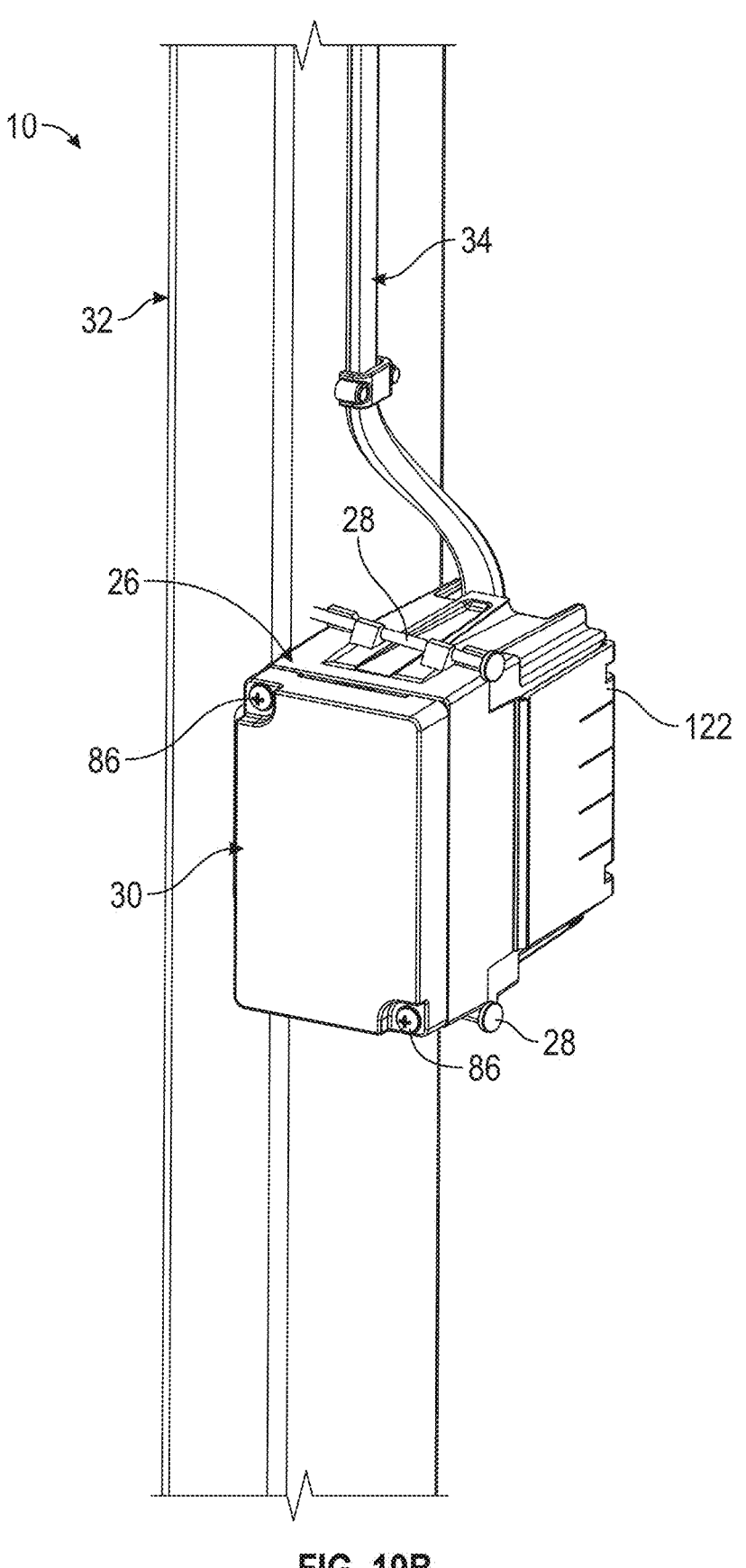
Figure 20:
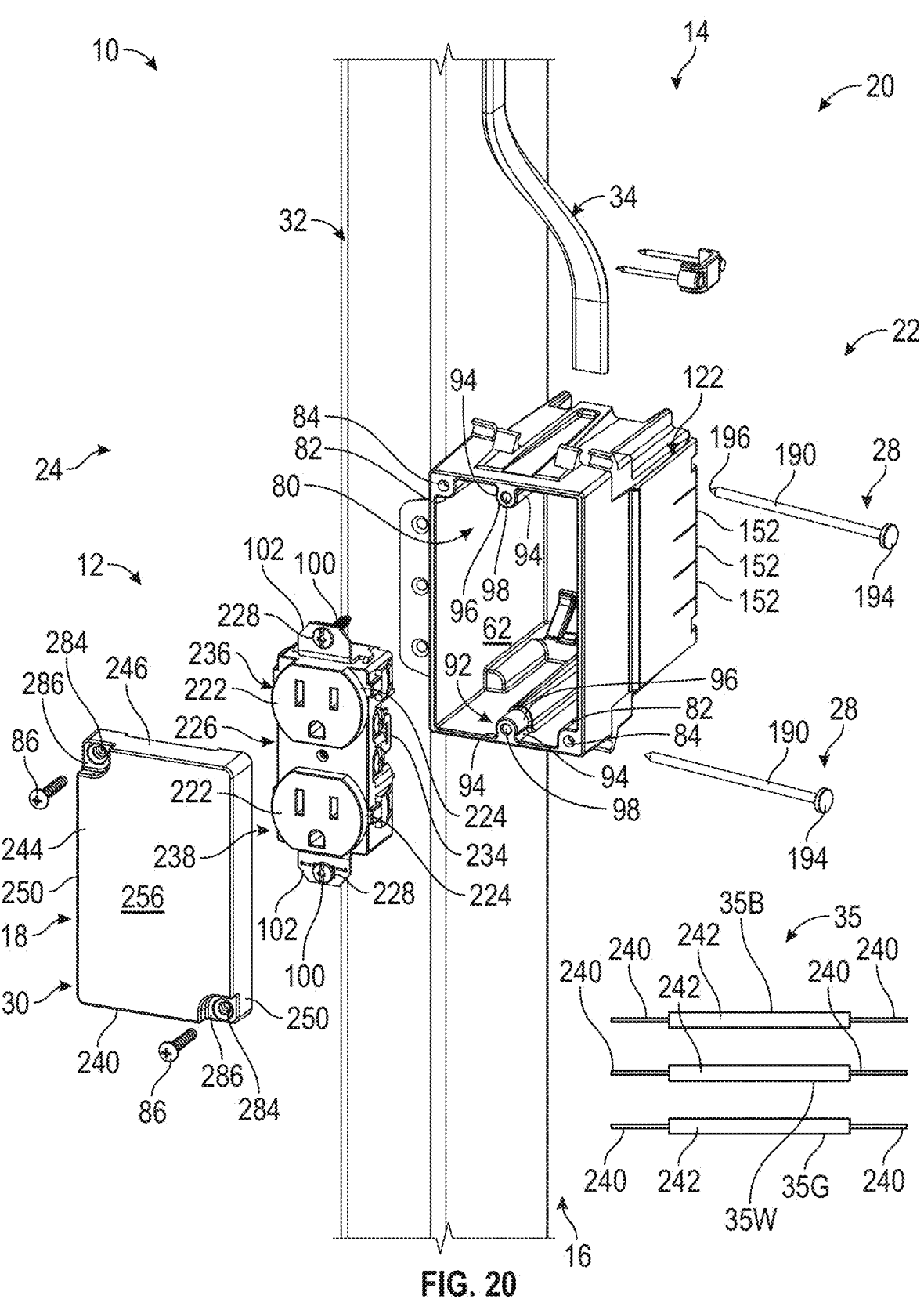
Figure 21:
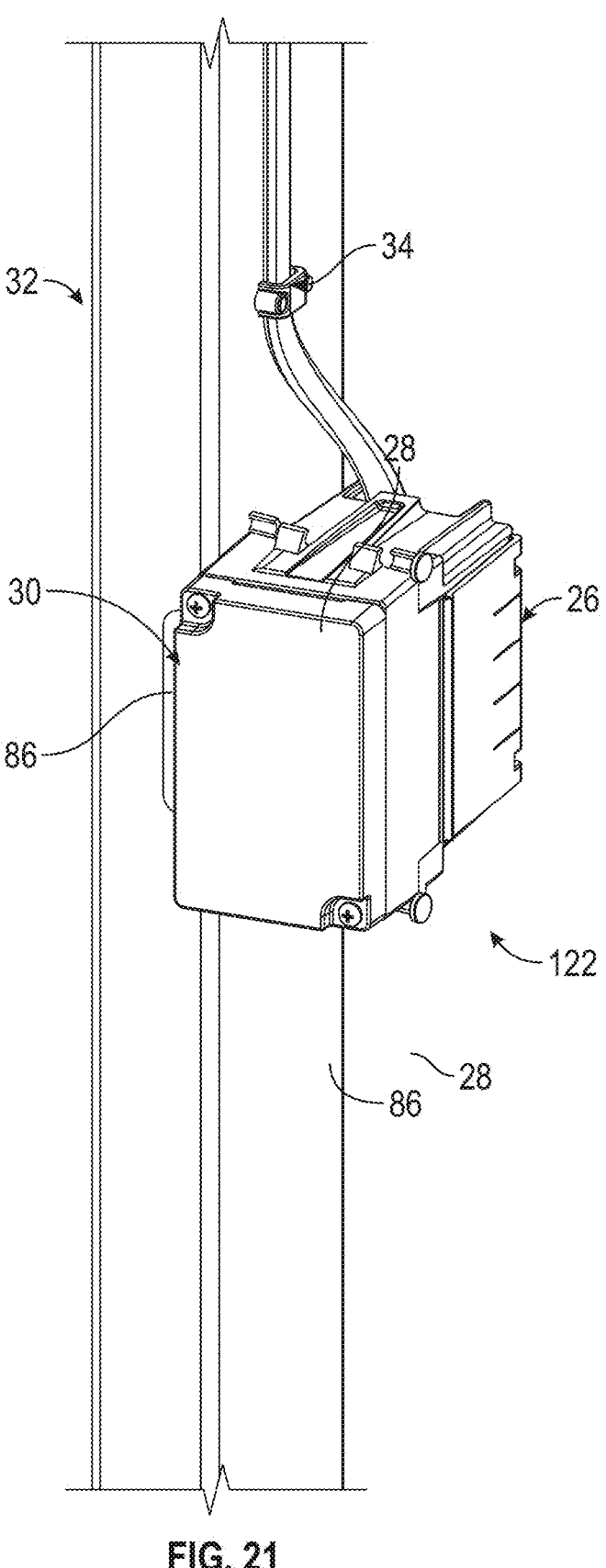
Figure 22:
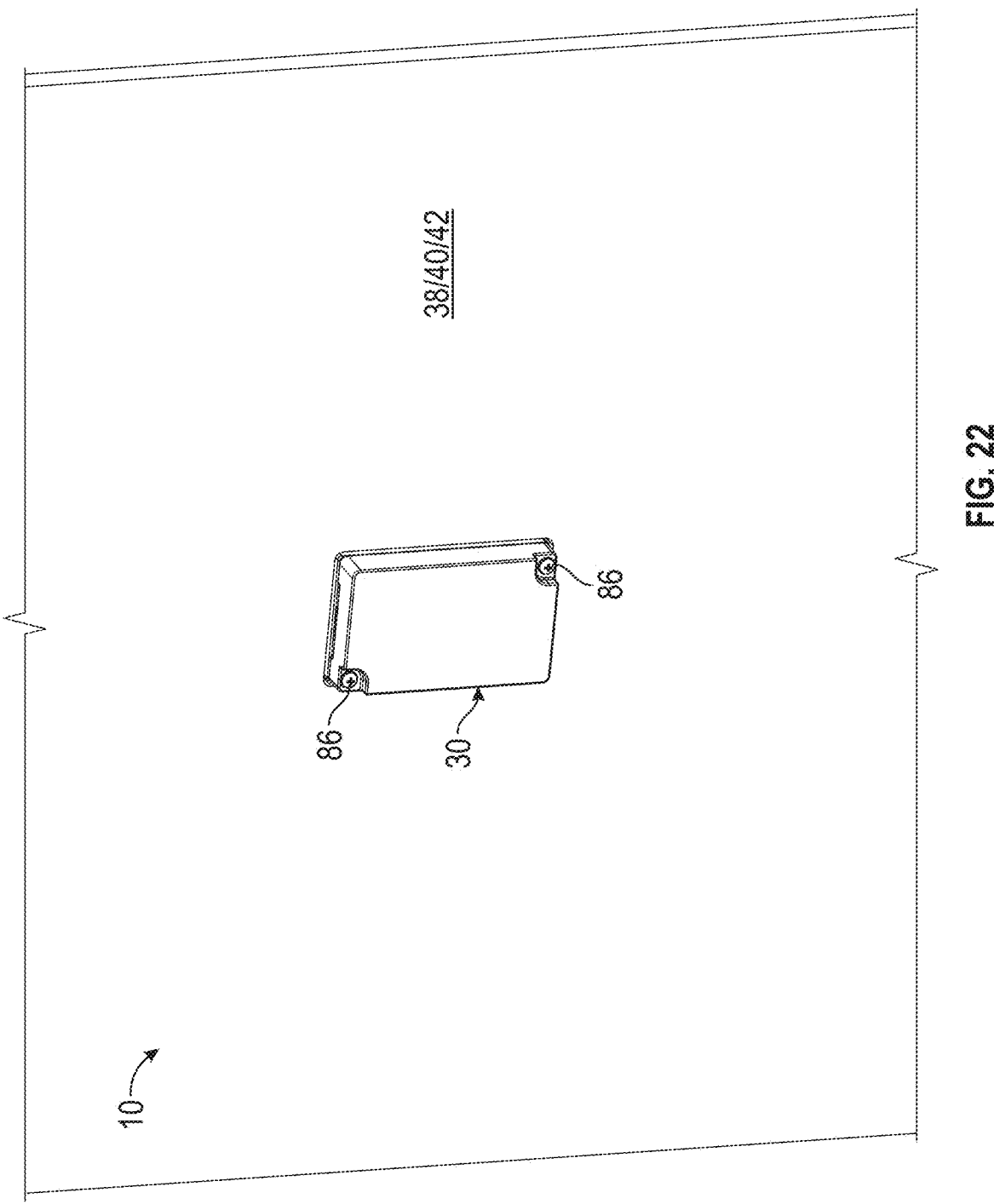
Figure 23:
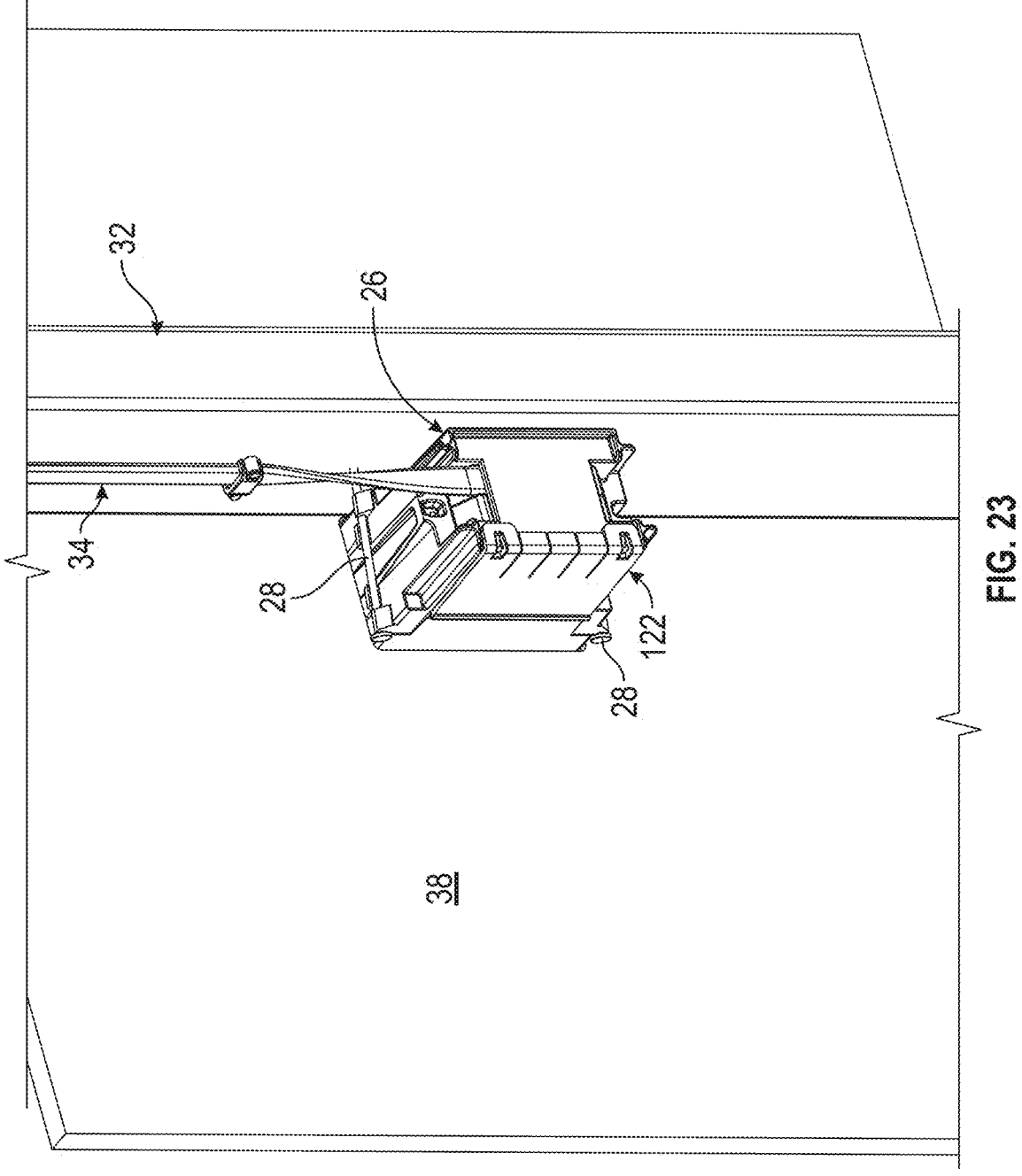
Figure 24:
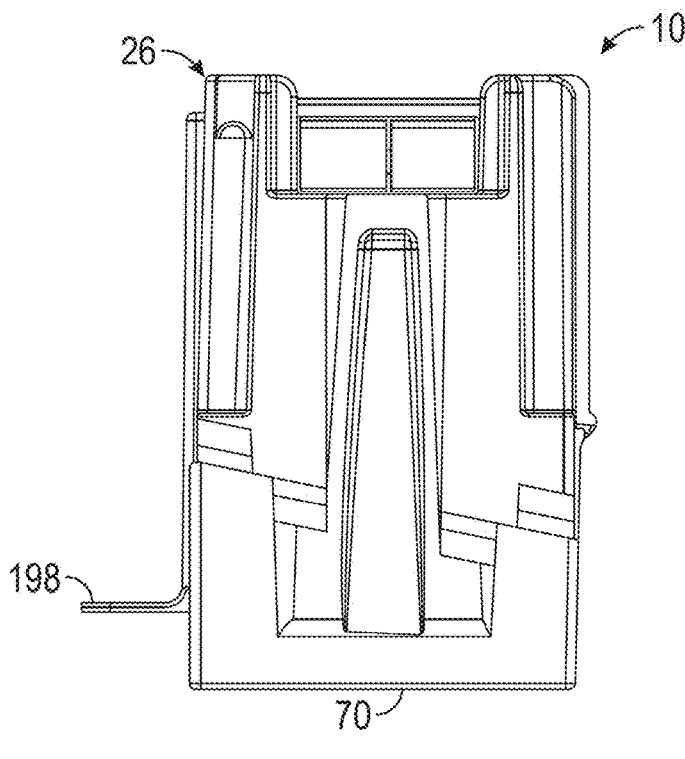
Figure 25:
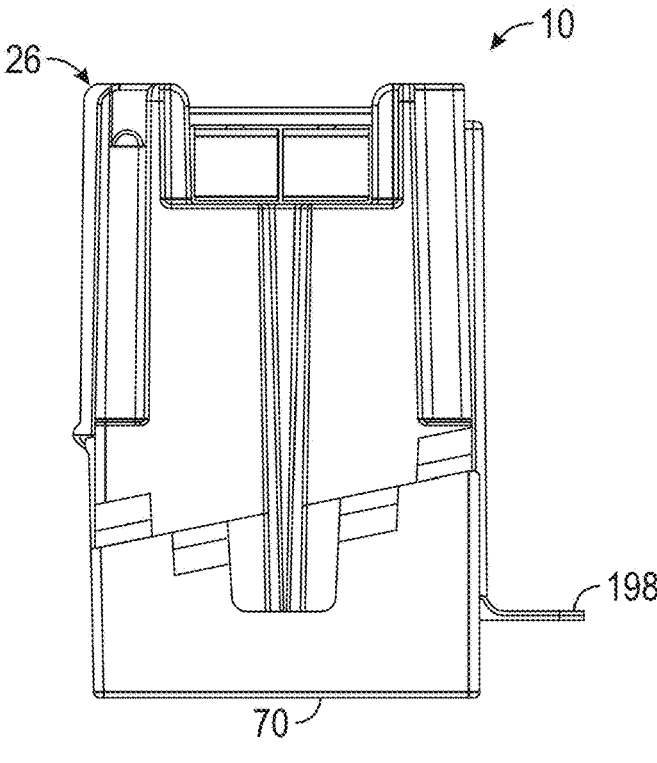
Figure 26:
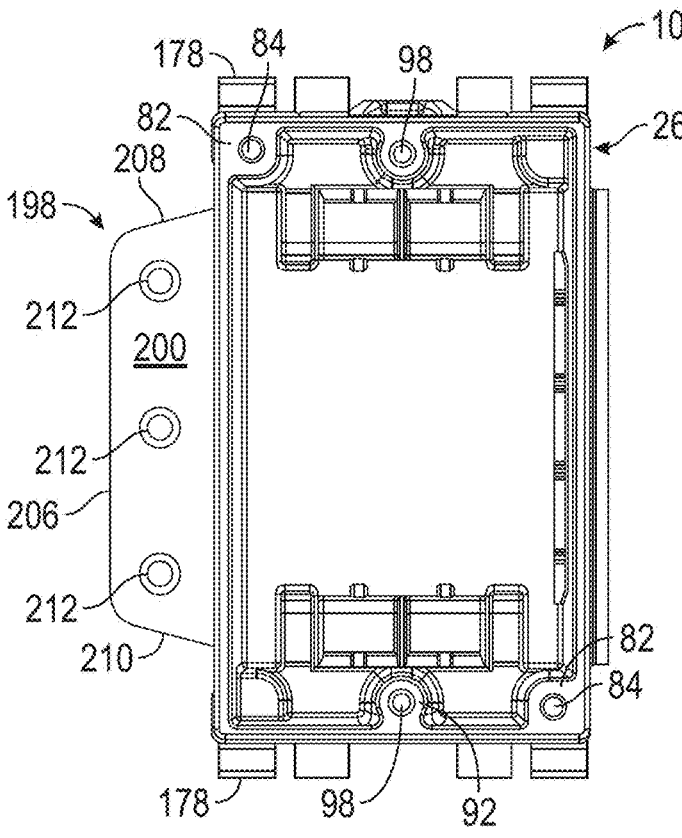
Figure 27:
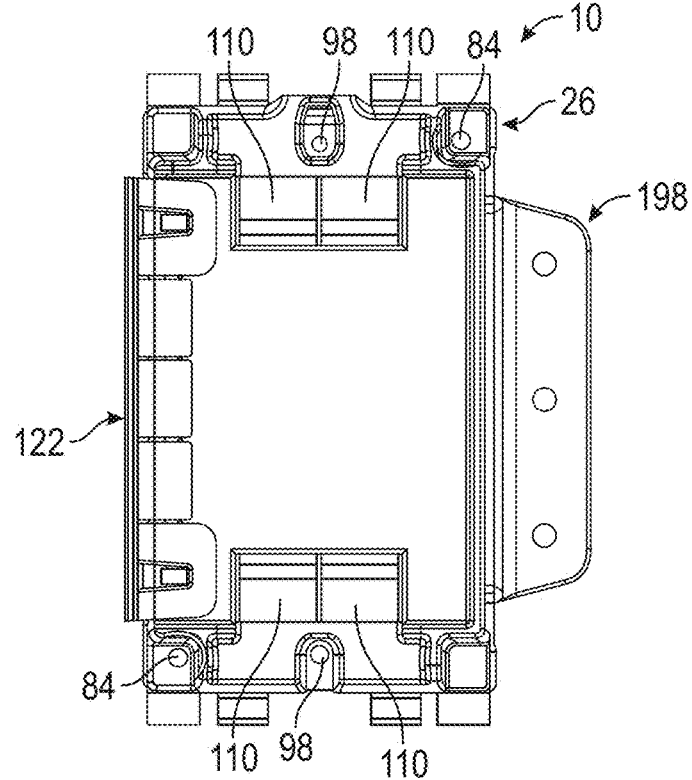
Figure 28:
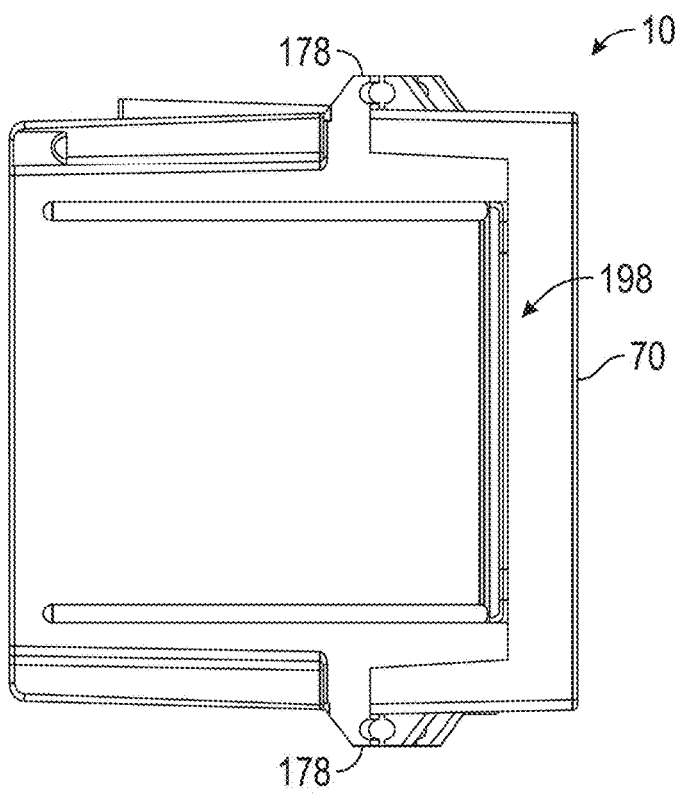
Figure 29:
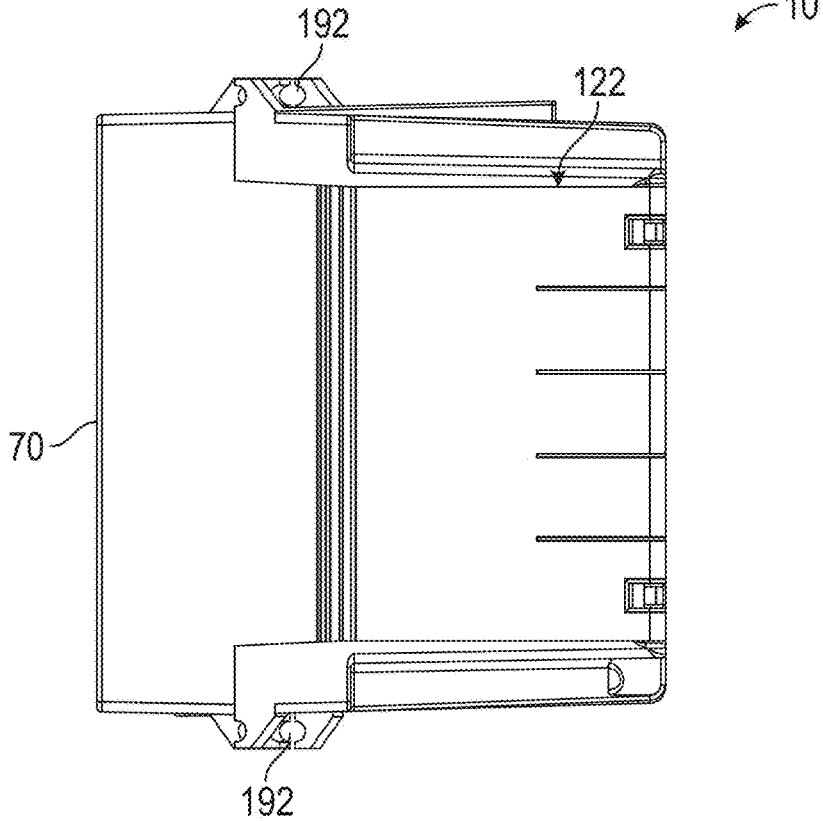
Figure 30:
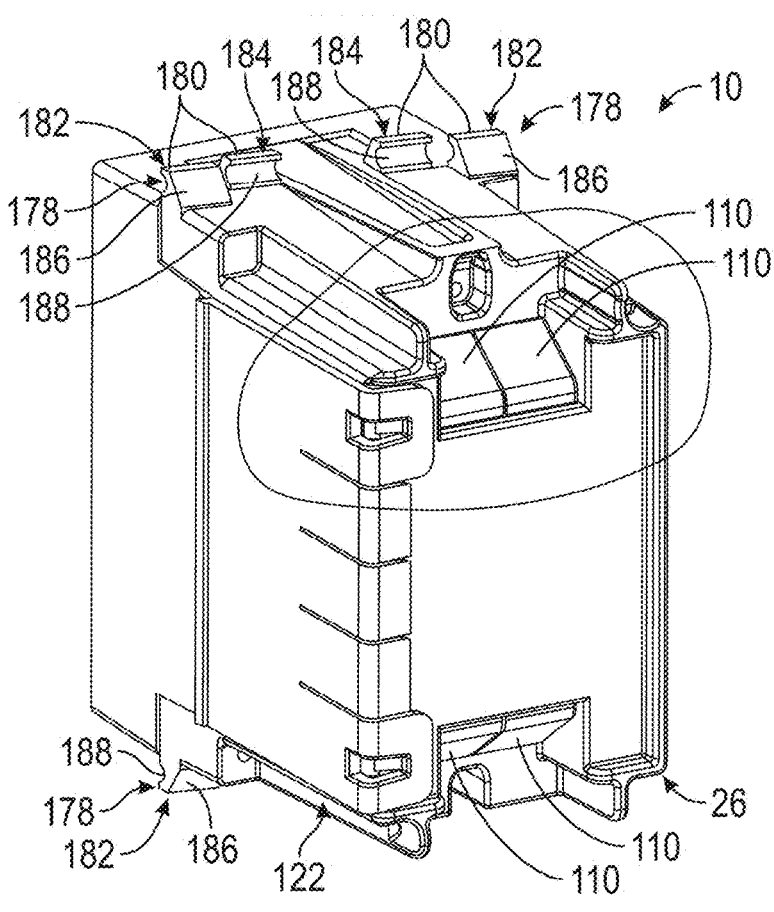
Figure 31:
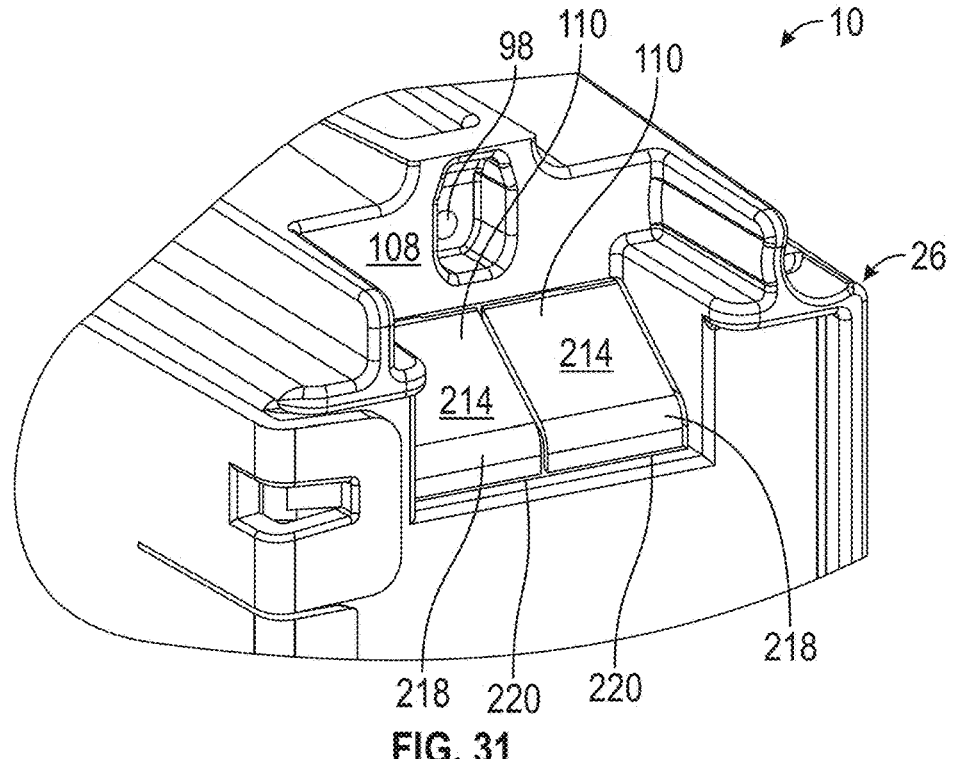
Figure 32:
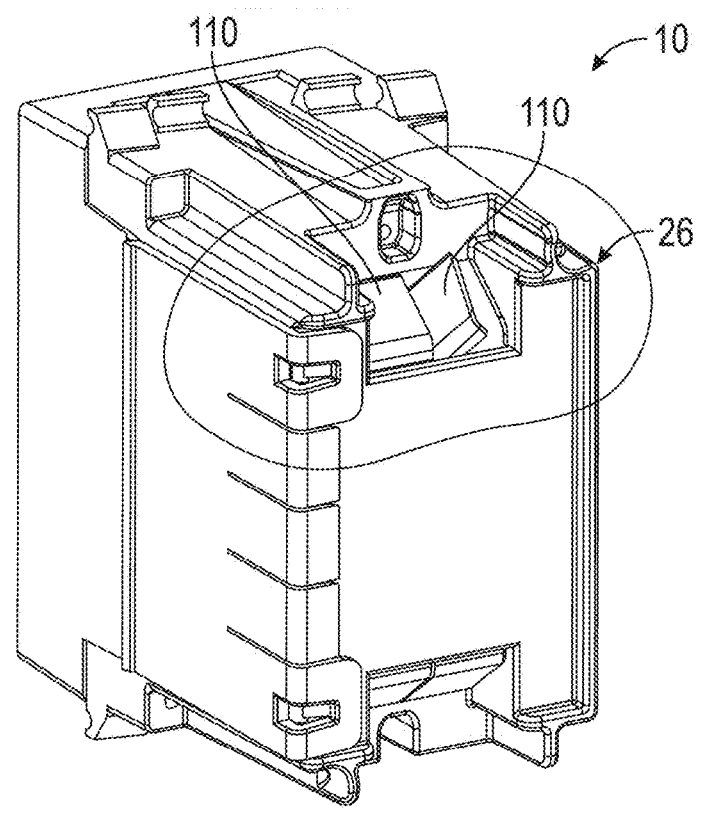
Figure 33:
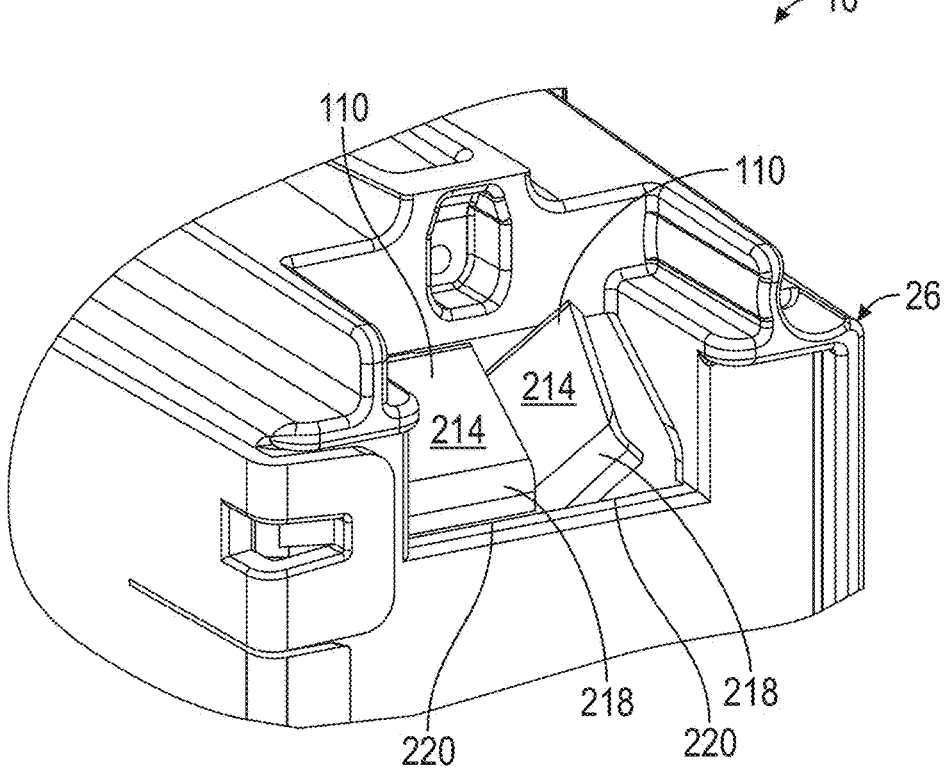
Figure 34:
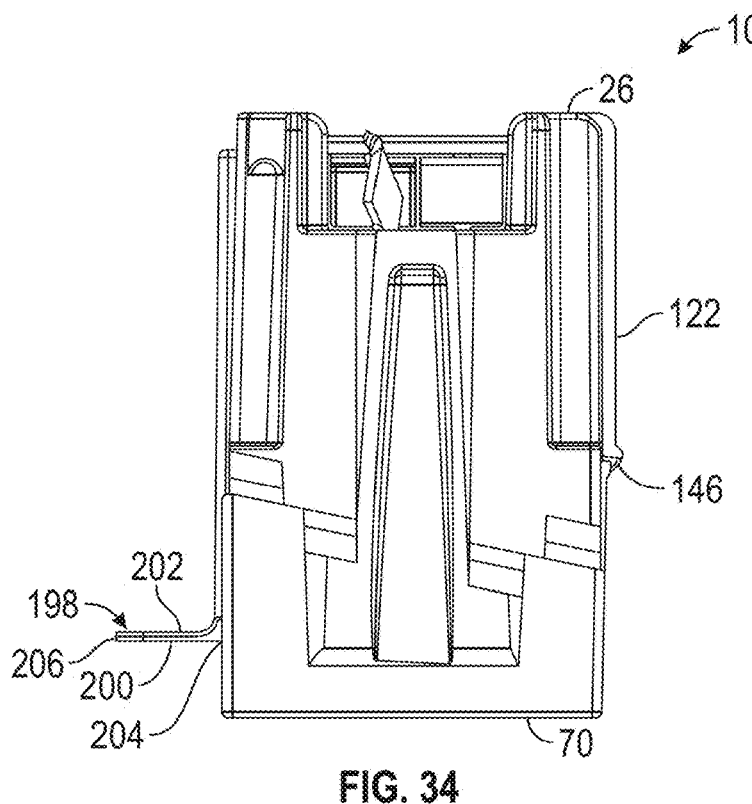
Figure 35:
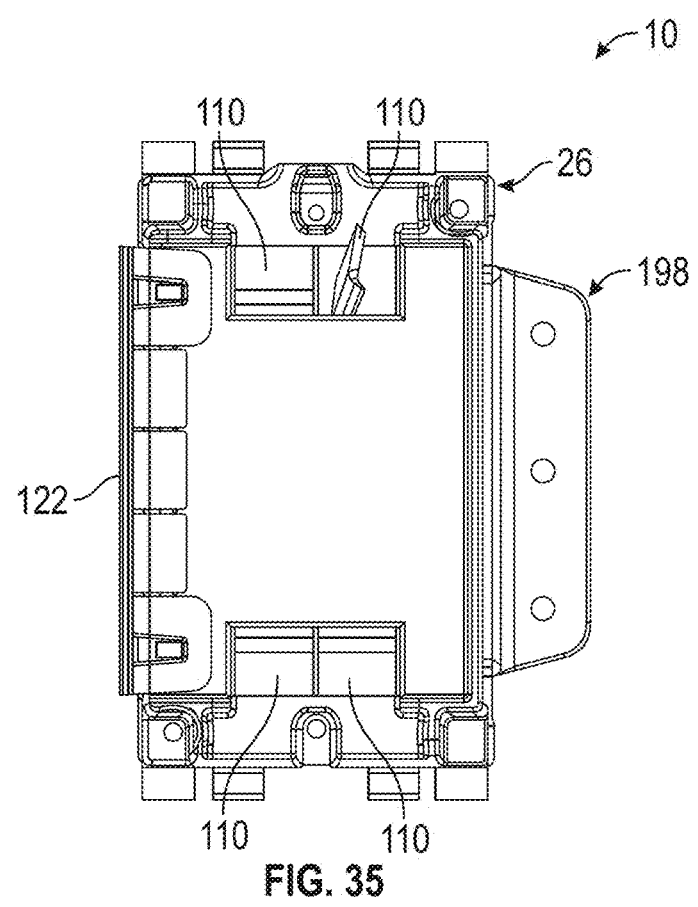
Figure 36:
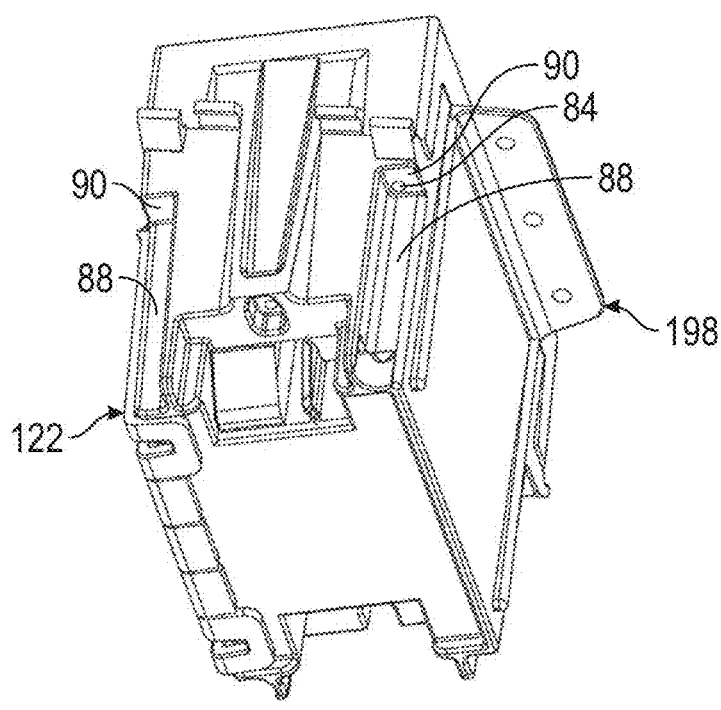
Figure 37:
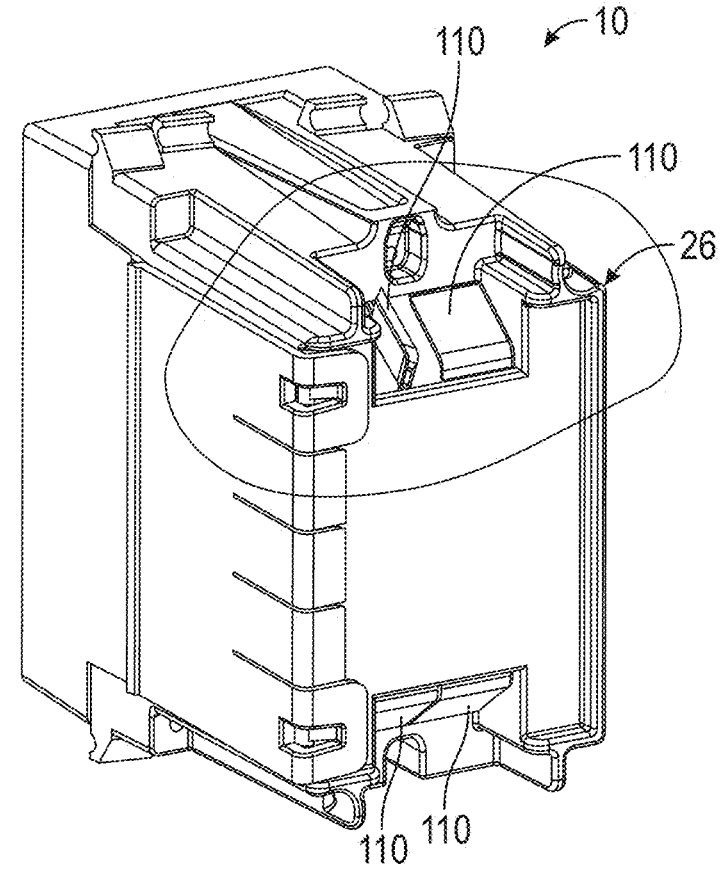
Figure 38:
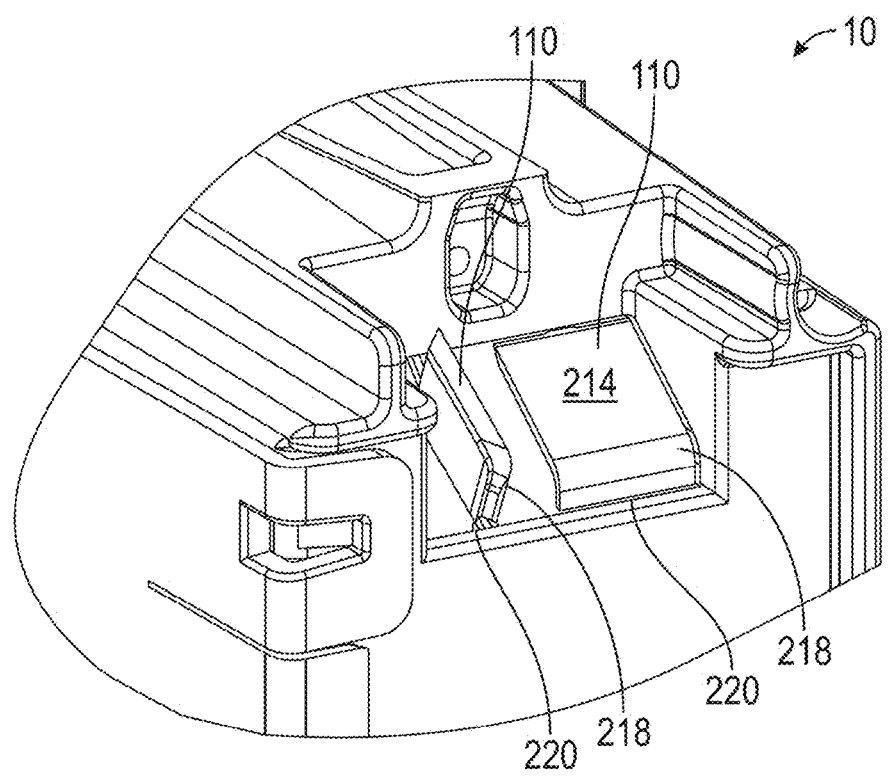
Figure 39:
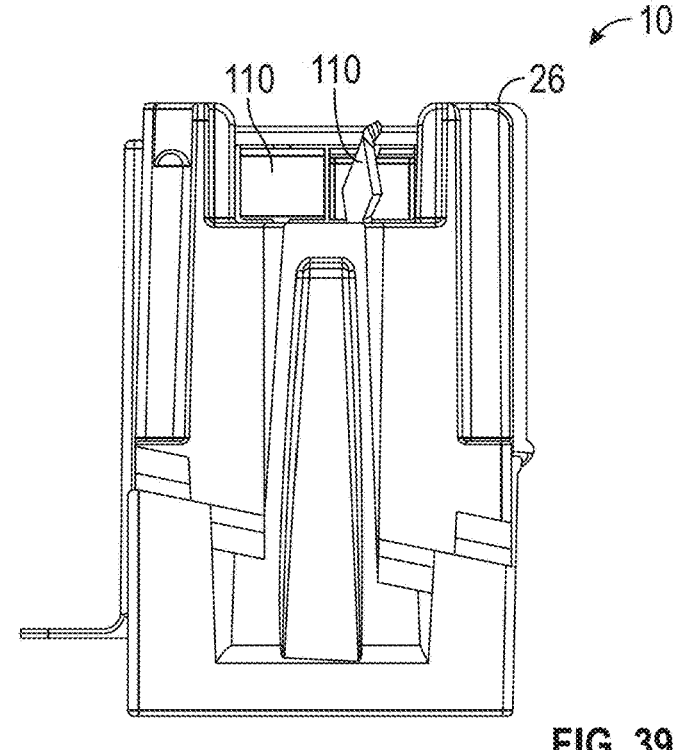
Figure 40:
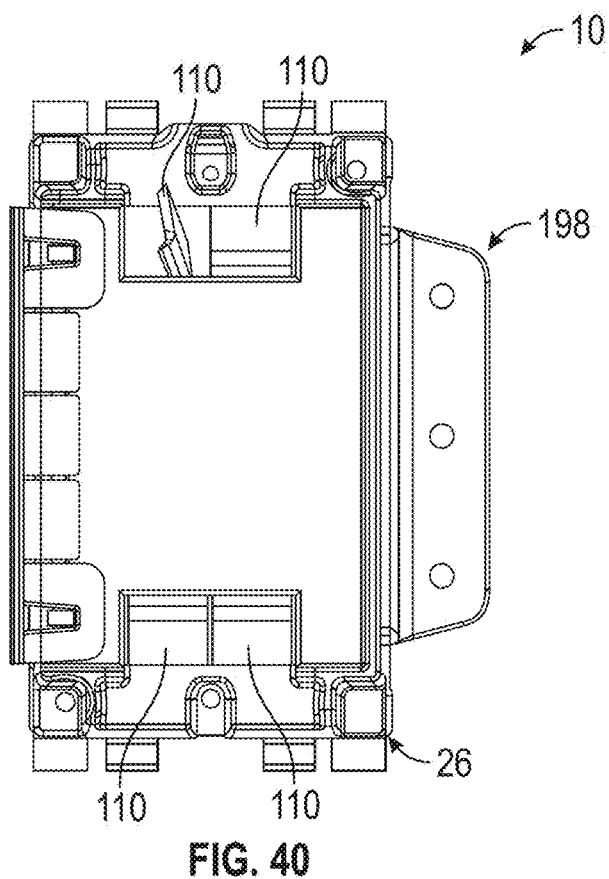
Figure 41:
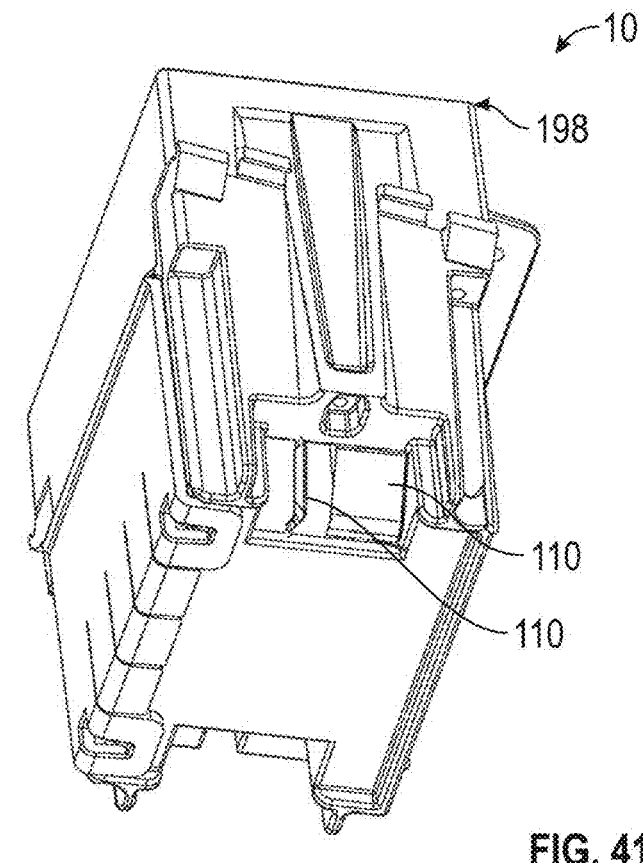
Figure 42:
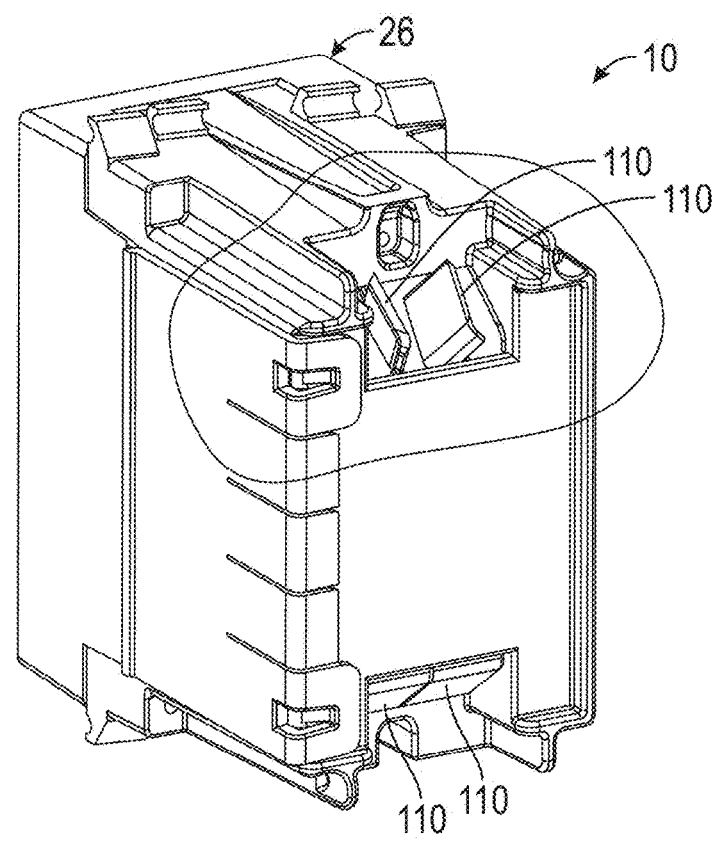
Figure 43:
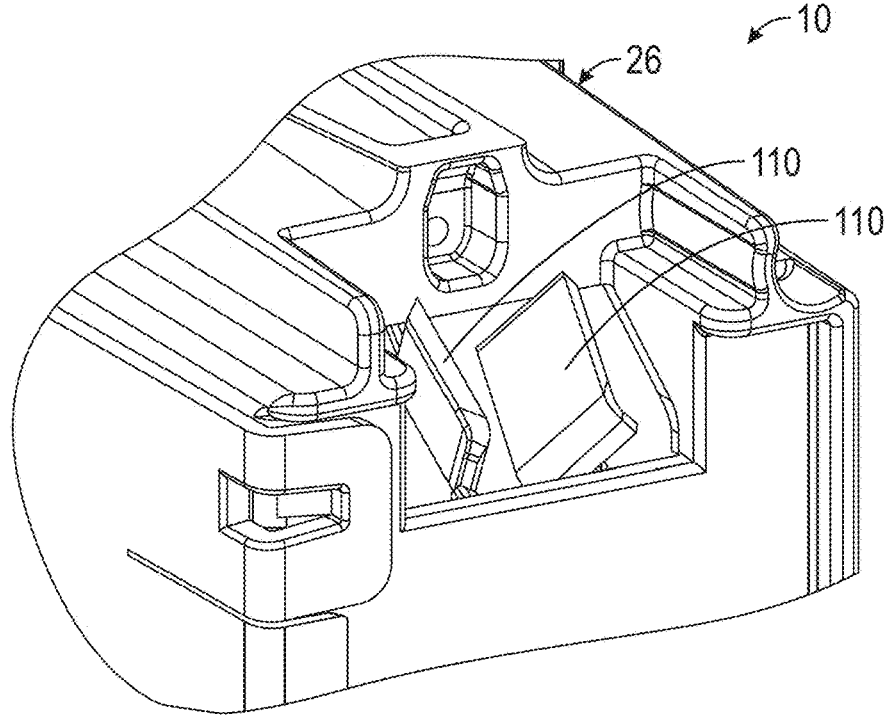
Figure 44:
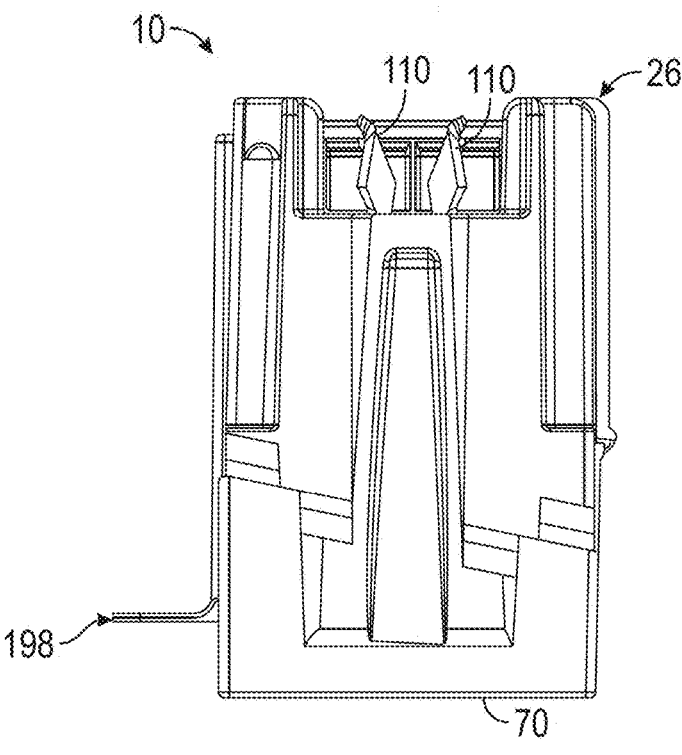
Figure 45:
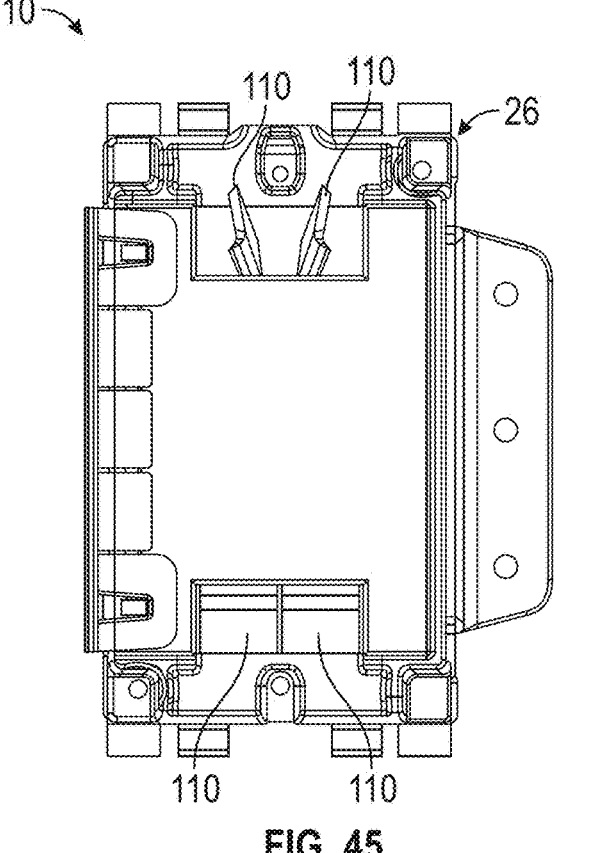
Figure 46:
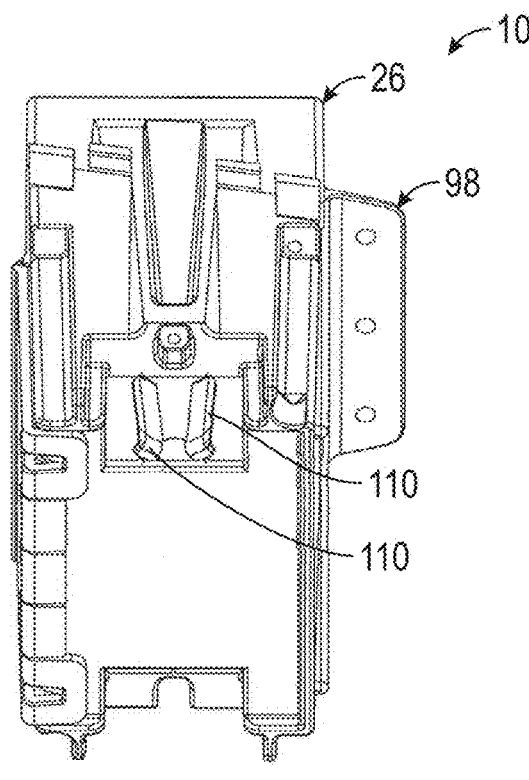
Figure 47:
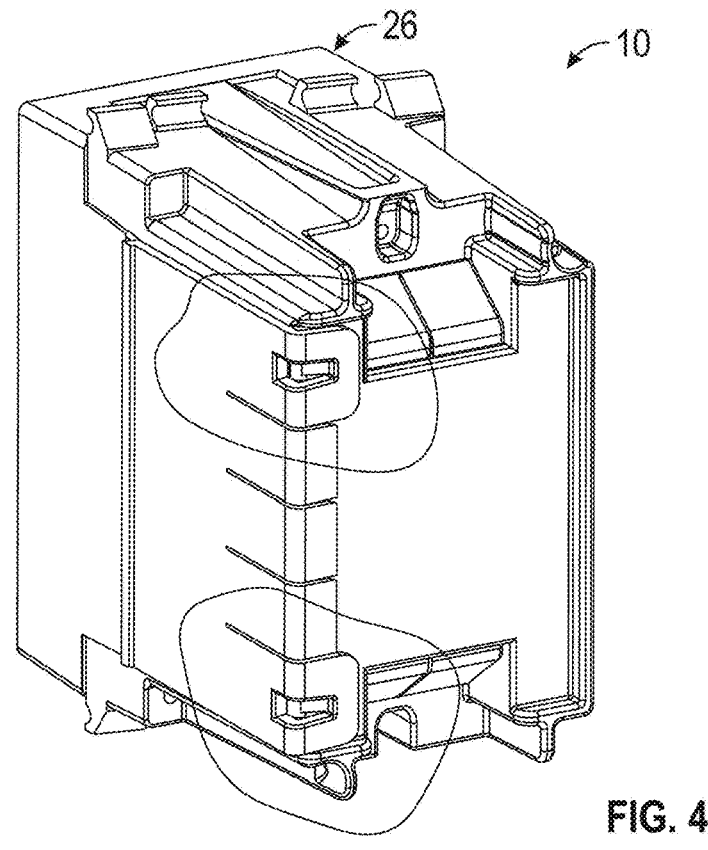
Figure 50A:
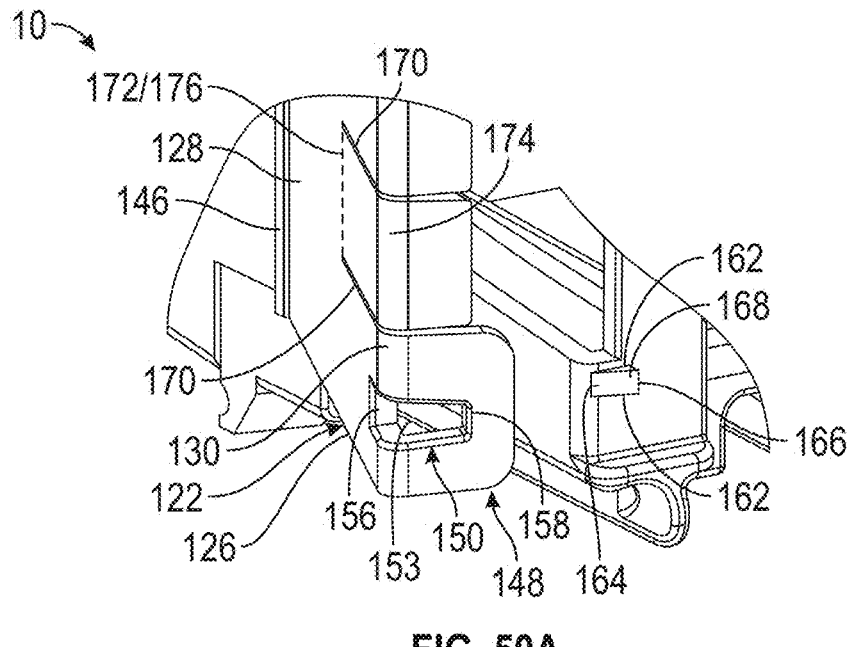
Figure 50B:
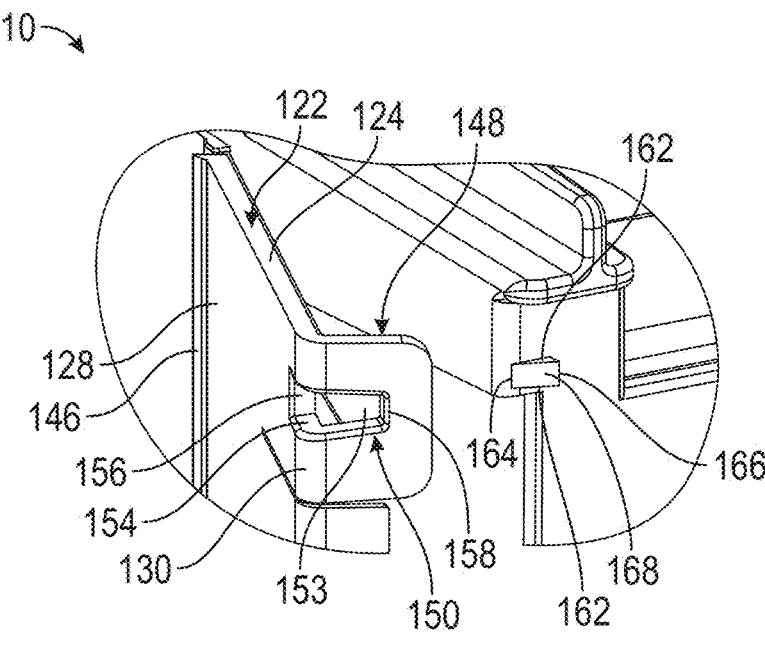
Figure 51:
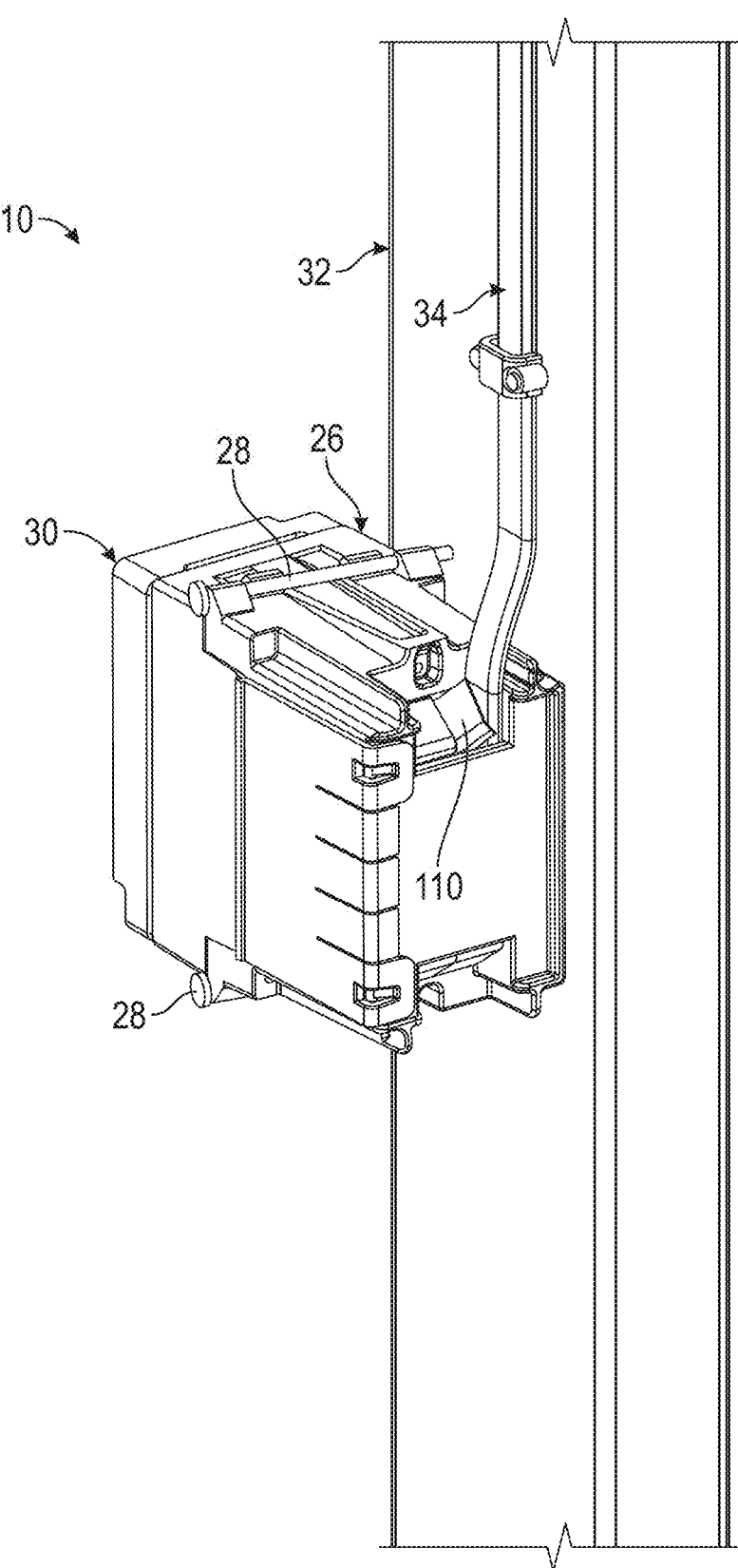
Figure 52:
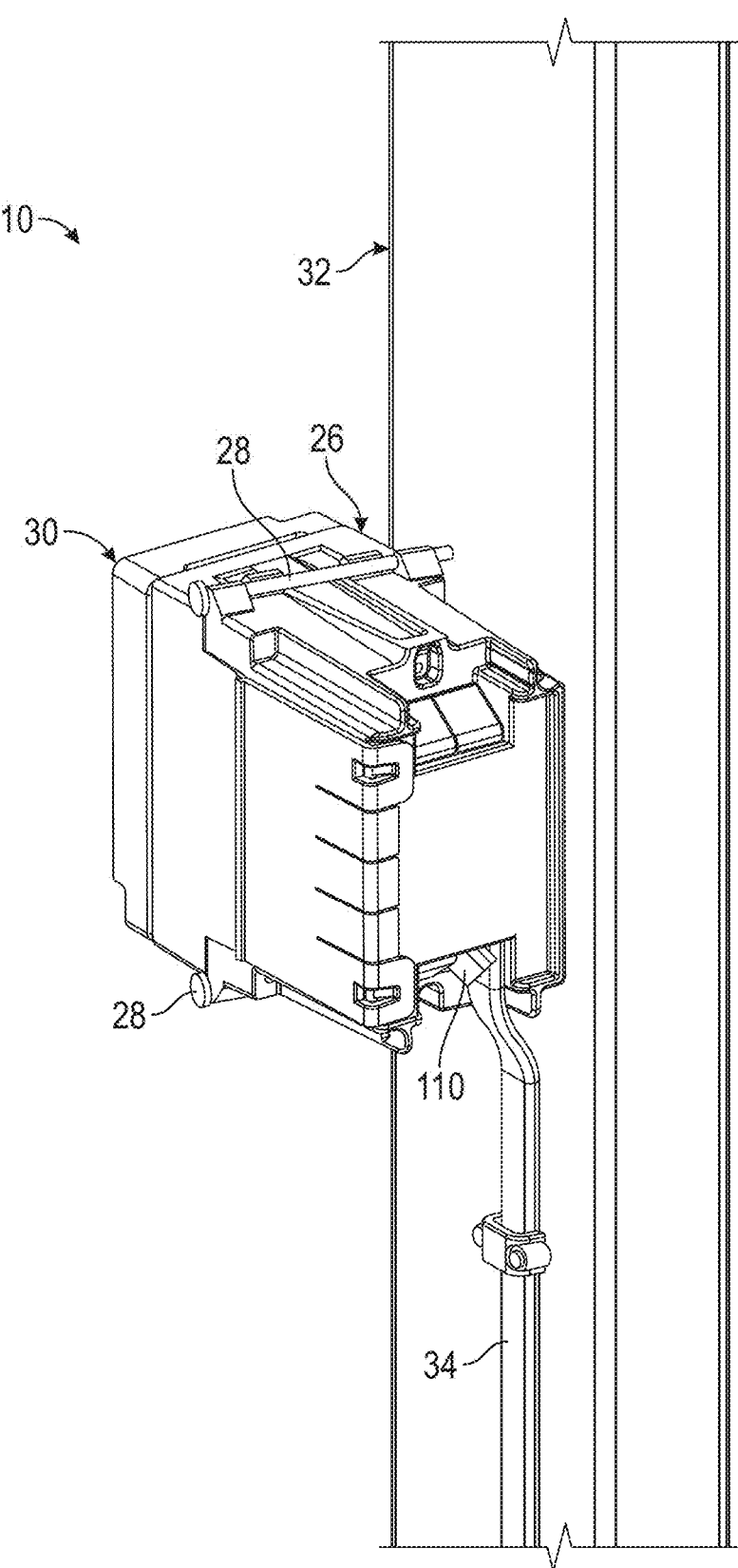
Figure 53:
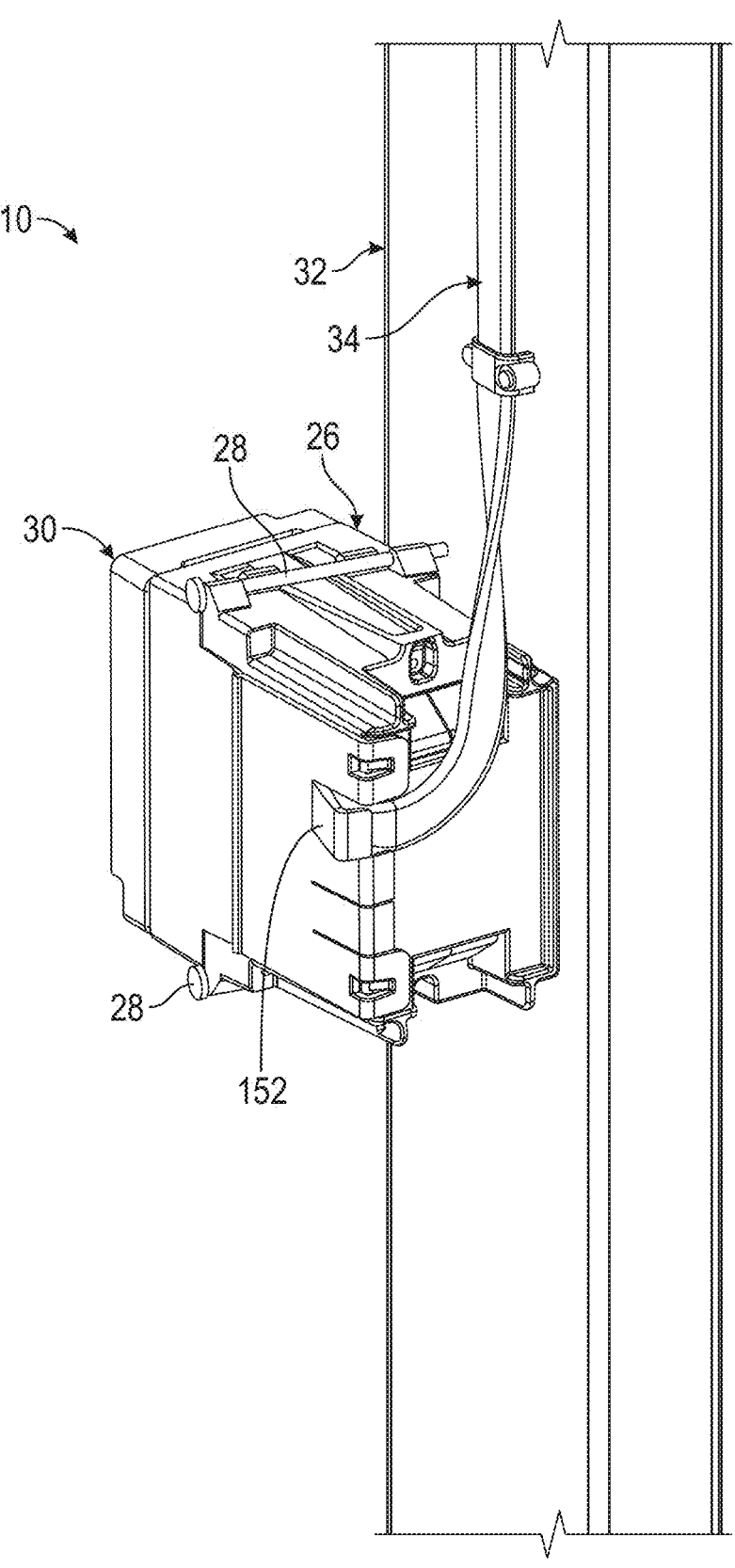
Figure 54:
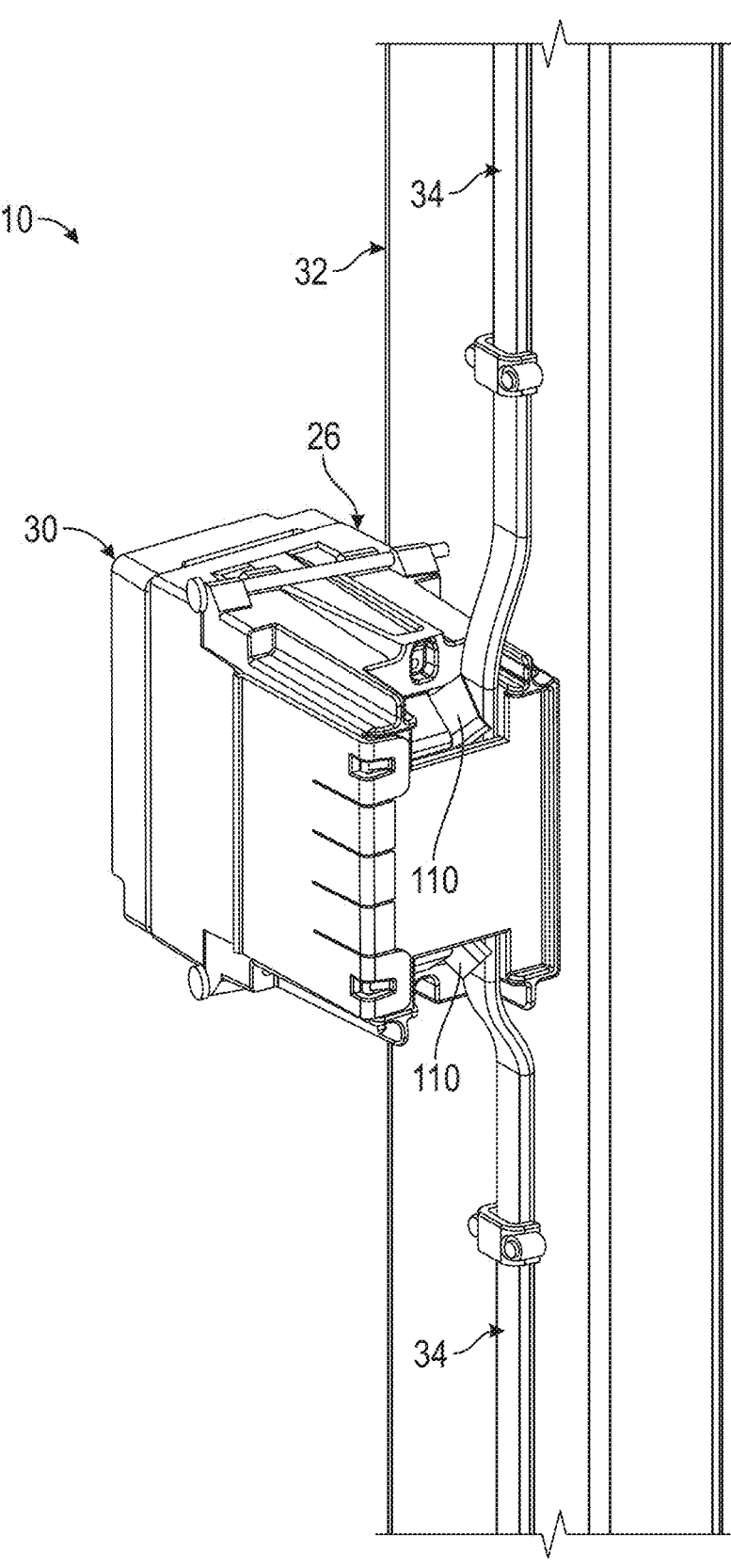
Figure 55:
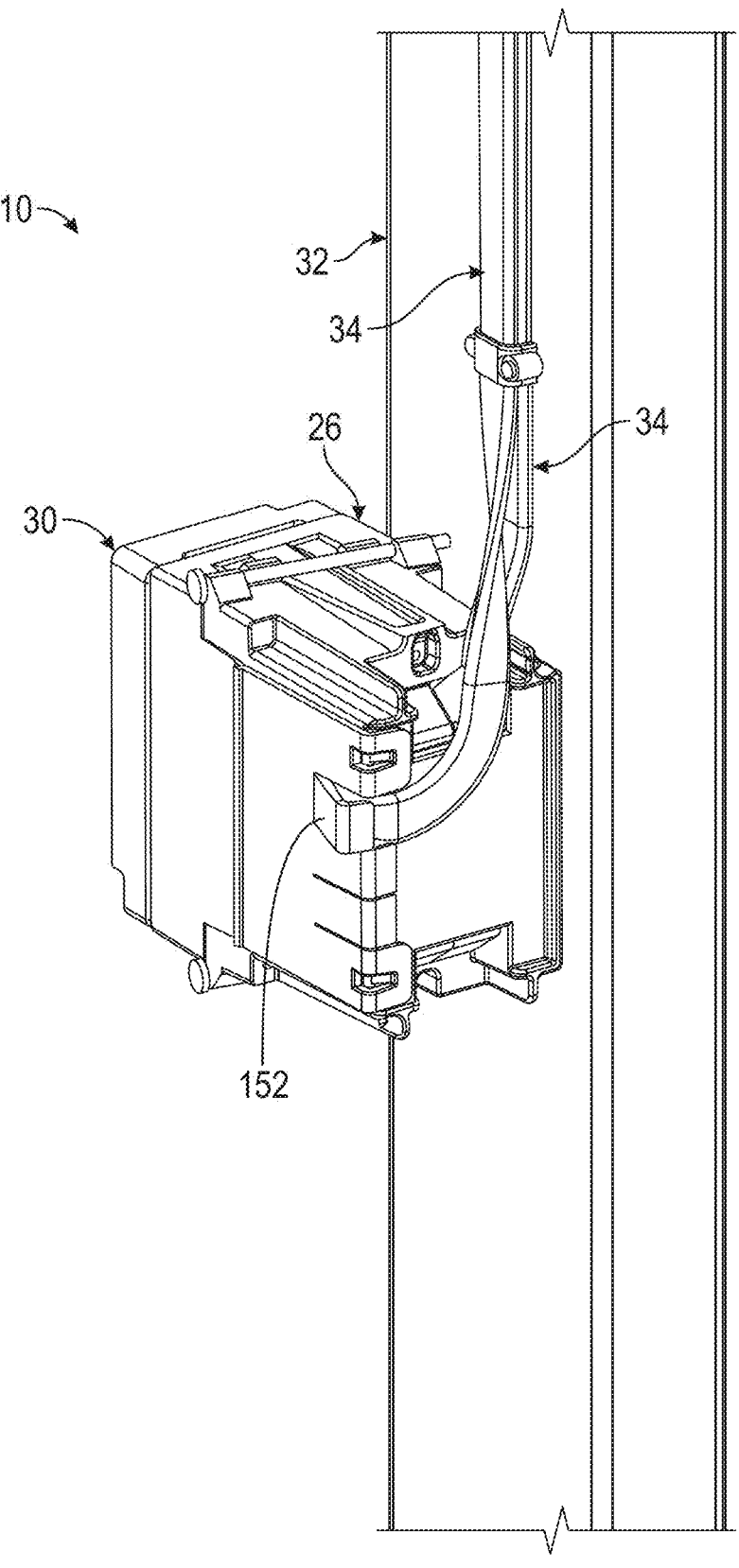
Figure 56:
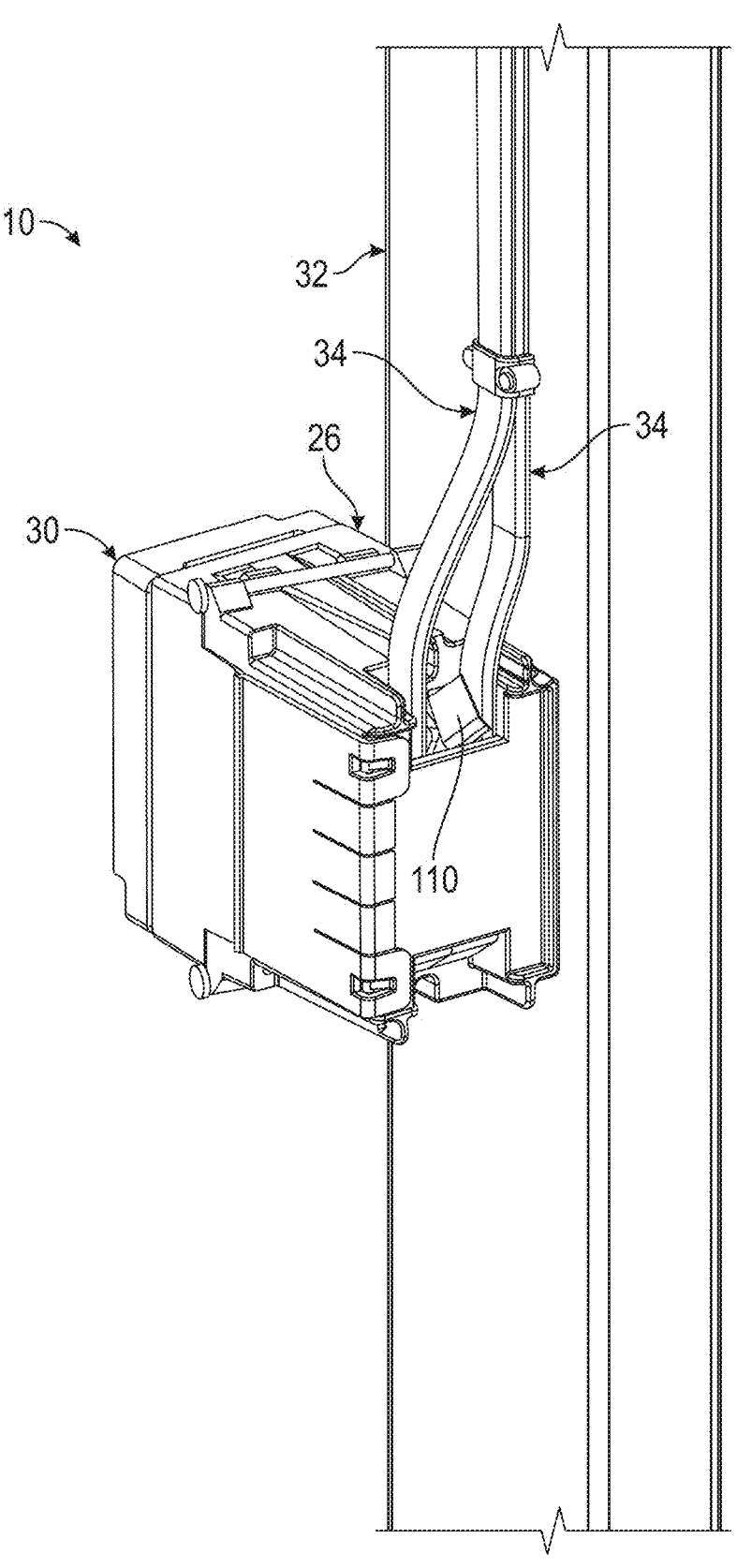
Figure 57:
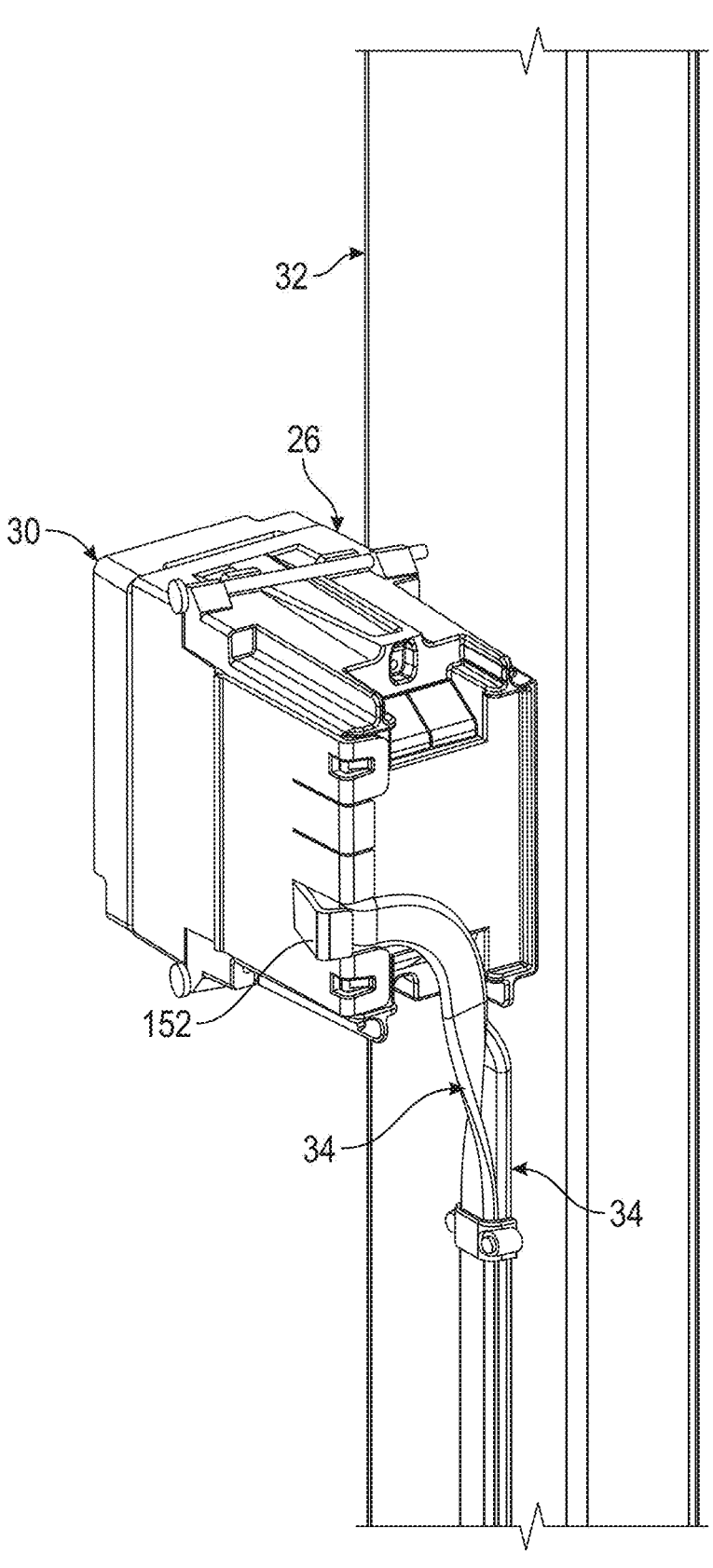
Figure 58:
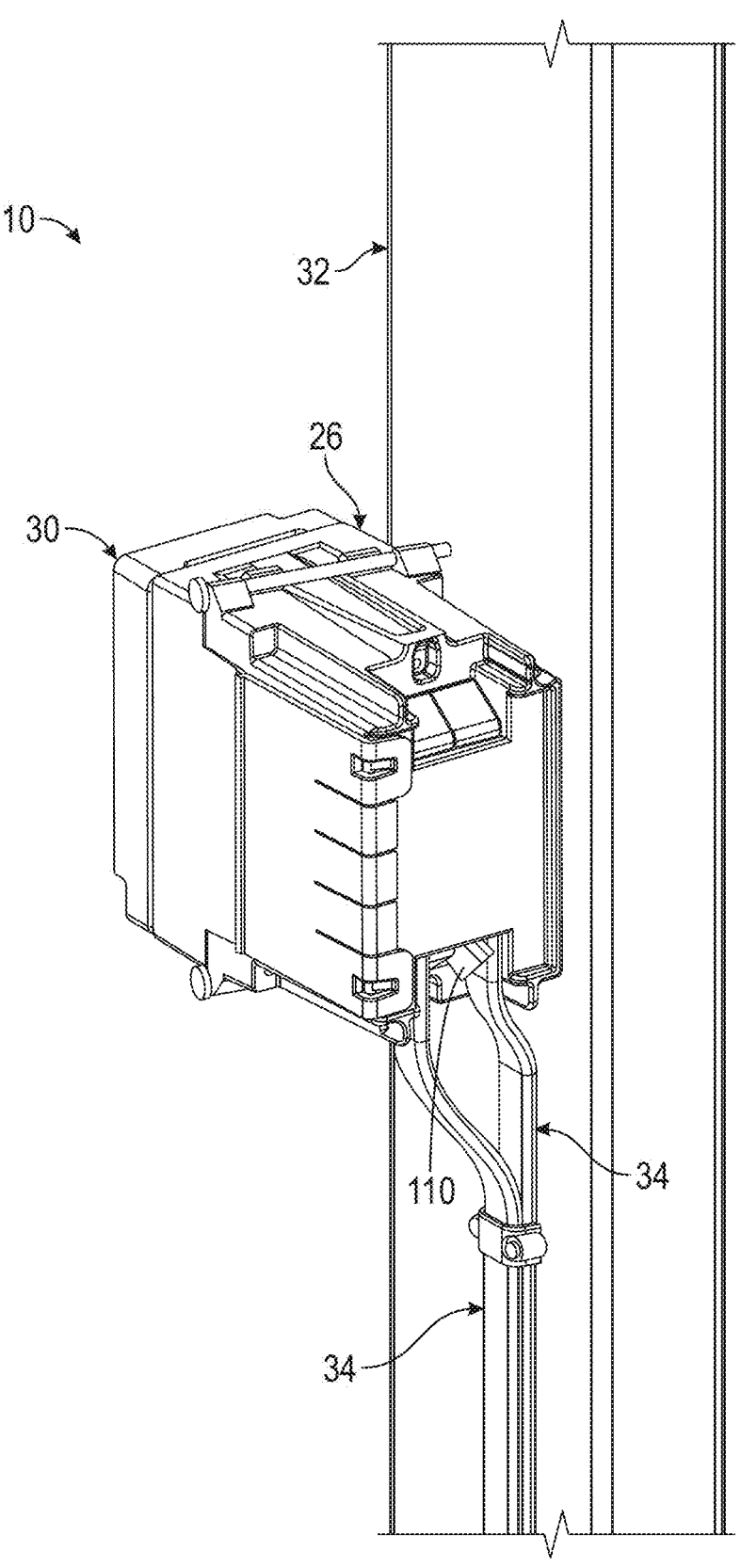
Figure 59:
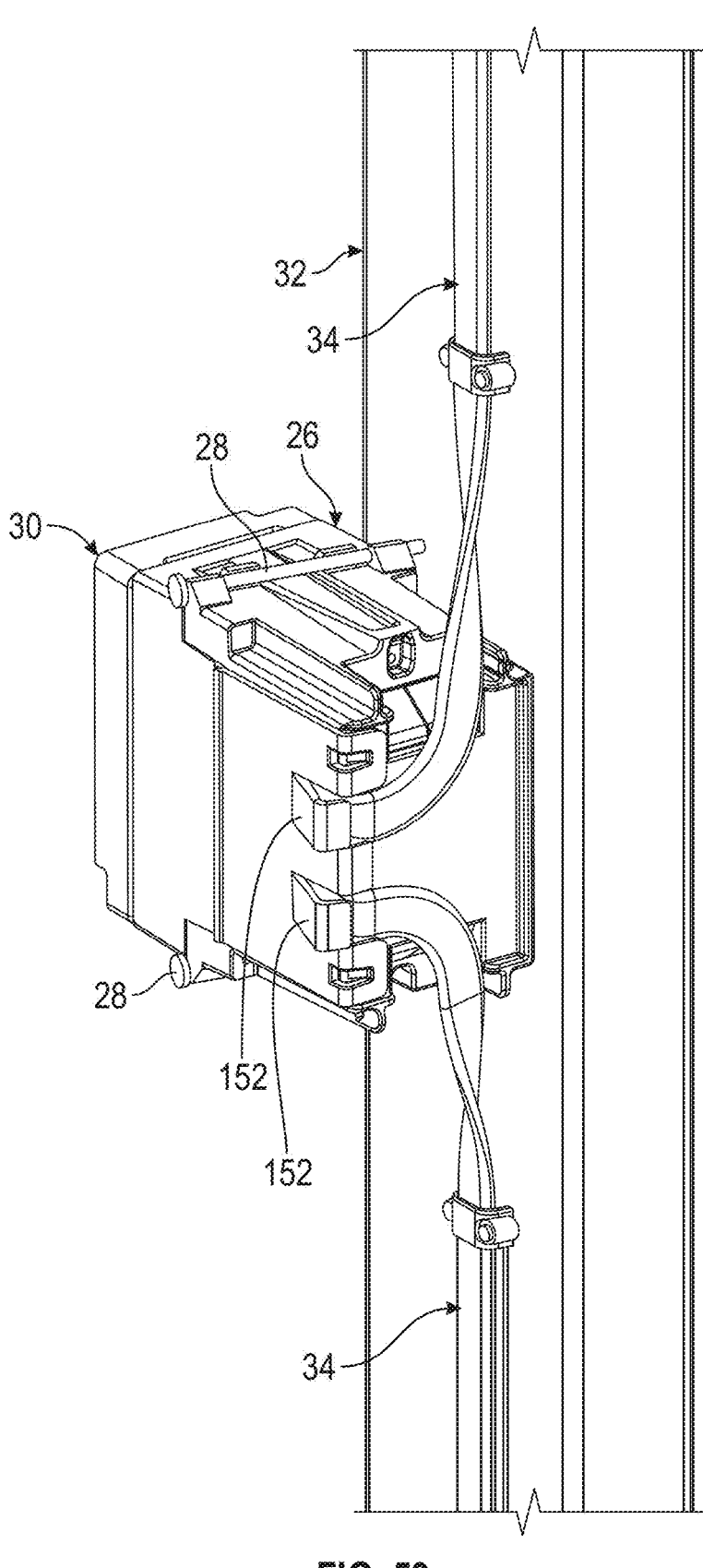
Figure 60A:
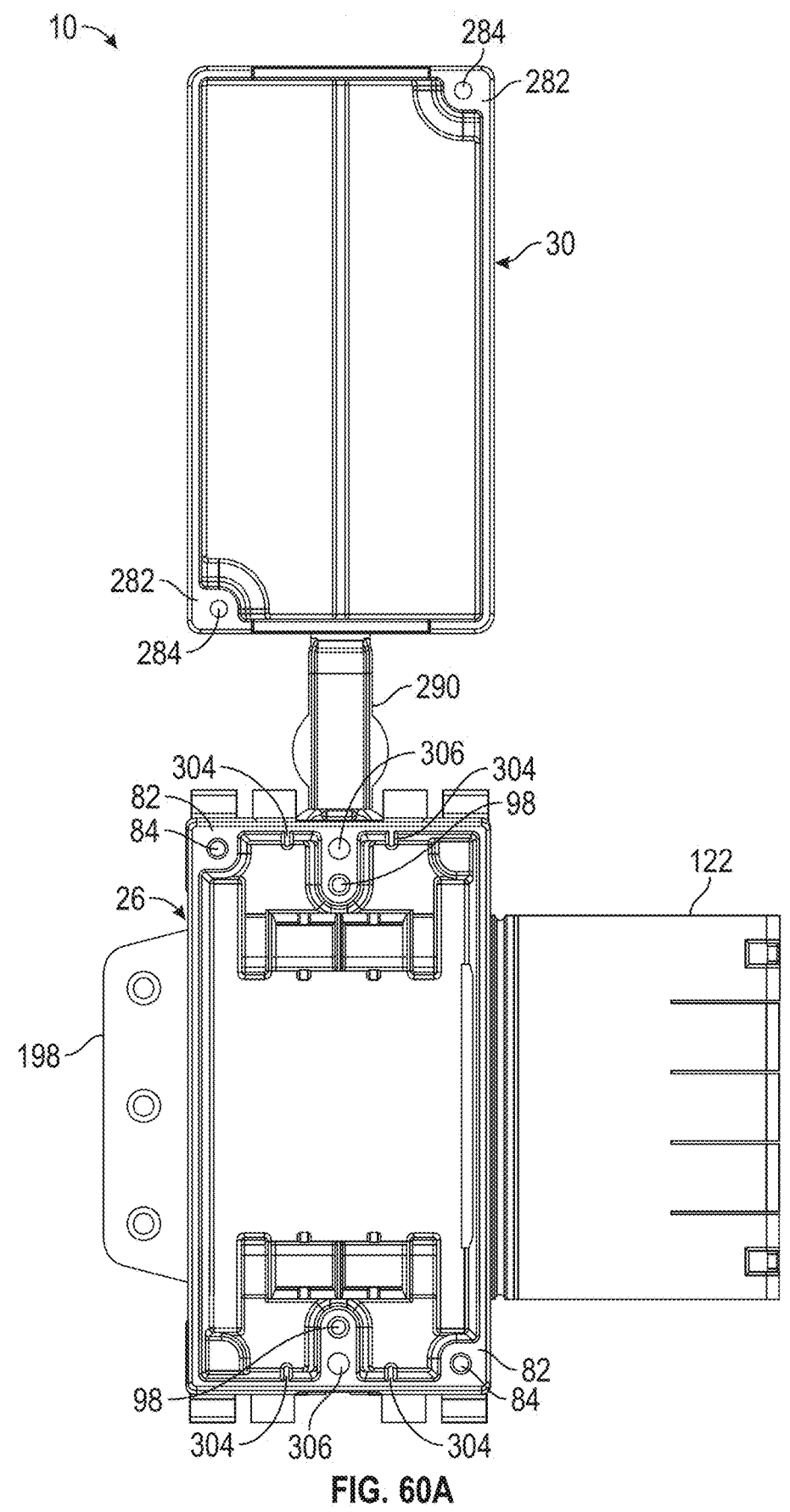
Figure 60B:
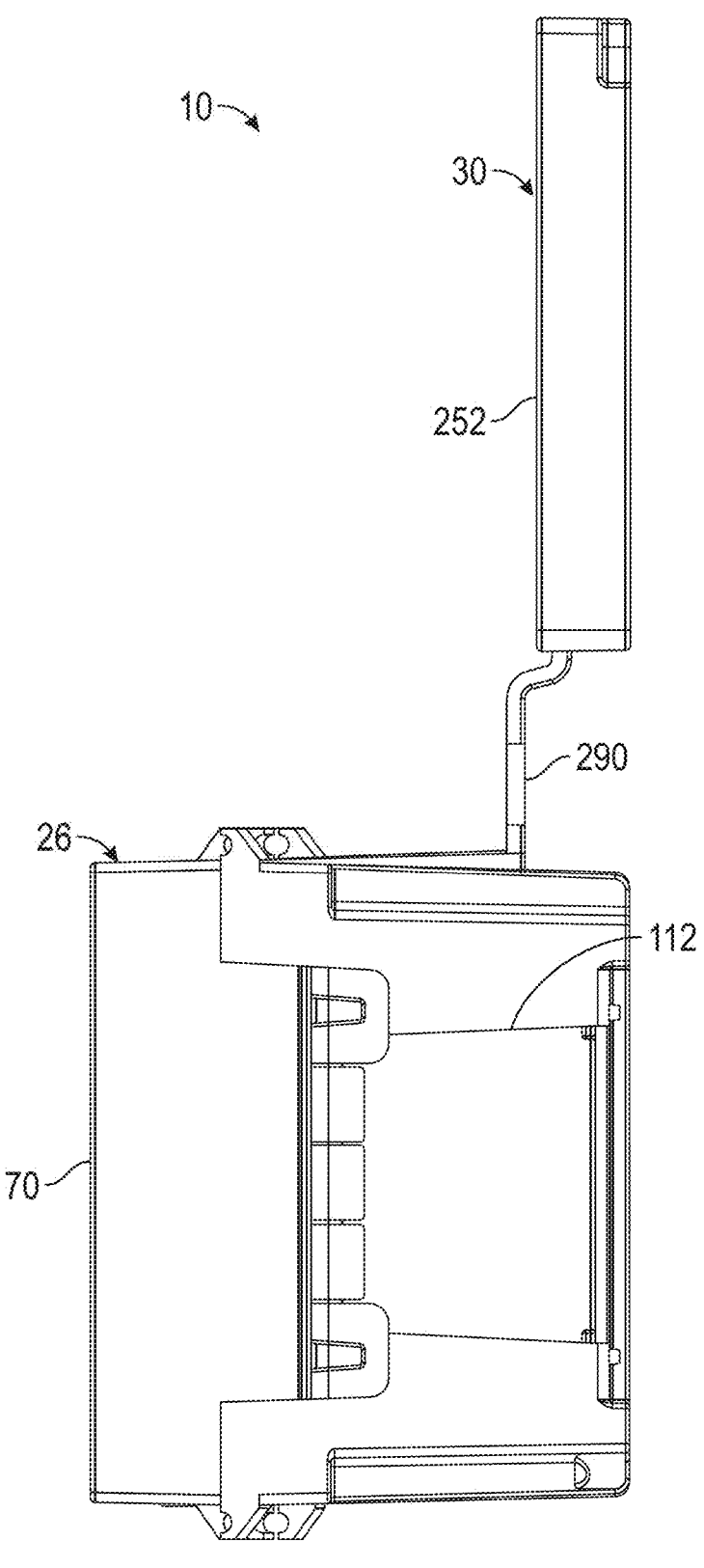
Figure 61A:
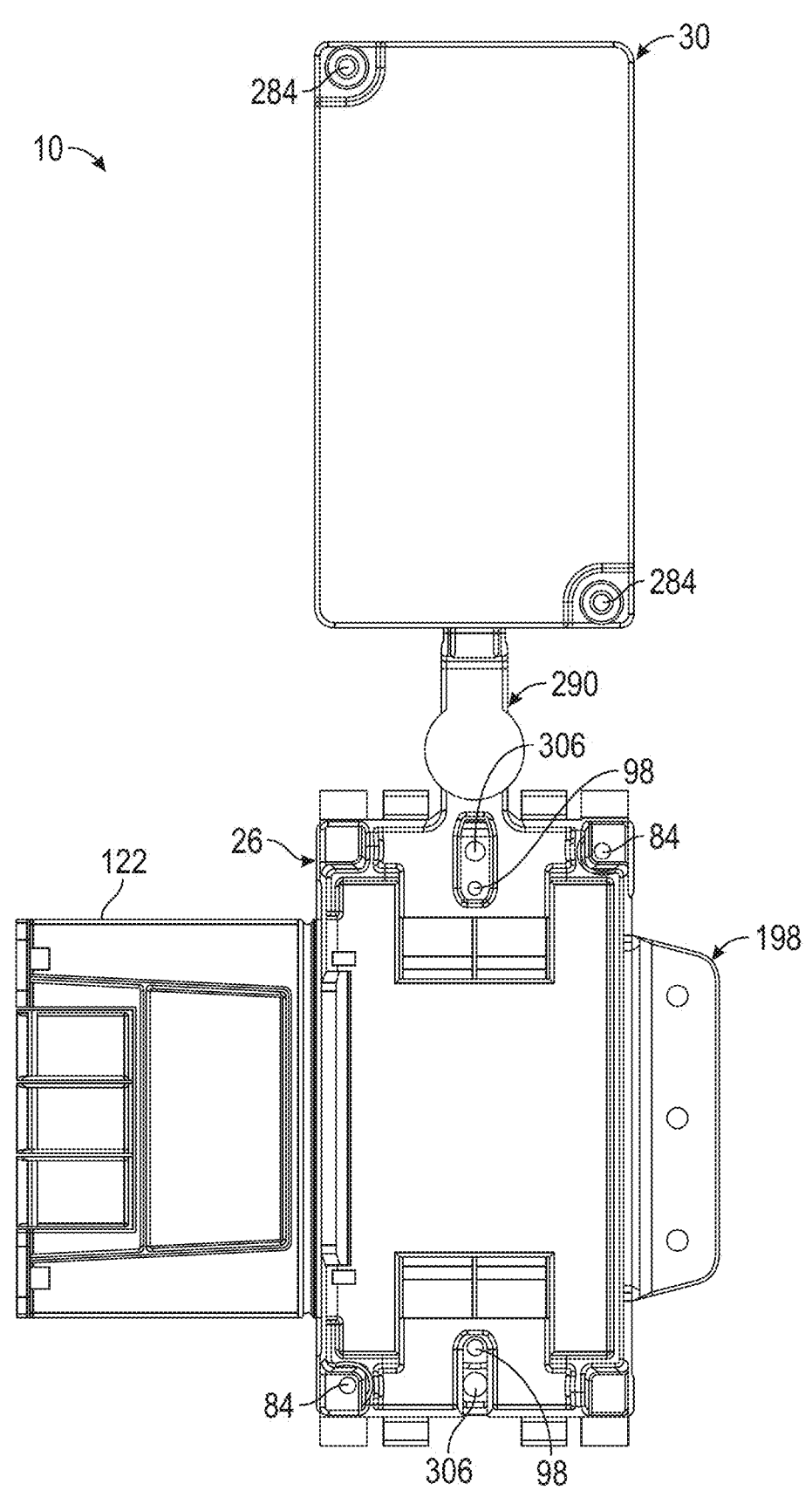
Figure 61B:
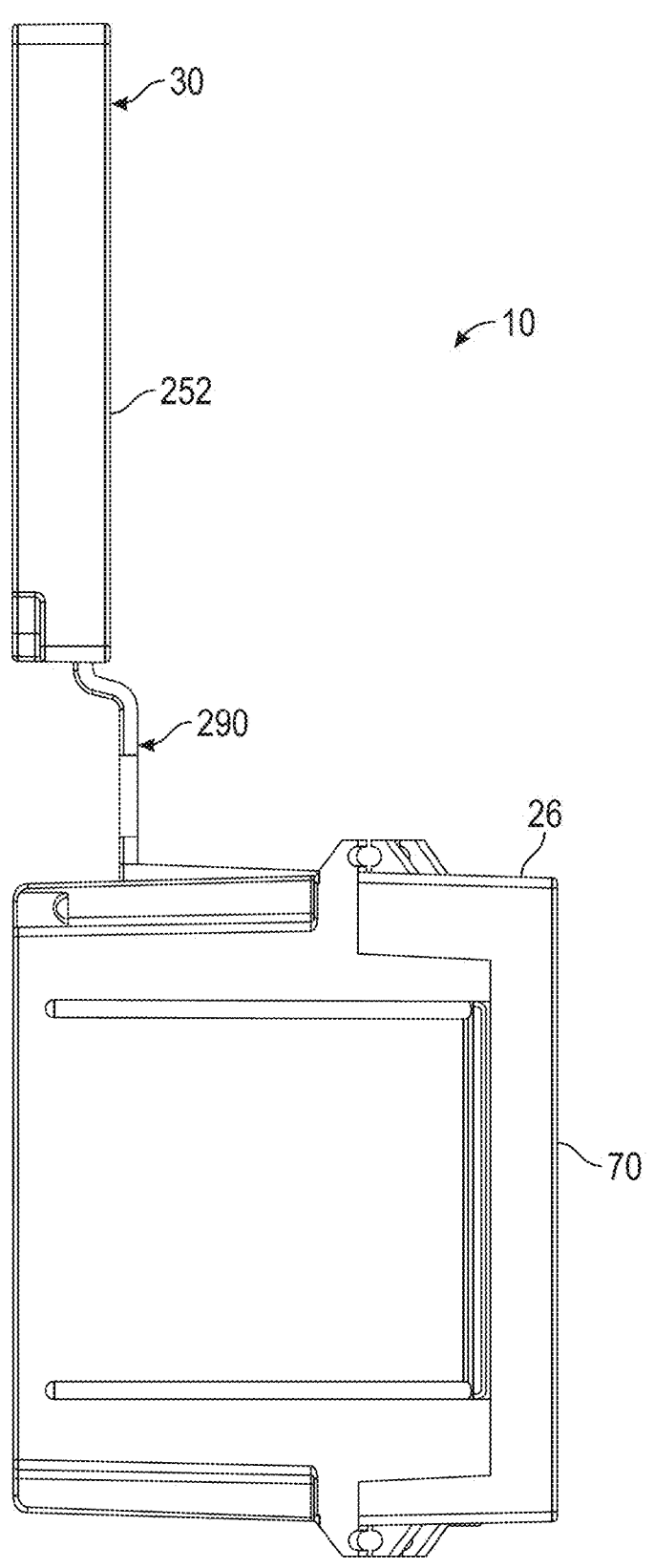
Figure 62A:
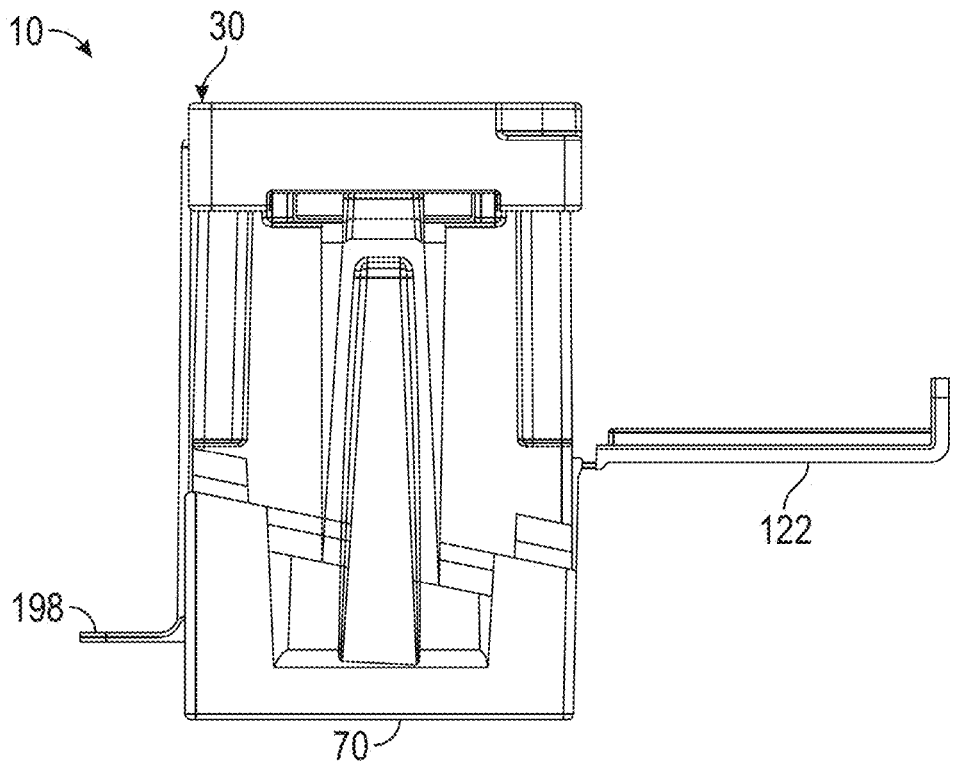
Figure 62B:
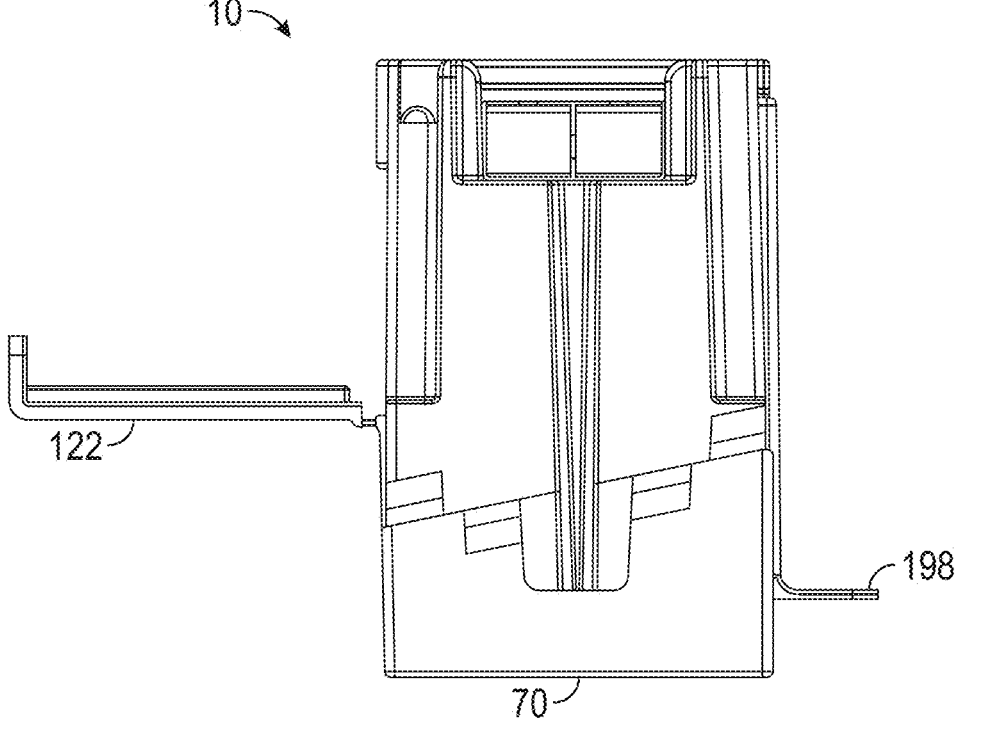
Figure 63A:
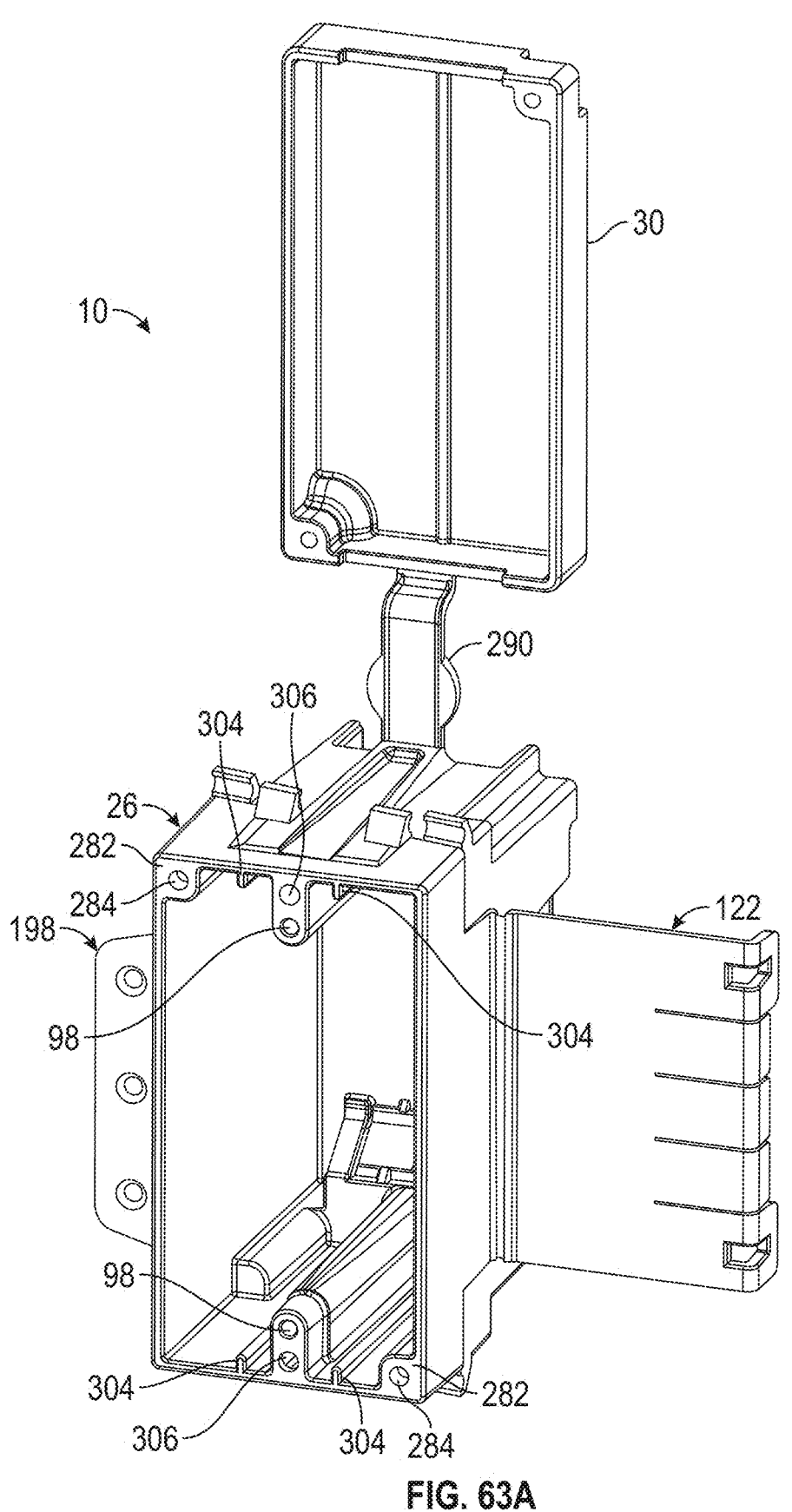
Figure 63B:
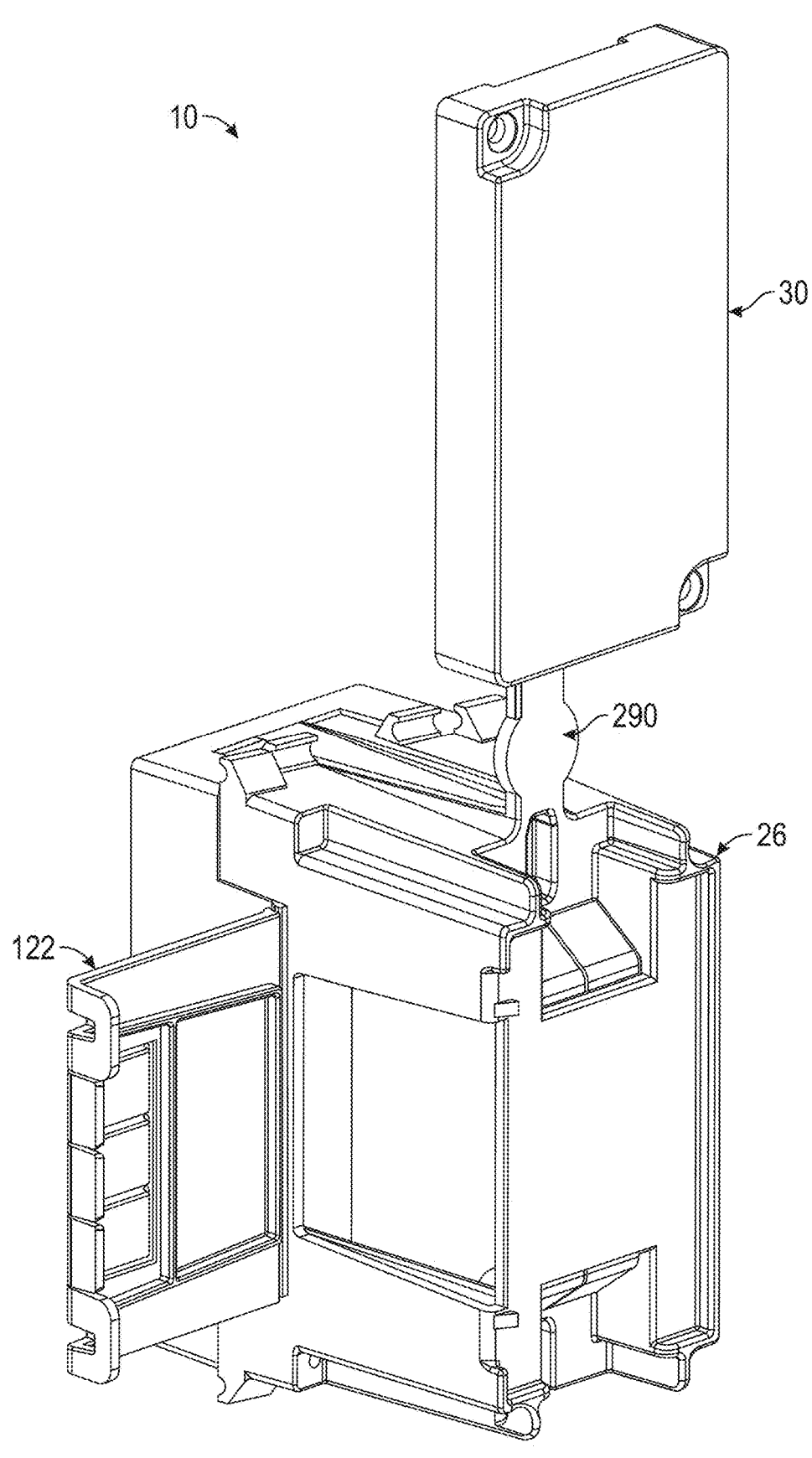
Figure 64A:
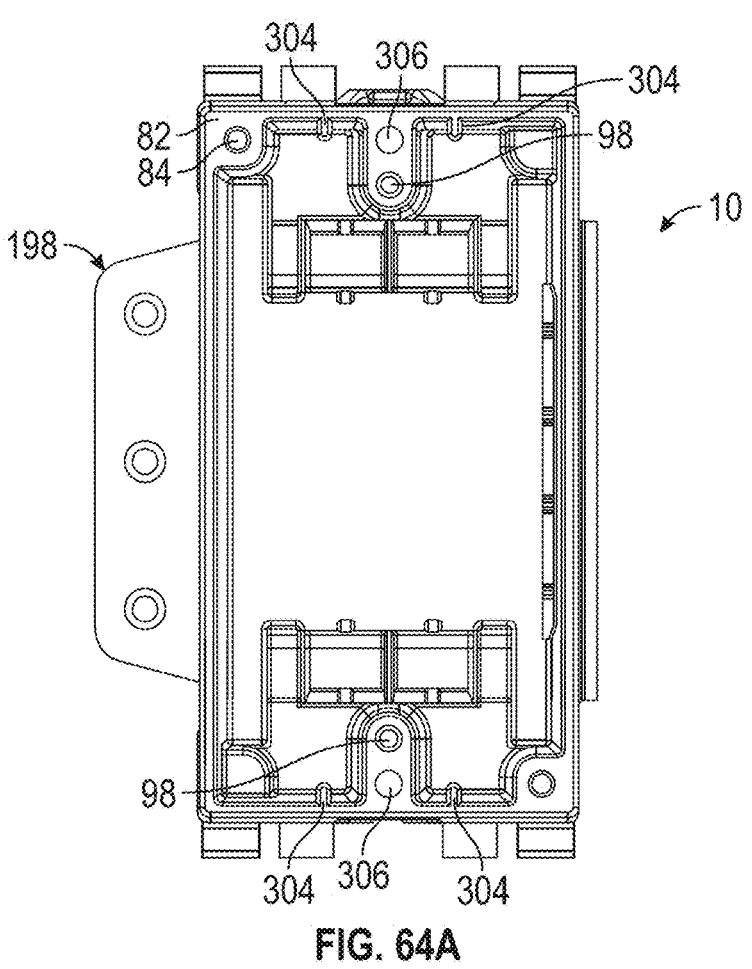
Figure 64B:
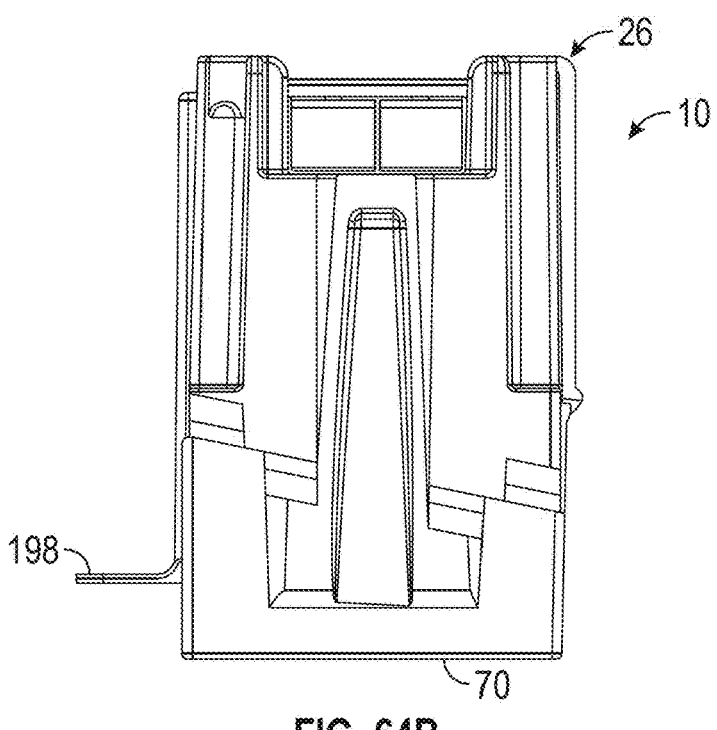
Figure 64C:
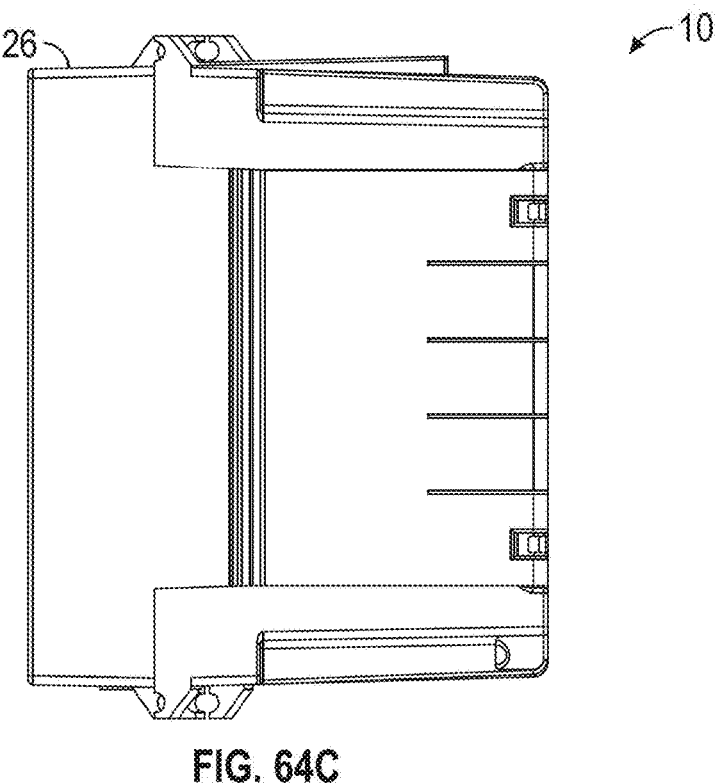
Figure 65A:
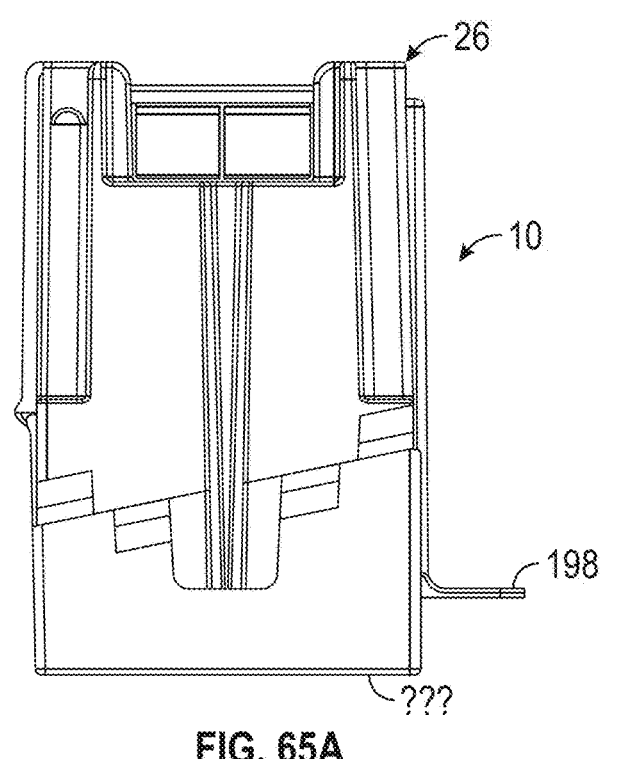
Figure 65B:
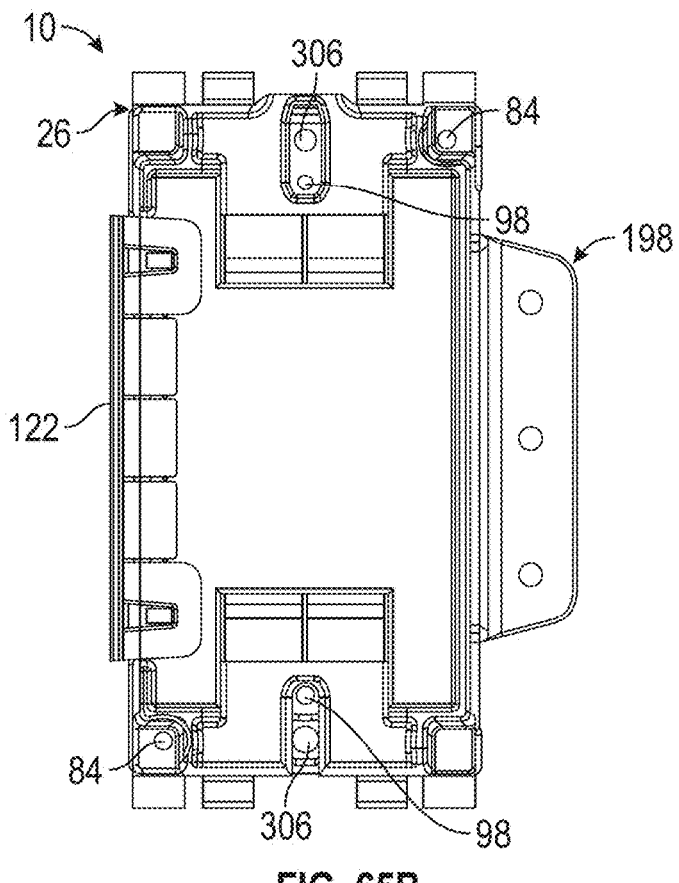
Figure 65C:
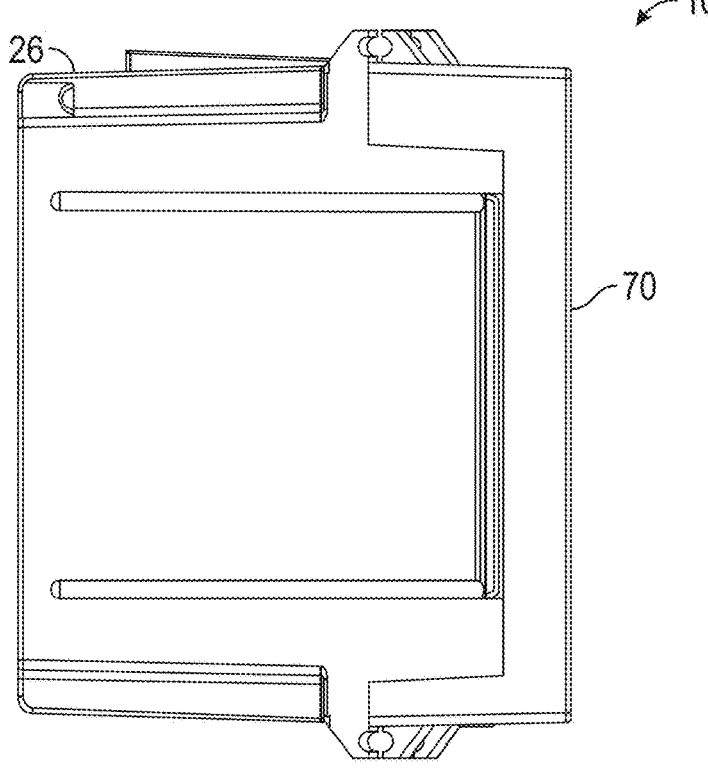
Figure 66A:
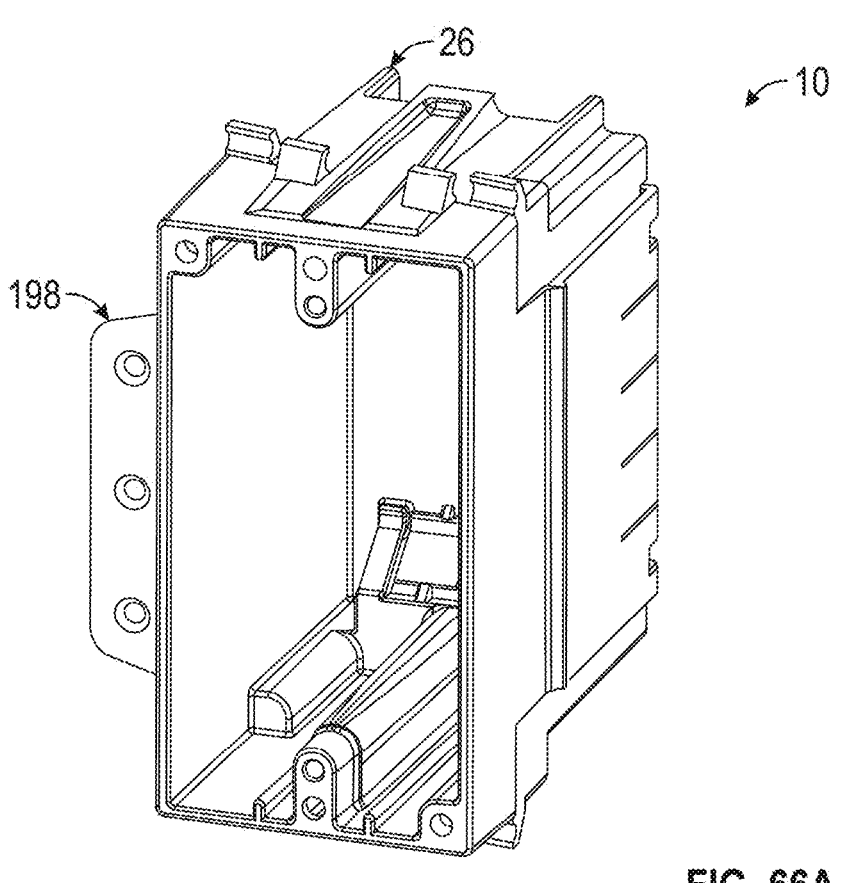
Figure 66B:
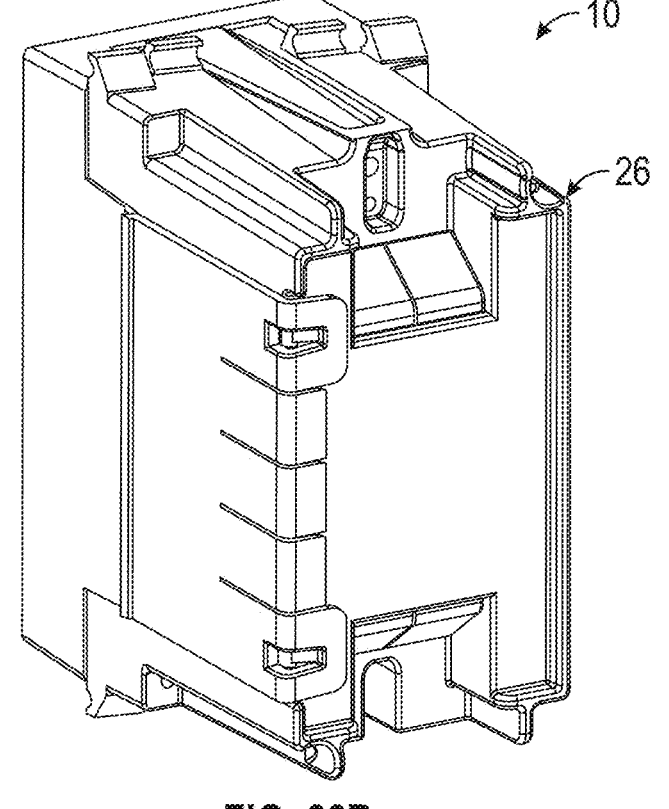
Figure 66C:
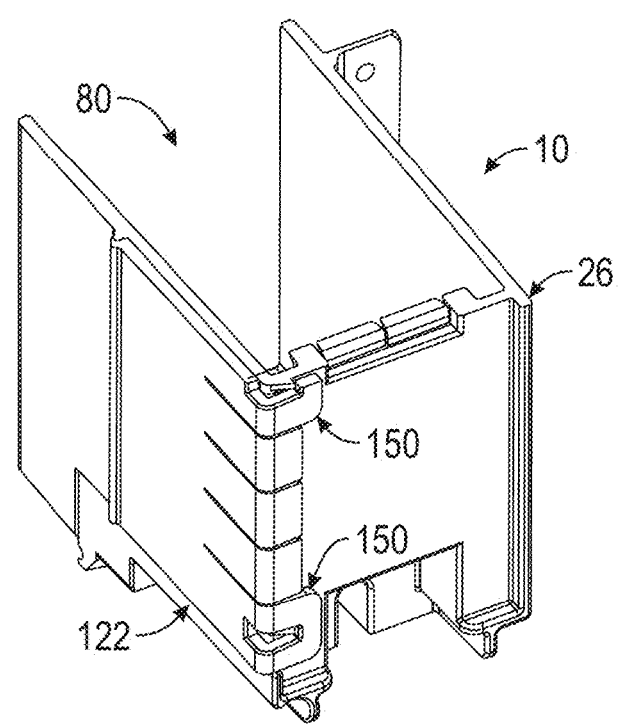
Figure 66D:
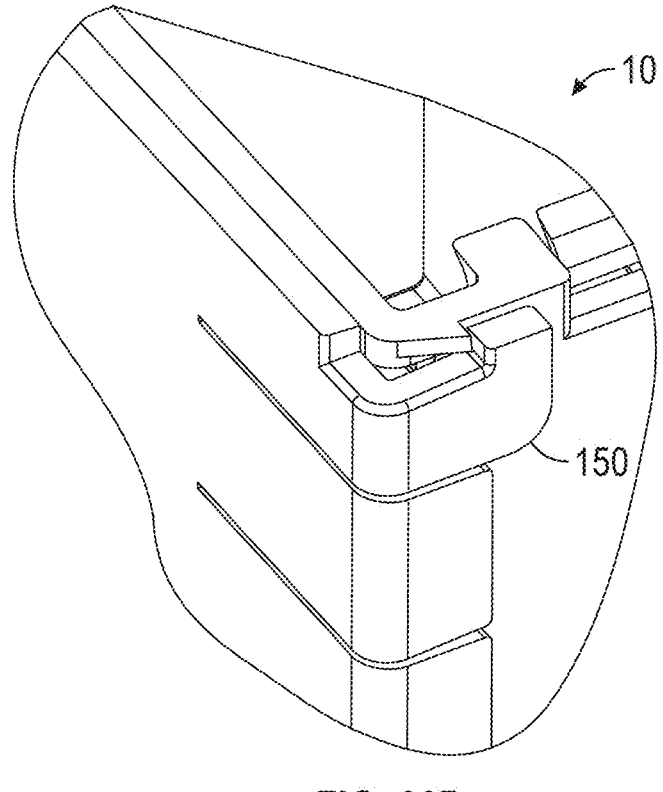
Figures 67A, 67B:
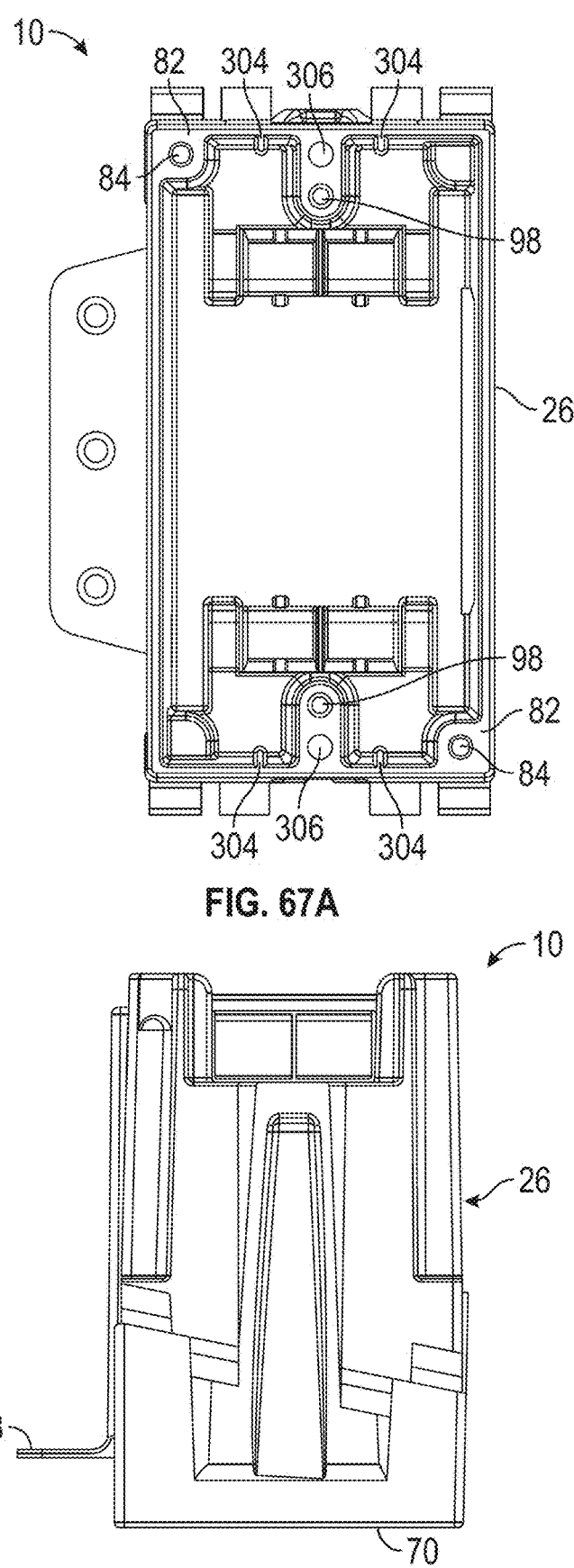
Figure 67C:
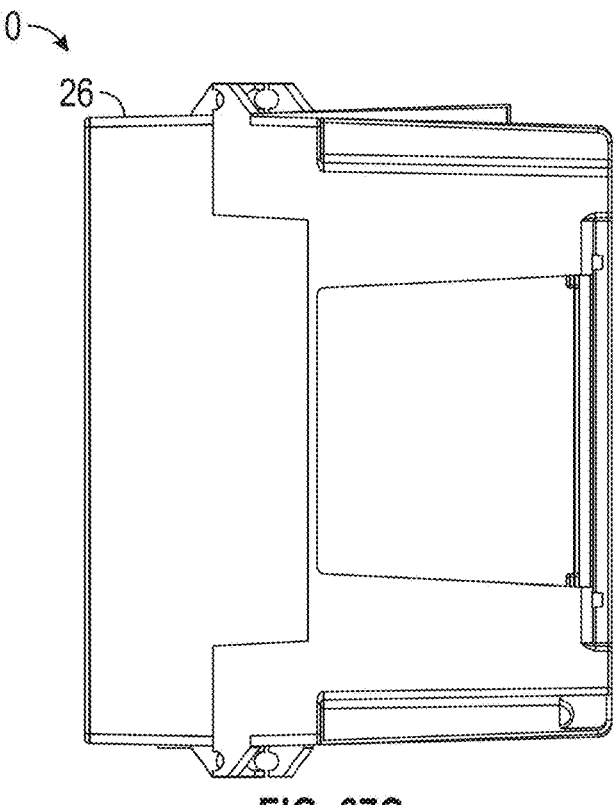
Figure 67D:
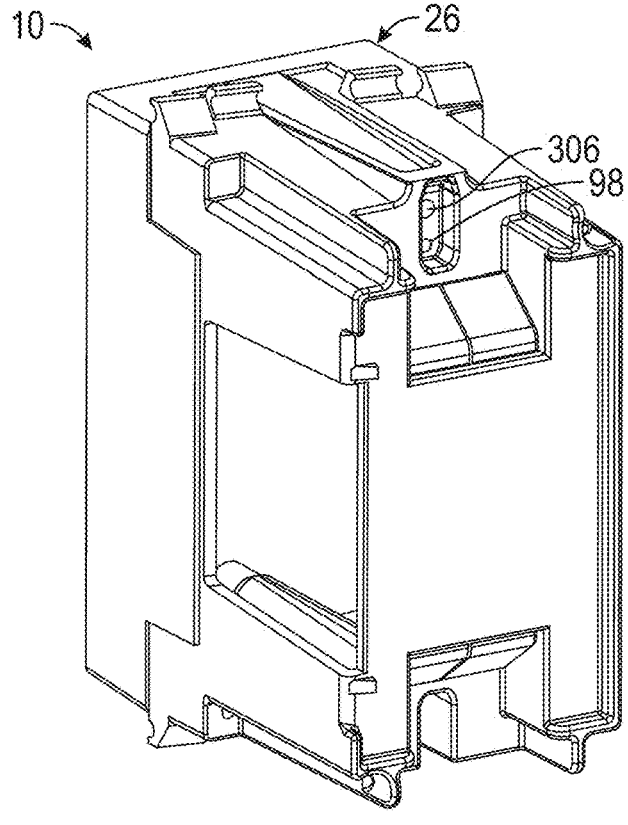
Figure 68A:
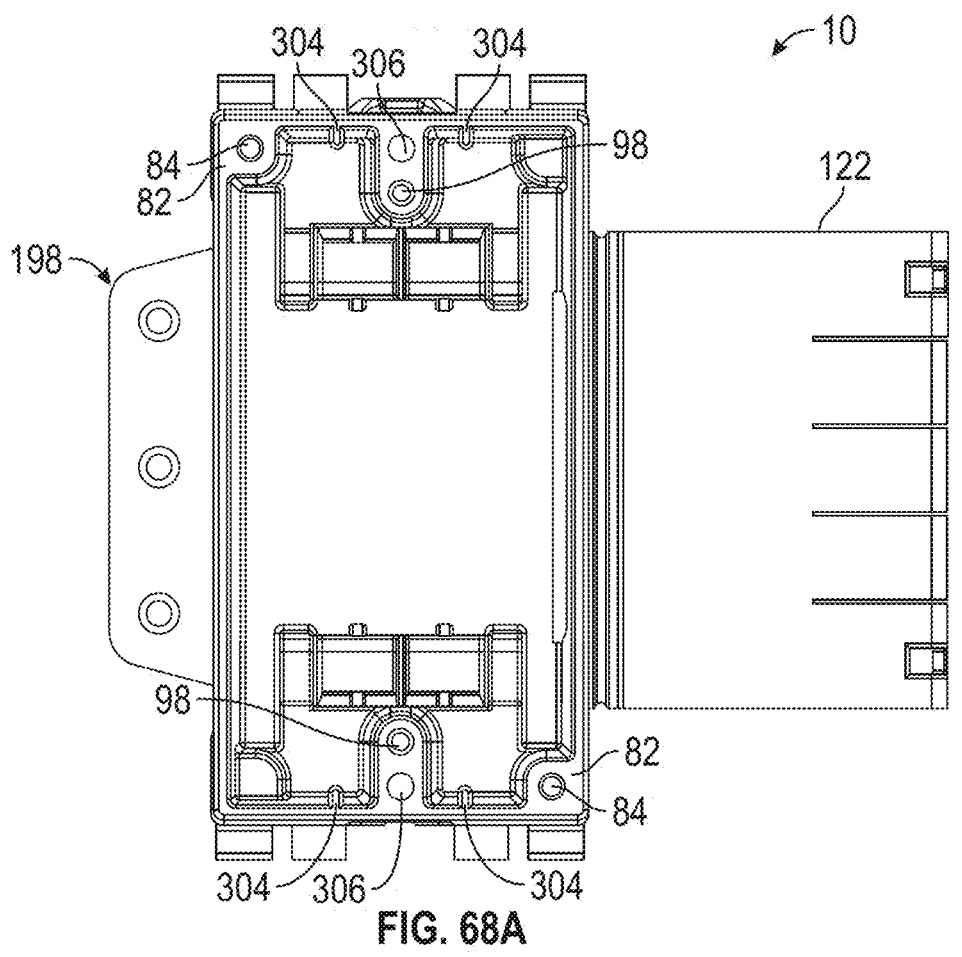
Figure 68B:
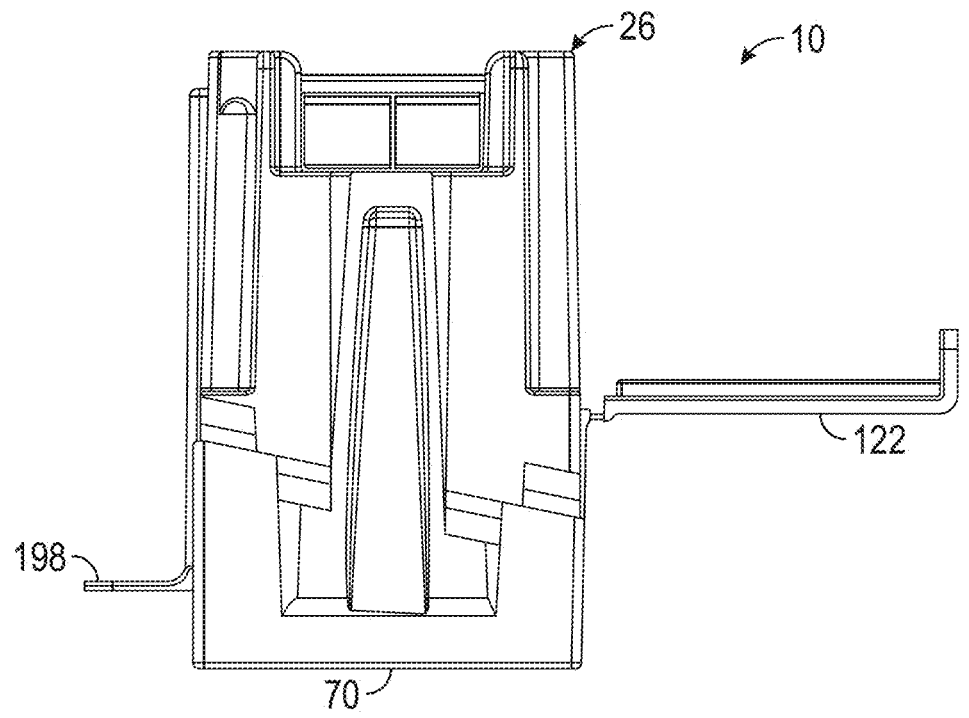
Figure 68C:
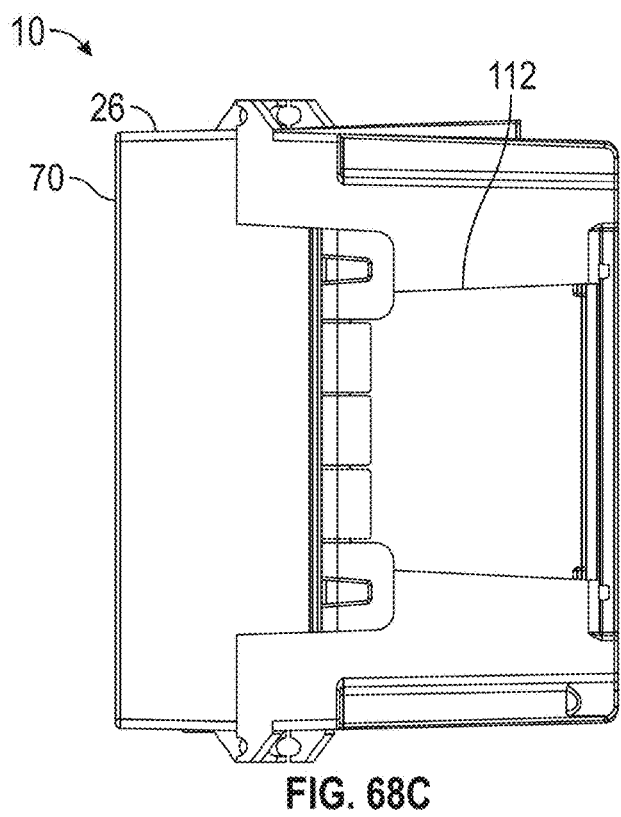
Figure 68D:
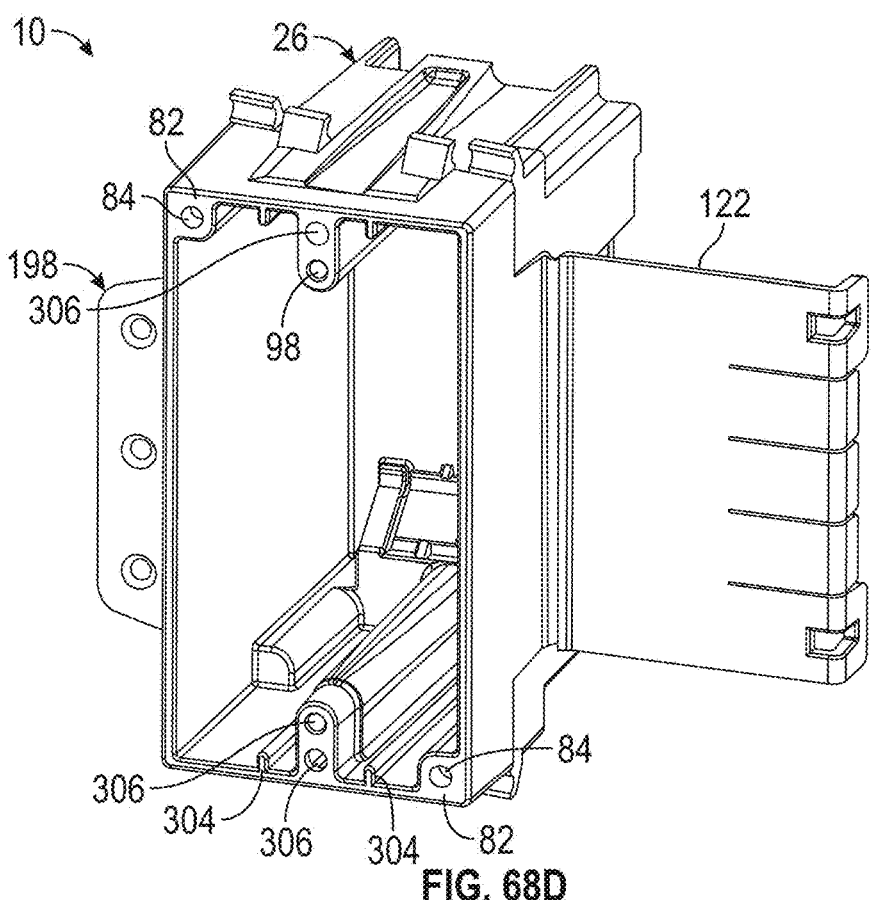
Figure 69A:
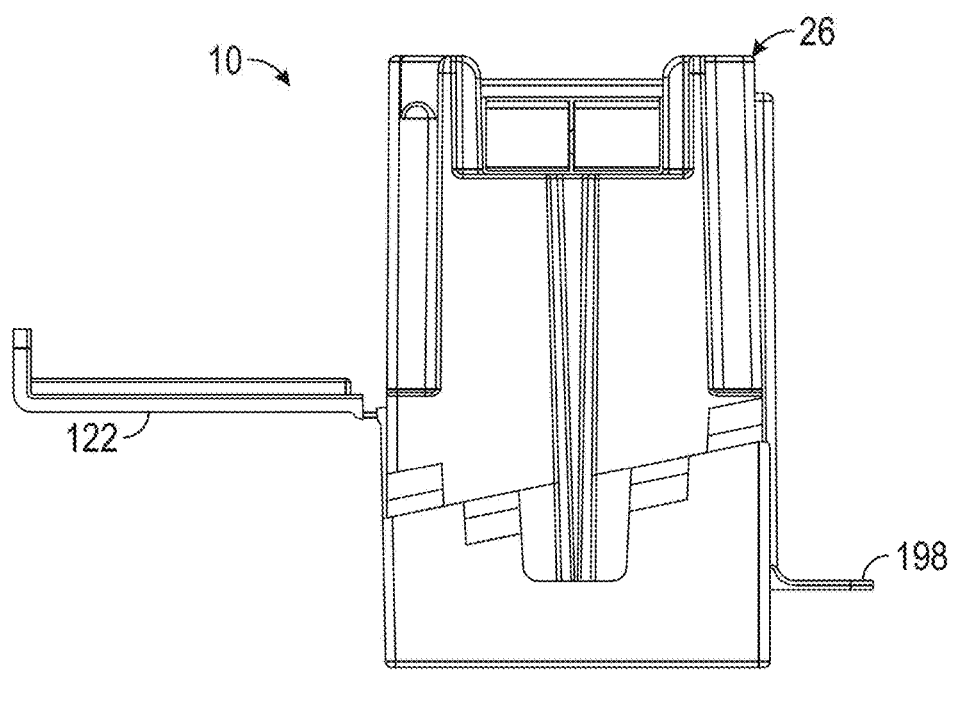
Figure 69B:
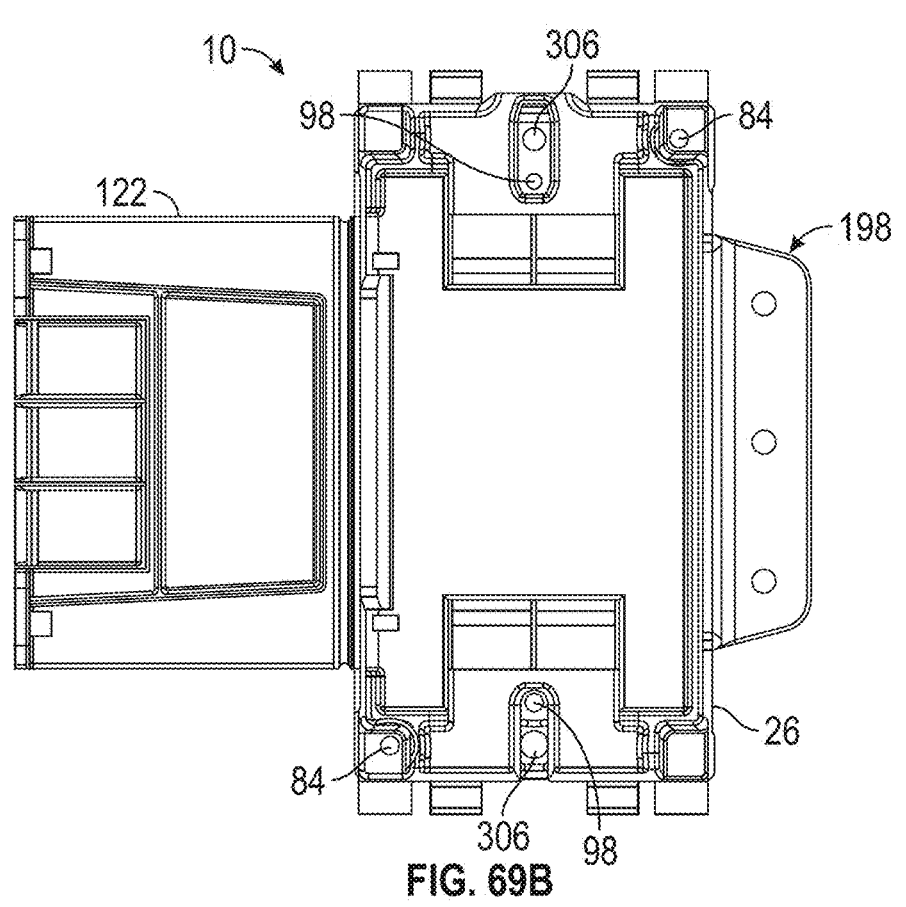
Figure 69C:
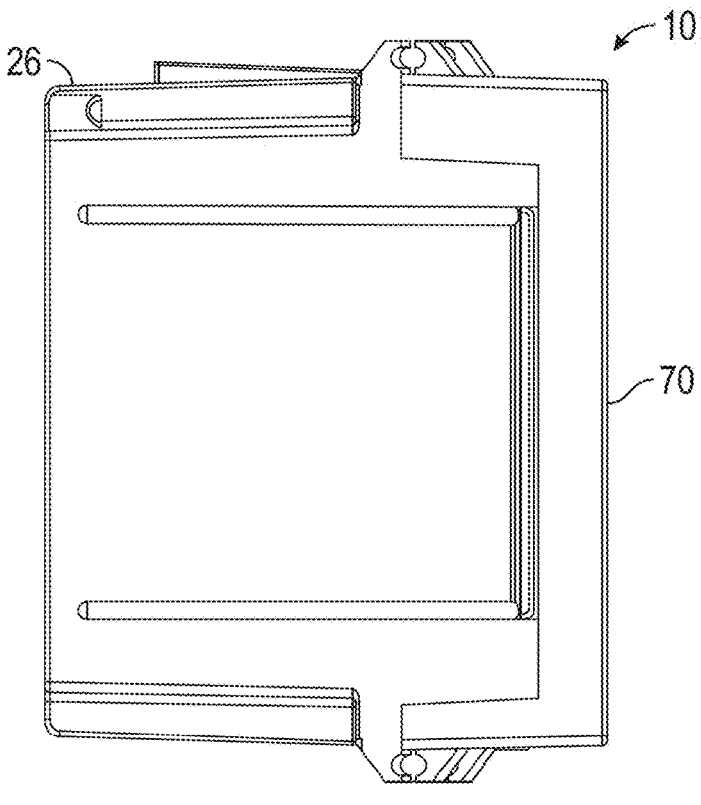
Figure 69D:
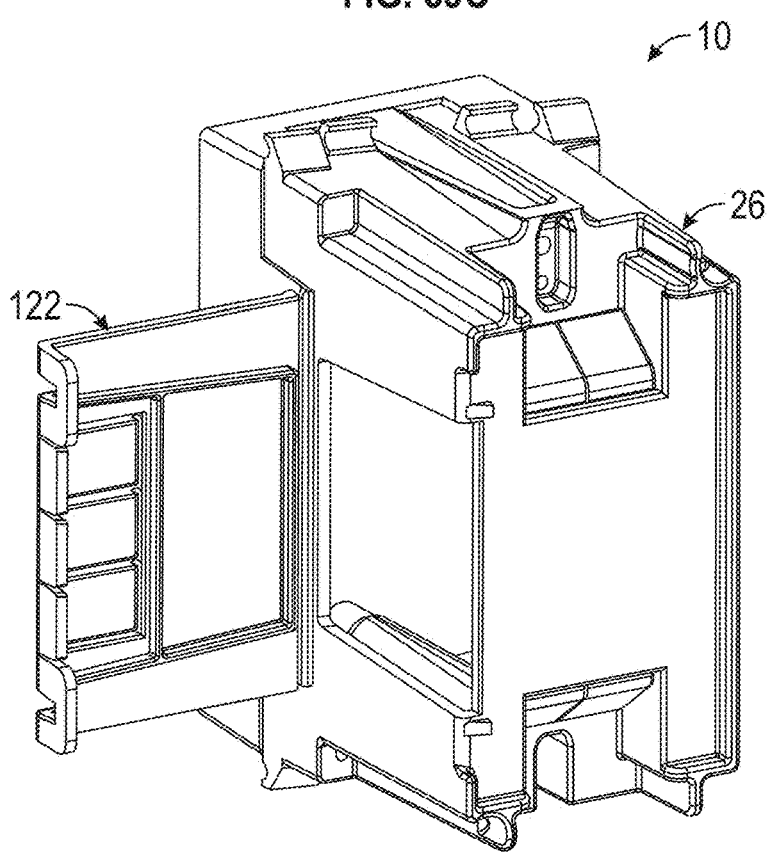
Figure 70A:
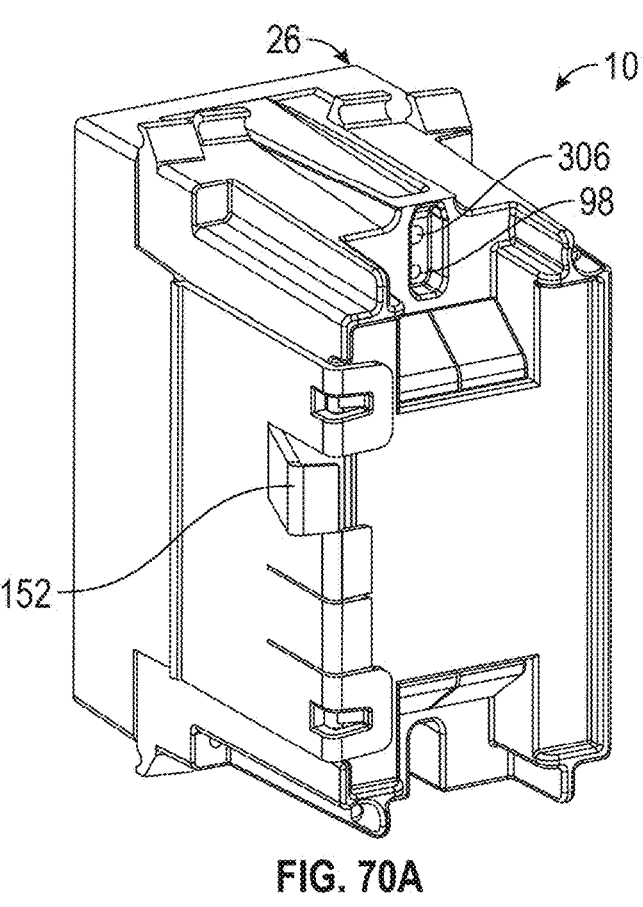
Figure 70B:
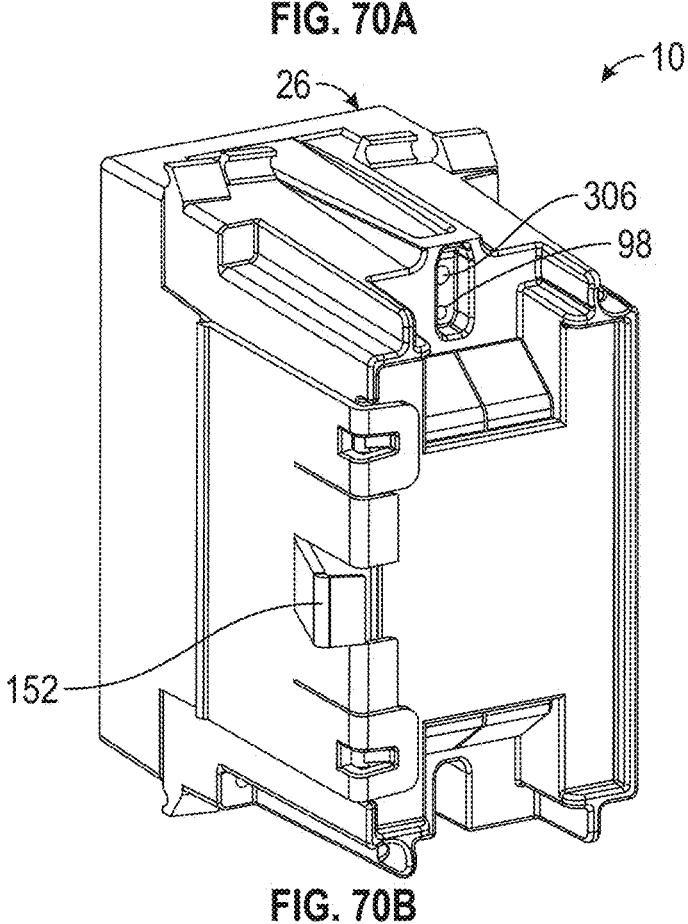
Figure 70C:
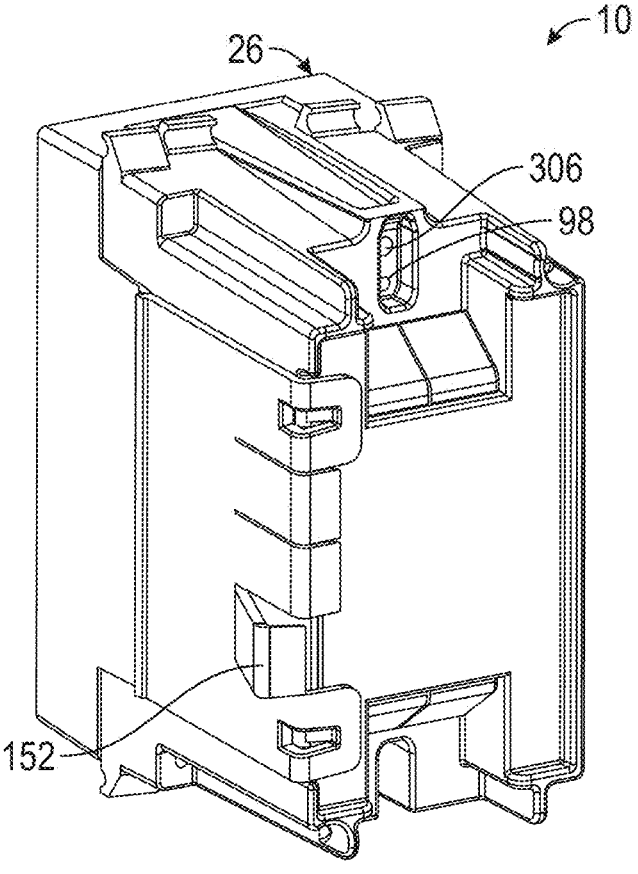
Figure 71A:
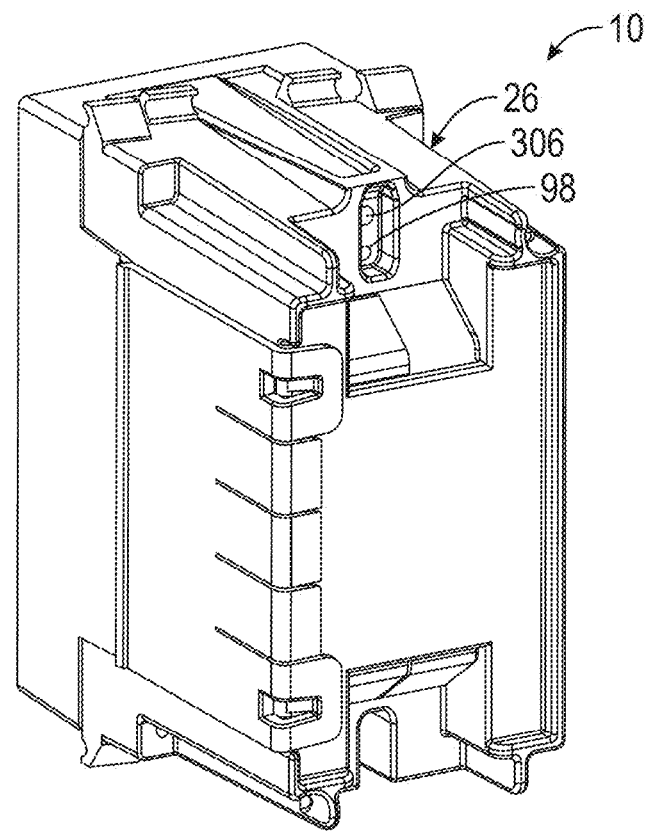
Figure 71B:
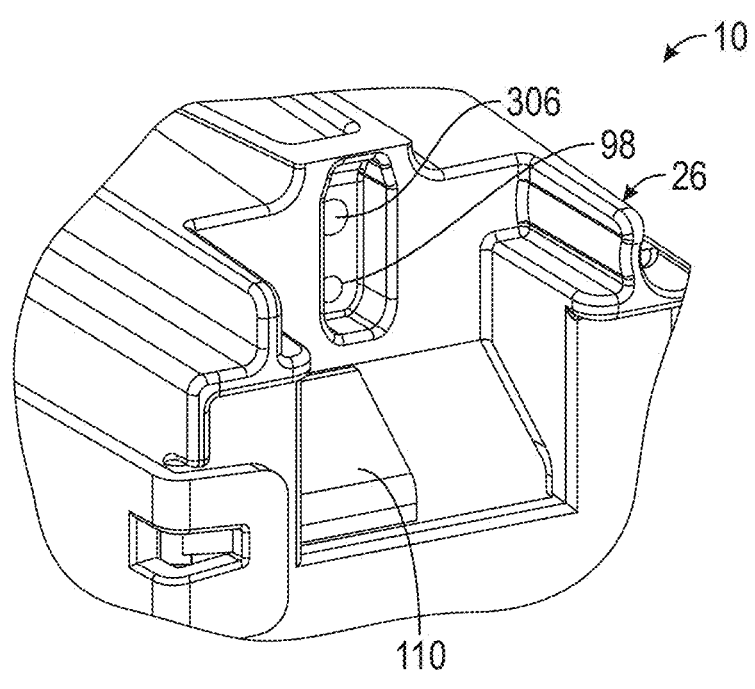
Figure 71C:
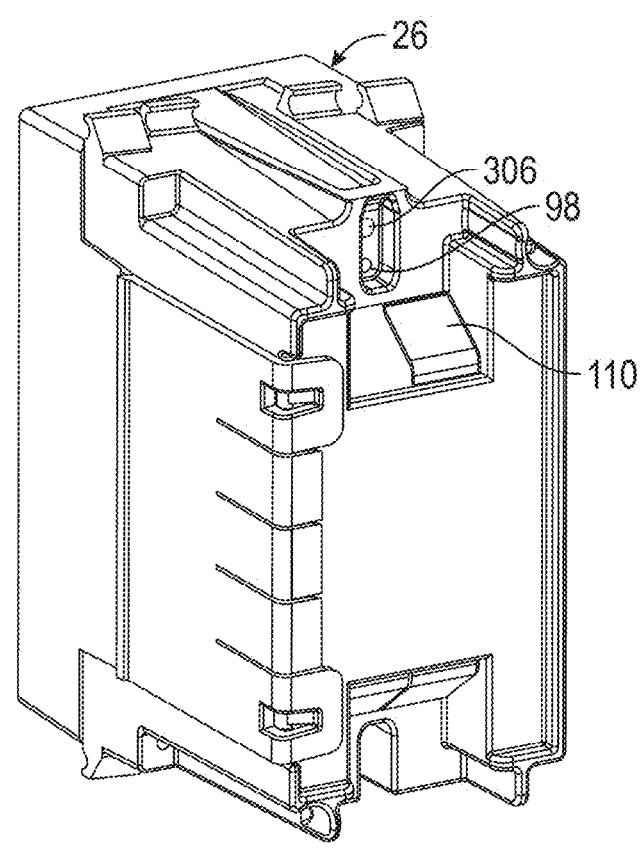
Figure 71D:
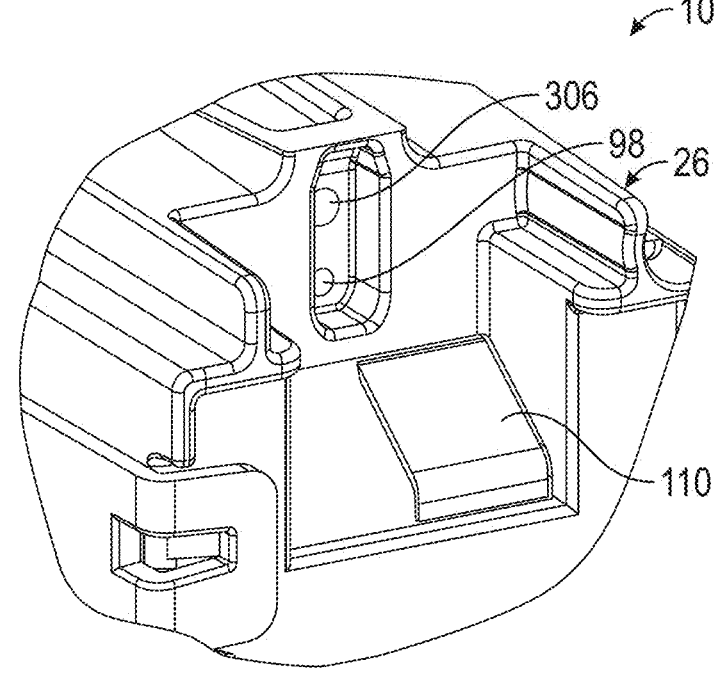
Figure 72A:
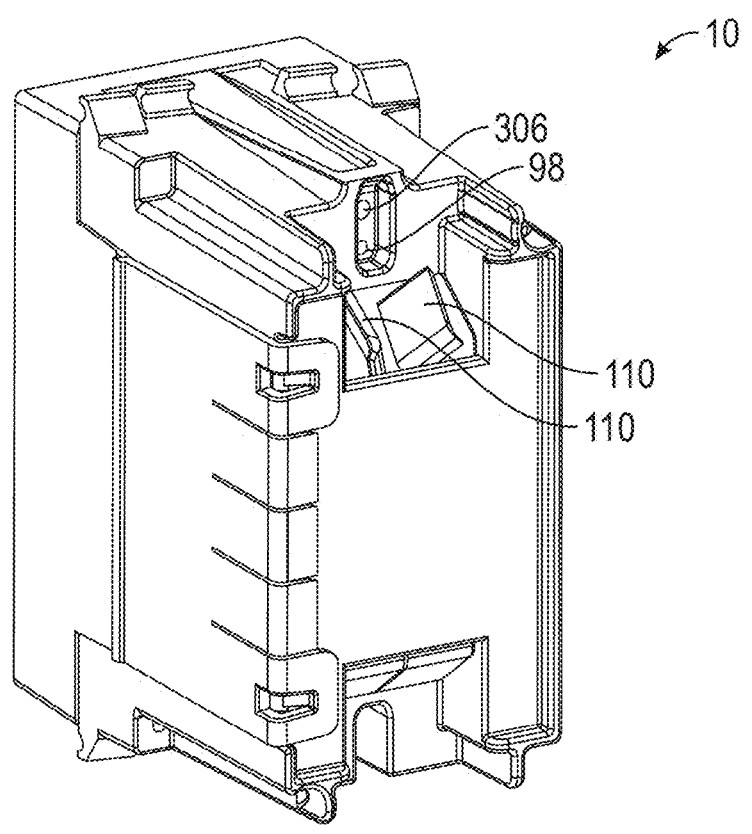
Figure 72B:
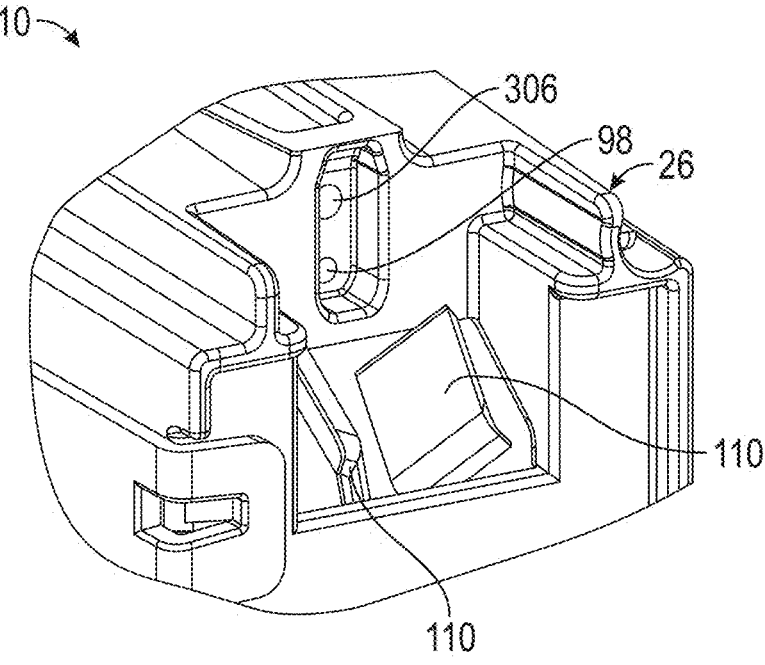
Figure 72C:
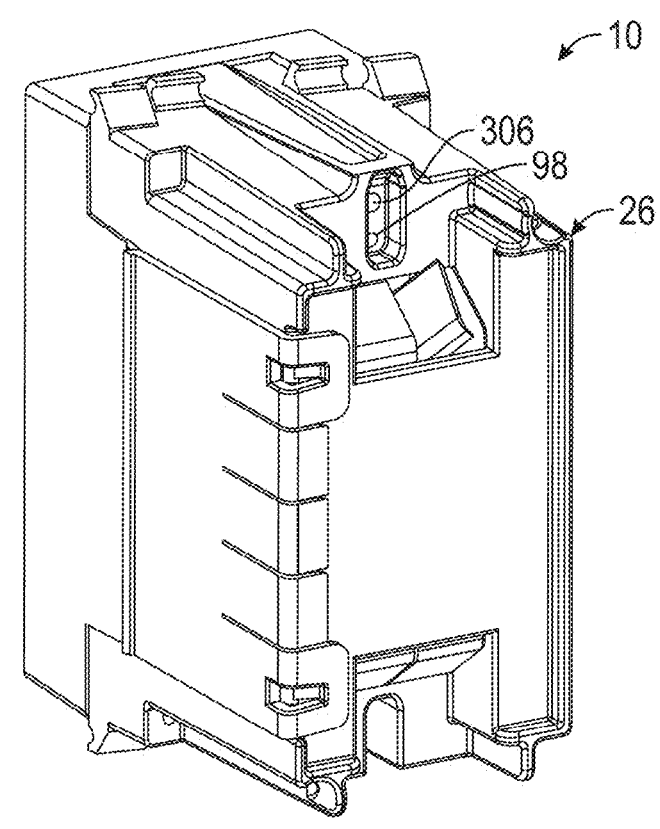
Figure 72D:
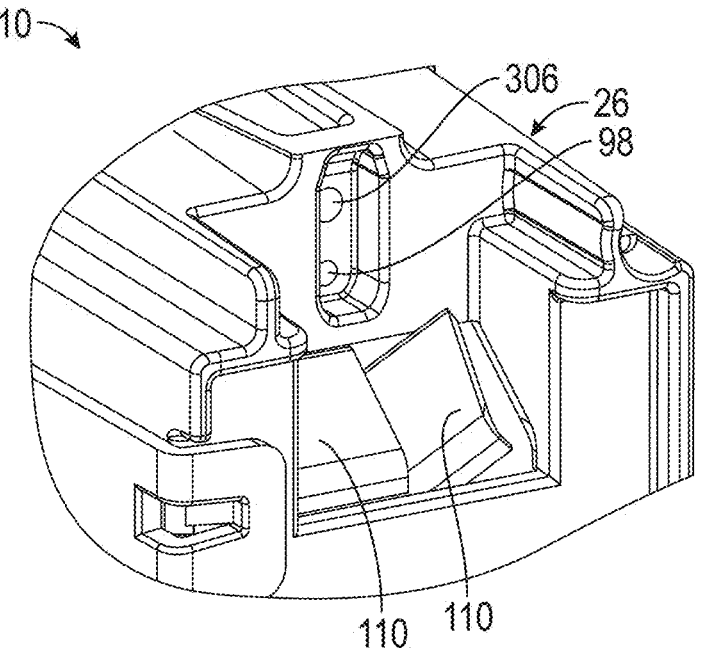
Figure 74A:
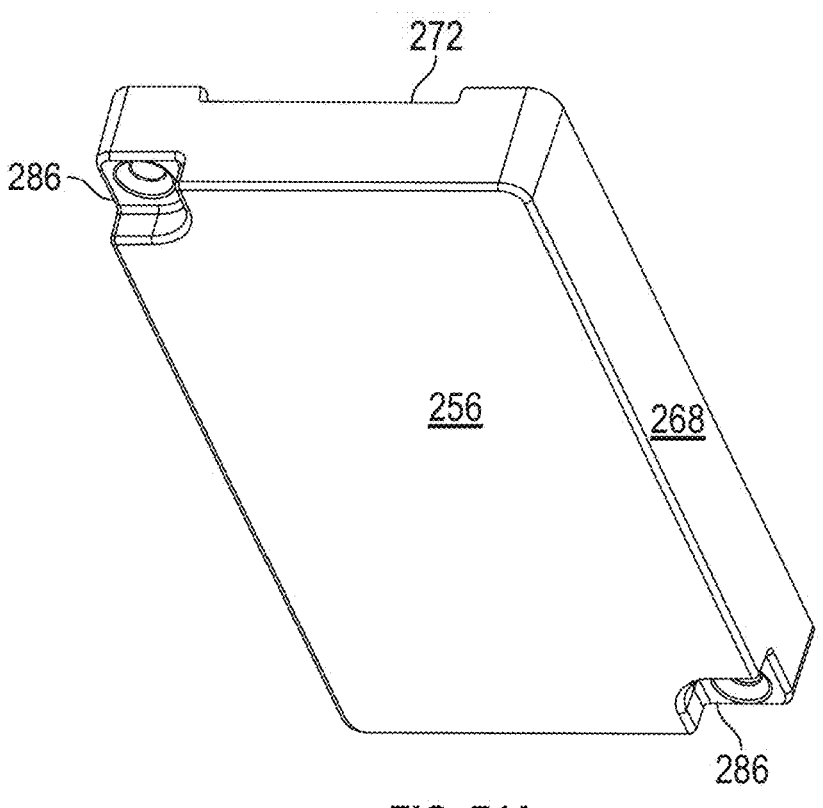
Figure 74B:
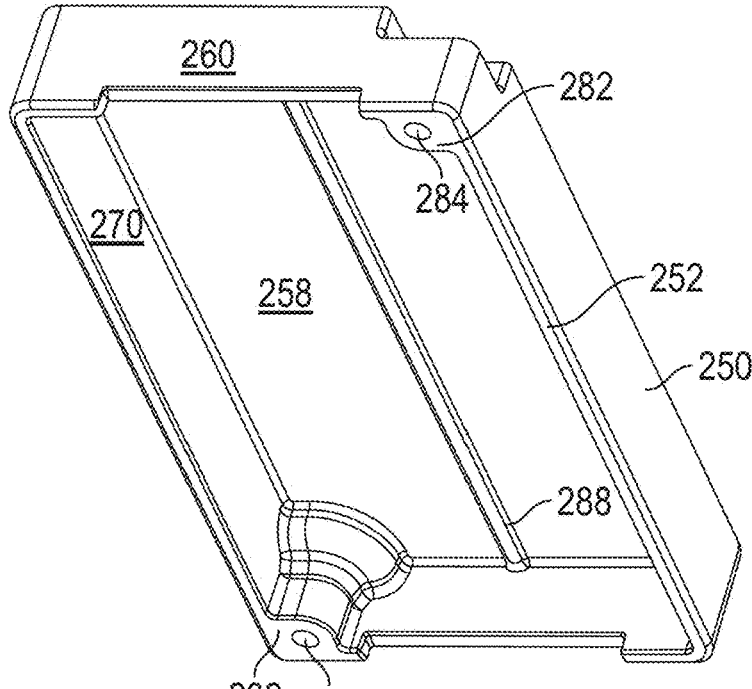
Figure 75A:
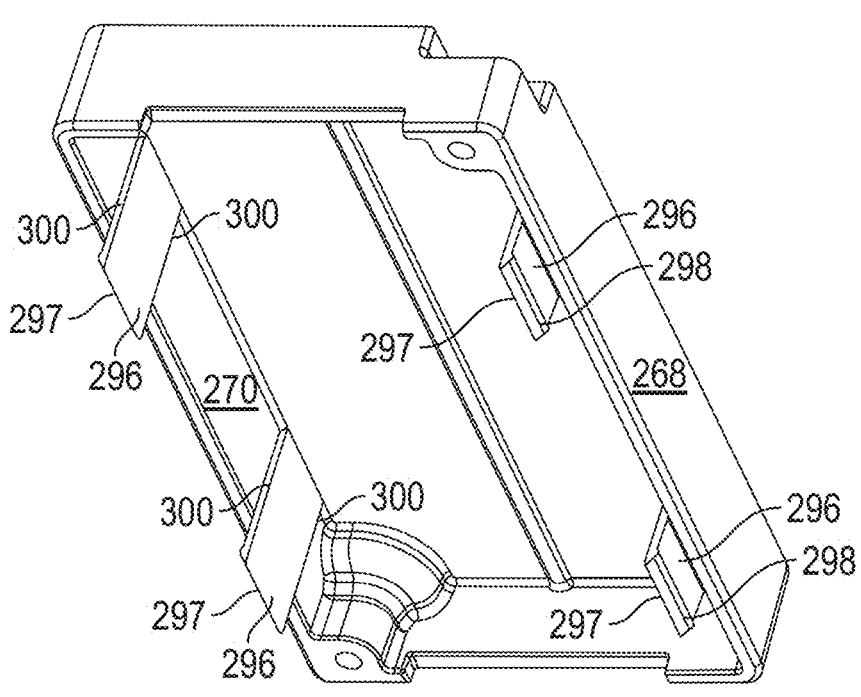
Figure 75B:
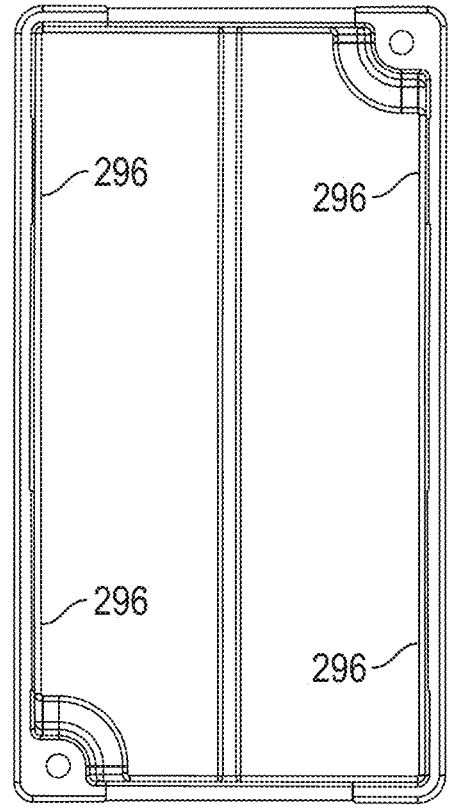
Figure 75C:
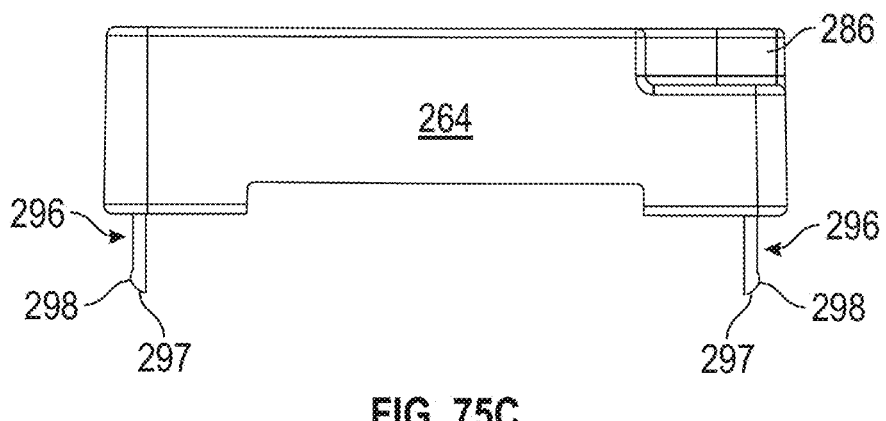
Figure 76A:
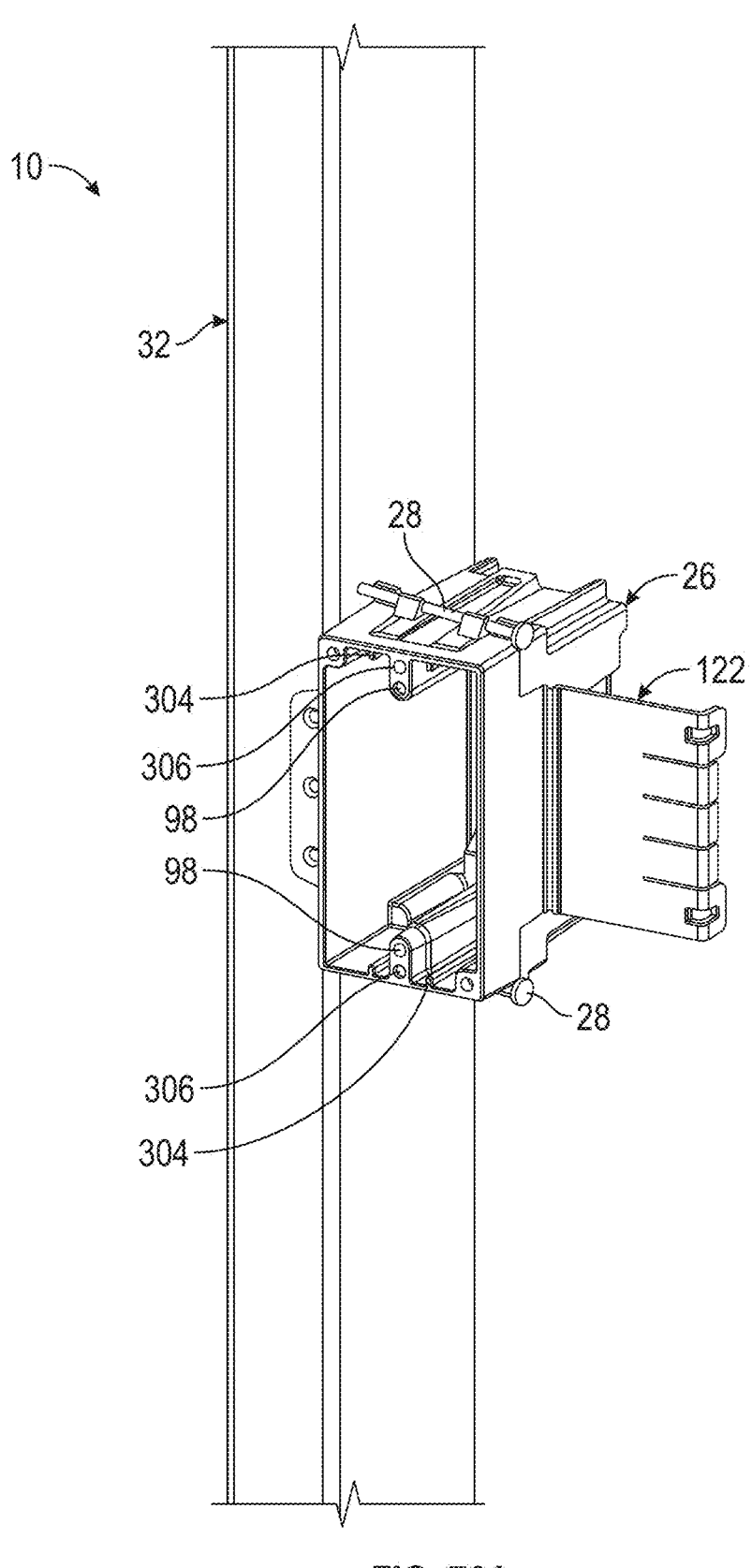
Figure 76B:
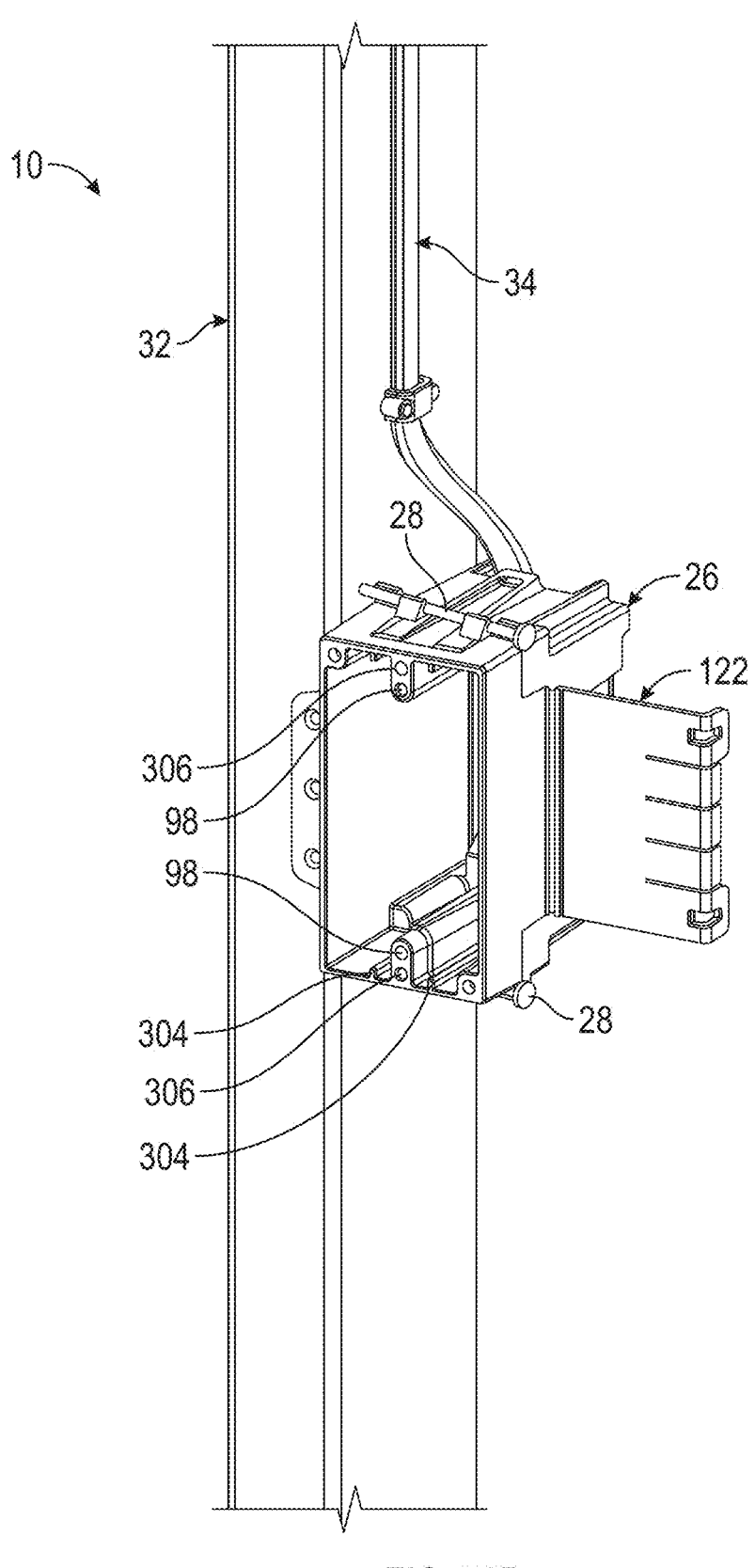
Figure 77A:
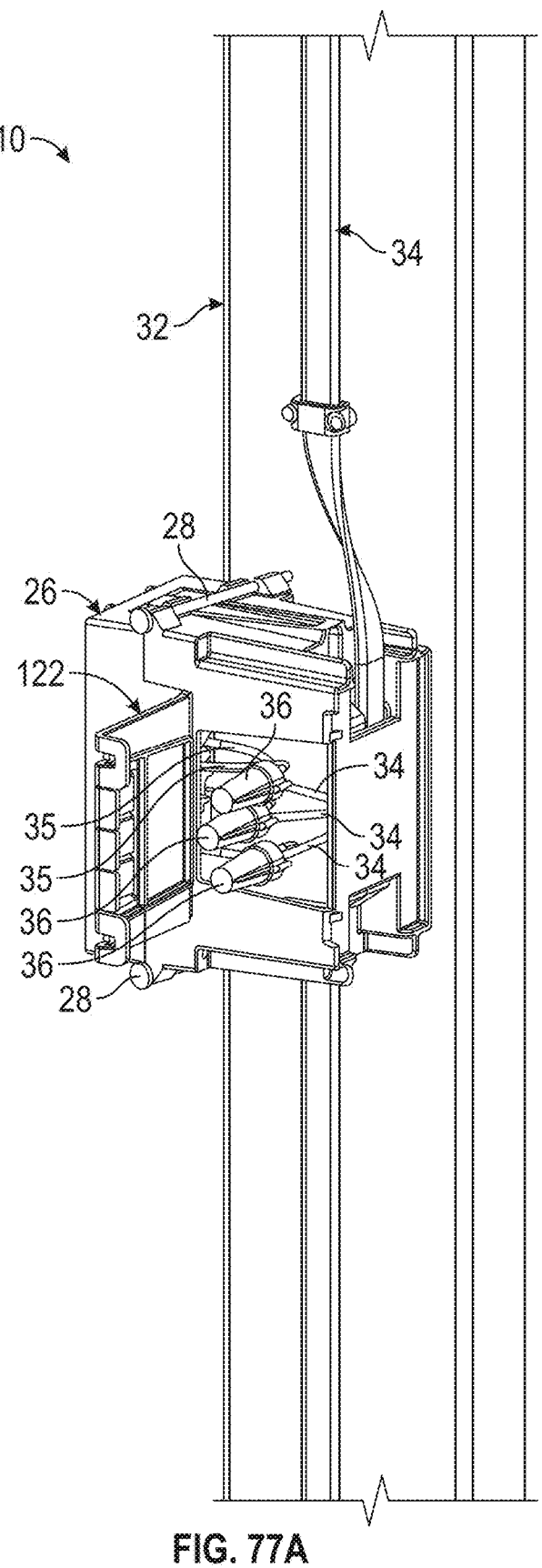
Figure 77B:
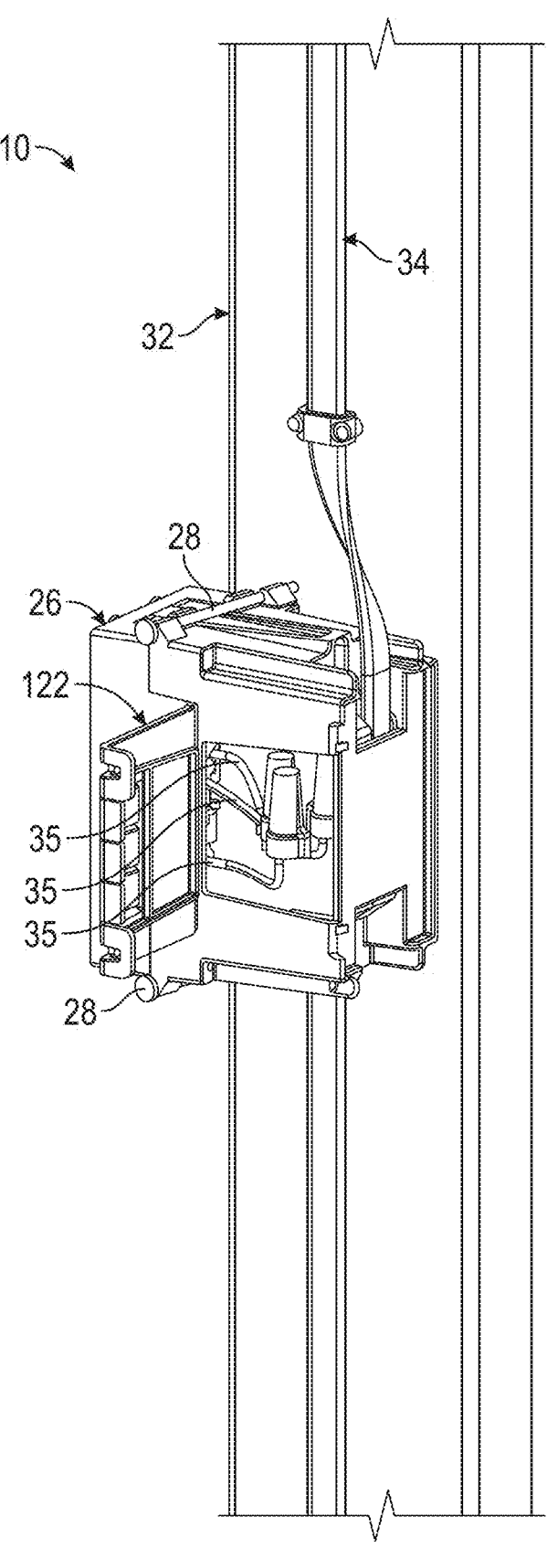
Figure 78A:
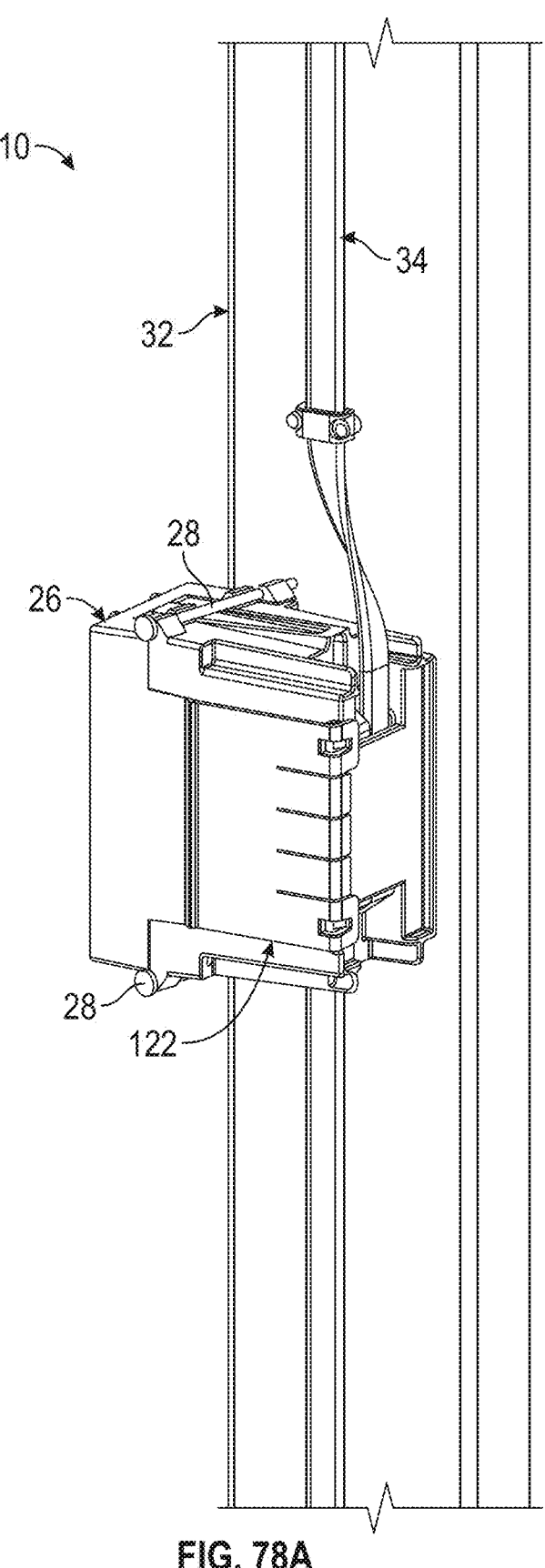
Figure 78B:
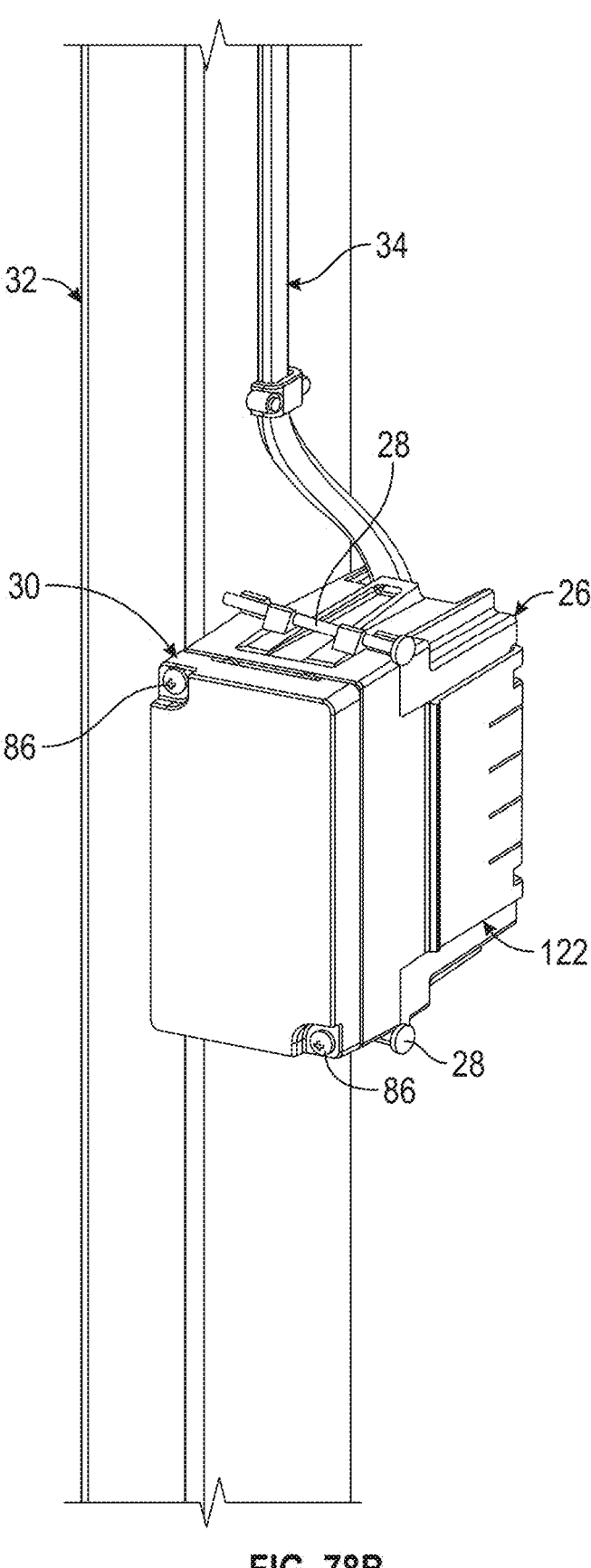
Figure 79:
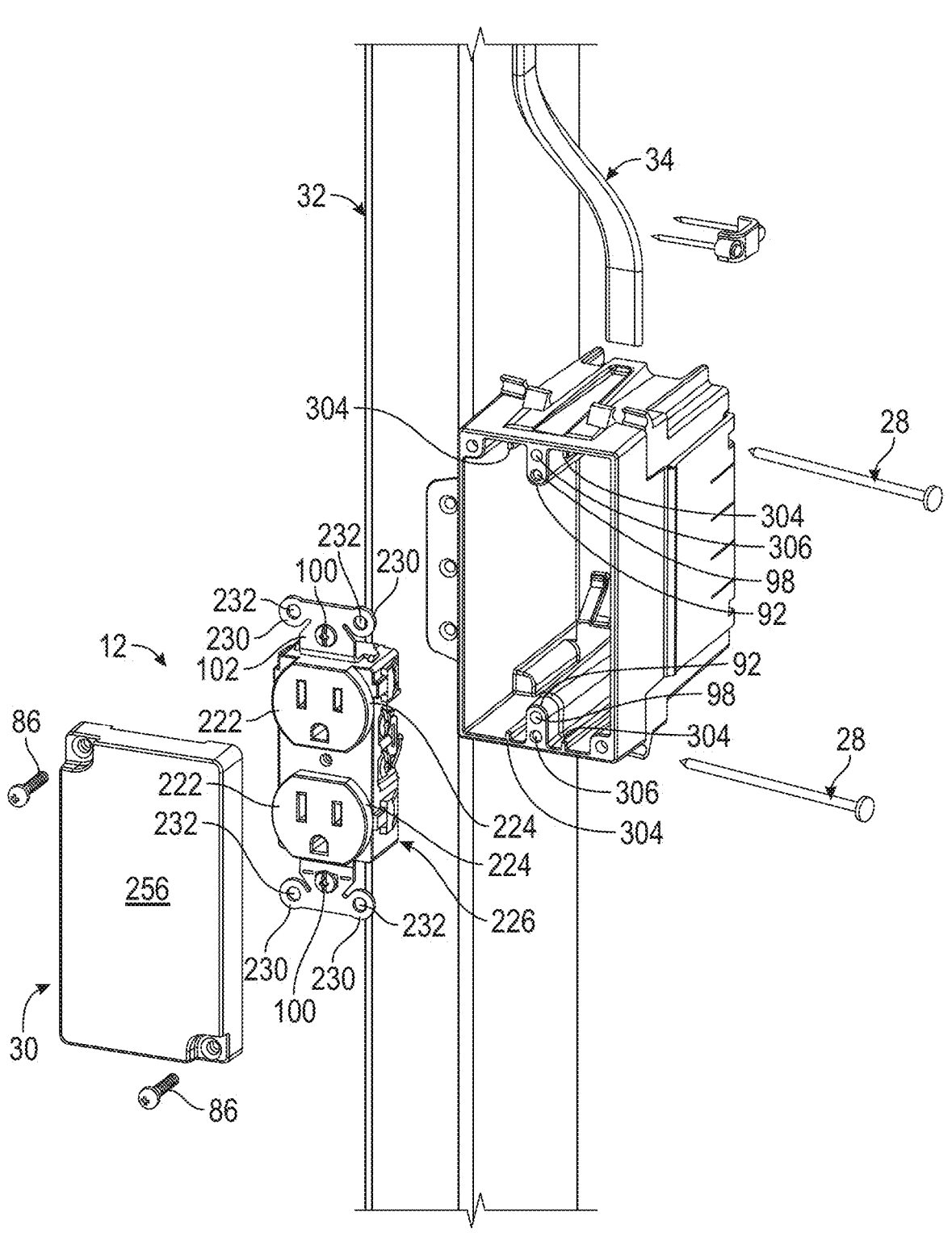
Figure 81:
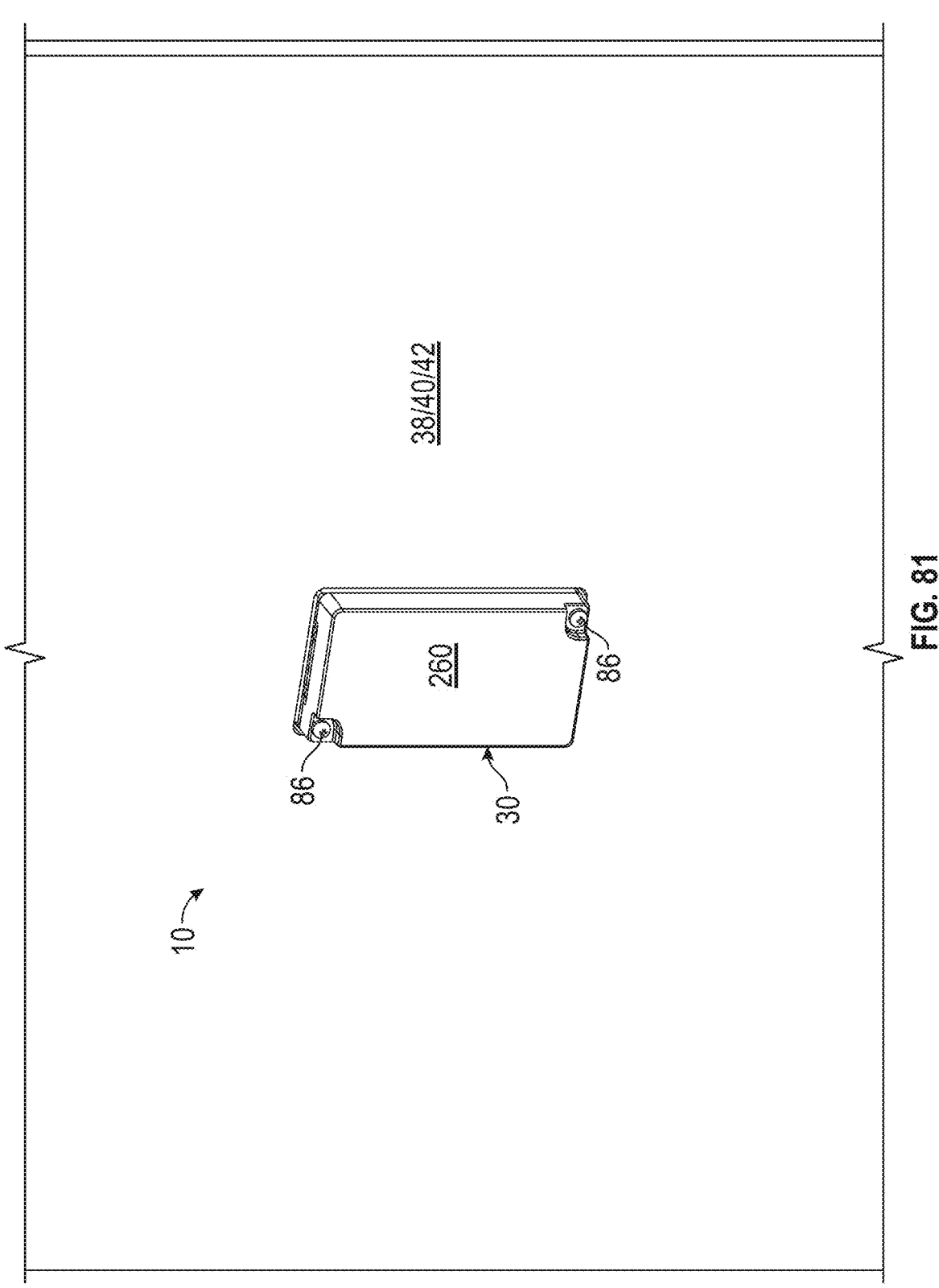
Figure 82:
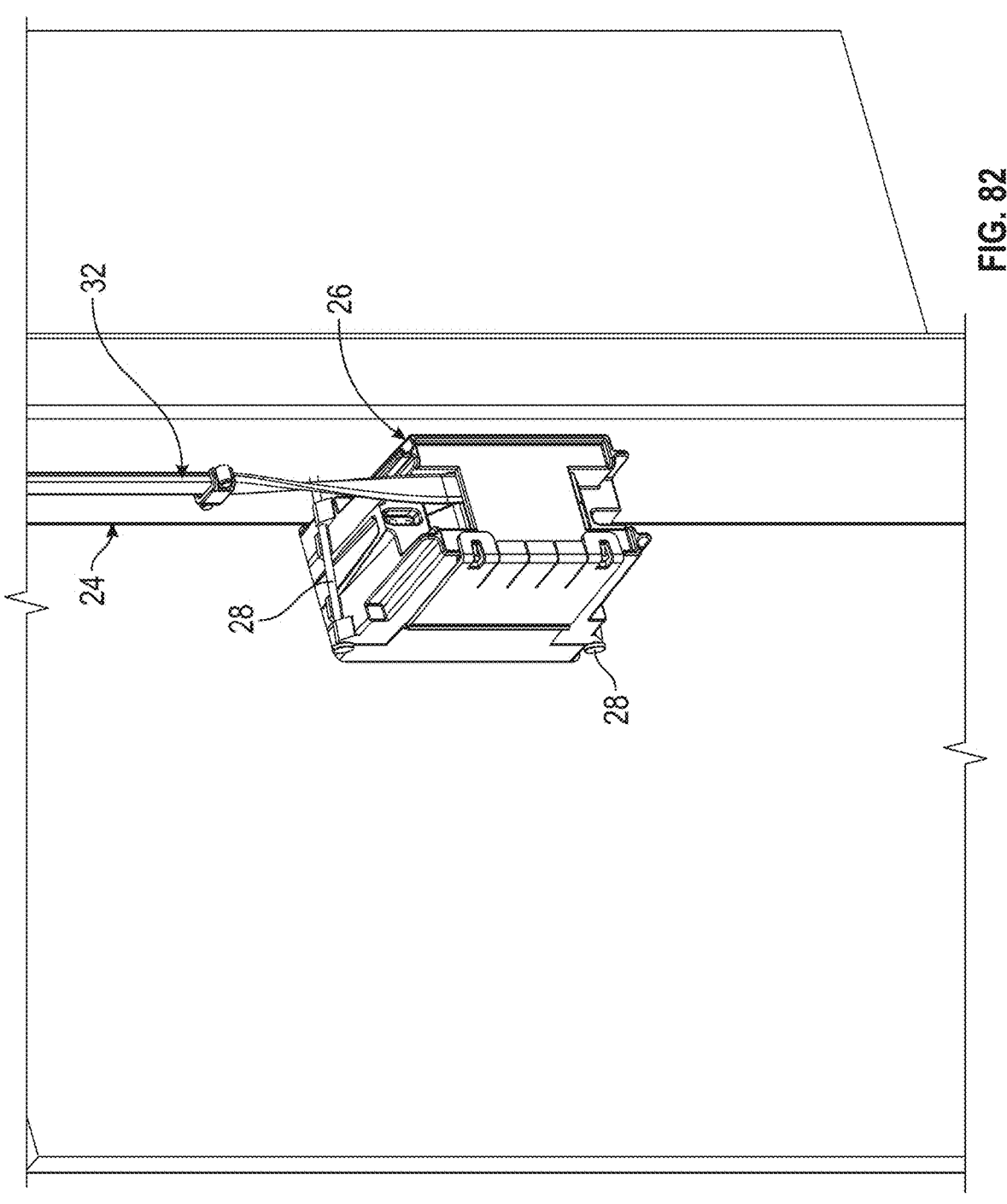
Figure 83A:
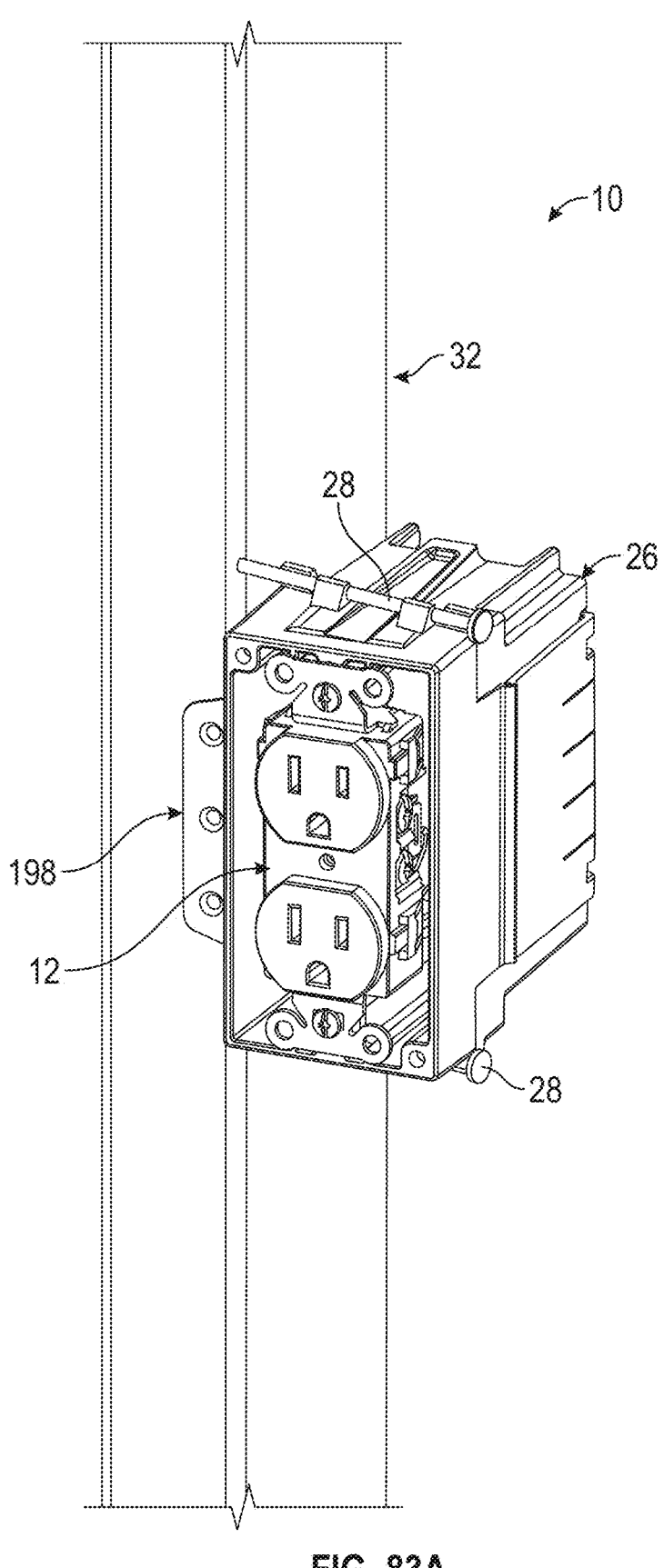
Figure 83B:
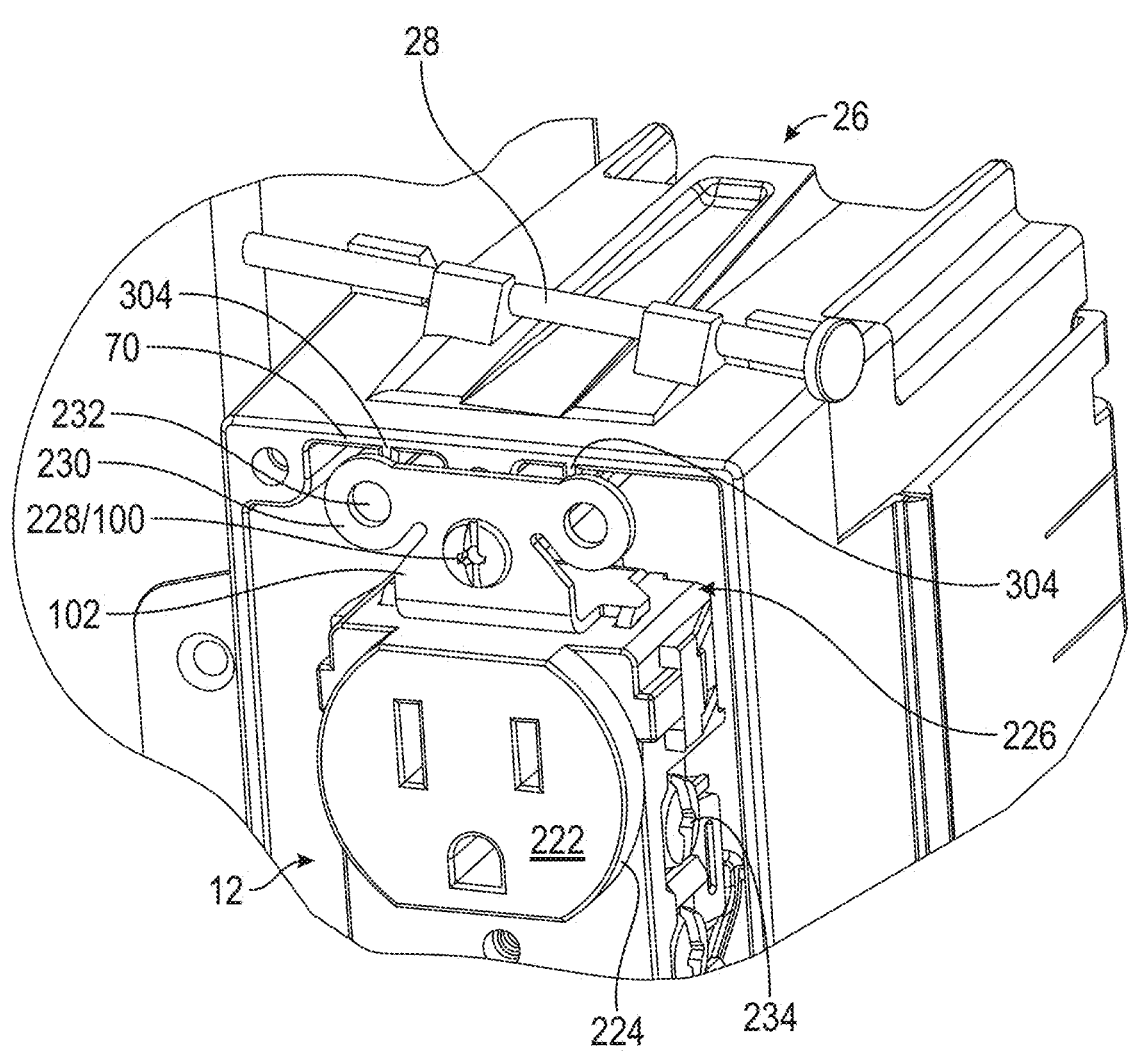
Figure 84:
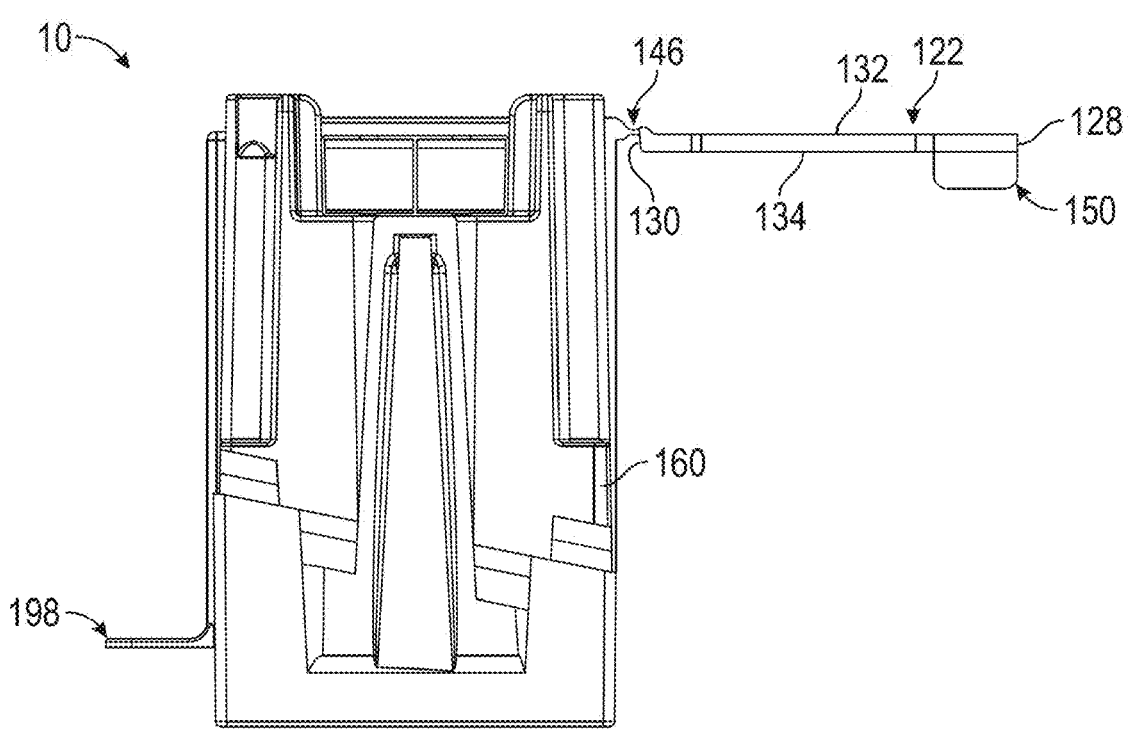
Figure 85:
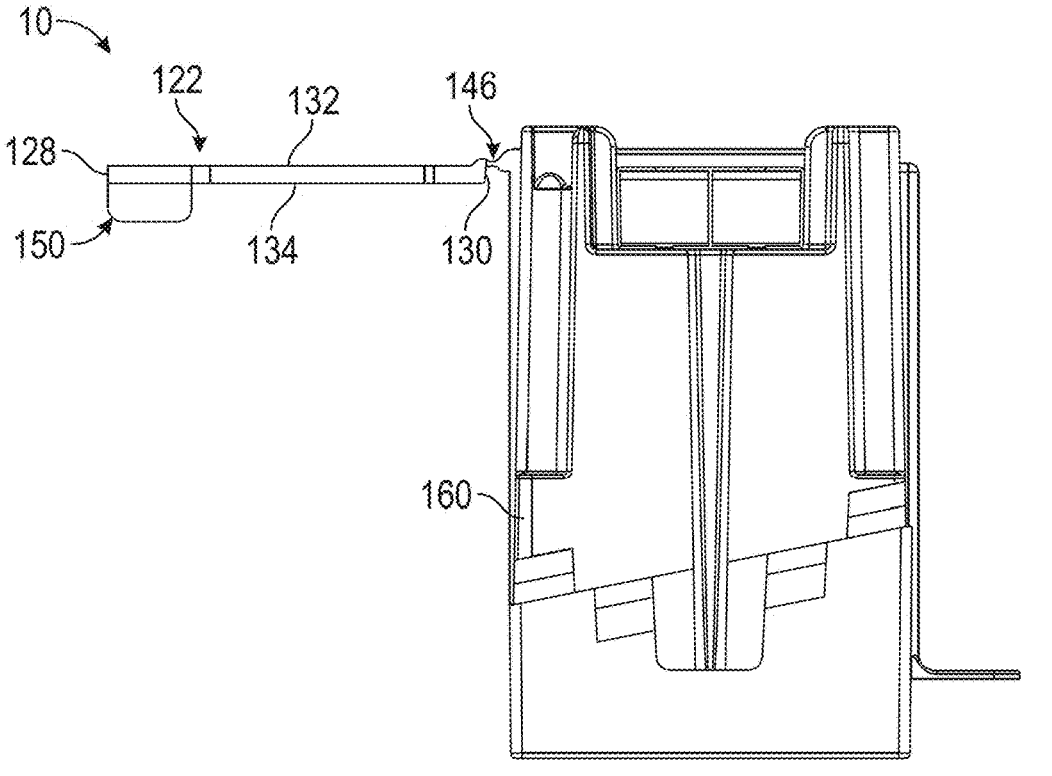
Figure 86:
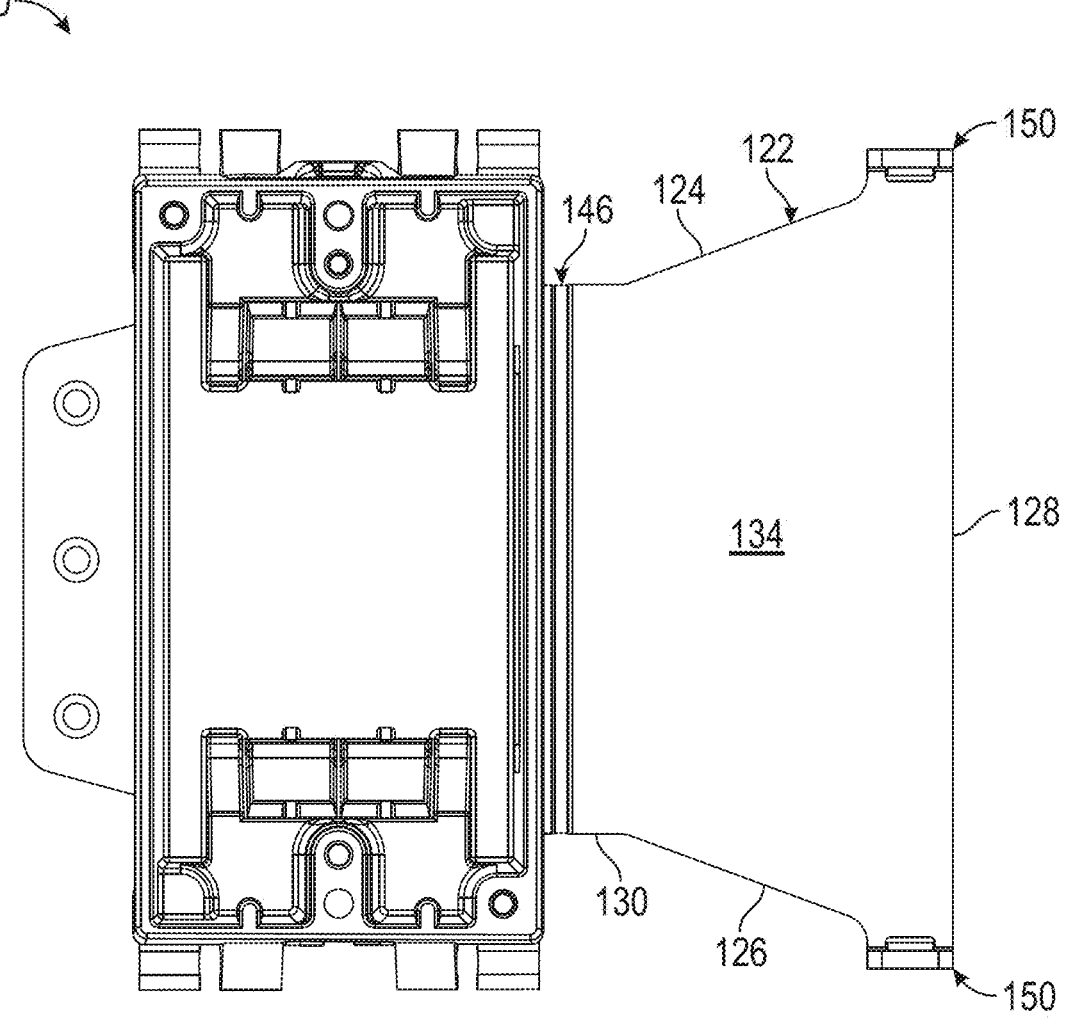
Figure 87:
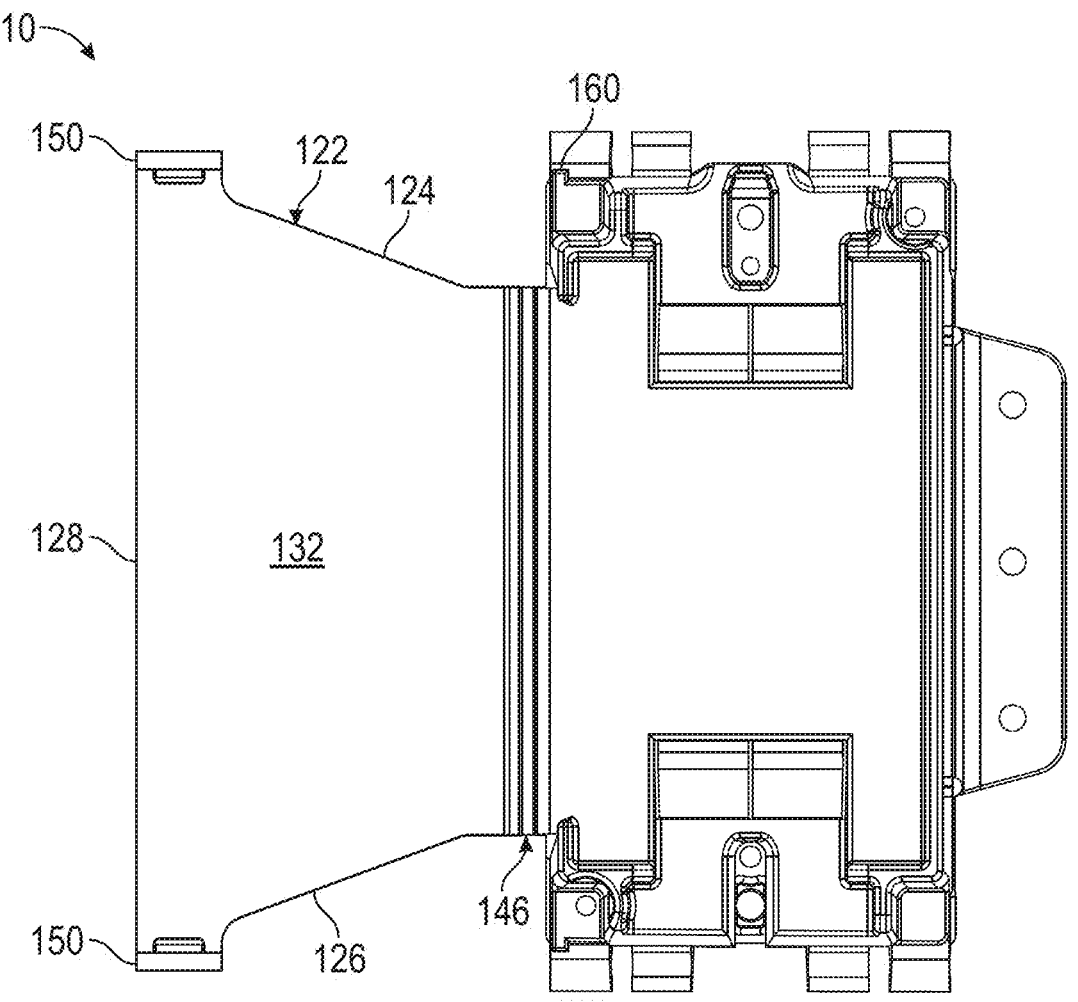
Figure 88:
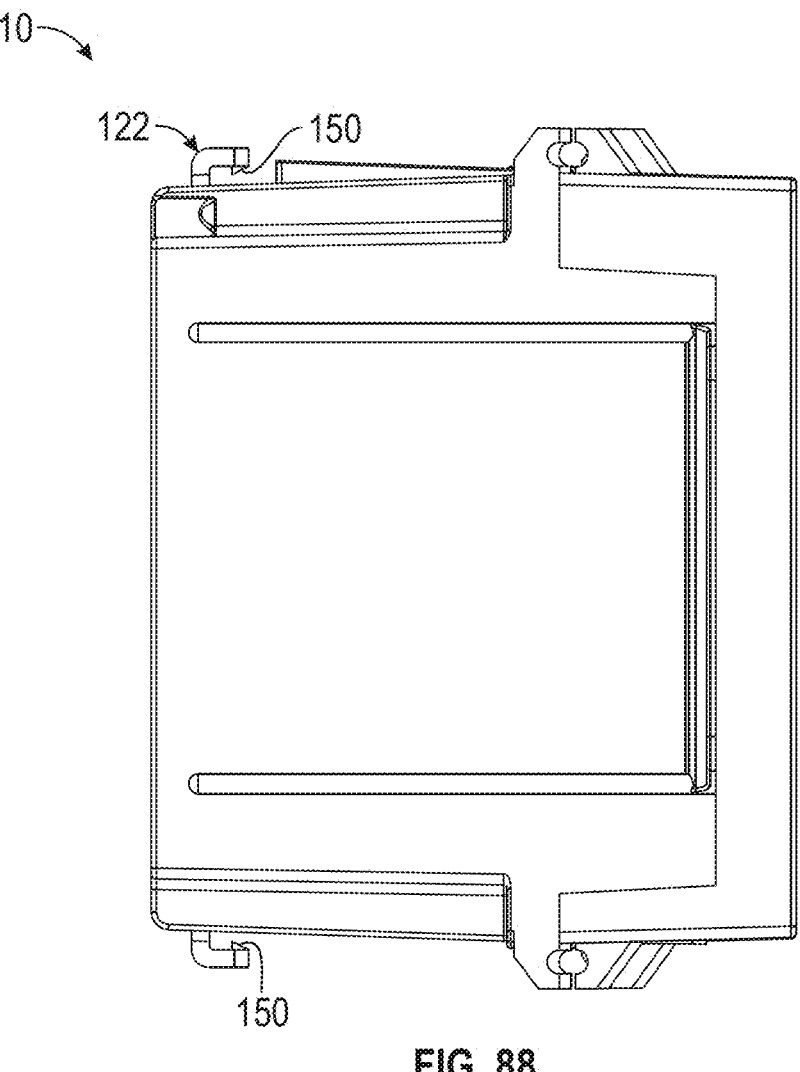
Figure 89:
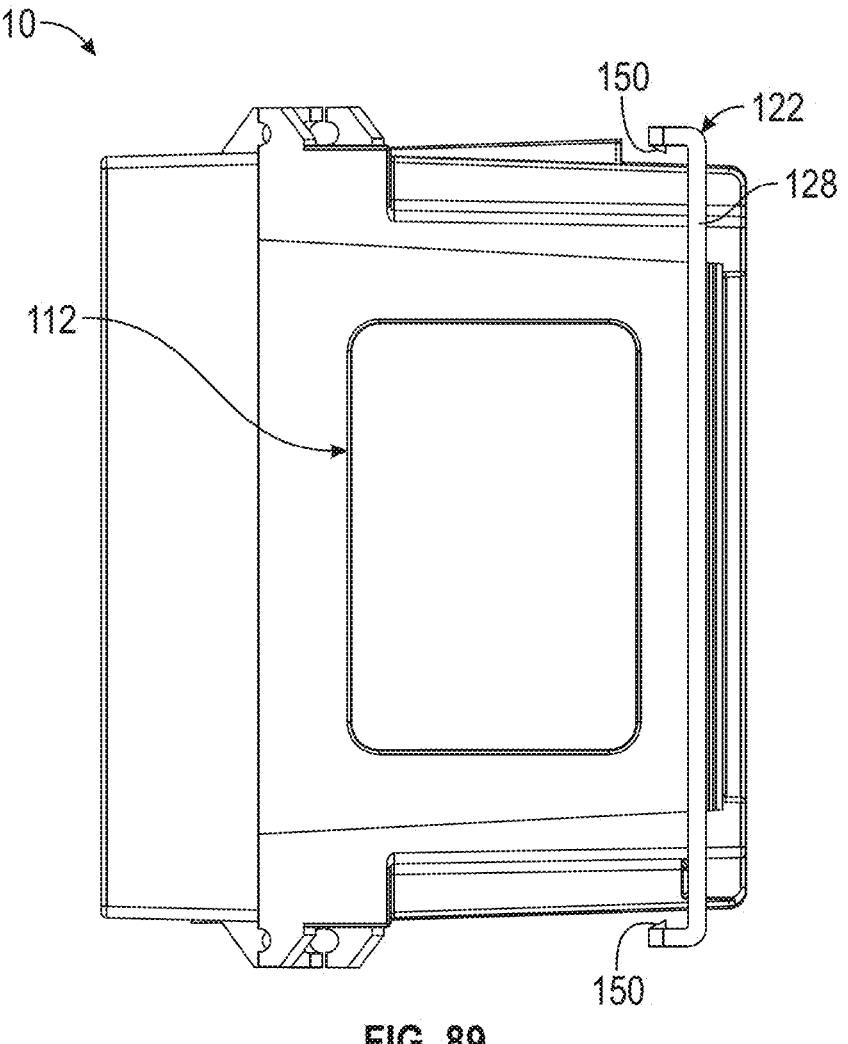
Figure 90:
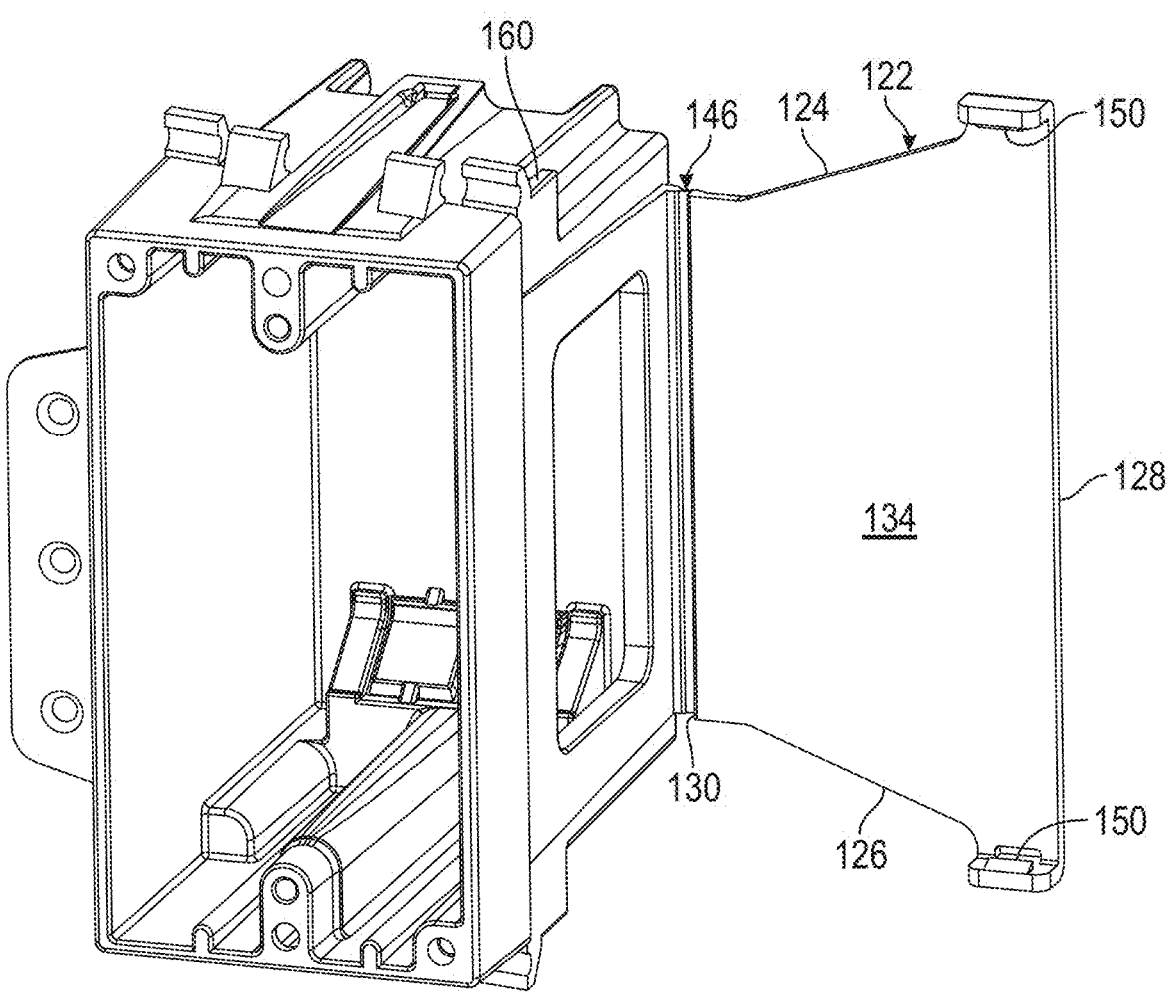
Figure 91:
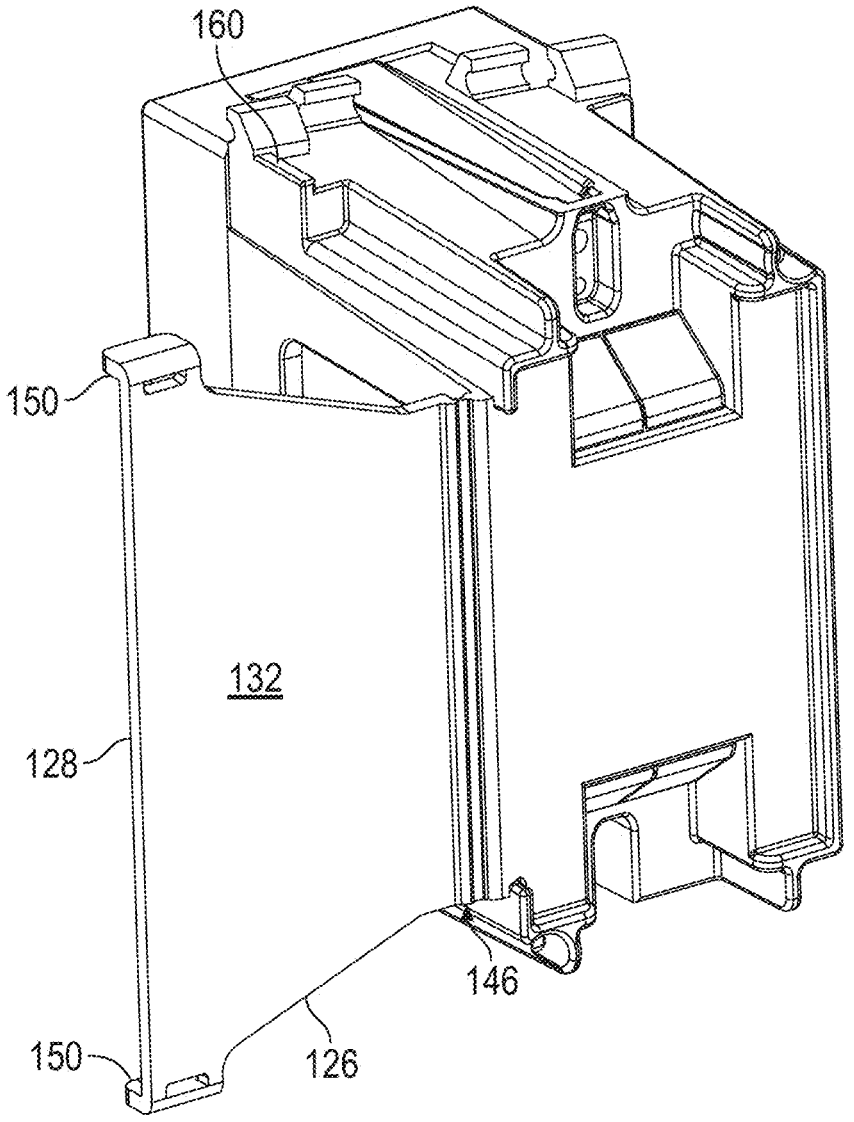
Figure 92:
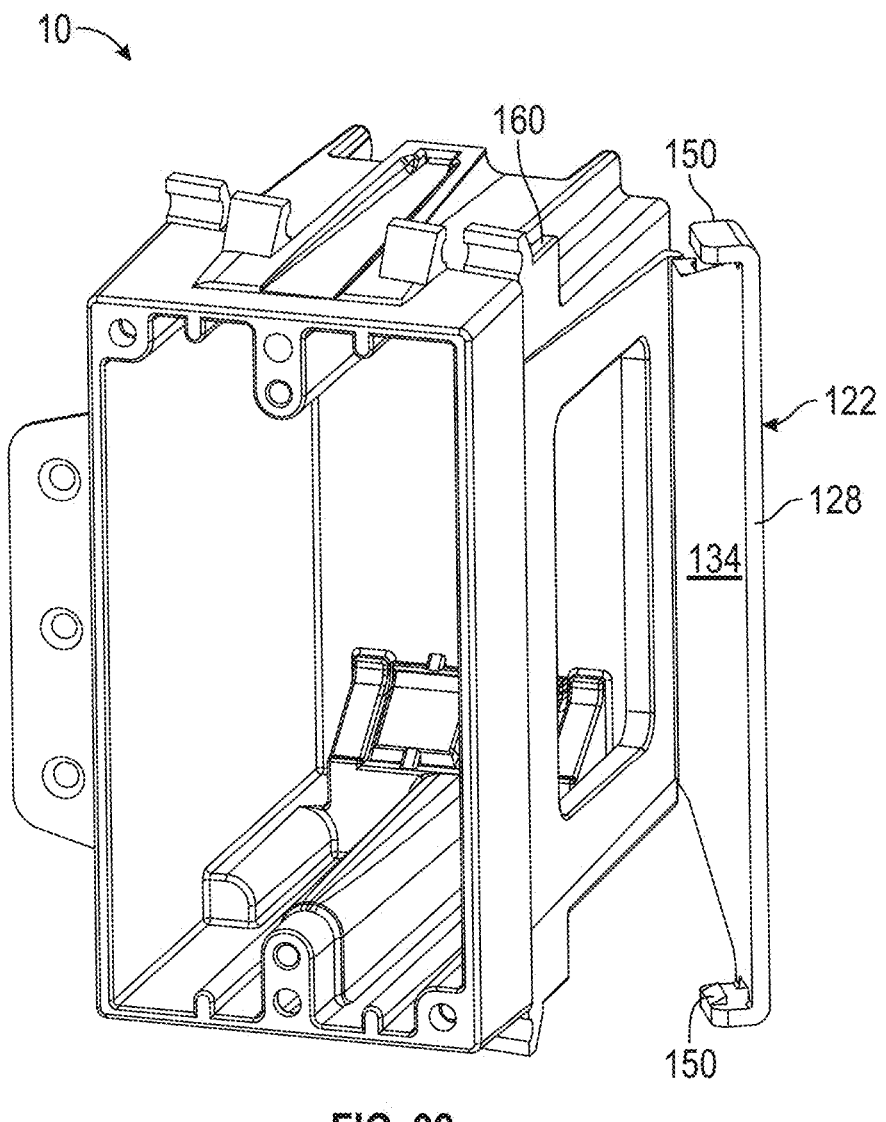
Figure 93:
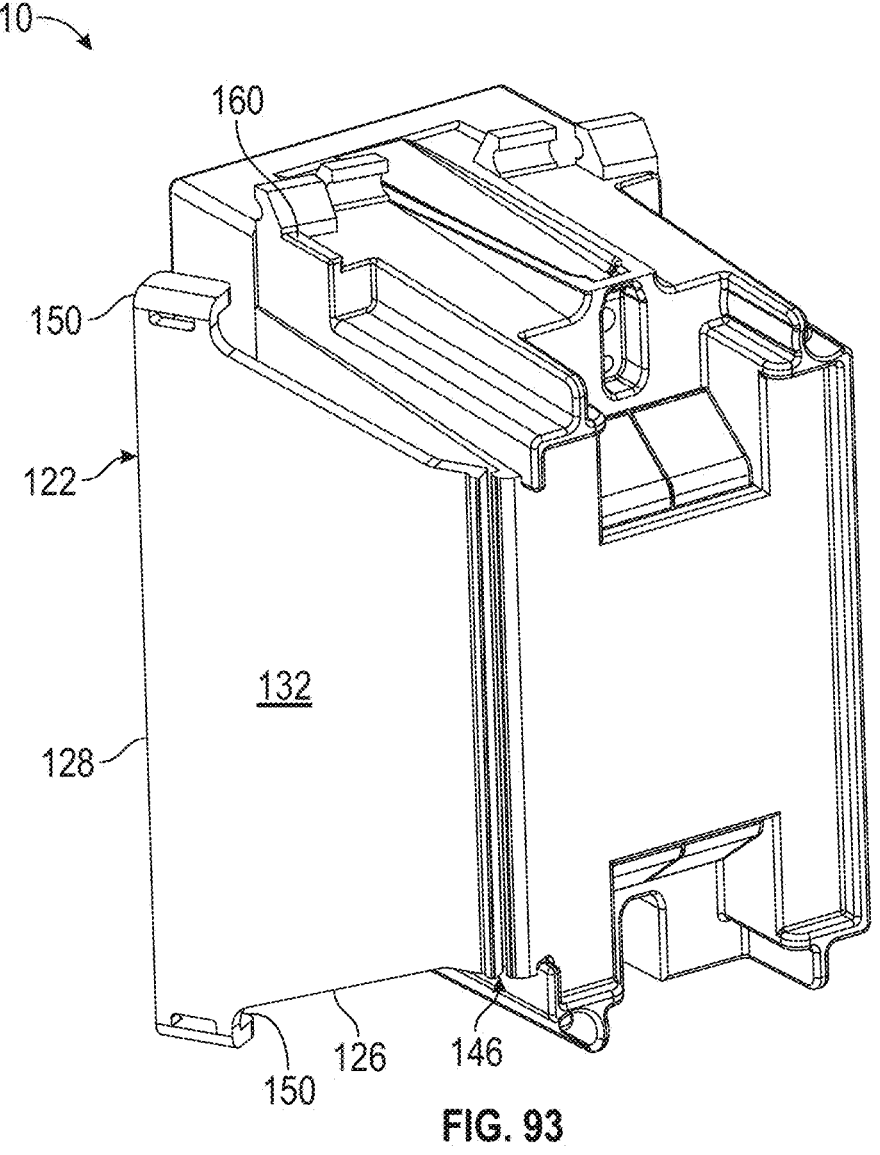
Figure 94:
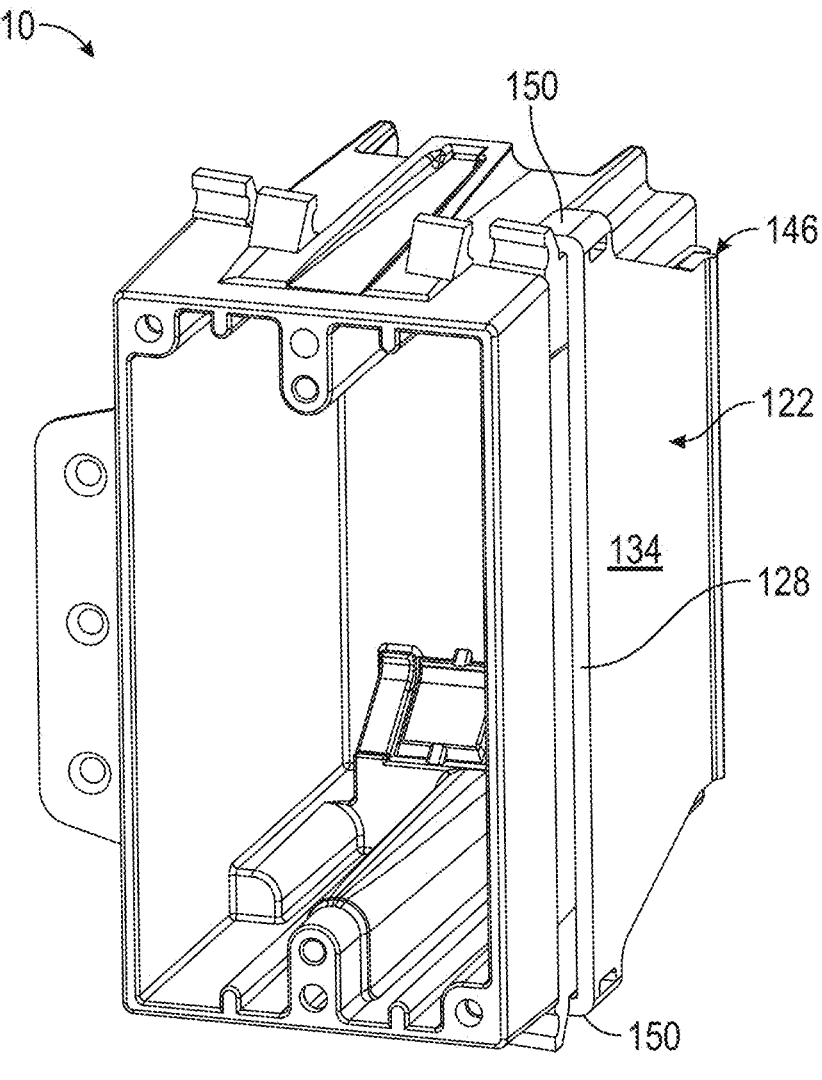
Figure 95:
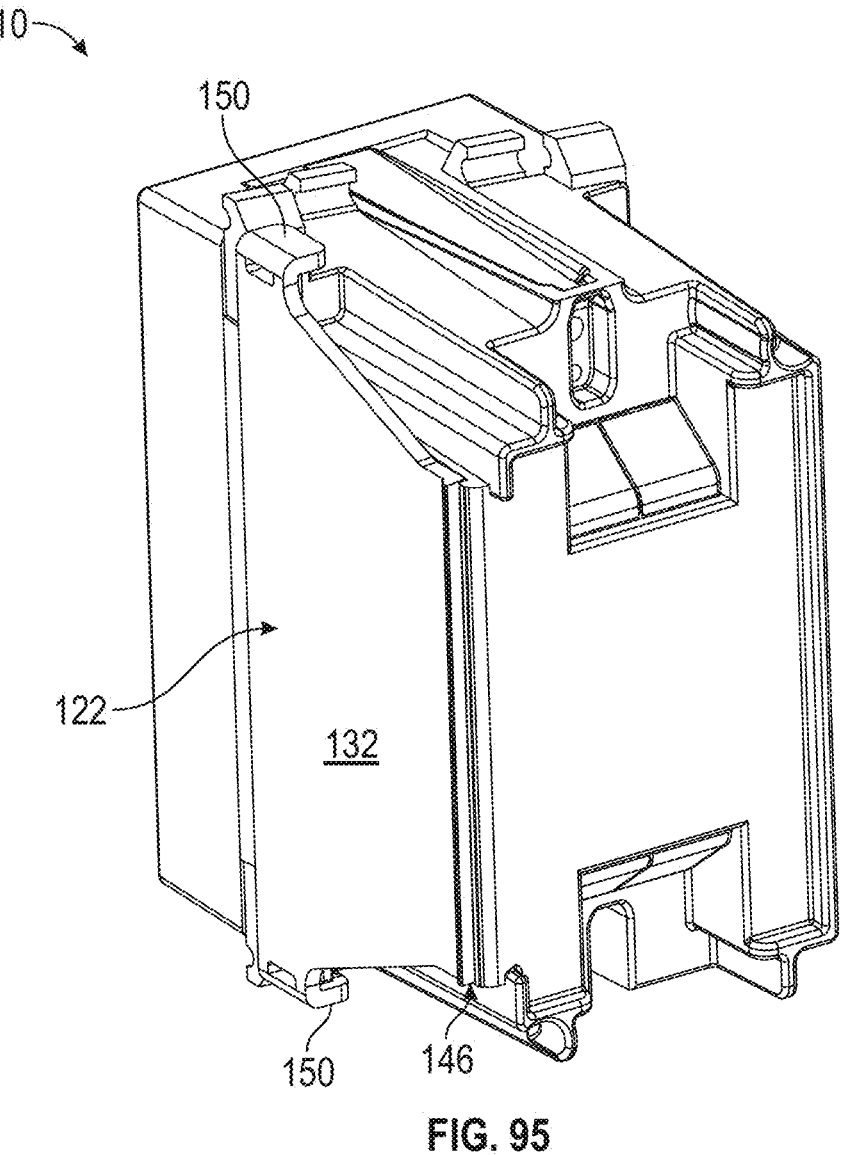
Figure 96A:
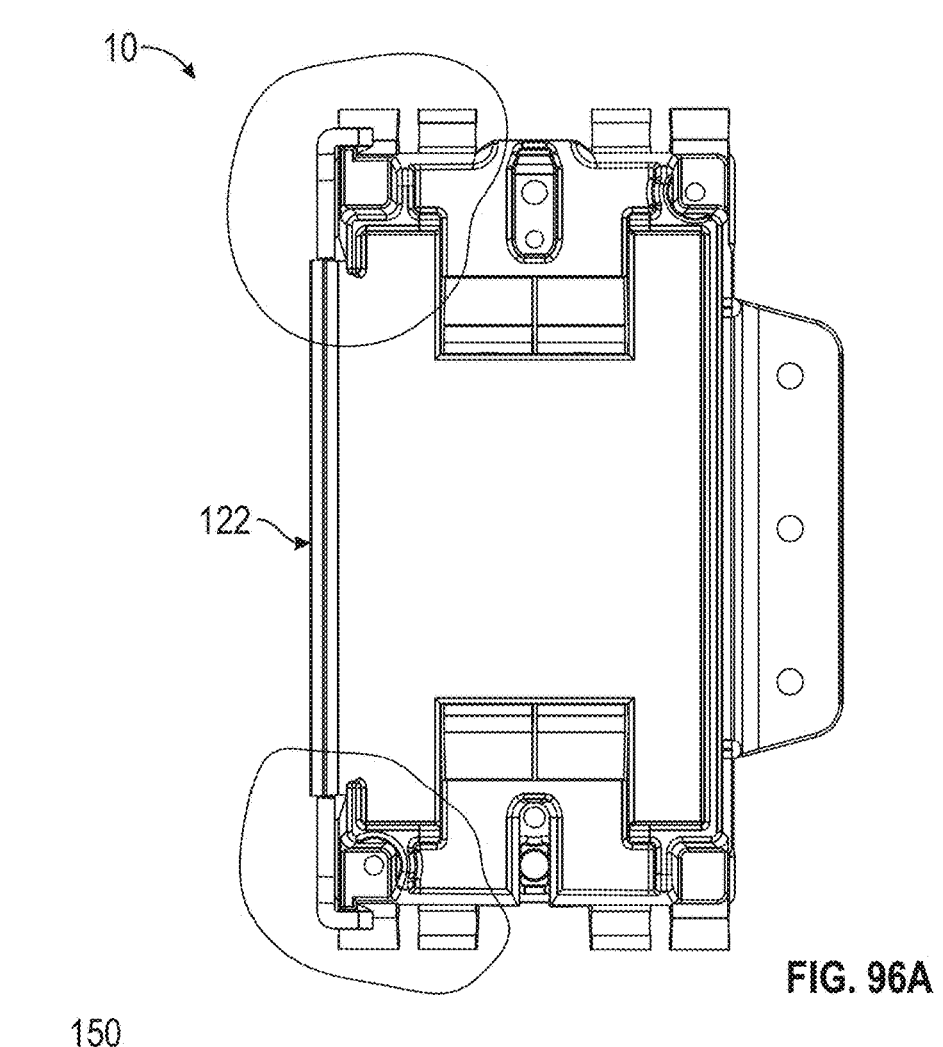
Figure 96B:
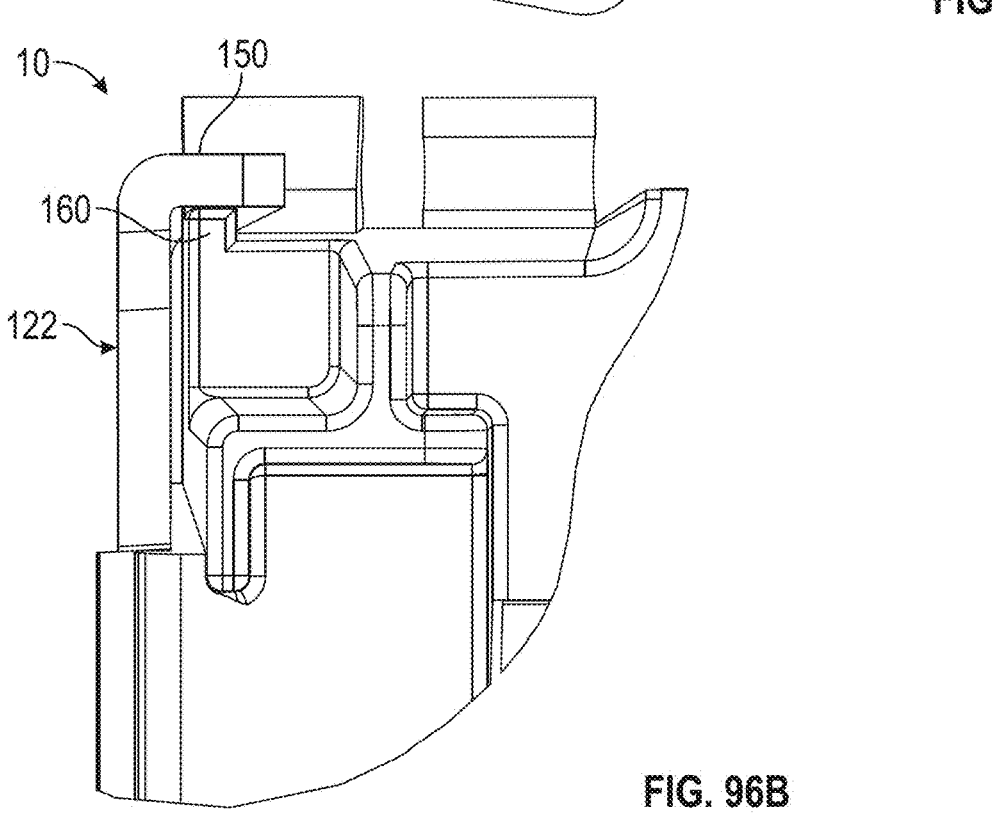
Figures 96C, 97A:
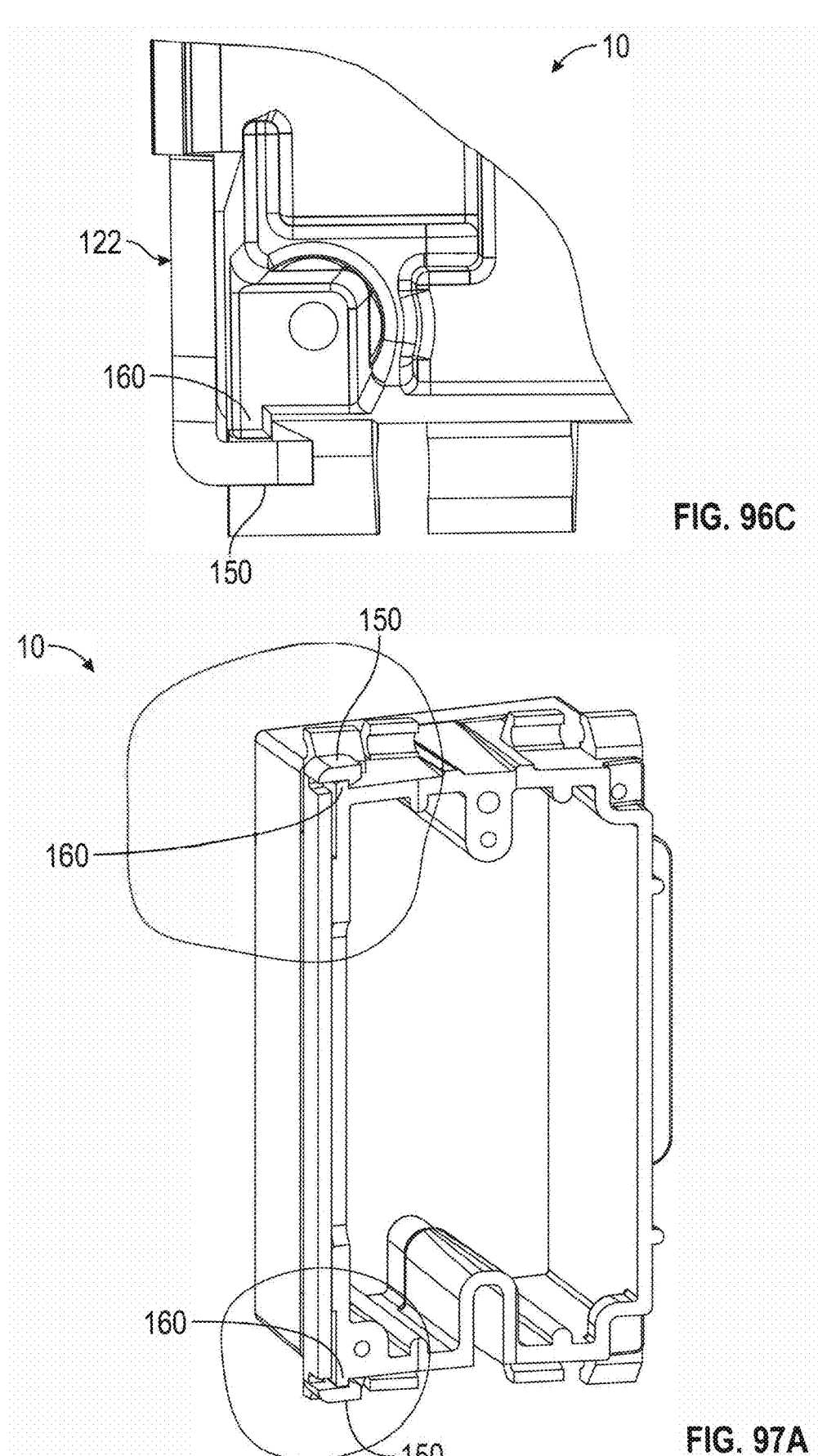
Figure 97B:
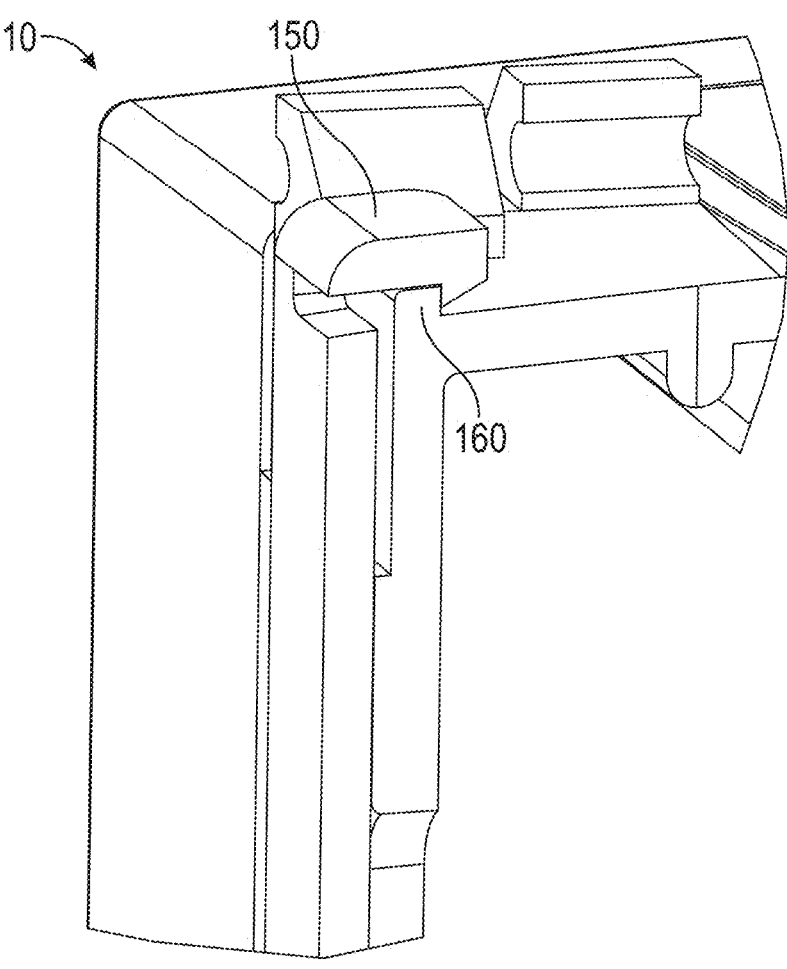
Figure 97C:
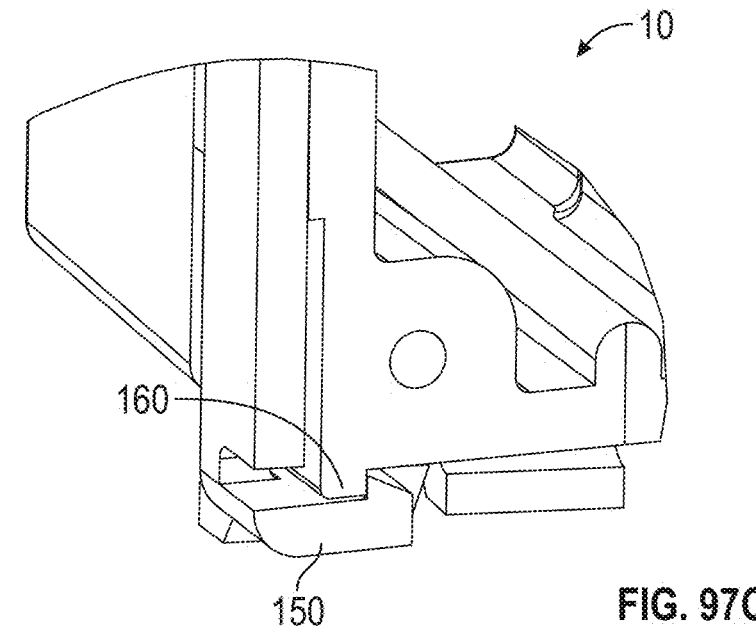
Figure 98:
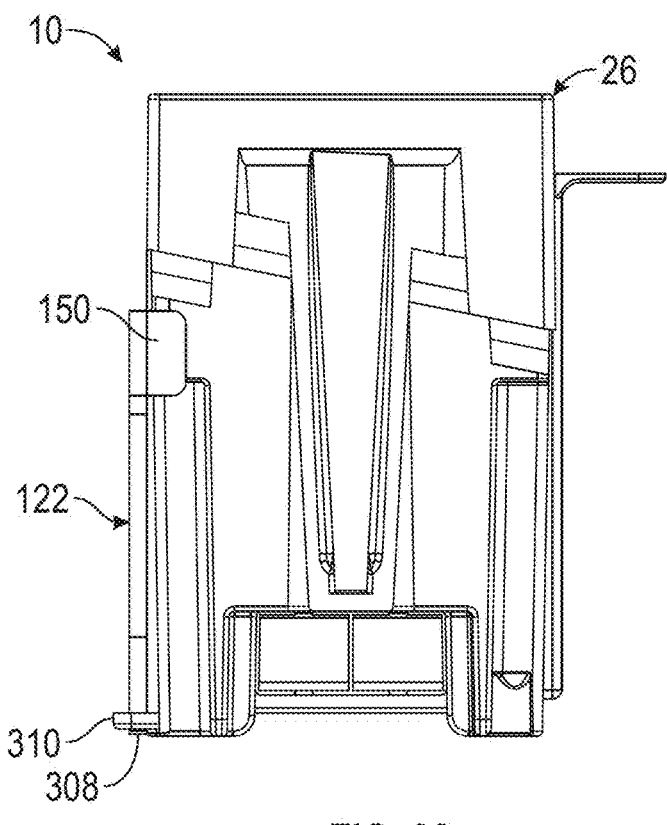
Figure 99:
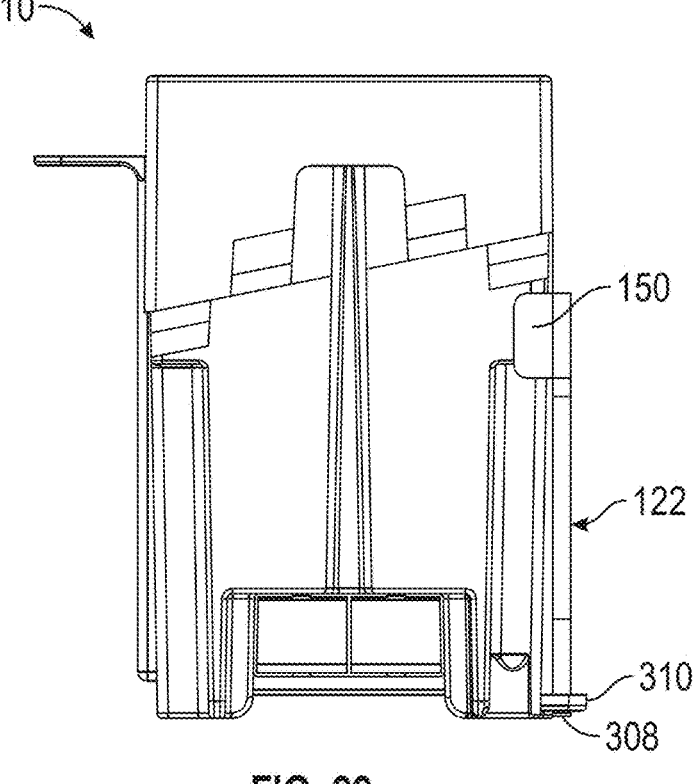
Figure 100:
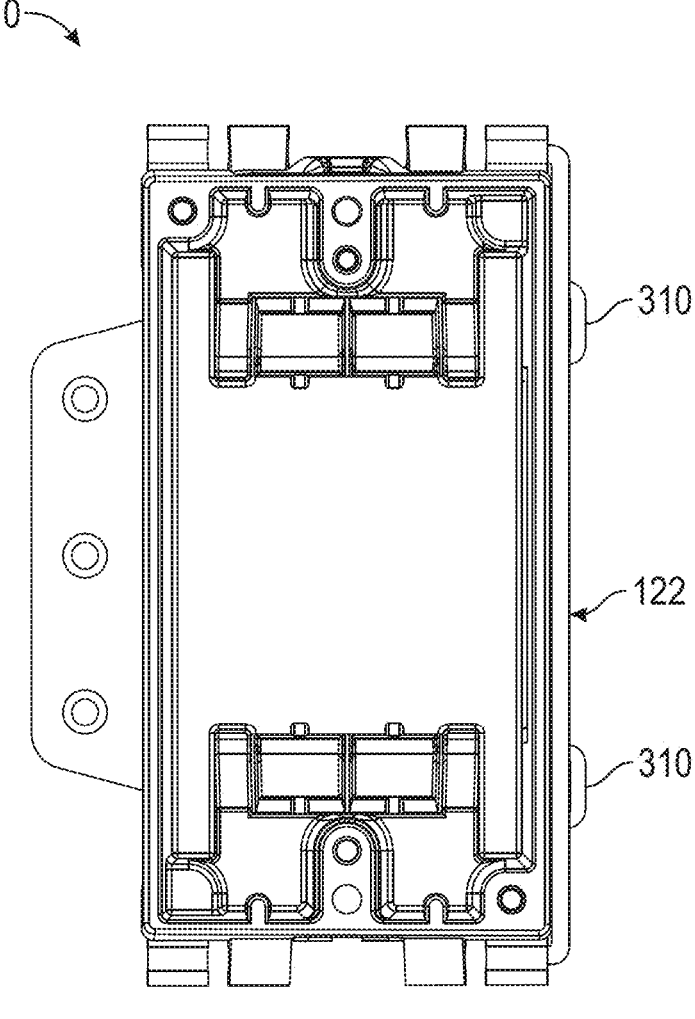
Figure 101:
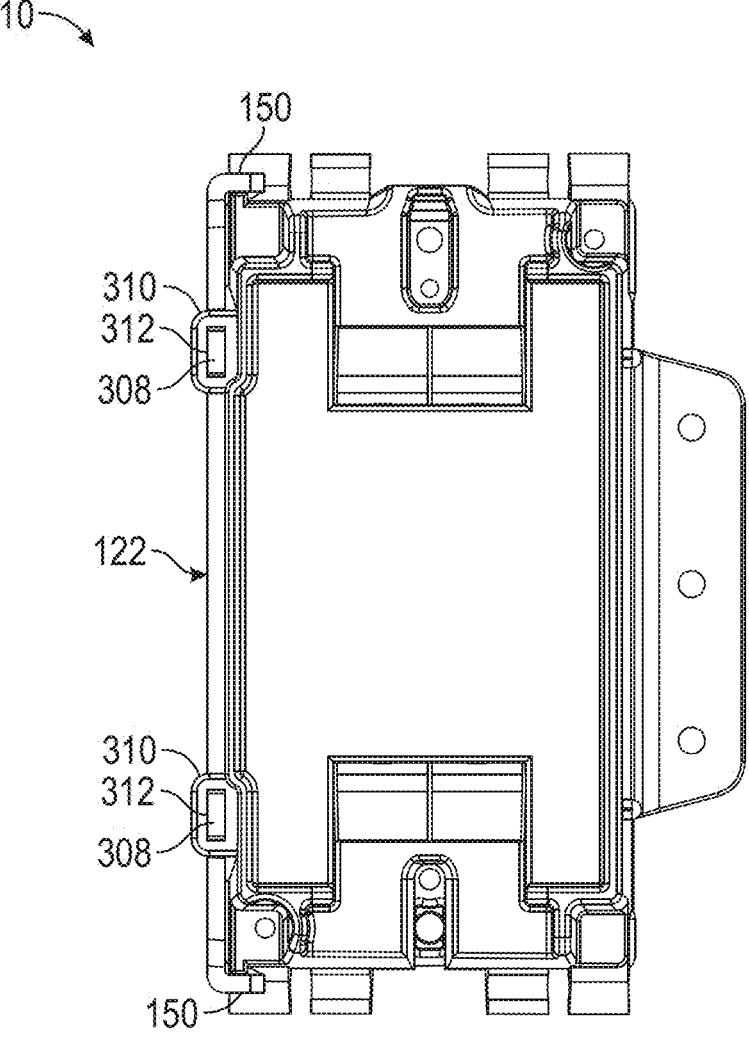
Figures 102, 103:
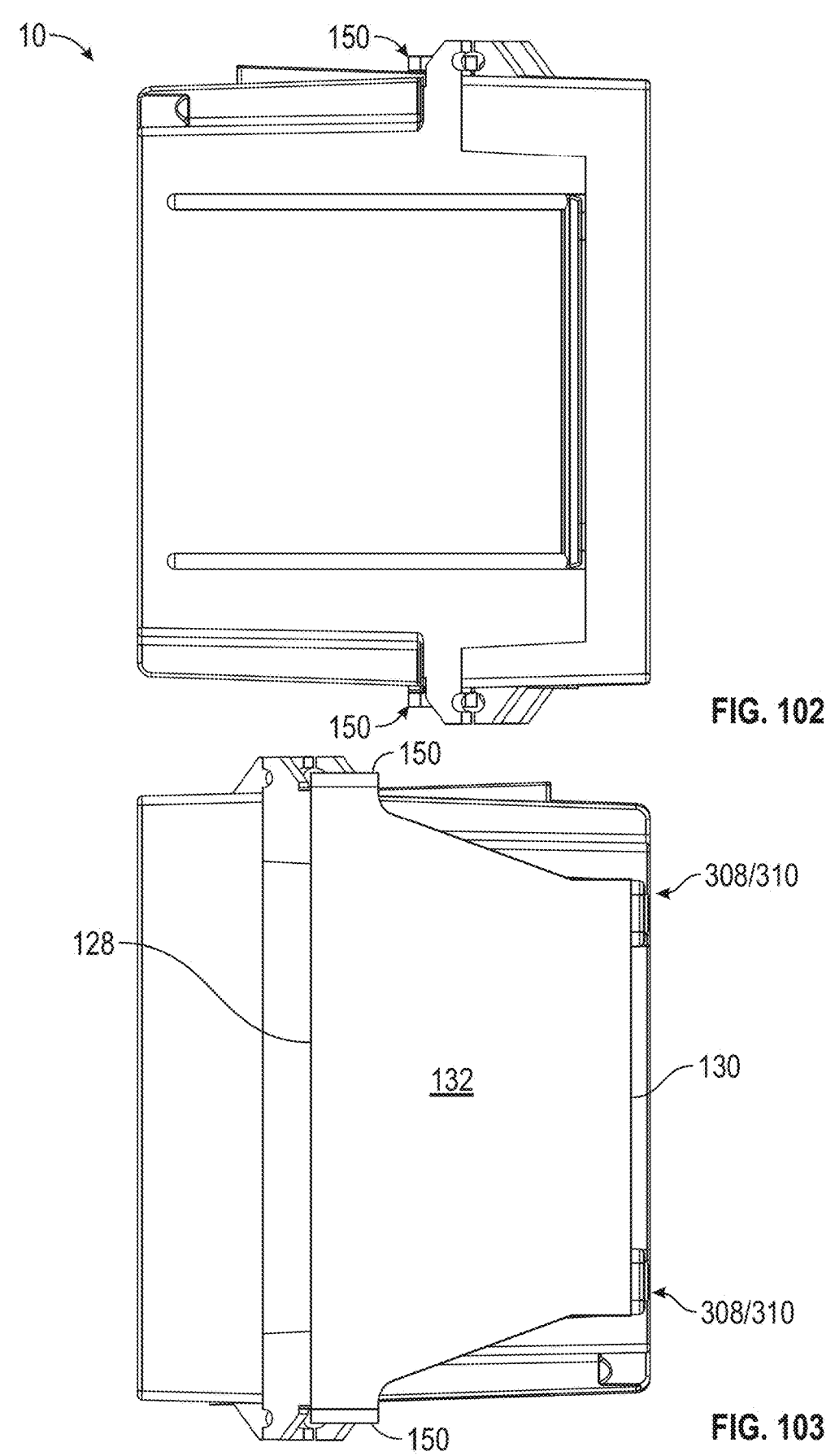
Figure 104:
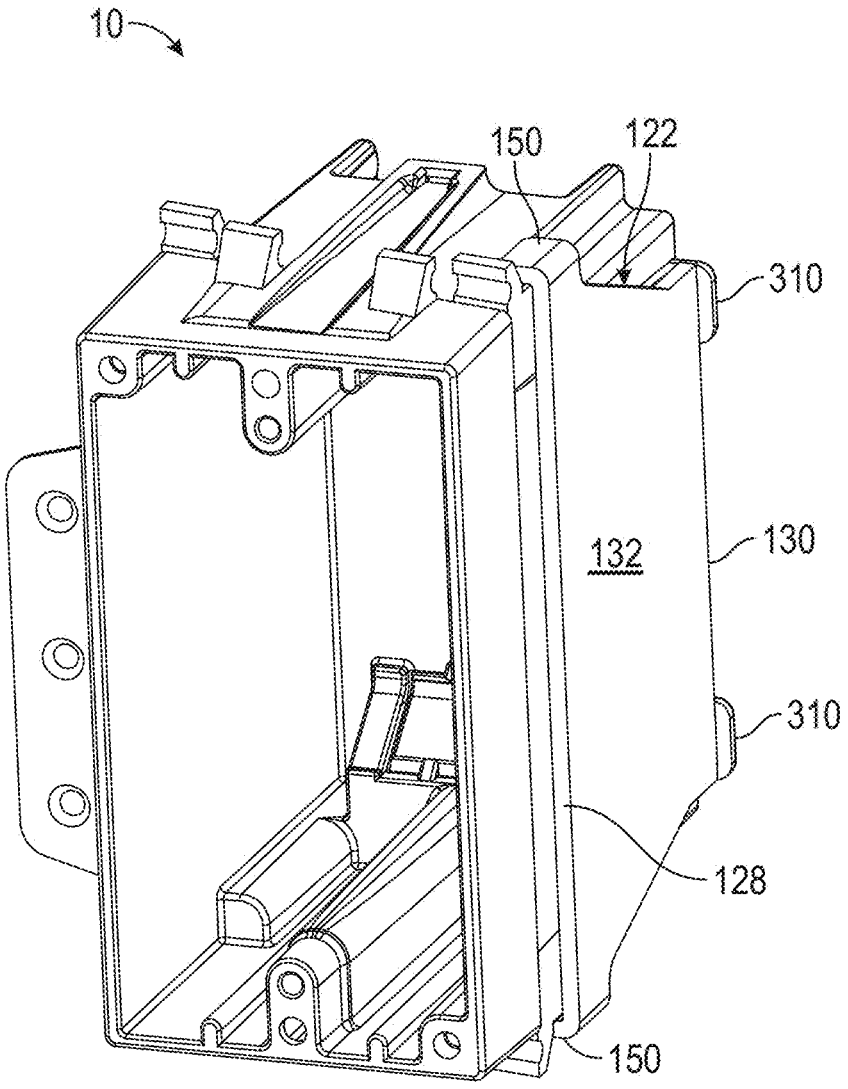
Figure 105A:
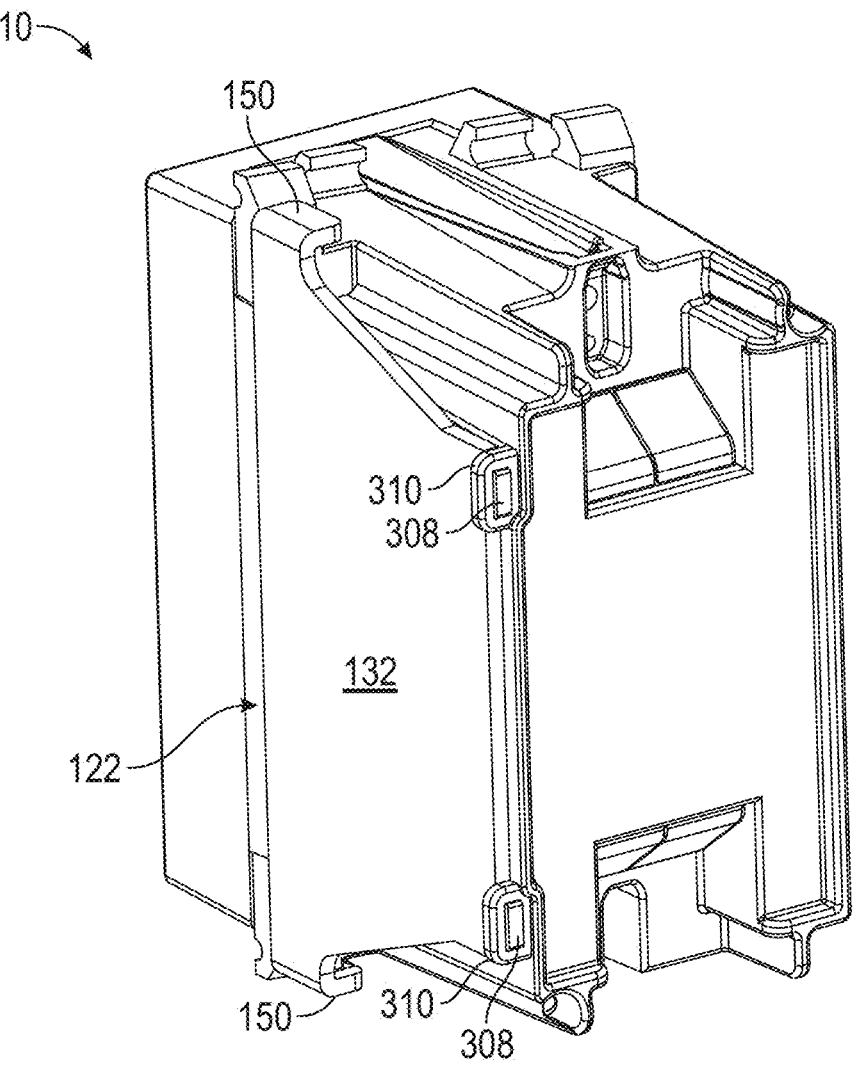
Figure 105B:
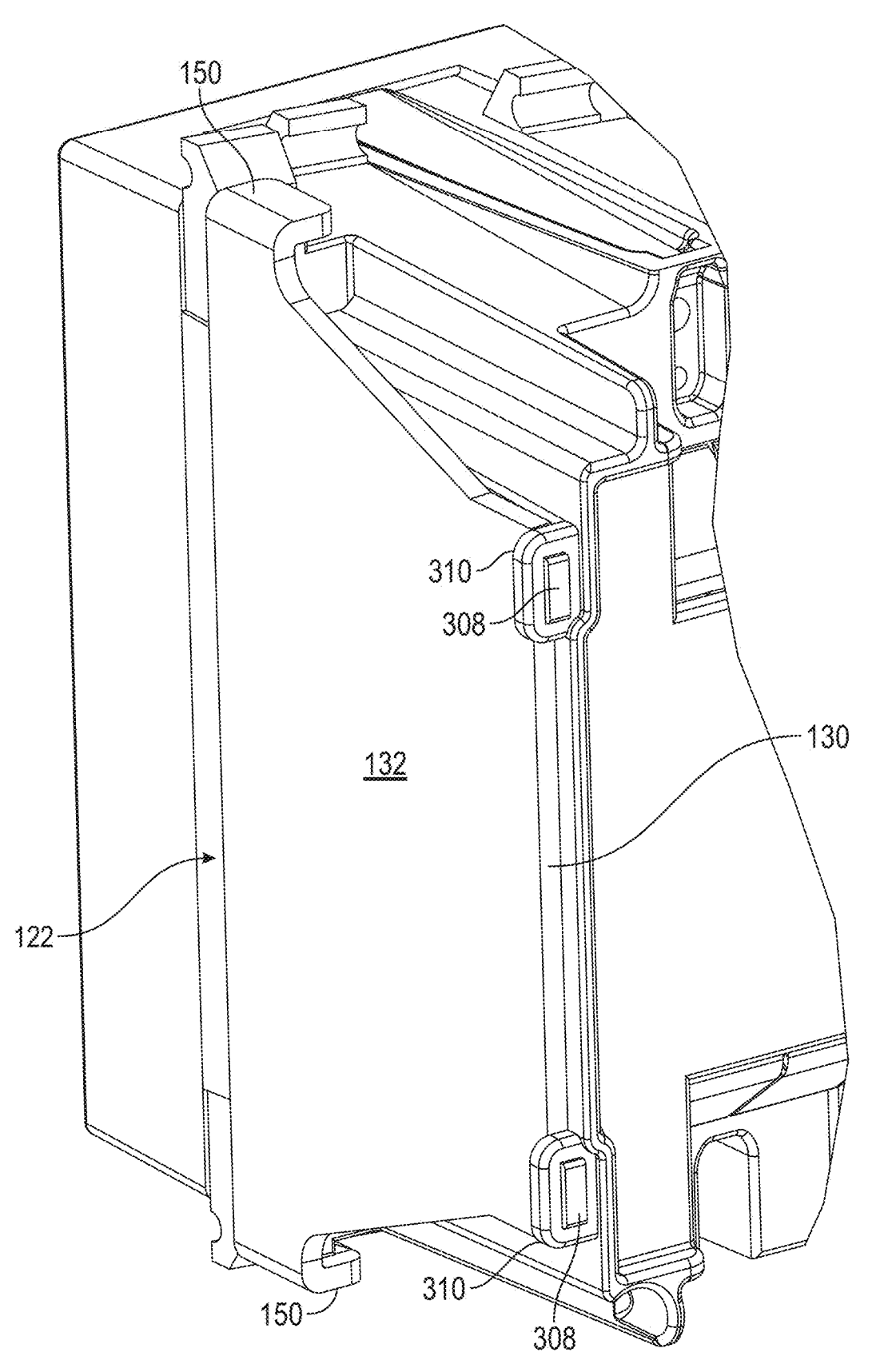
Figure 106A:
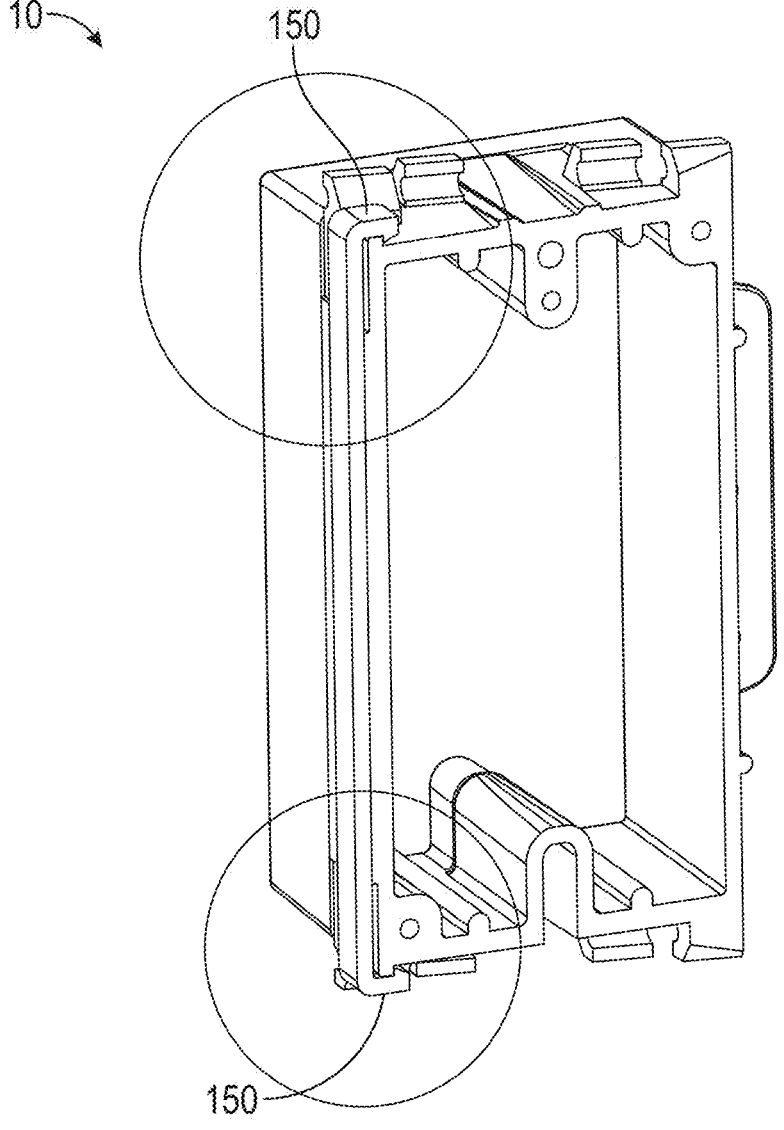
Figure 106B:
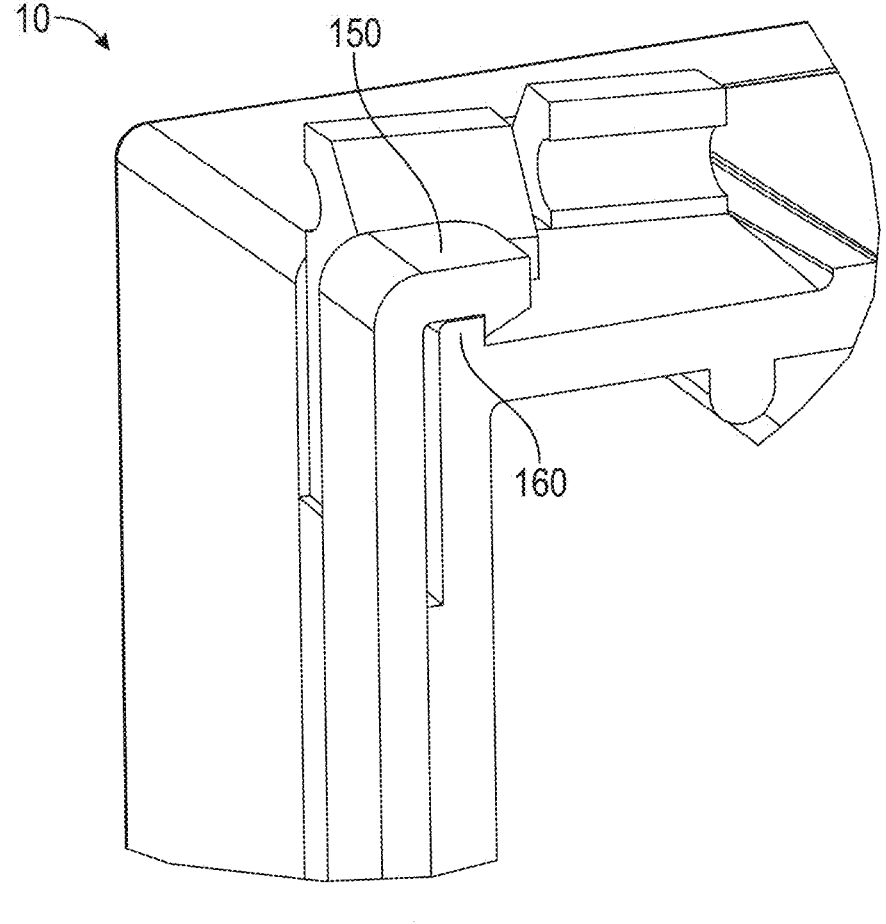
Figure 106C:
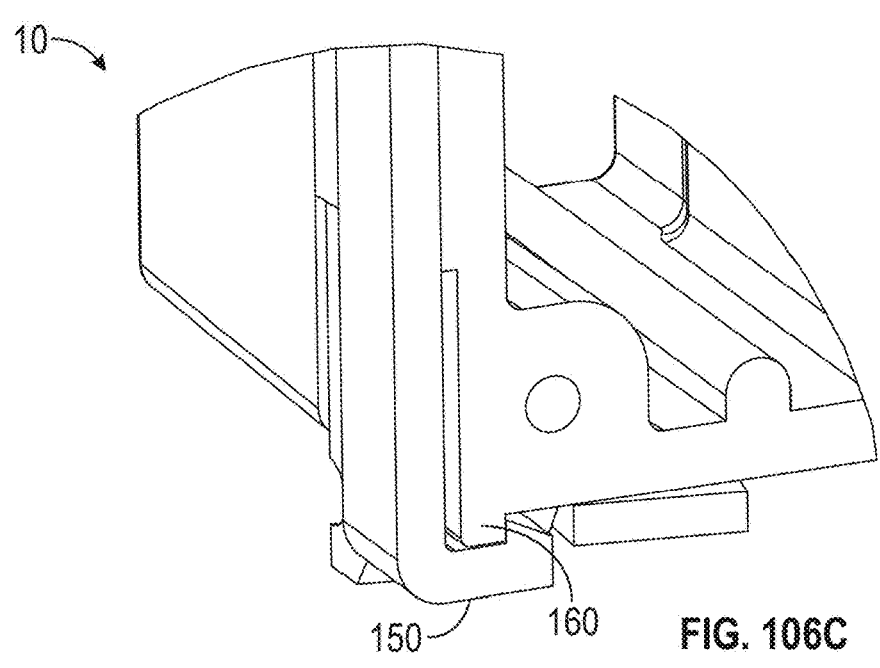
Figure 107A:
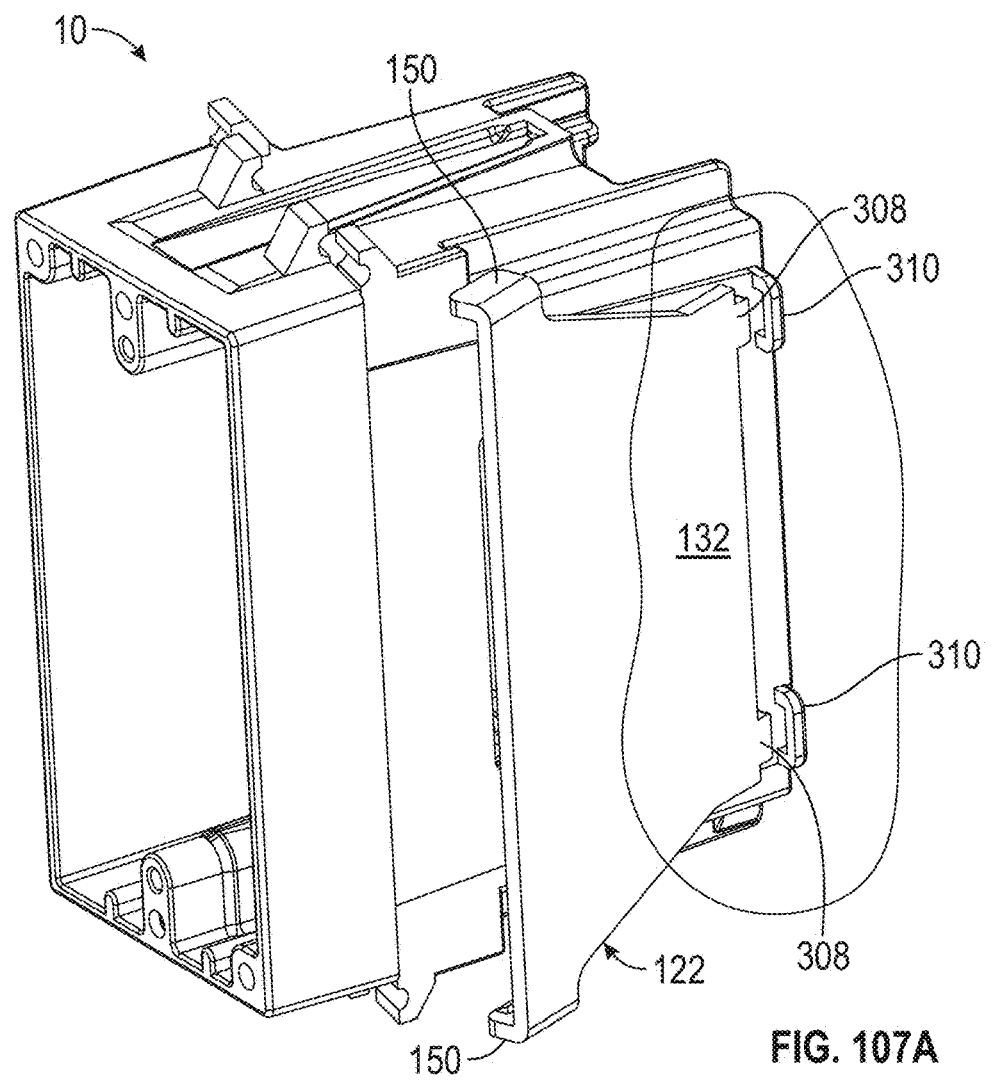
Figure 107B:
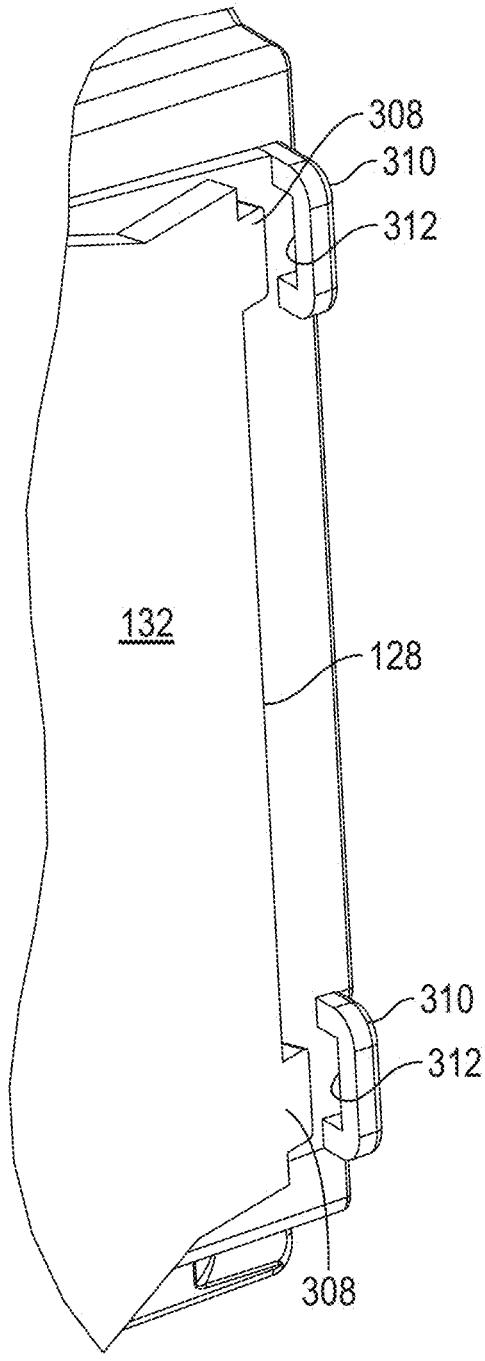
Figure 108A:
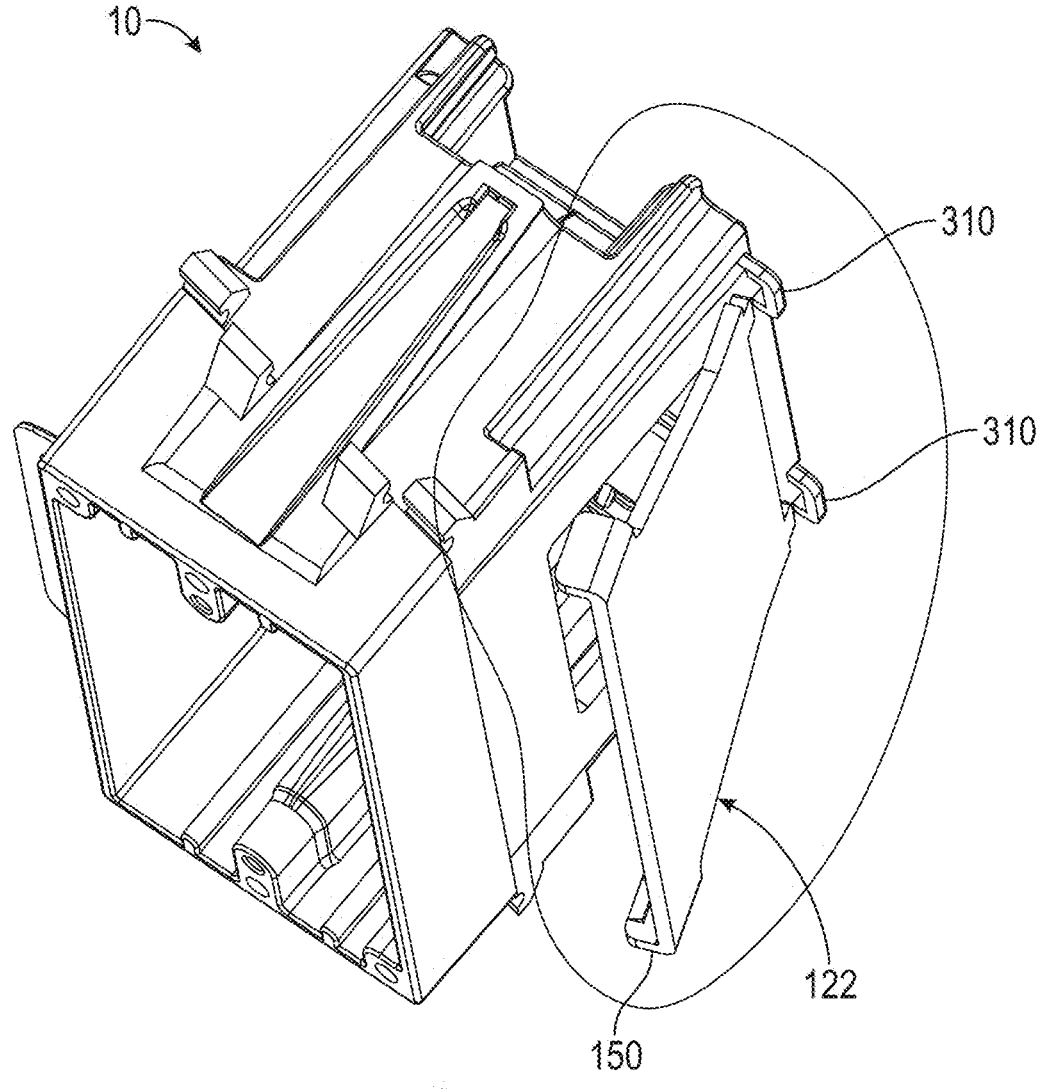
Figure 108B:
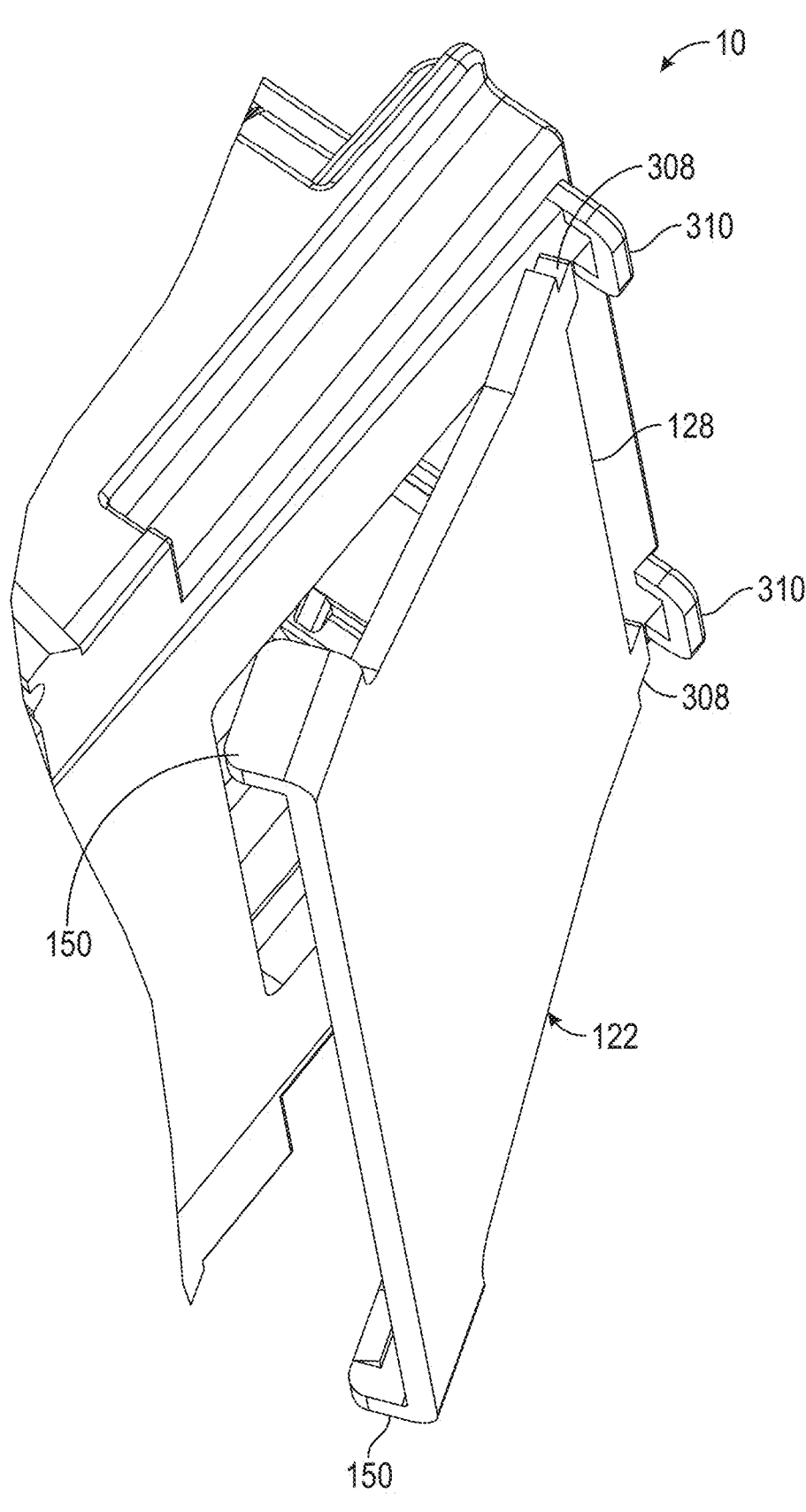
Figure 109A:
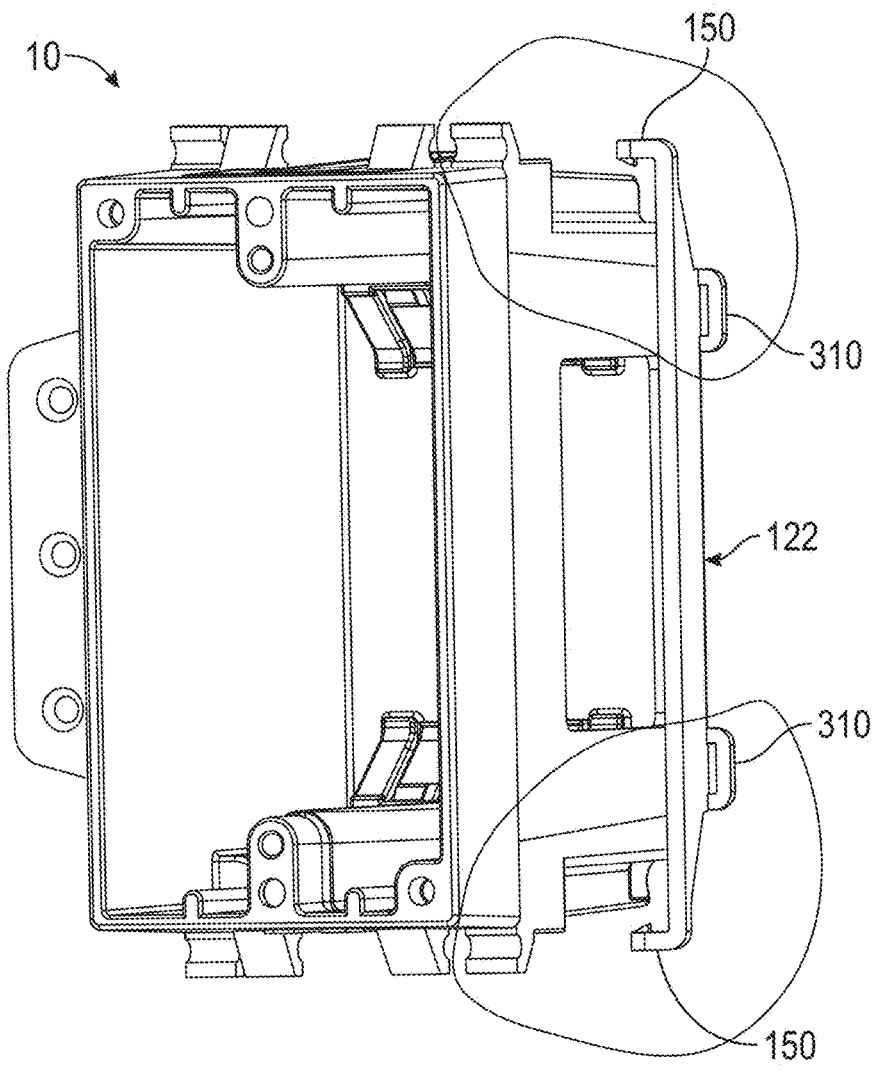
Figure 109B:
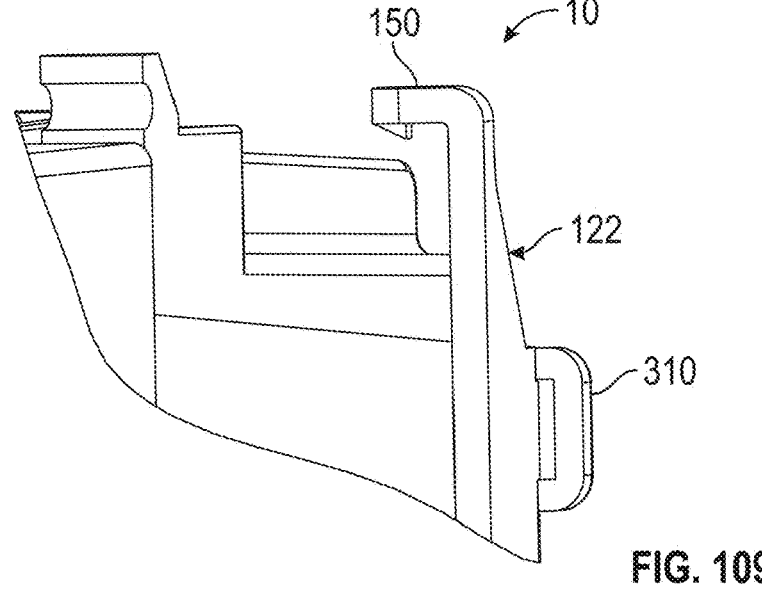
Figure 109C:
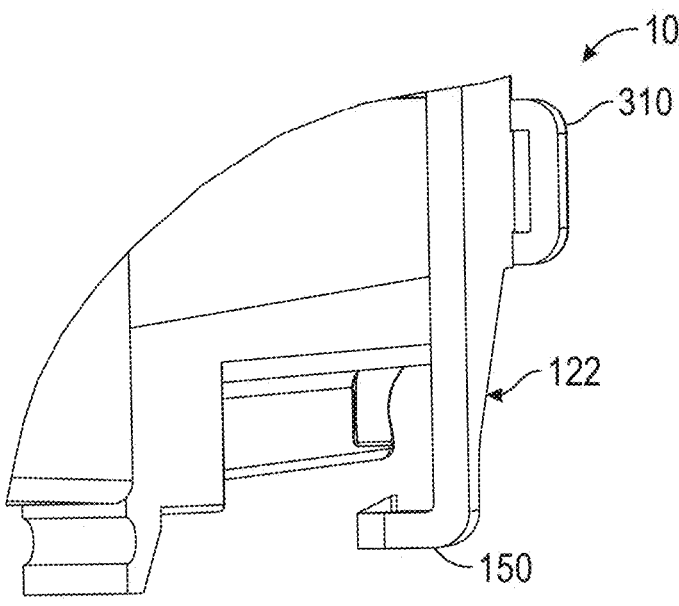
Figure 110:
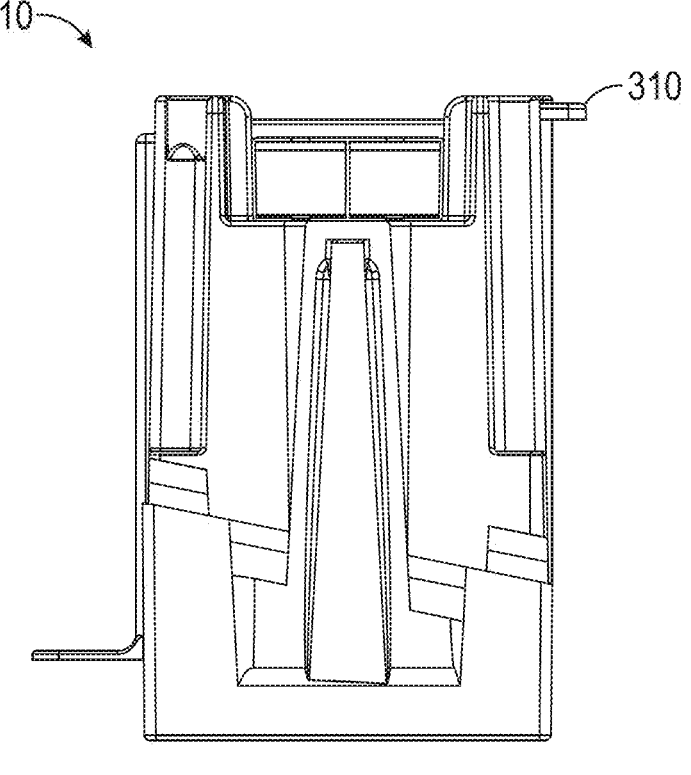
Figure 111:
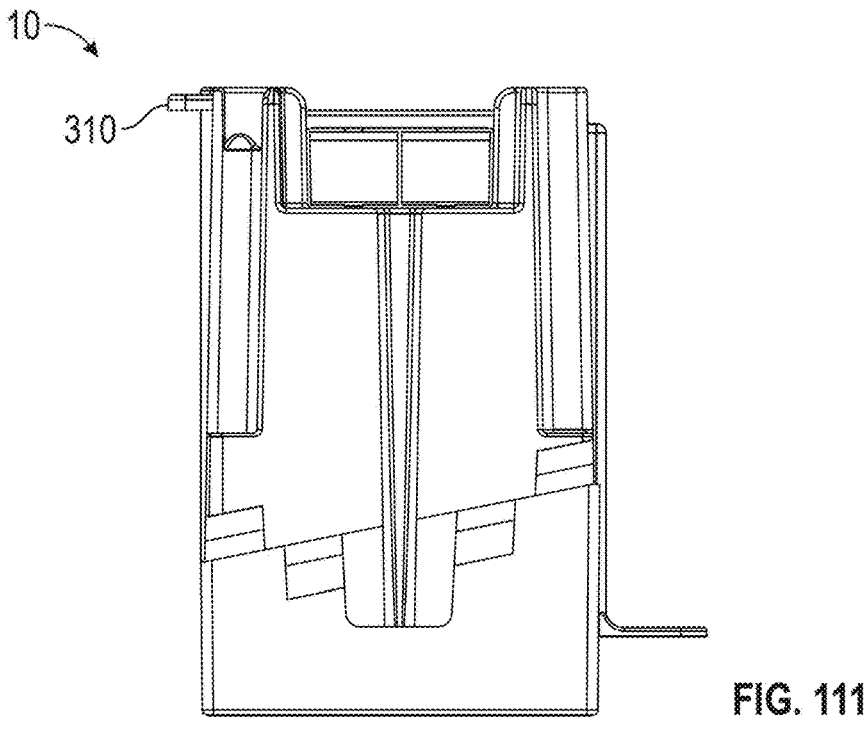
Figure 112:
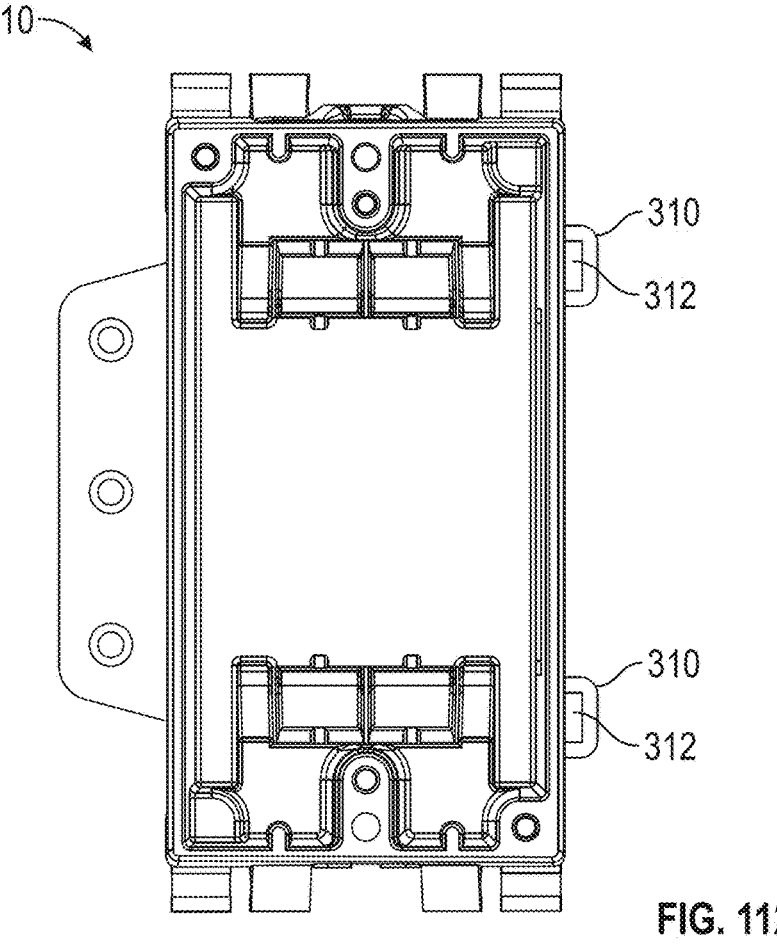
Figure 113:
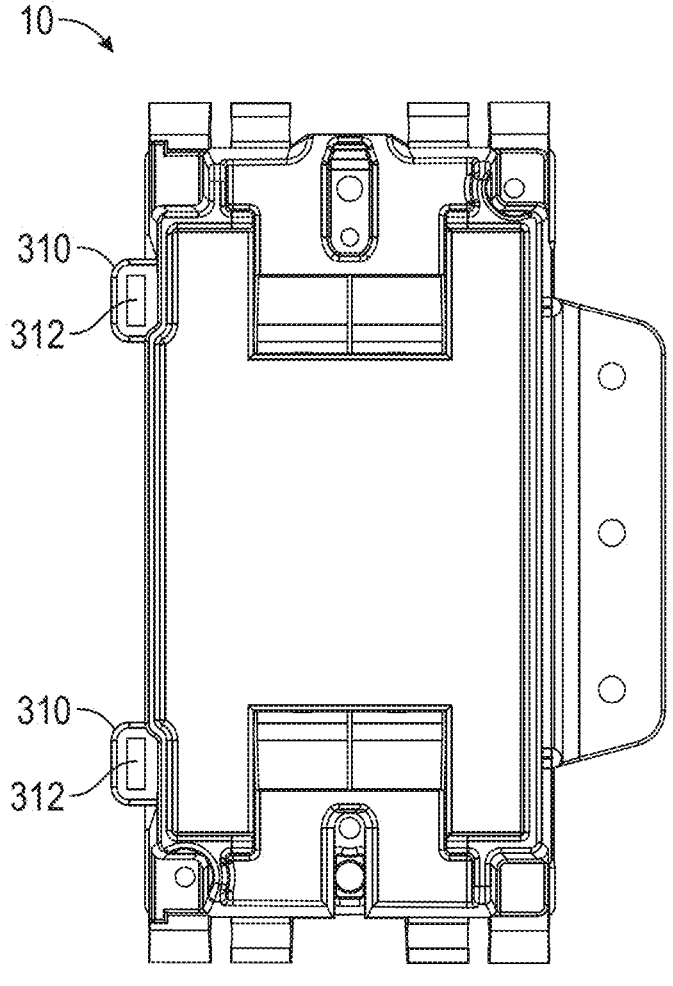
Figure 114:
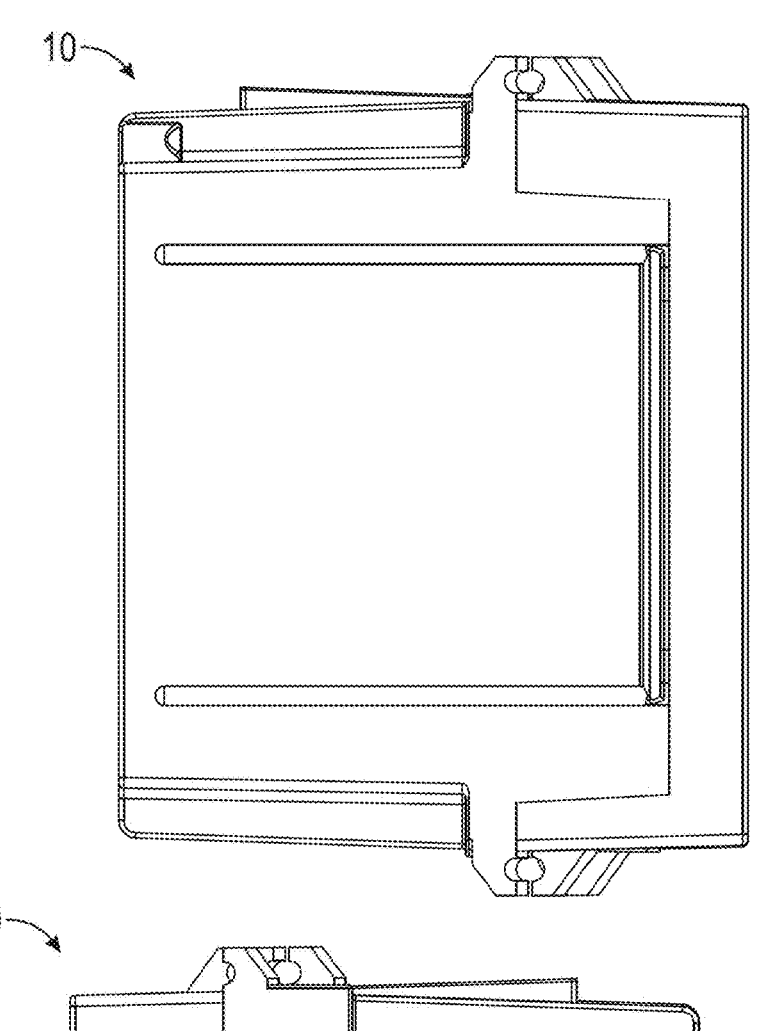
Figure 115:
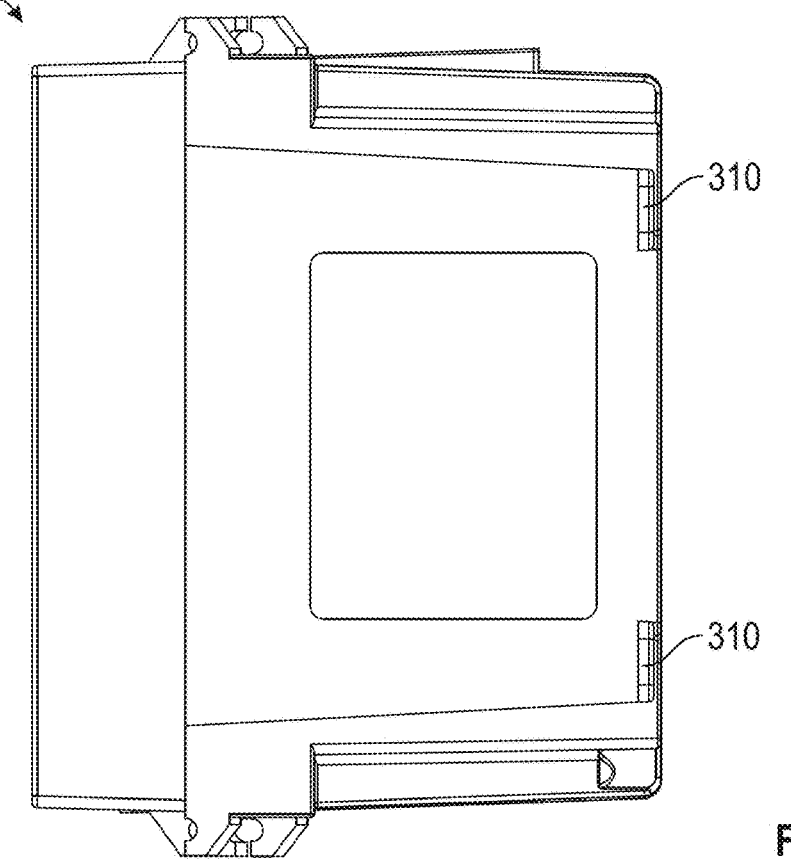
Figure 116:
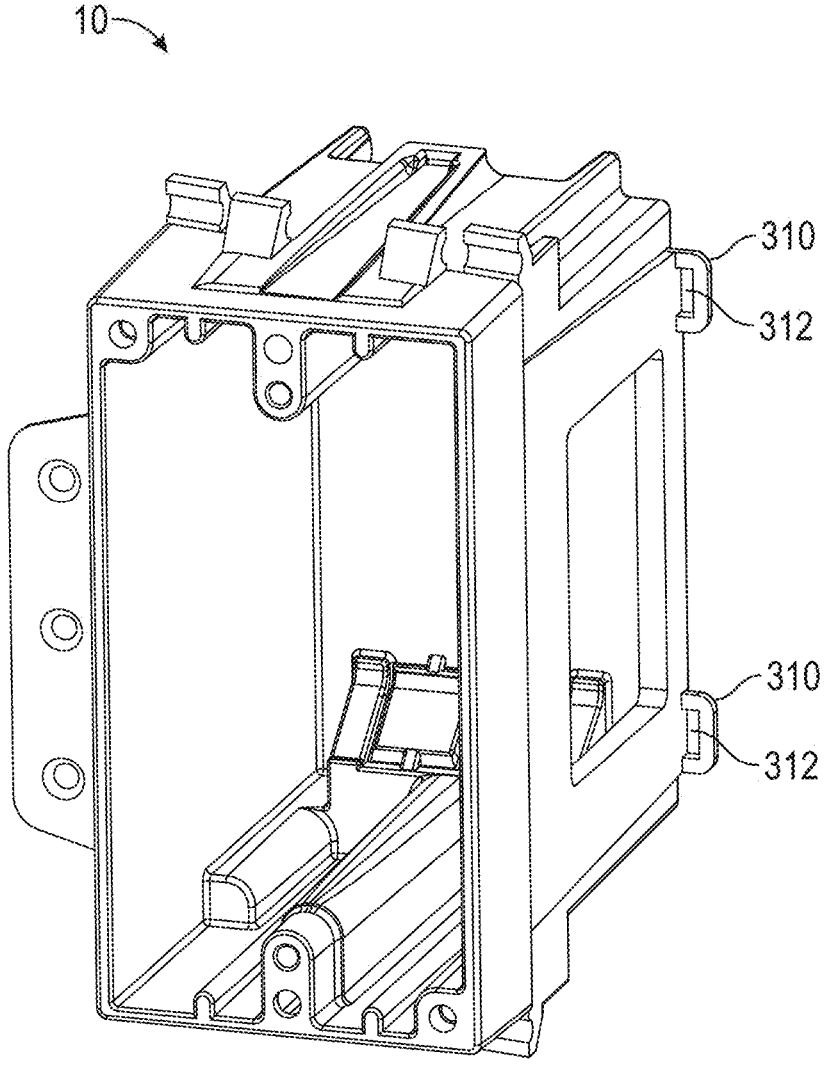
Figure 117:
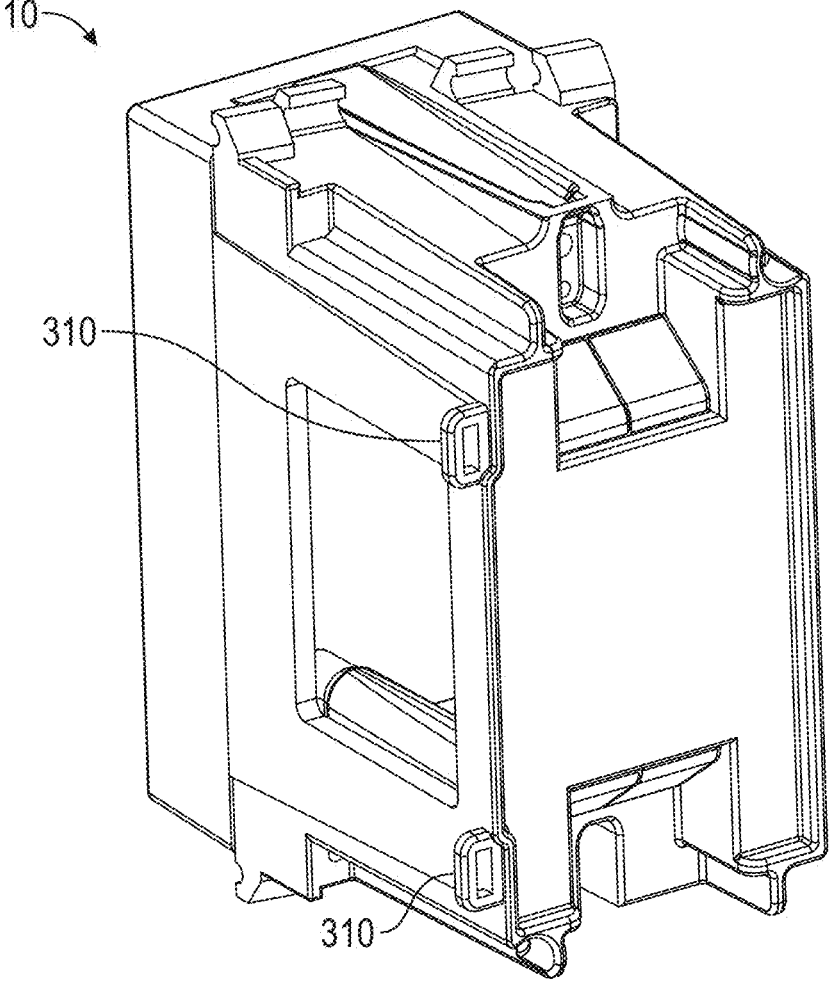
Figure 118A:
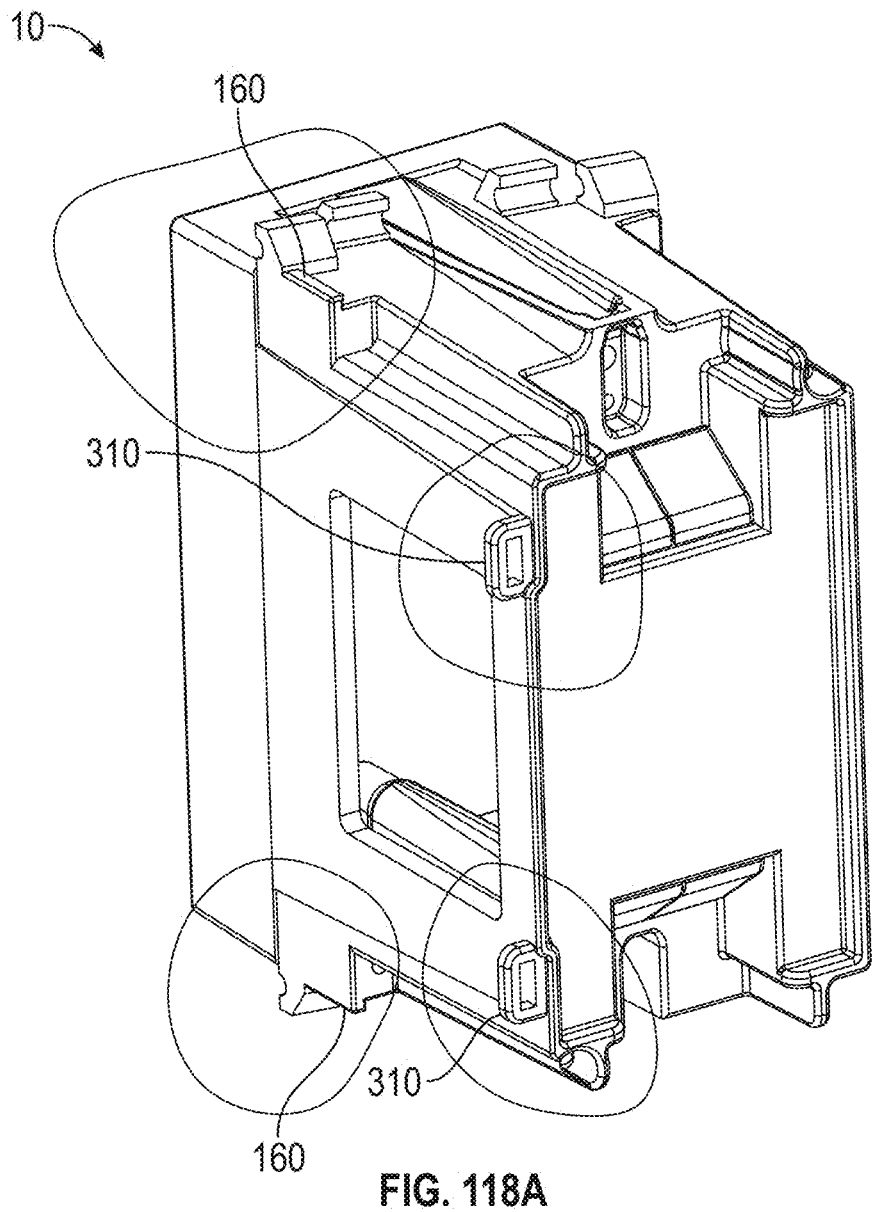
Figure 118B:
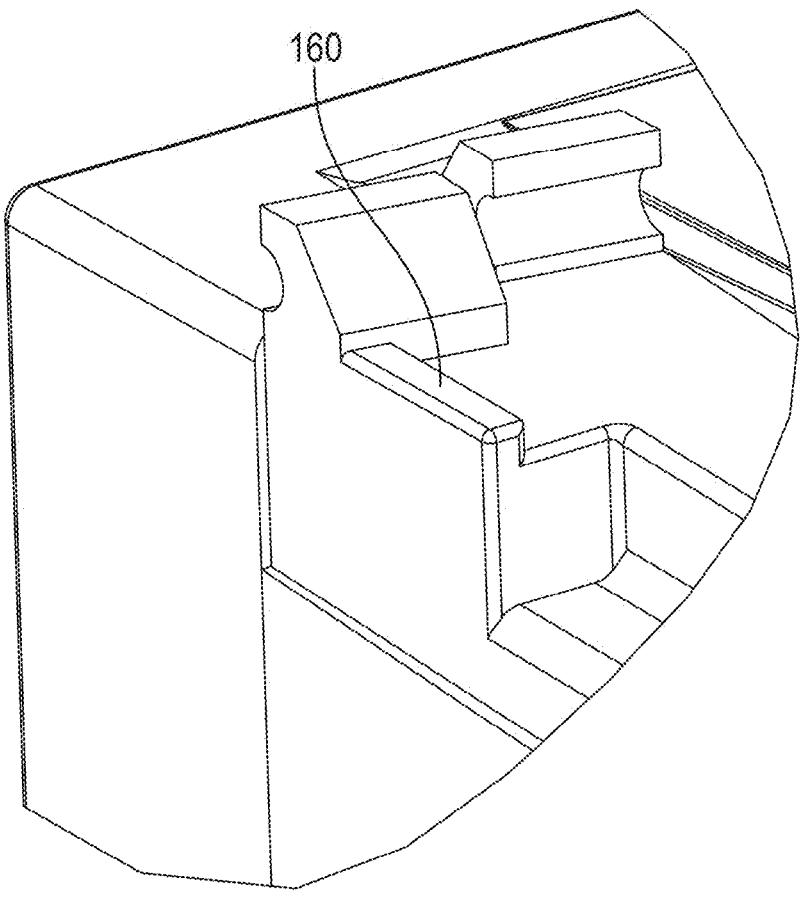
Figure 118C:
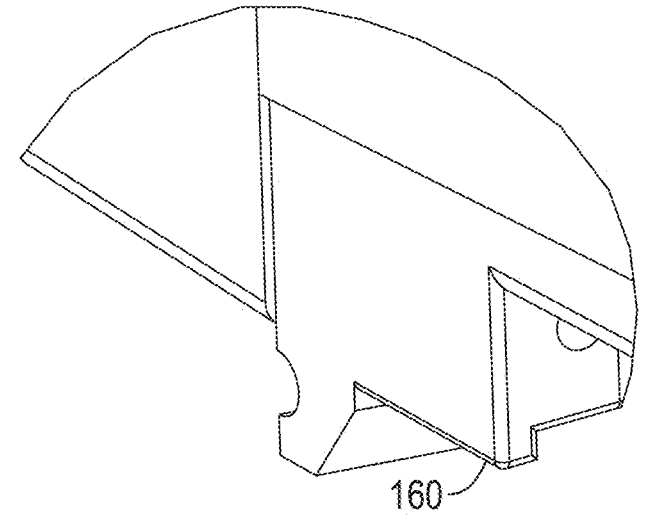
Figure 118D:
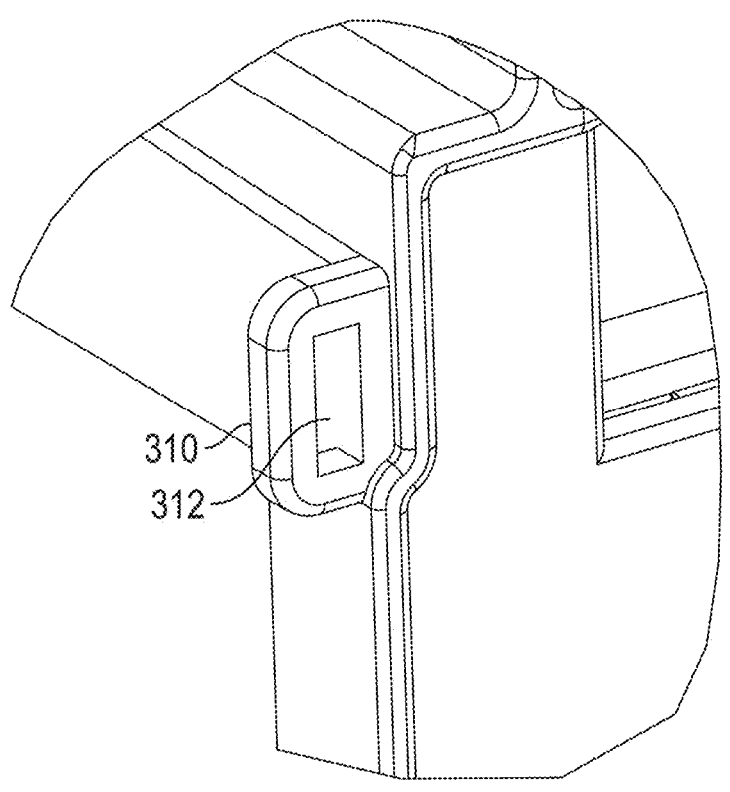
Figure 118E:
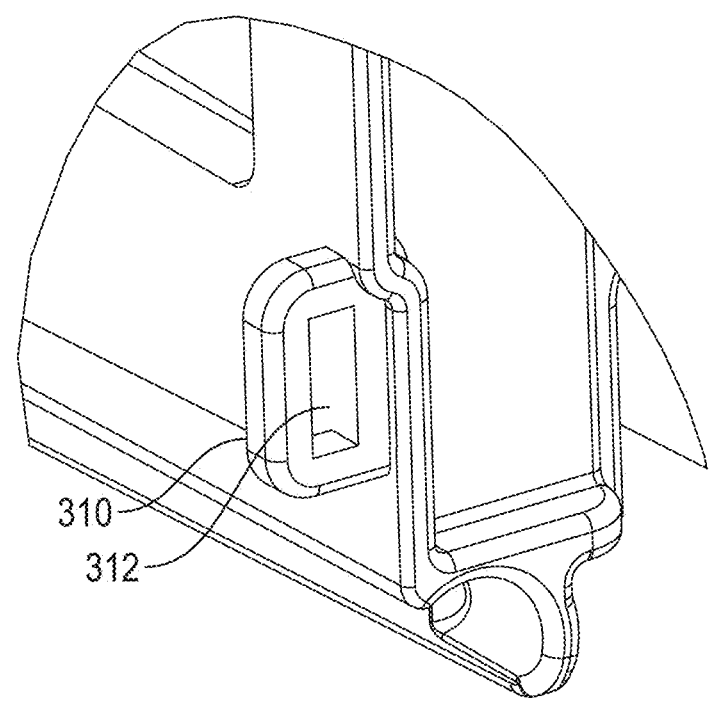
Figure 119:
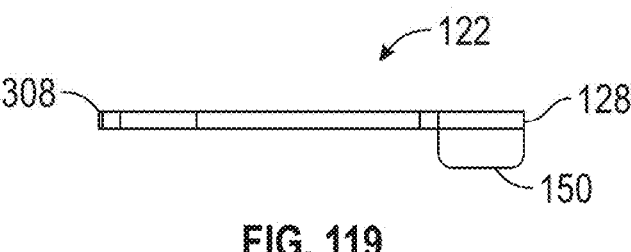
Figure 120:
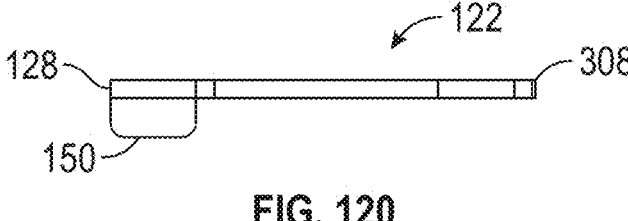
Figure 121:
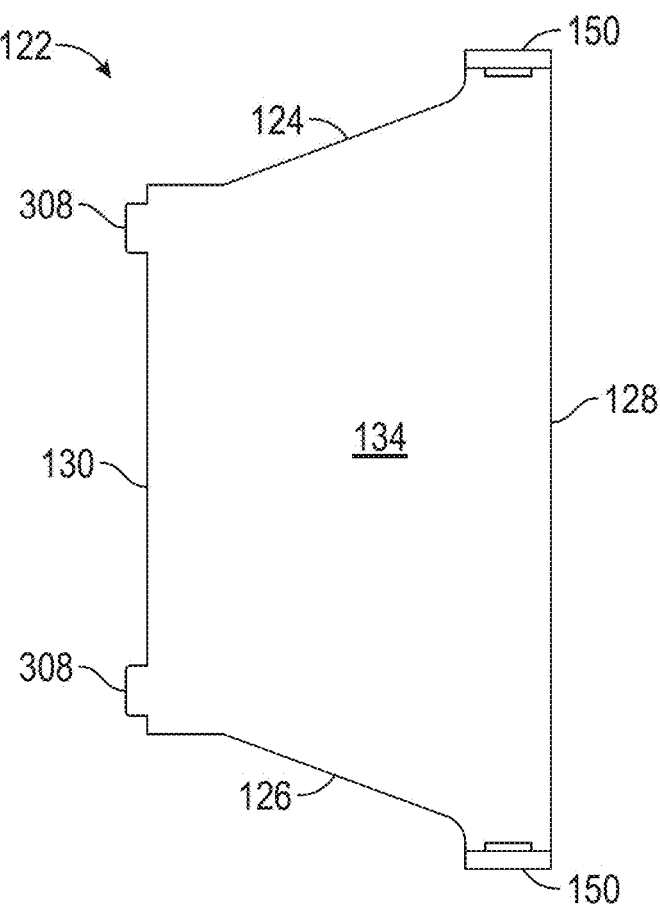
Figure 122:
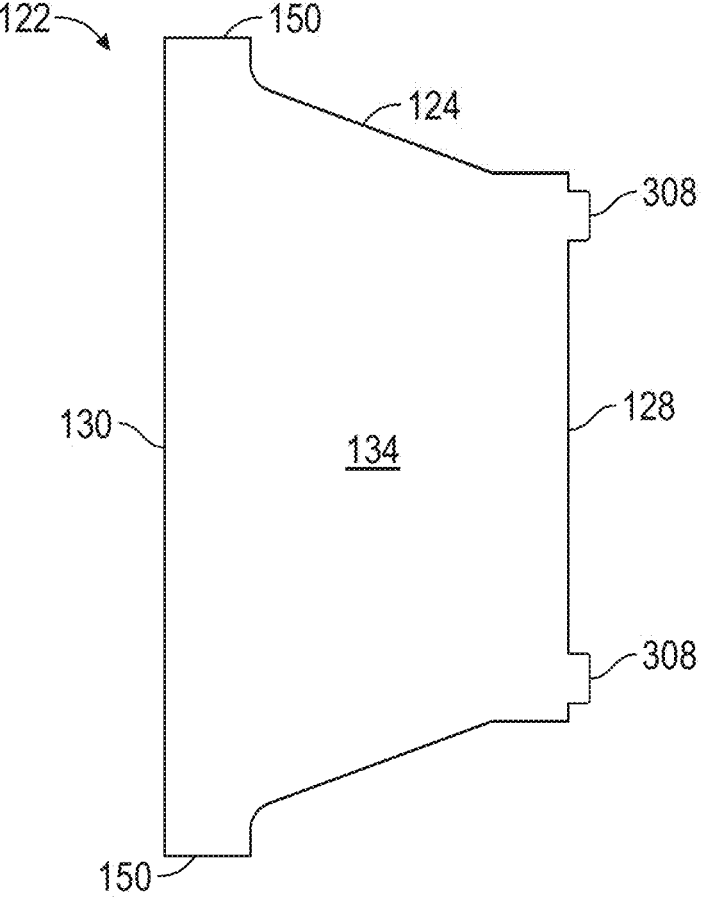
Figures 125, 126:
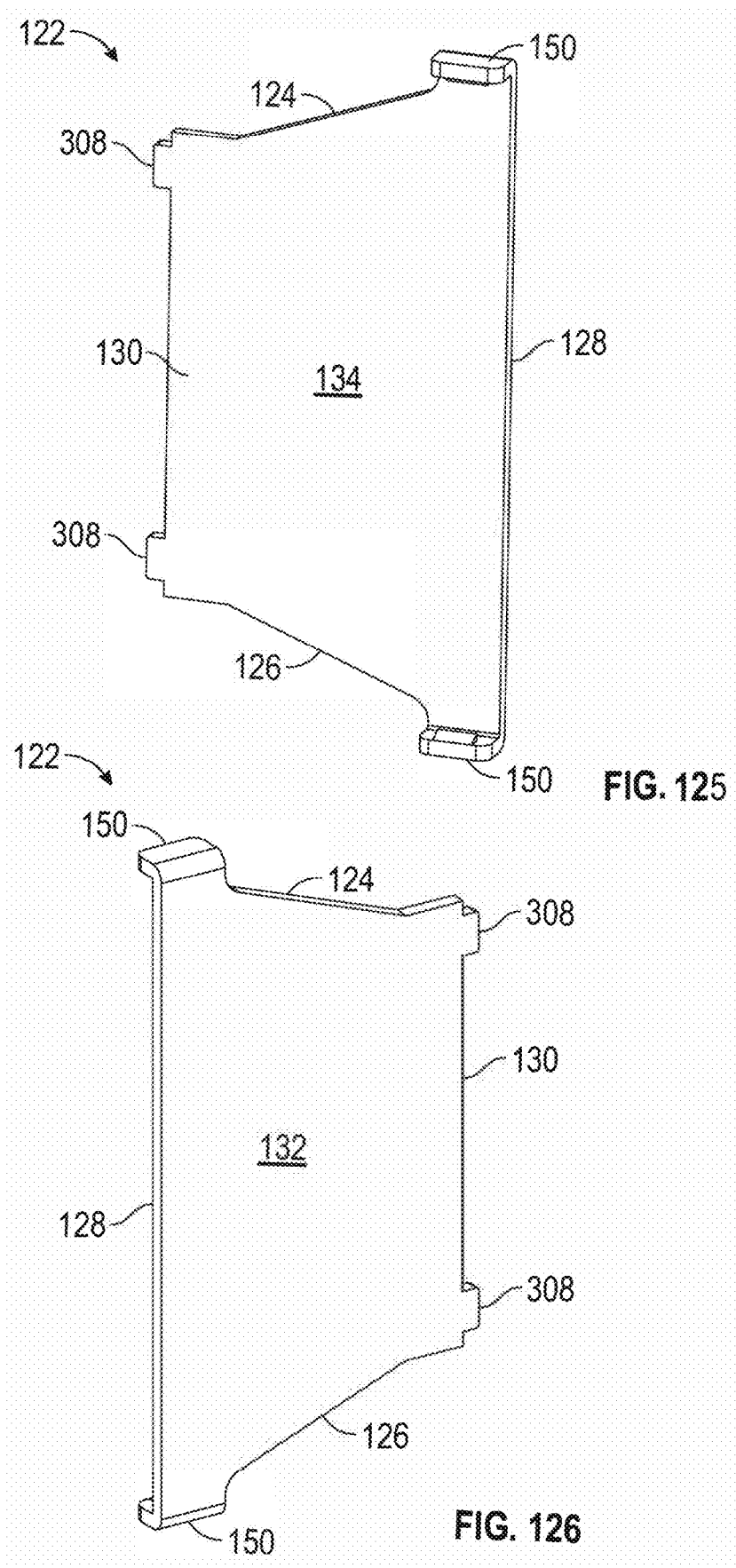
Figure 127A:
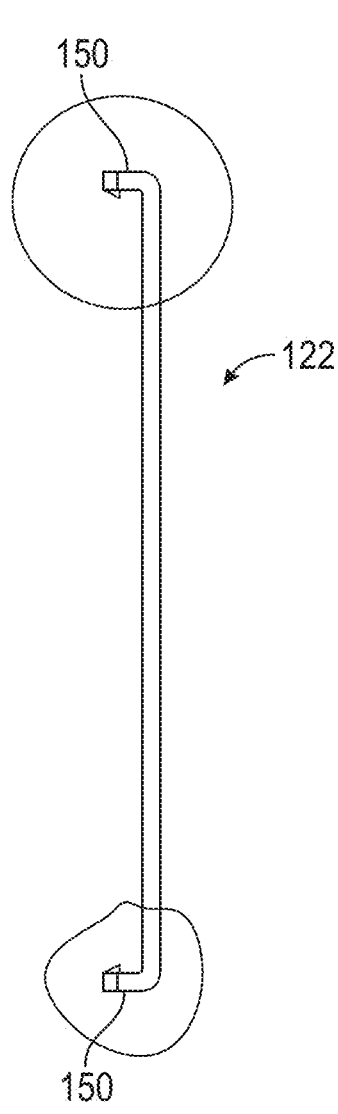
Figure 127B:
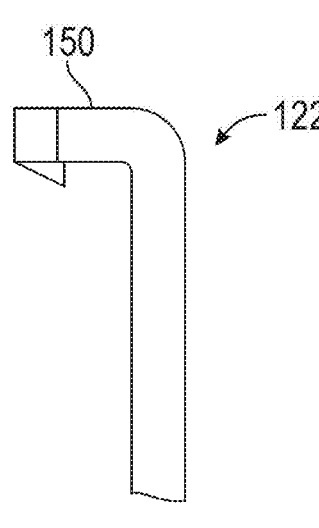
Figure 127C:
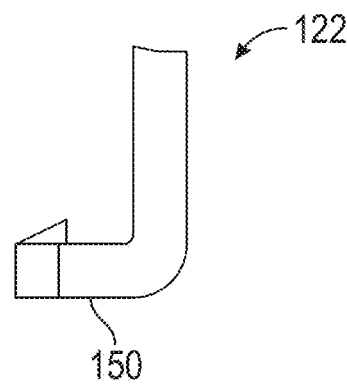

With that said, summary description of the figures are as follows:

FIG. 1A is a front elevation view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 1B is a left side elevation view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 2A is a rear elevation view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 2B is a right side elevation view of a standard-sized or conventionally sized electrical junction box system 10 having a housing 26, the view showing a cover 30 connected to the housing 26 by a runner 290;

FIG. 3A is a top elevation view of a standard-sized or conventionally sized electrical junction box system 10 having a housing 26 having an access door 122 connected to the left sidewall 58 by a hinge 46, the view showing the access door 122 in an open position, the view showing a cover 30 connected to the housing 26 by a runner 290;

FIG. 3B is a bottom elevation view of a standard-sized or conventionally sized electrical junction box system 10 having a housing 26 having an access door 122 connected to the left sidewall 58 by a hinge 46, the view showing the access door 122 in an open position;

FIG. 4A is front perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 4B is a rear perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 5A is a top elevation view of a standard-sized or conventionally sized electrical junction box system 10 having a housing 26 having an access door 122 connected to the left sidewall 58 by a hinge 46, the view showing the access door 122 in a closed position;

FIG. 5B is a front elevation view of a standard-sized or conventionally sized electrical junction box system 10 having a housing 26 having an access door 122 connected to the left sidewall 58 by a hinge 46, the view showing the access door 122 in a closed position;

FIG. 5C is a left side elevation view of a standard-sized or conventionally sized electrical junction box system 10 having a housing 26 having an access door 122 connected to the left sidewall 58 by a hinge 46, the view showing the access door 122 in a closed position;

FIG. 6A is a rear elevation view of a standard-sized or conventionally sized electrical junction box system 10 having a housing 26 having an access door 122 connected to the left sidewall 58 by a hinge 46, the view showing the access door 122 in a closed position;

FIG. 6B is a bottom elevation view of a standard-sized or conventionally sized electrical junction box system 10 having a housing 26 having an access door 122 connected to the left sidewall 58 by a hinge 46, the view showing the access door 122 in a closed position;

FIG. 6C is right side elevation view of a standard-sized or conventionally sized electrical junction box system 10 having a housing 26;

FIG. 7A is a front perspective view of a standard-sized or conventionally sized electrical junction box system 10 having a housing 26 having an access door 122 connected to the left sidewall 58 by a hinge 46, the view showing the access door 122 in a closed position;

FIG. 7B is a rear perspective view of a standard-sized or conventionally sized electrical junction box system 10 having a housing 26 having an access door 122 connected to the left sidewall 58 by a hinge 46, the view showing the access door 122 in a closed position;

FIG. 7C is a top perspective section view of a standard-sized or conventionally sized electrical junction box system 10 having a housing 26 having an access door 122 connected to the left sidewall 58 by a hinge 46, the view showing the access door 122 in a closed position, the section is sliced through the connection member 150 of access door 122 and connection member 160 of housing and shows how those components connect together;

FIG. 7D is a close-up top perspective section view of a standard-sized or conventionally sized electrical junction box system 10 having a housing 26 having an access door 122 connected to the left sidewall 58 by a hinge 46, the view showing the access door 122 in a closed position, the section is sliced through the connection member 150 of access door 122 and connection member 160 of housing and shows how those components connect together;

FIG. 8A is a top elevation view of a standard-sized or conventionally sized electrical junction box system 10 having a housing 26 having the access door 122 removed from the left sidewall 58 leaving the access opening 112 uncovered;

FIG. 8B is a front elevation view of a standard-sized or conventionally sized electrical junction box system 10 having a housing 26 having the access door 122 removed from the left sidewall 58 leaving the access opening 112 uncovered;

FIG. 8C is a left side elevation view of a standard-sized or conventionally sized electrical junction box system 10 having a housing 26 having the access door 122 removed from the left sidewall 58 leaving the access opening 112 uncovered;

FIG. 8D is a rear perspective view of a standard-sized or conventionally sized electrical junction box system 10 having a housing 26 having the access door 122 removed from the left sidewall 58 leaving the access opening 112 uncovered;

FIG. 9A is a top elevation view of a standard-sized or conventionally sized electrical junction box system 10 having a housing 26 having an access door 122 connected to the left sidewall 58 by a hinge 46, the view showing the access door 122 in an open position;

FIG. 9B is a front elevation view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152;

FIG. 9C is a left side elevation view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152;

FIG. 9D is a front perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152;

FIG. 10A is a rear elevation view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152;

FIG. 10B is a bottom elevation view of a standard-sized or conventionally sized electrical junction box system 10 having a housing 26 having an access door 122 connected to the left sidewall 58 by a hinge 46, the view showing the access door 122 in an open position;

FIG. 10C is a right side elevation view of a standard-sized or conventionally sized electrical junction box system 10 having a housing 26;

FIG. 10D is a rear perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152;

FIG. 11A is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the top finger 152 flexed outward in a partially-opened position so as to allow external wires 34 to pass into the hollow interior 80 of housing 26 through access opening 112;

FIG. 11B is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the middle finger 152 flexed outward in a partially-opened position so as to allow external wires 34 to pass into the hollow interior 80 of housing 26 through access opening 112;

FIG. 11C is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the bottom finger 152 flexed outward in a partially-opened position so as to allow external wires 34 to pass into the hollow interior 80 of housing 26 through access opening 112;

FIG. 12A is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 removed so as to allow external wires 34 to pass into the hollow interior 80 of housing 26 through the opening left behind when the upper right access tab 110 is removed;

FIG. 12B is a close up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 removed so as to allow external wires 34 to pass into the hollow interior 80 of housing 26 through the opening left behind when the upper right access tab 110 is removed;

FIG. 12C is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 removed so as to allow external wires 34 to pass into the hollow interior 80 of housing 26 through the opening left behind when the upper left access tab 110 is removed;

FIG. 12D is a close up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 removed so as to allow external wires 34 to pass into the hollow interior 80 of housing 26 through the opening left behind when the upper left access tab 110 is removed;

FIG. 13A is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 13B is a close up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 13C is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward upon strands 220 so as to allow external wires 34 to pass into the hollow interior 80 of housing 26 through the opening between the twisted upper right access tab 110 and the non-twisted upper left access tab 110;

FIG. 13D is a close-up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward toward upon strands 220 so as to allow external wires 34 to pass into the hollow interior 80 of housing 26 through the opening between the twisted upper right access tab 110 and the non-twisted upper left access tab 110;

FIG. 14A is a top elevation view of a cover 30 for a standard-sized or conventionally sized electrical junction box system 10, the view showing a relief 286 in the front side of the cover 30 and a recess 272 in the rear side of the cover 30;

FIG. 14B is a right side elevation view of a cover 30 for a standard-sized or conventionally sized electrical junction box system 10;

FIG. 14C is a front side elevation view of a cover 30 for a standard-sized or conventionally sized electrical junction box system 10;

FIG. 14D is a left side elevation view of a cover 30 for a standard-sized or conventionally sized electrical junction box system 10;

FIG. 14E is a rear side elevation view of a cover 30 for a standard-sized or conventionally sized electrical junction box system 10;

FIG. 14F is a bottom side elevation view of a cover 30 for a standard-sized or conventionally sized electrical junction box system 10;

FIG. 15A is a front side perspective view of a cover 30 for a standard-sized or conventionally sized electrical junction box system 10;

FIG. 15B is a rear side perspective view of a cover 30 for a standard-sized or conventionally sized electrical junction box system 10;

FIG. 16A is a rear side perspective view of an alternative embodiment of a cover 30 for a standard-sized or conventionally sized electrical junction box system 10, the view showing the cover 30 having four protrusions 296 that extend rearward from the interior surface of the sidewalls, two protrusions 296 on each sidewall, which are configured to friction fit and engage onto housing 26;

FIG. 16B is a top/bottom elevation view of an alternative embodiment of a cover 30 for a standard-sized or conventionally sized electrical junction box system 10, the view showing the cover 30 having four protrusions 296 that extend rearward from the interior surface of the sidewalls, two protrusions 296 on each sidewall, which are configured to friction fit and engage onto housing 26;

FIG. 16C is a rear elevation view of an alternative embodiment of a cover 30 for a standard-sized or conventionally sized electrical junction box system 10, the view showing the cover 30 having four protrusions 296 that extend rearward from the interior surface of the sidewalls, two protrusions 296 on each sidewall, which are configured to friction fit and engage onto housing 26;

FIG. 17A is a front perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing the alignment flange 198 positioned in flush alignment with the front surface of the structure 32;

FIG. 17B is a front perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing the alignment flange 198 positioned in flush alignment with the front surface of the structure 32, the view showing an external wire 34 entering the hollow interior 80 of housing 26 through one of the access tabs 110 in the rear side of the housing 26;

FIG. 18A is a rear perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tabs 110 in the rear side of the housing 26; the view showing external wires 34 connecting to conductor wires 35 (that are connected to electrical device 12) with electrical connectors 36 which are shown as conventional wire nuts, the view showing portions of the external wires 34 and conductor wires 35 and electrical connectors 36 extending outward through access opening 112;

FIG. 18B is a rear perspective view of a standard-sized or conventionally sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tabs 110 in the rear side of the housing 26; the view showing external wires 34 connecting to conductor wires 35 (that are connected to electrical device 12) with electrical connectors 36 which are shown as conventional wire nuts, the view showing the external wires 34 and conductor wires 35 and electrical connectors 36 tucked into the hollow interior 80 of housing 26 in preparation of access door 122 being closed;

FIG. 19A is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26;

FIG. 19B is a front perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing a cover 30 connected to the front side of the housing 26 by a pair of fasteners 86 thereby covering the electrical device 12 held within the hollow interior 80 of housing 26 and between housing 26 and cover 30;

FIG. 20 is a front perspective exploded view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 about to be connected by a pair of nails 28 to a structure 32 (which is shown as a conventional 2×4), the view showing an external wire 34 about to enter the hollow interior 80 of housing 26 through the upper right access tab 110 in the rear side of the housing 26; the view showing an electrical device 12 (which in this case is a conventional receptacle or plug) about to be installed within the hollow interior 80 of housing 26; the view showing a cover 30 about to be connected to the front side of the housing 26 by a pair of fasteners 86 thereby covering the electrical device 12 held within the hollow interior 80 of housing 26 and between housing 26 and cover 30; the view also showing three conductor wires 35 about to be electrically connected to the electrical device 12;

FIG. 21 is a front perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing a cover 30 connected to the front side of the housing 26 by a pair of fasteners 86 thereby covering the electrical device 12 held within the hollow interior 80 of housing 26 and between housing 26 and cover 30; the view showing the installation of electrical junction box system 10 prior to the installation of drywall 38;

FIG. 22 is a front perspective view of a standard-sized or conventionally sized electrical junction box system 10 having a housing 26 having an access door 122 connected to the left sidewall 58 by a hinge 46, and a cover 30 installed on the front of the housing 26; the view showing drywall 38 installed around the electrical junction box system 10;

FIG. 23 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing drywall 38 installed around the electrical junction box system 10;

FIG. 24 is a top elevation view of a standard-sized or conventionally sized electrical junction box system 10 having a housing 26 having an access door 122 connected to the left sidewall 58 by a hinge 46, the view showing the access door 122 in a closed position;

FIG. 25 is a bottom elevation view of a standard-sized or conventionally sized electrical junction box system 10 having a housing 26 having an access door 122 connected to the left sidewall 58 by a hinge 46, the view showing the access door 122 in a closed position;

FIG. 26 is a front elevation view of a standard-sized or conventionally sized electrical junction box system 10 having a housing 26 having an access door 122 connected to the left sidewall 58 by a hinge 46, the view showing the access door 122 in a closed position;

FIG. 27 is a rear elevation view of a standard-sized or conventionally sized electrical junction box system 10 having a housing 26 having an access door 122 connected to the left sidewall 58 by a hinge 46, the view showing the access door 122 in a closed position;

FIG. 28 is right side elevation view of a standard-sized or conventionally sized electrical junction box system 10 having a housing 26;

FIG. 29 is a left side elevation view of a standard-sized or conventionally sized electrical junction box system 10 having a housing 26 having an access door 122 connected to the left sidewall 58 by a hinge 46, the view showing the access door 122 in a closed position;

FIG. 30 is a rear perspective view of a standard-sized or conventionally sized electrical junction box system 10 having a housing 26 having an access door 122 connected to the left sidewall 58 by a hinge 46, the view showing the access door 122 in a closed position;

FIG. 31 is a close-up rear perspective view of a standard-sized or conventionally sized electrical junction box system 10 having a housing 26 having an access door 122 connected to the left sidewall 58 by a hinge 46, the view showing the access door 122 in a closed position; the view showing the access tabs 110 in the upper rear portion of housing 26, the view showing both access tabs 110 in place in their original orientation;

FIG. 32 is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward upon strands 220 so as to allow external wires 34 to pass into the hollow interior 80 of housing 26 through the opening between the twisted upper right access tab 110 and the non-twisted upper left access tab 110;

FIG. 33 is a close-up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward toward upon strands 220 so as to allow external wires 34 to pass into the hollow interior 80 of housing 26 through the opening between the twisted upper right access tab 110 and the non-twisted upper left access tab 110;

FIG. 34 is a top elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward toward upon strands 220 so as to allow external wires 34 to pass into the hollow interior 80 of housing 26 through the opening between the twisted upper right access tab 110 and the non-twisted upper left access tab 110;

FIG. 35 is a rear elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward toward upon strands 220 so as to allow external wires 34 to pass into the hollow interior 80 of housing 26 through the opening between the twisted upper right access tab 110 and the non-twisted upper left access tab 110;

FIG. 36 is a rear perspective elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward toward upon strands 220 so as to allow external wires 34 to pass into the hollow interior 80 of housing 26 through the opening between the twisted upper right access tab 110 and the non-twisted upper left access tab 110;

FIG. 37 is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 twisted inward upon strands 220 so as to allow external wires 34 to pass into the hollow interior 80 of housing 26 through the opening between the twisted upper left access tab 110 and the non-twisted upper right access tab 110;

FIG. 38 is a close-up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 twisted inward upon strands 220 so as to allow external wires 34 to pass into the hollow interior 80 of housing 26 through the opening between the twisted upper left access tab 110 and the non-twisted upper right access tab 110;

FIG. 39 is a top elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 twisted inward upon strands 220 so as to allow external wires 34 to pass into the hollow interior 80 of housing 26 through the opening between the twisted upper left access tab 110 and the non-twisted upper right access tab 110;

FIG. 40 is a rear elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 twisted inward upon strands 220 so as to allow external wires 34 to pass into the hollow interior 80 of housing 26 through the opening between the twisted upper left access tab 110 and the non-twisted upper right access tab 110;

FIG. 41 is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 twisted inward upon strands 220 so as to allow external wires 34 to pass into the hollow interior 80 of housing 26 through the opening between the twisted upper left access tab 110 and the non-twisted upper right access tab 110;

FIG. 42 is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 43 is a close up rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 44 is a top elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 45 is a rear elevation view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 46 is a rear perspective view of a standard-sized or conventionally sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110;

FIG. 47 is a rear perspective view of a standard-sized or conventionally sized electrical junction box system 10 having a housing 26 having an access door 122 connected to the left sidewall 58 by a hinge 46, the view showing the access door 122 in a closed position;

FIG. 48A is a close-up rear perspective view of a standard-sized or conventionally sized electrical junction box system 10 having a housing 26 having an access door 122 connected to the left sidewall 58 by a hinge 46, the view showing the access door 122 in a closed position; the view showing the lower-positioned connection member 150 of the access door 122 connected to the connection member 160 of the housing;

FIG. 48B is a close-up rear perspective view of a standard-sized or conventionally sized electrical junction box system 10 having a housing 26 having an access door 122 connected to the left sidewall 58 by a hinge 46, the view showing the access door 122 in a closed position; the view showing the upper-positioned connection member 150 of the access door 122 connected to the connection member 160 of the housing;

FIG. 49 is a rear perspective view of a standard-sized or conventionally sized electrical junction box system 10 having a housing 26 having an access door 122 connected to the left sidewall 58 by a hinge 46, the view showing the access door 122 in a partially opened position; the view showing the connection members 150 of the access door 122 and the connection members 160 of the housing;

FIG. 50A is a close-up rear perspective view of a standard-sized or conventionally sized electrical junction box system 10 having a housing 26 having an access door 122 connected to the left sidewall 58 by a hinge 46, the view showing the access door 122 in a partially opened position; the view showing the lower-positioned connection member 150 of the access door 122 and the connection member 160 of the housing;

FIG. 50B is a close-up rear perspective view of a standard-sized or conventionally sized electrical junction box system 10 having a housing 26 having an access door 122 connected to the left sidewall 58 by a hinge 46, the view showing the access door 122 in a partially opened position; the view showing the upper-positioned connection member 150 of the access door 122 and the connection member 160 of the housing;

FIG. 51 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing the upper right access tab 110 rotated upon strands 220; the view showing the external wires 34 entering between the twisted access tab 110 and the housing 26 (as opposed to entering between adjacent access tabs 110) the view showing a cover 30 connected to the front side of the housing 26;

FIG. 52 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the lower right access tab 110 in the rear side of the housing 26; the view showing the lower right access tab 110 rotated upon strands 220; the view showing the external wires 34 entering between the twisted access tab 110 and the housing 26 (as opposed to entering between adjacent access tabs 110) the view showing a cover 30 connected to the front side of the housing 26;

FIG. 53 is a rear perspective view of a standard-sized or conventionally sized electrical junction box system 10 having a housing 26 having an access door 122 connected to the left sidewall 58 by a hinge 46, the view showing the access door 122 in a closed position, the view showing the housing 26 connected by a pair of nails 28 to a structure 32 (which is shown as a conventional 2×4), the view showing a plurality of flexible fingers 152, the view showing the top finger 152 flexed outward in a partially-opened position so as to allow external wires 34 to pass into the hollow interior 80 of housing 26 through access opening 112; the view showing the external wires 34 entering the gap formed by the outwardly-flexed top finger 152;

FIG. 54 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing a first external wire 34 entering the hollow interior 80 of housing 26 through the upper right access tab 110 in the rear side of the housing 26; the view showing the upper right access tab 110 rotated upon strands 220; the view showing the first external wire 34 entering between the twisted access tab 110 and the housing 26 (as opposed to entering between adjacent access tabs 110) the view showing a cover 30 connected to the front side of the housing 26; the view showing a second external wire 34 entering the hollow interior 80 of housing 26 through the lower right access tab 110 in the rear side of the housing 26; the view showing the lower right access tab 110 rotated upon strands 220; the view showing the second external wire 34 entering between the twisted access tab 110 and the housing 26 (as opposed to entering between adjacent access tabs 110) the view showing a cover 30 connected to the front side of the housing 26;

FIG. 55 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing a first external wire 34 entering the hollow interior 80 of housing 26 through the upper right access tab 110 in the rear side of the housing 26; the view showing the upper right access tab 110 rotated upon strands 220; the view showing the first external wire 34 entering between the twisted access tab 110 and the housing 26 (as opposed to entering between adjacent access tabs 110) the view showing a cover 30 connected to the front side of the housing 26; the view showing the top finger 152 flexed outward in a partially-opened position so as to allow external wire 34 to pass into the hollow interior 80 of housing 26 through access opening 112; the view showing a second external wire 34 entering the gap formed by the outwardly-flexed top finger 152;

FIG. 56 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing a first external wire 34 entering the hollow interior 80 of housing 26 through the upper right access tab 110 in the rear side of the housing 26; the view showing the upper right access tab 110 rotated upon strands 220; the view showing the first external wire 34 entering between the twisted access tab 110 and the housing 26 (as opposed to entering between adjacent access tabs 110); the view showing a second external wire 34 entering the hollow interior 80 of housing 26 through the upper left access tab 110 in the rear side of the housing 26; the view showing the upper left access tab 110 rotated upon strands 220; the view showing the second external wire 34 entering between the twisted access tab 110 and the housing 26 (as opposed to entering between adjacent access tabs 110); the view showing a cover 30 connected to the front side of the housing 26;

FIG. 57 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing a first external wire 34 entering the hollow interior 80 of housing 26 through the lower right access tab 110 in the rear side of the housing 26; the view showing the lower right access tab 110 rotated upon strands 220; the view showing the first external wire 34 entering between the twisted access tab 110 and the housing 26 (as opposed to entering between adjacent access tabs 110); the view showing a cover 30 connected to the front side of the housing 26; the view showing the bottom finger 152 flexed outward in a partially-opened position so as to allow external wire 34 to pass into the hollow interior 80 of housing 26 through access opening 112; the view showing a second external wire 34 entering the gap formed by the outwardly-flexed bottom finger 152;

FIG. 58 is a rear perspective view of a standard-sized or conventionally sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing a first external wire 34 entering the hollow interior 80 of housing 26 through the lower right access tab 110 in the rear side of the housing 26; the view showing the lower right access tab 110 rotated upon strands 220; the view showing the first external wire 34 entering between the twisted access tab 110 and the housing 26 (as opposed to entering between adjacent access tabs 110); the view showing a second external wire 34 entering the hollow interior 80 of housing 26 through the lower left access tab 110 in the rear side of the housing 26; the view showing the lower left access tab 110 rotated upon strands 220; the view showing the second external wire 34 entering between the twisted access tab 110 and the housing 26 (as opposed to entering between adjacent access tabs 110); the view showing a cover 30 connected to the front side of the housing 26;

FIG. 59 is a rear perspective view of a standard-sized or conventionally sized electrical junction box system 10 having a housing 26 having an access door 122 connected to the left sidewall 58 by a hinge 46, the view showing the access door 122 in a closed position, the view showing the housing 26 connected by a pair of nails 28 to a structure 32 (which is shown as a conventional 2×4), the view showing a plurality of flexible fingers 152, the view showing the top finger 152 flexed outward in a partially-opened position so as to allow external wires 34 to pass into the hollow interior 80 of housing 26 through access opening 112; the view showing a first external wire 34 entering the gap formed by the outwardly-flexed top finger 152; the view showing the bottom finger 152 flexed outward in a partially-opened position so as to allow external wires 34 to pass into the hollow interior 80 of housing 26 through access opening 112; the view showing a second external wire 34 entering the gap formed by the outwardly-flexed bottom finger 152;

FIG. 60A is a front elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 60B is a left side elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 61A is a rear elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290; the view showing at the top side and bottom side of housing 26 a hole 98 in device support 92 for connecting electrical device 12 to housing 26 in line with a second hole 306 that can receive a fastener for attaching a faceplate;

FIG. 61B is a right side elevation view of an extended-length, elongated or "Hi-Box" over-sized electrical junction box system 10 having a housing 26, the view showing a cover 30 connected to the housing 26 by a runner 290;

FIG. 62A is a top elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a cover 30 connected to the housing 26 by a runner 290;

FIG. 62B is a bottom elevation view of an extended-length, elongated or "Hi-Box" over-sized electrical junction box system 10 having a housing 26 having an access door 122 connected to the left sidewall 58 by a hinge 46, the view showing the access door 122 in an open position;

FIG. 63A is front perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290; the view showing at the top side and bottom side of housing 26 a hole 98 in device support 92 for connecting electrical device 12 to housing 26 in line with a second hole 306 that can receive a fastener for attaching a faceplate;

FIG. 63B is a rear perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing a cover 30 connected to the housing 26 by a runner 290;

FIG. 64A is a front elevation view of an extended-length, elongated or "Hi-Box" over-sized electrical junction box system 10 having a housing 26 having an access door 122 connected to the left sidewall 58 by a hinge 46, the view showing the access door 122 in a closed position; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 64B is a top elevation view of a standard-sized or conventionally sized electrical junction box system 10 having a housing 26 having an access door 122 connected to the left sidewall 58 by a hinge 46, the view showing the access door 122 in a closed position;

FIG. 64C is a left side elevation view of an extended-length, elongated or "Hi-Box" over-sized electrical junction box system 10 having a housing 26 having an access door 122 connected to the left sidewall 58 by a hinge 46, the view showing the access door 122 in a closed position;

FIG. 65A is a bottom elevation view of an extended-length, elongated or "Hi-Box" over-sized electrical junction box system 10 having a housing 26 having an access door 122 connected to the left sidewall 58 by a hinge 46, the view showing the access door 122 in a closed position;

FIG. 65B is a rear elevation view of an extended-length, elongated or "Hi-Box" over-sized electrical junction box system 10 having a housing 26 having an access door 122 connected to the left sidewall 58 by a hinge 46, the view showing the access door 122 in a closed position; the view showing at the top side and bottom side of housing 26 a hole 98 in device support 92 for connecting electrical device 12 to housing 26 in line with a second hole 306 that can receive a fastener for attaching a faceplate;

FIG. 65C is right side elevation view of an extended-length, elongated or "Hi-Box" over-sized electrical junction box system 10 having a housing 26;

FIG. 66A is a front perspective view of an extended-length, elongated or "Hi-Box" over-sized electrical junction box system 10 having a housing 26 having an access door 122 connected to the left sidewall 58 by a hinge 46, the view showing the access door 122 in a closed position; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 66B is a rear perspective view of an extended-length, elongated or "Hi-Box" over-sized electrical junction box system 10 having a housing 26 having an access door 122 connected to the left sidewall 58 by a hinge 46, the view showing the access door 122 in a closed position; the view showing at the top side and bottom side of housing 26 a hole 98 in device support 92 for connecting electrical device 12 to housing 26 in line with a second hole 306 that can receive a fastener for attaching a faceplate;

FIG. 66C is a top perspective section view of an extended-length, elongated or "Hi-Box" over-sized electrical junction box system 10 having a housing 26 having an access door 122 connected to the left sidewall 58 by a hinge 46, the view showing the access door 122 in a closed position, the section is sliced through the connection member 150 of access door 122 and connection member 160 of housing and shows how those components connect together;

FIG. 66D is a close-up top perspective section view of an extended-length, elongated or "Hi-Box" over-sized electrical junction box system 10 having a housing 26 having an access door 122 connected to the left sidewall 58 by a hinge 46, the view showing the access door 122 in a closed position, the section is sliced through the connection member 150 of access door 122 and connection member 160 of housing and shows how those components connect together;

FIG. 67A is a front elevation view of an extended-length, elongated or "Hi-Box" over-sized electrical junction box system 10 having a housing 26 having the access door 122 removed from the left sidewall 58 leaving the access opening 112 uncovered; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 67B is a top elevation view of an extended-length, elongated or "Hi-Box" over-sized electrical junction box system 10 having a housing 26 having the access door 122 removed from the left sidewall 58 leaving the access opening 112 uncovered;

FIG. 67C is a left side elevation view of an extended-length, elongated or "Hi-Box" over-sized electrical junction box system 10 having a housing 26 having the access door 122 removed from the left sidewall 58 leaving the access opening 112 uncovered;

FIG. 67D is a rear perspective view of an extended-length, elongated or "Hi-Box" over-sized electrical junction box system 10 having a housing 26 having the access door 122 removed from the left sidewall 58 leaving the access opening 112 uncovered;

FIG. 68A is a front elevation view of an extended-length, elongated or "Hi-Box" over-sized electrical junction box system 10 having a housing 26 having an access door 122 connected to the left sidewall 58 by a hinge 46, the view showing the access door 122 in an open position; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 68B is a top elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152;

FIG. 68C is a left side elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152;

FIG. 68D is a front perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 69A is a bottom elevation view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152;

FIG. 69B is a rear elevation view of an extended-length, elongated or "Hi-Box" over-sized electrical junction box system 10 having a housing 26 having an access door 122 connected to the left sidewall 58 by a hinge 46, the view showing the access door 122 in an open position; the view showing at the top side and bottom side of housing 26 a hole 98 in device support 92 for connecting electrical device 12 to housing 26 in line with a second hole 306 that can receive a fastener for attaching a faceplate;

FIG. 69C is a right side elevation view of an extended-length, elongated or "Hi-Box" over-sized electrical junction box system 10 having a housing 26;

FIG. 69D is a rear perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152; the view showing at the top side and bottom side of housing 26 a hole 98 in device support 92 for connecting electrical device 12 to housing 26 in line with a second hole 306 that can receive a fastener for attaching a faceplate;

FIG. 70A is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the top finger 152 flexed outward in a partially-opened position so as to allow external wires 34 to pass into the hollow interior 80 of housing 26 through access opening 112; the view showing at the top side and bottom side of housing 26 a hole 98 in device support 92 for connecting electrical device 12 to housing 26 in line with a second hole 306 that can receive a fastener for attaching a faceplate;

FIG. 70B is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the middle finger 152 flexed outward in a partially-opened position so as to allow external wires 34 to pass into the hollow interior 80 of housing 26 through access opening 112; the view showing at the top side and bottom side of housing 26 a hole 98 in device support 92 for connecting electrical device 12 to housing 26 in line with a second hole 306 that can receive a fastener for attaching a faceplate;

FIG. 70C is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the bottom finger 152 flexed outward in a partially-opened position so as to allow external wires 34 to pass into the hollow interior 80 of housing 26 through access opening 112; the view showing at the top side and bottom side of housing 26 a hole 98 in device support 92 for connecting electrical device 12 to housing 26 in line with a second hole 306 that can receive a fastener for attaching a faceplate;

FIG. 71A is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 removed so as to allow external wires 34 to pass into the hollow interior 80 of housing 26 through the opening left behind when the upper right access tab 110 is removed; the view showing at the top side and bottom side of housing 26 a hole 98 in device support 92 for connecting electrical device 12 to housing 26 in line with a second hole 306 that can receive a fastener for attaching a faceplate;

FIG. 71B is a close up rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 removed so as to allow external wires 34 to pass into the hollow interior 80 of housing 26 through the opening left behind when the upper right access tab 110 is removed; the view showing at the top side and bottom side of housing 26 a hole 98 in device support 92 for connecting electrical device 12 to housing 26 in line with a second hole 306 that can receive a fastener for attaching a faceplate;

FIG. 71C is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 removed so as to allow external wires 34 to pass into the hollow interior 80 of housing 26 through the opening left behind when the upper left access tab 110 is removed; the view showing at the top side and bottom side of housing 26 a hole 98 in device support 92 for connecting electrical device 12 to housing 26 in line with a second hole 306 that can receive a fastener for attaching a faceplate;

FIG. 71D is a close up rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper left access tab 110 removed so as to allow external wires 34 to pass into the hollow interior 80 of housing 26 through the opening left behind when the upper left access tab 110 is removed; the view showing at the top side and bottom side of housing 26 a hole 98 in device support 92 for connecting electrical device 12 to housing 26 in line with a second hole 306 that can receive a fastener for attaching a faceplate;

FIG. 72A is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110; the view showing at the top side and bottom side of housing 26 a hole 98 in device support 92 for connecting electrical device 12 to housing 26 in line with a second hole 306 that can receive a fastener for attaching a faceplate;

FIG. 72B is a close up rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 and upper left access tab 110 twisted inward toward one another upon strands 220 so as to allow external wires 34 to pass into the hollow interior 80 of housing 26 through the opening between the twisted upper left access tab 110 and the upper right access tab 110; the view showing at the top side and bottom side of housing 26 a hole 98 in device support 92 for connecting electrical device 12 to housing 26 in line with a second hole 306 that can receive a fastener for attaching a faceplate;

FIG. 72C is a rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward upon strands 220 so as to allow external wires 34 to pass into the hollow interior 80 of housing 26 through the opening between the twisted upper right access tab 110 and the non-twisted upper left access tab 110; the view showing at the top side and bottom side of housing 26 a hole 98 in device support 92 for connecting electrical device 12 to housing 26 in line with a second hole 306 that can receive a fastener for attaching a faceplate;

FIG. 72D is a close-up rear perspective view of an extended-length, elongated or "Hi-Box" over-sized electrical junction box system 10 having a housing 26 having an access door 122 connected to the left sidewall 58 by a hinge 46, the view showing the access door 122 in closed position, the view showing a plurality of flexible fingers 152, the view showing the upper right access tab 110 twisted inward toward upon strands 220 so as to allow external wires 34 to pass into the hollow interior 80 of housing 26 through the opening between the twisted upper right access tab 110 and the non-twisted upper left access tab 110; the view showing at the top side and bottom side of housing 26 a hole 98 in device support 92 for connecting electrical device 12 to housing 26 in line with a second hole 306 that can receive a fastener for attaching a faceplate;

FIG. 73A is a top elevation view of a cover 30 for an extended-length, elongated or "Hi-Box" over-sized electrical junction box system 10, the view showing a relief 286 in the front side of the cover 30 and a recess 272 in the rear side of the cover 30;

FIG. 73B is a right side elevation view of a cover 30 for an extended-length, elongated or "Hi-Box" over-sized electrical junction box system 10;

FIG. 73C is a front side elevation view of a cover 30 for a standard-sized or conventionally sized electrical junction box system 10;

FIG. 73D is a left side elevation view of a cover 30 for an extended-length, elongated or "Hi-Box" over-sized electrical junction box system 10;

FIG. 73E is a rear side elevation view of a cover 30 for an extended-length, elongated or "Hi-Box" over-sized electrical junction box system 10;

FIG. 73F is a bottom side elevation view of a cover 30 for an extended-length, elongated or "Hi-Box" over-sized electrical junction box system 10;

FIG. 74A is a front side perspective view of a cover 30 for an extended-length, elongated or "Hi-Box" over-sized electrical junction box system 10;

FIG. 74B is a rear side perspective view of a cover 30 for an extended-length, elongated or "Hi-Box" over-sized electrical junction box system 10;

FIG. 75A is a rear side perspective view of an alternative embodiment of a cover 30 for an extended-length, elongated or "Hi-Box" over-sized electrical junction box system 10, the view showing the cover 30 having four protrusions 296 that extend rearward from the interior surface of the sidewalls, two protrusions 296 on each sidewall, which are configured to friction fit and engage onto housing 26;

FIG. 75B is a top/bottom elevation view of an alternative embodiment of a cover 30 for an extended-length, elongated or "Hi-Box" over-sized electrical junction box system 10, the view showing the cover 30 having four protrusions 296 that extend rearward from the interior surface of the sidewalls, two protrusions 296 on each sidewall, which are configured to friction fit and engage onto housing 26;

FIG. 75C is a rear elevation view of an alternative embodiment of a cover 30 for an extended-length, elongated or "Hi-Box" over-sized electrical junction box system 10, the view showing the cover 30 having four protrusions 296 that extend rearward from the interior surface of the sidewalls, two protrusions 296 on each sidewall, which are configured to friction fit and engage onto housing 26;

FIG. 76A is a front perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing the alignment flange 198 positioned in flush alignment with the front surface of the structure 32; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 76B is a front perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing the alignment flange 198 positioned in flush alignment with the front surface of the structure 32, the view showing an external wire 34 entering the hollow interior 80 of housing 26 through one of the access tabs 110 in the rear side of the housing 26; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 77A is a rear perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tabs 110 in the rear side of the housing 26; the view showing external wires 34 connecting to conductor wires 35 (that are connected to electrical device 12) with electrical connectors 36 which are shown as conventional wire nuts, the view showing portions of the external wires 34 and conductor wires 35 and electrical connectors 36 extending outward through access opening 112;

FIG. 77B is a rear perspective view of an extended-length, elongated or "Hi-Box" over-sized electrical junction box system 10 having a housing 26 having an access door 122 connected to the left sidewall 58 by a hinge 46, the view showing the access door 122 in an open position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tabs 110 in the rear side of the housing 26; the view showing external wires 34 connecting to conductor wires 35 (that are connected to electrical device 12) with electrical connectors 36 which are shown as conventional wire nuts, the view showing the external wires 34 and conductor wires 35 and electrical connectors 36 tucked into the hollow interior 80 of housing 26 in preparation of access door 122 being closed;

FIG. 78A is a rear perspective view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26;

FIG. 78B is a front perspective view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing a cover 30 connected to the front side of the housing 26 by a pair of fasteners 86 thereby covering the electrical device 12 held within the hollow interior 80 of housing 26 and between housing 26 and cover 30;

FIG. 79 is a front perspective exploded view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 about to be connected by a pair of nails 28 to a structure 32 (which is shown as a conventional 2×4), the view showing an external wire 34 about to enter the hollow interior 80 of housing 26 through the upper right access tab 110 in the rear side of the housing 26; the view showing an electrical device 12 (which in this case is a conventional receptacle or plug) about to be installed within the hollow interior 80 of housing 26; the view showing a cover 30 about to be connected to the front side of the housing 26 by a pair of fasteners 86 thereby covering the electrical device 12 held within the hollow interior 80 of housing 26 and between housing 26 and cover 30; the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12;

FIG. 80 is a front perspective view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing a cover 30 connected to the front side of the housing 26 by a pair of fasteners 86 thereby covering the electrical device 12 held within the hollow interior 80 of housing 26 and between housing 26 and cover 30; the view showing the installation of electrical junction box system 10 prior to the installation of drywall 38;

FIG. 81 is a front perspective view of an extended-length, elongated or "Hi-Box" over-sized electrical junction box system 10 having a housing 26 having an access door 122 connected to the left sidewall 58 by a hinge 46, and a cover 30 installed on the front of the housing 26; the view showing drywall 38 installed around the electrical junction box system 10;

FIG. 82 is a rear perspective view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing an external wire 34 entering the hollow interior 80 of housing 26 through the upper right access tab 110 in the rear side of the housing 26; the view showing drywall 38 installed around the electrical junction box system 10;

FIG. 83A is a front perspective view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12; the view showing an electrical device 12 (which in this case is a conventional receptacle or plug) having tabs 102 and ears 230 connected thereto installed within the hollow interior 80 of housing 26; the view showing the rear side of ears 230 engaging the orientation adjustment guides 304 and a fastener 100 passing through tabs 102/ears 230 and into hole 98 in device support 92 thereby affixing electrical device 12 to housing 12, notably, with ears 230 in place and within peripheral edge 70 of housing 26;

FIG. 83B is a close-up front perspective view of an extended-length, elongated or "Hi-Box" over-sized electrical junction box system 10 having a housing 26 having an access door 122 connected to the left sidewall 58 by a hinge 46, the view showing the access door 122 in a closed position, the view showing a plurality of flexible fingers 152, the view showing the housing 26 connected by a pair of nails 28 to a structure 32 (which is shown as a conventional 2×4), the view showing at the top side and bottom side of housing 26 a hole 98 in device support 92 for connecting electrical device 12 to housing 26 in line with a second hole 306 that can receive a fastener for attaching a faceplate; the view also showing a pair of orientation adjustment guides 304 at the top and bottom side of housing 26 for engaging and supporting ears 230 of electrical device 12; the view showing an electrical device 12 (which in this case is a conventional receptacle or plug) having tabs 102 and ears 230 connected thereto installed within the hollow interior 80 of housing 26; the view showing the rear side of ears 230 engaging the orientation adjustment guides 304 and a fastener 100 passing through tabs 102/ears 230 and into hole 98 in device support 92 thereby affixing electrical device 12 to housing 12, notably, with ears 230 in place and within peripheral edge 70 of housing 26;

FIG. 84 is a top elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 85 is a bottom elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 86 is a front elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 87 is a rear elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 88 is a right side elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 89 is a left side elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122; the view showing full access to access opening 112;

FIG. 90 is a front top perspective view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 91 is a rear top perspective view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 at approximately a ninety-degree position, or a fully open position, thereby providing unimpeded access to access opening 122;

FIG. 92 is a front top perspective view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 partially closed;

FIG. 93 is a rear top perspective view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 partially closed;

FIG. 94 is a front top perspective view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 95 is a rear top perspective view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 96A is a rear elevation view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 96B is a close-up rear elevation view of the upper left hand corner of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 96C is a close-up rear elevation view of the lower left hand corner of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 97A is a rear elevation section view of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 97B is a close-up rear elevation section view of the upper left hand corner of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 97C is a close-up rear elevation section view of the lower left hand corner of an alternative arrangement of an electrical junction box system 10 having an access door 122 with a hinge 146 connecting the rear edge 130 of access door 122 adjacent the back side 20 of housing 26 thereby providing a front opening access door 122, the view showing the access door 122 fully closed with connection members 150 of access door 122 fully locked onto connection members 160 of housing 26;

FIG. 98 is a top elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 99 is a bottom elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 100 is a front elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 101 is a rear elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 102 is a right side elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 103 is a left side elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 104 is a front top perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 105A is a rear top perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 105B is a rear top close-up perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a fully closed position;

FIG. 106A is a rear top section view perspective view of FIG. 105A, the view showing a section through connection members 150 of access door 122;

FIG. 106B is a close-up of the upper left corner of FIG. 106A;

FIG. 106C is a close-up of the lower left corner of FIG. 106A;

FIG. 107A is a front top perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a partially opened position;

FIG. 107B is a close-up view of the rear side of access door 122 of FIG. 107A;

FIG. 108A is another angle of a front top perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a partially opened position;

FIG. 108B is a close-up view of the rear side of access door 122 of FIG. 108A;

FIG. 109A is another angle of a front top perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 in a partially opened position;

FIG. 109B is a close-up view of the upper corner of housing 26 and access door 122 of FIG. 109A;

FIG. 109C is a close-up view of the lower corner of housing 26 and access door 122 of FIG. 109A;

FIG. 110 is a top elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 111 is a bottom elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 112 is a front elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 113 is a rear elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 114 is a right side elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 115 is a left side elevation view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 116 is a top front perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 117 is a top rear perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 118A is a top rear perspective view of an alternative arrangement of an electrical junction box system 10 having an access door 122 that is a separate piece that is formed as a separate piece from housing 26, the view showing separate access door 122 having a pair of connection members 308 that are formed of a pair of protrusions positioned at the rear edge 130 of access door 122, the view showing housing 26 having a pair of connection members 310 having openings 312 positioned at the rear side of housing 26, the view showing the protrusions of connection members 308 of separate access door 122 in mating engagement with the openings 312 of connection members 310 of housing 26 thereby connecting the rear edge 130 of access door 122 adjacent the rear side of housing 26, the view showing the front edge 128 of separate access door 122 having connection members 150 that engage to connection members 160 of housing 126 thereby connecting the front edge 128 of access door 122 adjacent the front side of housing 26, the view showing the separate access door 122 removed from the housing 26;

FIG. 118B is a close up view of the upper left front corner of FIG. 118A;

FIG. 118C is a close up view of the lower left front corner of FIG. 118A;

FIG. 118D is a close up view of the upper left rear corner of FIG. 118A;

FIG. 118E is a close up view of the lower left rear corner of FIG. 118A;

FIG. 119 is a top elevation an access door 122 that is a separate piece that is formed as a separate piece from housing 26, the view showing separate access door 122 having a pair of connection members 308 that are formed of a pair of protrusions positioned at the rear edge 130 of access door 122 that engage connection members 310 of housing 26 thereby connecting rear edge 130 of access door 122 to housing 26, the view showing the front edge 128 of separate access door 122 having connection members 150 that engage to connection members 160 of housing 126 thereby connecting the front edge 128 of access door 122 adjacent the front side of housing 26;

FIG. 120 is a bottom side elevation view of the access door 122 shown in FIG. 119;

FIG. 121 is a right side elevation view of the access door 122 shown in FIG. 119 showing the interior surface 134 of access door 122;

FIG. 122 is a left side elevation view of the access door 122 shown in FIG. 119 showing the exterior surface 132 of access door 122;

FIG. 123 is a rear elevation view of the access door 122 shown in FIG. 119;

FIG. 124 is a front elevation view of the access door 122 shown in FIG. 119;

FIG. 125 is a right side perspective view of the access door 122 shown in FIG. 119 showing the interior surface 134 of access door 122;

FIG. 126 is a left side elevation view of the access door 122 shown in FIG. 119 showing the exterior surface 132 of access door 122;

FIG. 127A is a front elevation view of the access door 122 shown in FIG. 119;

FIG. 127B is a close up of the upper side of access door 122 shown in FIG. 127A;

FIG. 127C is a close up of the lower side of access door 122 shown in FIG. 127A.

DETAILED DESCRIPTION

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

The term "electrical junction box" describes any enclosure or partial enclosure housing electrical connections and/or where electrical wires and/or devices are interconnected.

The term "electrical connections" describes any interconnection of one or more electrical wires, cables, or combinations and another wire, cable, outlet, switch, receptacles, plugs, or other connectors.

The term "structure" describes any residential, commercial, business, building, or vehicles, including fixed structures or non-fixed structures (e.g., RVs, trailers, and the like) that have electrical connections and/or interfaces.

Terms characterizing sequential order, a position, and/or an orientation are not limiting and are only referenced according to the views presented.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, sub-combinations, or the like that would be obvious to those skilled in the art.

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

As will be understood, the following description will provide numerous aspects of numerous embodiments. It should be appreciated that any of the aspects of any of the embodiments could be combined with one another, even if not explicitly stated, to create additional embodiments covered by the disclosure.

In general, the disclosure provides numerous variations of apparatus, systems, and/or assemblies for use in the construction industry. More particularly, electrical junction boxes used to house various electrically connected plugs, connectors, outlets, switches, interfaces, and the like (collectively, "electrical devices" or "electrically connected devices", are disclosed. The junction boxes are used as a manner to connect the electrical devices to wires, such as wires coming from electrical panels. For example, one example may be an electrical outlet to receive a plug for providing electricity. The electrical outlet is housed in a junction box and connected, via wires, to an electrical panel in a structure, such as a house or other building. The junction boxes are used for many reasons. Junction boxes protect the electrical connections from the weather, as well as protecting people from accidental electric shocks. In addition, the junction boxes can be used as a bit of protection and location during the construction, remodel, or other building of a structure or portion of a structure. Furthermore, the electrical junction box provides a sheltered open interior that protects the electrical device or components housed within the electrical junction box and prevents in-wall components (such as insulation, other wiring, pipes, and the like) from contacting, compressing or otherwise interfering-with the electrical device or components housed within the electrical junction box. In this way, the rigid electrical junction box serves the purpose of protecting the electrical connections within the electrical junction box and therefore serves as protection against broken electrical connections, shorts, and electrical fires.

As noted herein, the junction boxes are added during the construction in a manner that allows for different workers to perform different steps of the construction process. As will be understood, the embodiments and aspects thereof described herein provide improvements over the use and methods involved with the addition of junction boxes and associated electrical devices, which can aid in improved efficiencies, better adherence to local, regional, national, and/or international codes, standards and best practices, and will mitigate unwanted issues, such as damage, lost junction boxes, issues with subsequent steps of the construction process (e.g., drywall and mudding), and other debris, which can create additional delays or redo's for the process. Said another way, use of the electrical junction boxes presented herein allow for an electrician to essentially complete the electrical installation in a single trip, "one and done," thereby eliminating multiple trips to complete an electrical installation. That is, an electrician can install electrical devices and components and connect them to the electrical panel because the electrical devices and components are protected by the electrical junction box and the attached cover. In this way, the drywallers, painters and other tradesmen cannot damage the electrical devices and components housed within the electrical junction boxes because they are protected. The use of the electrical junction boxes presented herein allows an electrician to test the electrical installation prior to the drywall being installed. This can allow the electrician to determine the root cause of any failure and allows them to correct it prior to drywall installation. This can be a massive time and cost and effort savings as it is far easier to correct electrical problems when all of the electrical devices and components are assessable, as opposed to being buried behind drywall and potentially within insulation. This process could allow for an electrical inspection prior to installation of the drywall, which would be a substantial change, and potential improvement, from the current practices.

Still further, while aspects of the description and/or accompanying figures may be related to certain shapes, sizes, and/or other configurations of junction boxes and associated components (e.g., covers, devices, etc.), these are listed for example purposes and are not to be limiting to the disclosure. For example, while single gang devices and boxes may be shown, it should be appreciated that the disclosures cover, and it is hereby contemplated for use that any number or size of boxes, such as double gang, triple gang, quadruple gang, n-gang (where "n" is any number more than one), as well as other shapes, such as generally any shape of junction box that may be found and/or used in any industry, including, but not limited to circles, ovals, rectangles, squares, or any other geometrical shape used to house an electrical device.

Improved junction boxes and methods of installation are shown and described in U.S. Pat. Nos. 10,862,285 and 11,303,104. Various aspects and/or embodiments of the present disclosure will include variations of that disclosed in the patents, as well as new features not contemplated therein. However, as the written descriptions of the patents (e.g., pages 1-18 of the originally filed application that resulted in the '285 patent) are incorporated by reference herein, it should be appreciated that aspects of the patents can be used to aid in the understanding, as well as to be combined with the improvements disclosed herein to arrive at yet additional embodiments covered by the present disclosure.

System 10:

With reference to the figures, an electrical junction box system 10 (or simply system 10) is presented. Electrical junction box system 10 is formed of any suitable size, shape and design and is configured to house and hold an electrical device 12 and improve the installation process over prior art systems by making the installation process quicker, easier, cleaner with less errors, faults, and issues, with better connections and better alignment and additional protection for the electrical device 12 during the installation process, among many other benefits and improvements.

In the arrangement shown, as one example, housing 26 (or otherwise known as the electrical junction box 26) has a top side 14, a bottom side 16, a front side 18, a back side 20, and a left side 22 and a right side 24.

In the arrangement shown, as one example, electrical junction box system 10 includes and/or is used in association with, a housing 26 (or otherwise known as the electrical junction box 26), nails 28, cover 30, structure(s) 32, external wire(s) 34, conductor wires 35 (also known as "pigtails"), electrical connectors 36, drywall 38, mud 40, paint 42 and a faceplate 44, among other elements, features, objects, devices and systems as is further described and/or shown herein.

Housing 26 (or Otherwise Known as the Electrical Junction Box 26):

In the arrangement shown, as one example, electrical junction box system 10 includes a housing 26 (or otherwise known as the electrical junction box 26). Housing 26 is formed of any suitable size, shape and design and is configured to house and hold an electrical device 12 and improve the installation process over prior art systems by making the installation process quicker, easier, cleaner with less errors, faults and issues, with better connections and better alignment and additional protection for the electrical device 12 during the installation process, among many other benefits and improvements as is described further herein.

In the arrangement shown, as one example, housing 26 is formed of a generally square or rectangular member, however any other size shape and design is hereby contemplated for use.

Top Wall 46: In the arrangement shown, as one example, housing 26 includes a top wall 46. Top wall 46 is formed of any suitable size shape and design and is configured to partially or fully enclose the top side of housing 26 while providing strength and rigidity to housing 26 and protecting electrical device 12 when it is installed within housing 26. In the arrangement shown as one example, top wall 46 has an exterior surface 48 and an opposing interior surface 50.

Bottom Wall 52: In the arrangement shown, as one example, housing 26 includes a bottom wall 52. Bottom wall 52 is formed of any suitable size shape and design and is configured to partially or fully enclose the bottom side of housing 26 while providing strength and rigidity to housing 26 and protecting electrical device 12 when it is installed within housing 26. In the arrangement shown as one example, bottom wall 52 has an exterior surface 54 and an opposing interior surface 56.

Sidewalls 58: In the arrangement shown, as one example, housing 26 includes a pair of opposing sidewalls 58. Sidewalls 58 are formed of any suitable size shape and design and is configured to partially or fully enclose the sides of housing 26 while providing strength and rigidity to housing 26 and protecting electrical device 12 when it is installed within housing 26. In the arrangement shown as one example, sidewalls 58 have an exterior surface 60 and an opposing interior surface 62.

Rear Wall 64: In the arrangement shown, as one example, housing 26 includes a rear wall 64. Rear wall 64 is formed of any suitable size shape and design and is configured to partially or fully enclose the rear side of housing 26 while providing strength and rigidity to housing 26 and protecting electrical device 12 when it is installed within housing 26. In the arrangement shown as one example, rear wall 64 has an exterior surface 66 and an opposing interior surface 68.

Peripheral Edge 70: In the arrangement shown, as one example, housing 26 includes a peripheral edge 70. Peripheral edge 70 is formed of any suitable size shape and design and is configured to form the forward edge of housing 26. In the arrangement shown, as one example, peripheral edge 70 is a generally flat edge that extends around the entire periphery of housing 26. This flat edge formed by peripheral edge 70 allows for flat and flush alignment, or slightly recessed alignment, of the forward most edge of housing (the peripheral edge 70) with the front face or front surface or front edge of drywall 38 during the installation process. In the arrangement shown, as one example, peripheral edged 70 is formed in part at its top side by a termination of the forward end of top wall 46; peripheral edged 70 is formed in part at its bottom side by a termination of the forward end of bottom wall 52; peripheral edged 70 is formed in part at its sides by a termination of the forward end of opposing sidewalls 58. In the arrangement shown, as one example, peripheral edge 70 forms a continuous and seamless flat edge that, when viewed from front side 18 is generally square or rectangular in shape with a generally straight top edge, a generally straight bottom edge and generally straight side edges. Any other size, shape and design is hereby contemplated for use as peripheral edge 70.

In the arrangement shown, as one example, peripheral edge 70, and housing 26 includes an upper left corner 72, which is formed at the intersection of the left side of top wall 46 and the upper end of the left sidewall 58. In the arrangement shown, as one example, peripheral edge 70, and housing 26 includes an upper right corner 74, which is formed at the intersection of the right side of top wall 46 and the upper end of the right sidewall 58. In the arrangement shown, as one example, peripheral edge 70, and housing 26 includes a lower left corner 76, which is formed at the intersection of the left side of bottom wall 52 and the lower end of the left sidewall 58. In the arrangement shown, as one example, peripheral edge 70, and housing 26 includes a lower right corner 78, which is formed at the intersection of the right side of bottom wall 52 and the lower end of the right sidewall 58.

In the arrangement shown, as one example, top wall 46 is formed of a generally flat and planar member that extends from its front edge at peripheral edge 70 rearward before connecting at the upper end of rear wall 64 and extends side-to-side from the upper end of left sidewall 58 at upper left corner 72 to the upper end of right sidewall 58 at upper right corner 72. Although the generally flat and planar member that is top wall 46 includes various features as is further shown and described herein.

In the arrangement shown, as one example, bottom wall 52 is formed of a generally flat and planar member that extends from its front edge at peripheral edge 70 rearward before connecting at the lower end of rear wall 64 and extends side-to-side from the lower end of left sidewall 58 at lower left corner 76 to the lower end of right sidewall 58 at lower right corner 78. Although the generally flat and planar member that is top wall 46 includes various features as is further shown and described herein.

In the arrangement shown, as one example, left sidewall 58 is formed of a generally flat and planar member that extends from its front edge at peripheral edge 70 rearward before connecting at the left end of rear wall 64, and extends vertically from the left end of top wall 46 at upper left corner 72 to the left end of bottom wall 52 at lower left corner 76. Although the generally flat and planar member that is left sidewall 58 includes various features as is further shown and described herein.

In the arrangement shown, as one example, right sidewall 58 is formed of a generally flat and planar member that extends from its front edge at peripheral edge 70 rearward before connecting at the right end of rear wall 64 and extends vertically from the right end of top wall 46 at upper right corner 74 to the right end of bottom wall 52 at lower right corner 78. Although the generally flat and planar member that is right sidewall 58 includes various features as is further shown and described herein.

In the arrangement shown, as one example, top wall 46 and bottom wall 52 extend in generally parallel spaced relation to one another from their forward end, at peripheral edge 70 to their rearward end, at rear wall 64. In the arrangement shown, as one example, opposing sidewalls 58 extend in generally parallel spaced relation to one another from their forward end, at peripheral edge 70 to their rearward end, at rear wall 64. In the arrangement shown, as one example, top wall 46 and bottom wall 52 extend in approximate perpendicular alignment to opposing sidewalls 58. In the arrangement shown, as one example, rear wall 64 extends in approximate perpendicular alignment to top wall 46 and bottom wall 52. In the arrangement shown, as one example, rear wall 64 extends in approximate perpendicular alignment to opposing sidewalls 58. In this way, top wall 46, bottom wall 52, sidewalls 58 and rear wall 64 form a generally square or rectangular member having a hollow interior 80.

While it is stated that top wall 46 and bottom wall 52 extend in approximate parallel spaced relation to one another, and while it is stated that opposing sidewalls 58 extend in approximate parallel spaced relation to one another, for purposes of mold manufacturing, it is hereby contemplated that top wall 46 and bottom wall 52, and opposing sidewalls 58, angle slightly toward one another as they extend from peripheral edge 70 at their front edge, to rear wall 64 at their rear edge. This slight tapering facilitates removal of the housing from the mold during mold manufacturing.

Hollow Interior 80: In the arrangement shown, as one example, housing 26 forms a hollow interior 80. Hollow interior 80 is formed of any suitable size, shape and design and is configured to provide adequate space to house and hold electrical device 12, conductor wires 35 (also known as pigtails) connected to electrical device 12, a portion of external wires 34 and electrical connectors 36 among other items. In the arrangement shown, as one example, hollow interior 80 is defined by peripheral edge 70 and by interior surface 50 of top wall 46, interior surface 56 of bottom wall 52 and interior surfaces 62 of opposing sidewalls 58.

Cover Supports 82: In the arrangement shown, as one example, housing 26 includes one or more cover supports 82. Cover supports 82 are formed of any suitable size, shape and design and are configured to facilitate connection of cover 30 to housing 26. In the arrangement shown, as one example, housing 26 includes a pair of cover supports 82, one positioned in the upper right corner 74 and one positioned in the lower left corner 76. However, any number of cover supports 82 are hereby contemplated for use, such as one, two, three, four or more. As one example, it is contemplated that all four corners, upper left corner 72, upper right corner 74, lower left corner 76 and lower right corner 78, may include a cover support 82. As another example, it is contemplated that the upper left corner 72 and lower right corner 78 include a cover support 82. Any other number of and arrangement of cover supports 82 is hereby contemplated for use.

In the arrangement shown, as one example, cover supports 82 are formed of a mass of material, or shoulder, which extends inward from the interior surface of upper right corner 74 and lower left corner 76 and into hollow interior 80 of housing 26 a distance. In the arrangement shown, as one example, cover supports 82 have an extended front surface area that is flush with the forward edge of peripheral edge 70. In the arrangement shown, as one example, the upper right cover supports 82 has a lower edge that extends approximately horizontally inward into hollow interior 80 approximately perpendicular to the interior surface 62 of right sidewall 58 and another inward edge that extends approximately vertically inward into hollow interior 80 approximately perpendicular to interior surface 50 of top wall 46. In the arrangement shown, as one example, the lower left cover supports 82 has an upper edge that extends approximately horizontally inward into hollow interior 80 approximately perpendicular to the interior surface 62 of left sidewall 58 and another inward edge that extends approximately vertically inward into hollow interior 80 approximately perpendicular to interior surface 56 of bottom wall 52. These edges of cover support 82 connect to one another at a rounded corner positioned at the inward most end of the horizontal edge and vertical edge of cover supports 82. In this way, cover supports 82 are formed of a mass of additional material positioned at upper right corner 74 and lower left corner 76 and form an increased surface area that is flush with the forward edge of peripheral edge 70 which facilitates increased area of connection for mounting or attachment of cover 30 to housing 26.

In the arrangement shown, as one example, cover supports 82 include a hole 84. Hole 84 is formed of any suitable size, shape and design and is configured to receive the shaft of fastener 86 of cover 30, which in the arrangement shown, is a conventional screw. In the arrangement shown, as one example, hole 84 is circular opening that is approximately centrally positioned within cover support 82. In the arrangement shown, as one example, cover 30 is attached to housing 26 by aligning cover 30 with peripheral edge 70 of housing 26 and passing fasteners 86 through cover 30 and into hole 84 of cover support 82 thereby affixing cover 30 to housing 26 in a flat, flush, and secure manner.

In the arrangement shown, as one example, a relief 88 is positioned rearward a distance from cover supports 82. Reliefs 88 are recesses or indentations in the exterior surface of housing 26 rearward a distance from cover supports 82. In the arrangement shown, as one example, reliefs 88 start between approximately ¼ and ½ of the depth of housing 26 and rearward of cover supports 82. In the arrangement shown, as one example, reliefs 88 begin at a vertical wall 90 positioned at a forward most end or relief 88. In the arrangement shown, as one example, hole 84 of cover support 82 extends all the way through housing 26, all the way through cover support 82 and exits wall 90 in a generally perpendicular alignment. That is, the forward end of hole 84 enters into the front face of cover support 82 at peripheral edge 70 and the rearward end of hole 84 exits housing 26 in relief 88. More specifically, hole 84 enters the vertical plane formed by the front surface of cover support 82 in a generally perpendicular manner, and hole 84 exits the vertical plane formed by wall 90 at relief 88 in a generally perpendicular manner. In this way, this positioning of the rearward end of hole 84 within relief 88 allows for the use of any length of fastener 86 without interference.

In the arrangement shown, as one example, housing 26 includes a relief 88 positioned in each corner, upper left corner 72, upper right corner 74, lower left corner 76 and lower right corner 78. However, only the upper right corner 74 and lower left corner 76 include cover supports 82 and only in these corners that include cover supports 82 do holes 84 exit within reliefs 88.

Any other configuration is hereby contemplated for use for cover supports 82 and reliefs 88.

Device Supports 92: In the arrangement shown, as one example, housing 26 includes one or more device supports 92. Device supports 92 are formed of any suitable size, shape and design and are configured to facilitate connection of electrical device 12 to housing 26 as well as support to device 12 once it is connected as well as provide a feature from which adjustment of device 12 may be made. In the arrangement shown, as one example, housing 26 includes a pair of device supports 92.

In the arrangement shown, as one example, housing 26 includes a pair of device supports 92, one approximately centrally positioned in the top all 46 and one approximately centrally positioned in the bottom wall 52. However, any number of device supports 92 are hereby contemplated for use, such as one pair, two pairs, three pairs, four pairs or more. Although it is generally contemplated one pair of device supports 92 are used for each electrical device 12. As such, for a one gang box, which is used to house one electrical device 12, it is generally contemplated that one pair of device supports 92 are present; for a two gang box, which is used to house two electrical devices 12, it is generally contemplated that two pairs of device supports 92 are present; for a three gang box, which is used to house three electrical devices 12, it is generally contemplated that three pairs of device supports 92 are present; for a four gang box, which is used to house four electrical devices 12, it is generally contemplated that four pairs of device supports 92 are present, and so on. Any other number of and arrangement of device supports 92 is hereby contemplated for use.

In the arrangement shown, as one example, device supports 92 are formed of a mass of material, or shoulder, which extends inward from the interior surface of top wall 46 and bottom wall 52 and into hollow interior 80 of housing 26 a distance. In the arrangement shown, as one example, device supports 92 have an extended front surface area that is flush with the forward edge of peripheral edge 70.

In the arrangement shown, as one example, the upper device support 92 is approximately centrally positioned upon top wall 46 and has a pair of opposing sidewalls 94 that extend approximately vertically downward into hollow interior 80 of housing 26 a distance in approximate perpendicular alignment to the interior surface 50 of top wall 46 in approximate parallel space relation to one another. In the arrangement shown, as one example, these sidewalls 94 of device support 92 connect to one another at a rounded corner or end 96 positioned at the inward most end of the sidewalls 94, which in this case is the bottom end of upper device support 92.

In the arrangement shown, as one example, the lower device support 92 is approximately centrally positioned upon bottom wall 52 and has a pair of opposing sidewalls 94 that extend approximately vertically upward into hollow interior 80 of housing 26 a distance in approximate perpendicular alignment to the interior surface 56 of bottom wall 52 in approximate parallel space relation to one another. In the arrangement shown, as one example, these sidewalls 94 of device support 92 connect to one another at a rounded corner or end 96 positioned at the inward most end of the sidewalls 94, which in this case is the upper end of lower device support 92.

In this way, device supports 92 are formed of a mass of additional material positioned at the center of the forward edge of interior side of top wall 46 and at the center of the forward edge of interior side of bottom wall 52 and form an increased surface area that is flush with the forward edge of peripheral edge 70 which facilitates increased area of connection for mounting or attachment of electrical device 12 to housing 26.

In the arrangement shown, as one example, device supports 92 include a hole 98. Hole 98 is formed of any suitable size, shape and design and is configured to receive the shaft of fastener 100 of electrical device 12, which in the arrangement shown, is a conventional screw. In the arrangement shown, as one example, hole 98 is circular opening that is approximately centrally positioned within device support 92. In the arrangement shown, as one example, electrical device 12 is attached to housing 26 by aligning the rearward surface of tabs 102 of electrical device 12 with peripheral edge 70 of housing 26 and passing fasteners 100 through tabs 102 and into hole 98 of device supports 92 thereby affixing electrical device 12 to housing 26 in a flat, flush, and secure manner.

In the arrangement shown, as one example, a relief 104 is positioned rearward a distance from device support 92. Reliefs 104 are recesses or indentations in the rearward side of housing 26 rearward a distance from device supports 92. In the arrangement shown, as one example, reliefs 104 start between approximately ¹⁄₁₀ to ¾ of the depth of housing 26 and rearward of device supports 92. In the arrangement shown, as one example, reliefs 104 begin at a vertical wall 106 positioned at a forward most end or relief 104. In the arrangement shown, as one example, hole 98 of device support 92 extends all the way through housing 26, all the way through device support 92 and exits wall 106 in a generally perpendicular alignment. That is, the forward end of hole 98 enters into the front face of device support 92 at peripheral edge 70 and the rearward end of hole 98 exits housing 26 in relief 104. More specifically, hole 98 enters the vertical plane formed by the front surface of device support 92 in a generally perpendicular manner, and hole 98 exits the vertical plane formed by wall 106 at relief 104 in a generally perpendicular manner. In this way, this positioning of the rearward end of hole 98 within relief 104 allows for the use of any length of fastener 100 without interference.

In the arrangement shown, as one example, the upper relief 104 is positioned further back from the peripheral edge 70 as compared to the lower relief 104. In the arrangement shown, as one example, upper relief 104 is a recess or indentation that extends forward into a partial rear wall 108 that is positioned between opposing sidewalls 58 forward a distance from rear wall 64 and positioned just above upper access tabs 110. In the arrangement shown, the upper partial rear wall 108 terminates at its upper end adjacent the rearward end of top wall 46 and terminates at its lower end adjacent the forward upper end of upper access tabs 110. In the arrangement shown, upper partial rear wall 108 terminates at its sides adjacent or opposite reliefs 88.

In the arrangement shown, as one example, the lower relief 104 is positioned further forward from the peripheral edge 70 as compared to the upper relief 104. In the arrangement shown, as one example, lower relief 104 is a recess or indentation that extends forward into lower partial rear wall 108 that is positioned between opposing sidewalls 58 forward a distance from rear wall 64 and positioned just below lower access tabs 110. In the arrangement shown, the lower partial rear wall 108 terminates at its lower end adjacent the rearward end of bottom wall 52 and terminates at its upper end adjacent the forward lower end of lower access tabs 110. In the arrangement shown, lower partial rear wall 108 terminates at its sides adjacent or opposite reliefs 88.

In the arrangement shown, as one example, the lower positioned relief 104 is substantially longer than upper positioned relief 104, or, said another way, lower positioned relief 104 extends substantially farther forward as compared to the upper positioned relief 104. In the arrangement shown, the upper positioned relief 104 is a recess into partial rear wall 108 and is covered by a portion of top wall 46 whereas the lower end of the lower positioned relief 104 is open and thereby forms a groove or slot into bottom wall 52 between the lower positioned partial rear wall 108 and the lower positioned wall 106.

Any other configuration is hereby contemplated for use for device supports 92, reliefs 104 and partial rear wall 108.

Access Opening 112: In the arrangement shown, as one example, housing 26 includes an access opening 112. Access opening 112 is formed of any suitable size, shape and design and is configured to provide a convenient opening of sufficient size that provides access into the hollow interior 80 of housing 26. That is, access opening 112 is configured to be of substantial enough size and shape: to allow a user's fingers or at least tools to pull the free ends of conductor wires 35 (pigtails) out of the hollow interior 80 of housing 26; to facilitate and ease the insertion of external wires 34 into hollow interior 80; to facilitate and ease the retrieval of the free end of external wires 34 out of hollow interior 80; to facilitate the insertion of the free end of conductor wires 35 (pigtails) and the free end of external wires 34 after they have been electrically connected to one another with electrical connectors 36, among other features and purposes.

In the arrangement shown, as one example, access opening 112 is positioned in left sidewall 58, however it is contemplated that access opening 112 may be positioned in the right sidewall 58, top wall 46, bottom wall 52 and/or any other portion of housing 26 or combination thereof.

In the arrangement shown, as one example, access opening 112 is formed of a generally square or rectangular shaped opening having a top edge 114, a bottom edge 116, a front edge 118 and a rear edge 120, however any other size, shape and design is hereby contemplated for use. In the arrangement shown, as one example, top edge 114 is a generally flat and straight edge that connects at its forward end to the upper end of front edge 118 and connects at its rearward end to the upper end of rear edge 120. In the arrangement shown, as one example, bottom edge 116 is a generally flat and straight edge that connects at its forward end to the lower end of front edge 118 and connects at its rearward end to the lower end of rear edge 120. In the arrangement shown, as one example, front edge 118 is a generally flat and straight edge that connects at its upper end to the forward end of top edge 114 and connects at its lower end to the forward end of bottom edge 116. In the arrangement shown, as one example, rear edge 120 is a generally flat and straight edge that connects at its upper end to the rearward end of top edge 114 and connects at its lower end to the rearward end of bottom edge 116. In the arrangement shown, as one example, top edge 114 and bottom edge 116 extend in a generally straight and horizontal manner, whereas front edge 118 and rear edge 120 extend in a generally straight and vertical manner. In this way, top edge 114, bottom edge 116, front edge 118 and rear edge 120 form a generally square or rectangular opening through sidewall 58.

In the arrangement shown, as one example, top edge 114 and bottom edge 116 taper inward toward one another a slight amount or angle as they extend forward from rear edge 120 toward front edge 118. This tapering makes front edge 118 slightly shorter than rear edge 120. Or, said another way, the forward end of access opening 112 is slightly smaller than the rearward end of access opening 112.

In the arrangement shown, as one example, top edge 114 is positioned in sidewall 58 a distance below the bottom outside edge of relief 88. Similarly, in the arrangement shown, as one example, bottom edge 116 is positioned in sidewall 58 a distance above the upper outside edge of relief 88. In the arrangement shown, as one example, front edge 118 is positioned in sidewall 58 a distance rearward of peripheral edge 70. In the arrangement shown, as one example, rear edge 120 is positioned at the side of rear wall 64. However, any other size, shape, design, or positioning is hereby contemplated for use.

In this way, top edge 114, bottom edge 116, front edge 118 and rear edge 120 form a completely open and unobstructed opening into hollow interior 80 of sufficient size and shape that forms access opening 112 that provides functional access into hollow interior 80 of housing 26. However, any other size, shape, design, or positioning of access opening 112 and its top edge 114, bottom edge 116, front edge 118 and rear edge 120 is hereby contemplated for use.

Access Door 122: In the arrangement shown, as one example, housing 26 includes an access door 122. Access door 122 is formed of any suitable size, shape and design and is configured to move between an open position and a closed position and selectively cover and selectively uncover access opening 112. In one arrangement, access door 122 is similarly sized and shaped to the size and shape of access opening 112 such that access door 122 covers access opening 112 when access door 122 in a closed position.

In the arrangement shown, as one example, access door 122 is positioned in left sidewall 58, as is access opening 112, however it is contemplated that access door 122 may be positioned in the right sidewall 58, top wall 46, bottom wall 52 or any other portion of housing 26 or combination thereof, and/or wherever access opening 112 is positioned.

In the arrangement shown, as one example, access door 122 is formed of a generally square or rectangular shaped member having a top edge 124, a bottom edge 126, a front edge 128 and a rear edge 130, however any other size, shape and design is hereby contemplated for use. In the arrangement shown, as one example, top edge 124 is a generally flat and straight edge that connects at its forward end to the upper end of front edge 128 and connects at its rearward end to the upper end of rear edge 130. In the arrangement shown, as one example, bottom edge 126 is a generally flat and straight edge that connects at its forward end to the lower end of front edge 128 and connects at its rearward end to the lower end of rear edge 130. In the arrangement shown, as one example, front edge 128 is a generally flat and straight edge that connects at its upper end to the forward end of top edge 124 and connects at its lower end to the forward end of bottom edge 126. In the arrangement shown, as one example, rear edge 130 is a generally flat and straight edge that connects at its upper end to the rearward end of top edge 124 and connects at its lower end to the rearward end of bottom edge 126. In the arrangement shown, as one example, top edge 124 and bottom edge 126 extend in a generally straight and horizontal manner, whereas front edge 128 and rear edge 130 extend in a generally straight and vertical manner. In this way, top edge 124, bottom edge 126, front edge 128 and rear edge 130 form a generally square or rectangular member.

In the arrangement shown, as one example, top edge 124 is positioned adjacent sidewall 58 a distance below the bottom outside edge of relief 88. Similarly, in the arrangement shown, as one example, bottom edge 126 is positioned adjacent sidewall 58 a distance above the upper outside edge of relief 88. In the arrangement shown, as one example, front edge 128 is positioned adjacent sidewall 58 a distance rearward of peripheral edge 70. In the arrangement shown, as one example, rear edge 130 is positioned adjacent or just past rear wall 64 when access door 122 is in a closed position.

In the arrangement shown, as one example, access door 122 has an exterior surface 132 opposite an interior surface 134. In the arrangement shown, as one example, exterior surface 132 is generally flat and straight and extends from top edge 124 to bottom edge 126 and from front edge 128 to rear edge 130 on the exterior side of access door 122. Similarly, in the arrangement shown, as one example, interior surface 134 is generally flat and straight and extends from top edge 124 to bottom edge 126 and from front edge 128 to rear edge 130 on the interior side of access door 122.

In the arrangement shown, as one example, a plurality of structural features 136 are positioned in the interior surface 134 of access door 122. Structural features 136 are formed of any suitable size, shape and design and are configured to provide additional strength and rigidity to access door 122 as well as to provide alignment for access door 122 when moving to and/or in the closed position. In the arrangement shown, as one example, structural features 136 are elongated rectangular protrusions that extend inward, perpendicular to the interior surface 134 of access door 122. In the arrangement shown, as one example, structural features 136 include a forward member 138, a rearward member 140, a top member 142 and a bottom member 144.

In the arrangement shown, as one example, forward member 138 extends generally vertically across a portion of interior surface 134 of access door 122 a distance rearward of front edge 128 of access door 122. In the arrangement shown, as one example, forward member 138 connects at its upper end to the forward end of top member 142 and connects at its lower end to the forward end of bottom member 144.

In the arrangement shown, as one example, rearward member 140 extends generally vertically across a portion of interior surface 134 of access door 122 a distance forward of rear edge 130 of access door 122. In the arrangement shown, as one example, rearward member 140 connects at its upper end to top member 142 a distance forward from the rearward end of top member 142 and connects at its lower end to bottom member 144 a distance forward from the rearward end of bottom member 144.

In the arrangement shown, as one example, top member 142 extends generally horizontally across a portion of interior surface 134 of access door 122 a distance below top edge 124 of access door 122. In the arrangement shown, as one example, top member 142 connects at its forward end to the upper end of forward member 138 and connects to rearward member 140 a distance forward of rear edge 130 of access door 122 before terminating adjacent rear edge 130 of access door 122.

In the arrangement shown, as one example, bottom member 144 extends generally horizontally across a portion of interior surface 134 of access door 122 a distance above bottom edge 126 of access door 122. In the arrangement shown, as one example, bottom member 144 connects at its forward end to the lower end of forward member 138 and connects to rearward member 140 a distance forward of rear edge 130 of access door 122 before terminating adjacent rear edge 130 of access door 122.

In the arrangement shown, as one example, the size and shape of forward member 138, top member 142 and bottom member 144 of structural features 136 mimic the size and shape of access opening 112 and as such, when access door 122 is in a closed position, the exterior edges forward member 138, top member 142 and bottom member 144 are positioned just inward of front edge 118, top edge 114 and bottom edge 116 of access opening 112. In this way, structural features 136 provide additional strength to access door 122 as well as improved alignment when closing access door 122 over access opening 112 as well as improved strength of close when access door 122 is closed over access opening 112, among other features and benefits.

Notably, in the arrangement shown, wherein access opening 112 narrows slightly as it extends forward from rear edge 120 to front edge 118, top member 142 and bottom member 144 of structural features 136 similarly angle inward as they extend forward to mimic the size and shape of access opening 112.

In the arrangement shown, as one example access door 122 is connected to housing 26 by a hinge 146. Hinge 146 is formed of any suitable size, shape and design and is configured to connect access door 122 to housing 126 while facilitating movement of access door 122 between an open position and a closed position.

In the arrangement shown, as one example, hinge 146 is positioned adjacent front edge 128 of access door 122, however any other position is hereby contemplated for use such as rear edge 130, top edge 124, bottom edge 126 or any other position on access door 122 and/or housing 126.

In the arrangement shown, as one example, hinge 146 connects front edge 128 of access door 122 to the left sidewall 58 of housing 26 a distance rearward of peripheral edge 70. In the arrangement shown, as one example, hinge 146 extends generally vertically along exterior surface 60 of sidewall 59, however any other size, shape, design, or position is hereby contemplated for use.

In the arrangement shown, as one example, hinge 146 extends the entire height of access door 122 along front edge 128 from top edge 124 to bottom edge 126, although it is hereby contemplated that hinge 146 may only extend a portion of the length of access door 122.

In the arrangement shown, as one example, hinge 146 is what is known as a living hinge. A living hinge, or integral hinge is a thin flexible hinge (flexure bearing) made from the same material as the two rigid pieces it connects, which in this case is sidewall 58/housing 26 and access door 122. A living hinge provides the benefit that hinge 146 may be formed at the same time access door 122 and housing 26 are formed, through a molding process. This eliminates an additional manufacturing step and eliminates additional parts and additional assembly steps. In addition, one of the benefits of a living hinge is that is more than functional for the number intended uses, or the number of intended openings and closings access door 122 is intended to perform when appropriate engineering considerations are made and addressed. Furthermore, a living hinge used as hinge 146 is strong, secure, will not separate or come apart under normal conditions, requires no additional assembly, is easy to use, is effective and is low-profile and does not get in the way during use of system 10. Furthermore, a living hinge used as hinge 146 makes it easy to open and close access door 122.

However, any other form of a hinge is hereby contemplated for use such as: a barrel hinge, butt hinge, spring-loaded hinge, concealed hinge, overlay hinge, strap hinge, gate hinge, ball bearing hinge, offset hinge, scissor hinge, continuous hinge, double-action spring hinge, knuckle hinge, flange hinge, slip joint hinge, strap hinge, stop hinge, T-hinge, or any other type of hinge and/or combination thereof. Any other structure, manner, method, device, or system is hereby contemplated for use for connecting access door 122 to sidewall 58 and/or housing 26.

As one example alternative arrangement, it is hereby contemplated that access door 122 is connected to sidewall 58 and/or housing 26 by way of one or more fingers that extend into hollow interior 80 and engage and friction-fit onto one or more edges of access opening 112 such as top edge 114, bottom edge 116, front edge 118 and/or rear edge 120 (in much the same way an alternative embodiment of cover 30 is presented with respect to FIGS. 16A, 16B, and 16C) and all teaching provided with respect to that embodiment is hereby incorporated into and applies to this embodiment of connecting access door 122 to sidewall 58 and/or housing 26, unless stated otherwise.

As another example alternative arrangement, it is hereby contemplated that access door 122 is connected to sidewall 58 and/or housing 26 by way of one or more fasteners, such as conventional screws, bolts, rivets, friction-fit members, or the like that extend through a hole in the material of access door 122 and through a hole in the sidewall 58 and/or housing 26 thereby fastening access door 122 to sidewall 58 and/or housing 26 (in much the same way cover 30 is attached to housing 16 and all teaching provided with respect to that embodiment is hereby incorporated into and applies to this embodiment of connecting access door 122 to sidewall 58 and/or housing 26, unless stated otherwise.

In the arrangement shown, as one example access door 122 includes wrap-around section 148. Wrap around section 148 is formed of any suitable size, shape and design and is configured enclose the rearward end of access opening 112 and facilitate selective opening and closing of access door 122 to housing 126.

In the arrangement shown, as one example, wrap-around section 148 is positioned adjacent rear edge 130 of access door 122, however any other position is hereby contemplated for use.

In the arrangement shown, as one example, wrap-around section 148 extends generally perpendicularly inward from rear edge 130 of access door 122 such that when access door 122 is in a closed position, the interior surface of wrap-around section 148 extends in approximate parallel spaced alignment to the exterior surface 66 of rear wall 64 of housing 26. In this way, when access door 122 is in a closed position, wrap-around section 148 provides an overlapping layer of material that encloses the rearward end of access opening 112 thereby providing additional protection, coverage, and security to the contents of hollow interior 80 of housing 26.

In the arrangement shown, as one example, rear edge 130 of access door 122 and wrap-around section 148 include a pair of connection members 150 and a plurality of fingers 152.

In the arrangement shown, as one example, connection members 150 are formed of any suitable size, shape and design and are configured to facilitate selective locking of access door 122 in a closed position, and selective unlocking of access door 122 so that it may be opened. In the arrangement shown, as one example, a connection member 150 is positioned at the upper side of the rearward end of access door 122 and a connection member 150 is positioned at the lower side of the rearward end of access door 122. However, additional connection members 150 are hereby contemplated for use.

In the arrangement shown, as one example, connection members 150 include an opening 153 having opposed upper and lower edges 154, a forward edge 156 and a rearward edge 158. In the arrangement shown, as one example, opening 153 and opposing upper and lower edges 154 extend around the corner of wrap-around section 148 of access door 122 with forward edge 156 positioned in the primary plane or section of access door 122 and rear edge 156 being positioned in the wrap-around section 148, or secondary plane or section of access door 122. In this way, the planes formed by forward edge 158 and rearward edge 158 are positioned approximately perpendicular to one another. In this way, opening 153 is generally L-shaped in nature. In the arrangement shown, as one example, forward edge 156 of opening 153 forms a plane that is approximately perpendicular to the plane formed by exterior surface 132 and interior surface 134 of access door 122. In the arrangement shown, as one example, rearward edge 158 of opening 153 forms a plane that is approximately parallel to the plane formed by exterior surface 132 and interior surface 134 of access door 122. However, any other size, shape and design is hereby contemplated for use. In the arrangement shown, as one example, connection members 150 of access door 122 are configured to engage connection members 160 of rear wall 64 of housing 26.

In the arrangement shown, as one example, connection members 150 of access door 122 are configured to engage and lock onto connection members 160 of housing 26 when access door 122 is moved to a closed position, in this way the mating engagement of connection members 150 of access door 122 and connection members 160 of housing 26 lock access door 122 in a closed position. In the arrangement shown, as one example, connection members 150 of access door 122 are configured to be selectively disengage from connection members 160 of housing 26 by prying, pushing, pulling, bending and/or moving connection members 150 of access door 122 away from connection members 160 of housing 26 thereby breaking their mating engagement and allowing access door 122 to be moved to an open position thereby providing access to access opening 112 and hollow interior 80 of housing 26. In the arrangement shown, once the user is done accessing hollow interior 80 of housing 26, the user may simply move access door 122 to the closed position with sufficient force connection members 150 of access door 122 automatically engage connection members 160 of housing 26 and lock access door 122 in a closed position.

Connection Members 160 (of Housing 26): In the arrangement shown, as one example, housing 26 includes a pair of connection members 160. In the arrangement shown, as one example, connection members 160 are formed of any suitable size, shape and design and are configured to facilitate locking of access door 122 in a closed position and unlocking of access door 122 so that it may be opened.

In the arrangement shown, as one example, a connection member 160 is positioned at the upper outward corner of rear wall 64 of housing 26, adjacent access opening 112, and a connection member 160 is positioned at the lower outward corner of rear wall 64 of housing 26, adjacent access opening 112. However, additional connection members 160 are hereby contemplated for use. In the arrangement shown, as one example the upper In the arrangement shown, as one example, connection members 160 include opposing upper and lower edges 162 that extend in approximate parallel spaced relation to one another. In the arrangement shown, as one example, connection members 160 include a forward edge 164 and an opposing rearward edge 166, that extend in approximate parallel spaced relation to one another. In the arrangement shown, as one example, forward edge 164 of connection members 160 is positioned adjacent the rearward corners of access opening 112 at the intersection of exterior surface 60 of sidewall 58 and exterior surface 66 of rear wall 64 whereas rearward edge 166 of connection members 160 are positioned a distance inward from the outward edge of rear wall 64. In the arrangement shown, as one example, rearward edge 166 of connection members 160 extends outward and rearward from rear wall 64 a distance in a plane that is approximately perpendicular to the plane formed by exterior surface 66 of rear wall 64. In the arrangement shown, as one example, the plane formed the exterior surface 168 of connection members 160 angles from rearward edge 166, which is positioned a distance away from and rearward from rear wall 64, forward toward rear wall 64 before terminating at forward edge 164. In this way, connection members 160 ramp rearward from forward edge 164 to rearward edge 166 at which point rearward edge 166 forms a flat and perpendicular edge.

In the arrangement shown, as one example, as access door 122 is closed, connection members 150 of access door 122 engage connection members 150 of housing 26, or more specifically, the opening 153 of connection members 150 receives the angled member that is connection members 160. As access door 122 is moved further toward the closed position, connection members 150 of access door 122 slide upward along the ramping exterior surface 168 of connection members 160 as they slide from forward edge 164 toward rearward edge 166. As access door 122 is moved toward the closed position, the 90-degree wrap-around section 148 of access door 122 stretches or flexes slightly, with increasing engagement pressure as access door 122 is moved further toward the closed position. This increasing engagement pressure and flexion of wrap-around section 148 continues until rearward edge 158 of connection members 150 passes rearward edge 166 of connection members 160 at which point the spring-loaded bias of wrap-around section 148 is relieved and rearward edge 158 of connection members 150 slides toward rear wall 64 upon rearward edge 166 of connection members 160. In this closed position, rearward edge 158 of connection members 150 are positioned in approximate parallel flush engagement with rearward edge 166 of connection members 160 thereby locking access door 122 in a closed position. In this position, the angled connection members 160 are fully received within and held within openings 153 of connection members 150.

In this position, access door 122 will remain in a closed position and will not and cannot be unintentionally opened. Access door 122 will remain in the closed position until a user applies a bias force to pry, push, pull, bend and/or move rearward edge 158 of connection members 150 of access door 122 rearward past the rearward edge of rearward edge 166 of connection members 160 of housing 26 thereby breaking their mating engagement and allowing access door 122 to be rotated upon hinge 146 and moved to an open position thereby providing access to access opening 112 and hollow interior 80 of housing 26.

In the arrangement shown, as one example, access door 122 includes one or more fingers 152 positioned between connection members 150.

Fingers 152: In the arrangement shown, as one example, access door 122 includes one or more fingers 152. Fingers 152 are formed of any suitable size, shape and design and are configured to both enclose access opening 112 when access door 122 is in a closed position while also providing a flexible access for external wire(s) 34 to enter and/or exit hollow interior 80 of housing 26 when desired thereby providing a new and additional egress into and out of hollow interior 80 of housing 26 that never before existed in the art of electrical junction boxes. However, any other size, shape or design is hereby contemplated for use.

In the arrangement shown, as one example, fingers 152 are positioned in the rear edge 130 of access door 122. However, any other position of fingers 152 is hereby contemplated for use including fingers 152 being positioned in the top edge 124 of access door 122, the bottom edge 126 of access door 122, the front edge 128 of access door 122, or any combination of the front edge 128, rear edge 130, top edge 124 and/or bottom edge 126.

One of the benefits of having fingers 152 positioned in top edge 124 or bottom edge 126 of access door 122 is that this provides additional space for external wires 34 to enter and exit hollow interior 80 of housing 26 as opposed to fingers 152 being positioned in the rear edge 130 of access door 122 because in some construction applications, rear edge 130 may be close to drywall or other building components when housing 26 is installed and external wires 34 may not have room to enter and exit housing 26 the back side 20 of electrical junction box system 10. Another benefit of having fingers 152 positioned in top edge 124 or bottom edge 126 of access door 122 is that if external wires 34 extend out the back side 20 of housing 26 external wires 34 may not pass code because they are too close to the interior side of drywall 38 making them exposed to being punctured or shorted if anything were to go through the drywall 38 such as a nail or screw.

In the arrangement shown, as one example, fingers 152 include opposing top and bottom edges 170 that extend in approximate parallel spaced relation to one another. In the arrangement shown, as one example, fingers 152 include a forward edge 172 and a rearward edge 174. In the arrangement shown, as one example, fingers 152 include a hinge 176 positioned at the forward edge 172 of fingers 152.

Hinge 176 is formed of any suitable size shape and design and is configured to provide movement of fingers 152 between a closed position, wherein fingers 152 are in plane and in line with the plane formed by access door 122, and an open position, wherein fingers 152 are flexed or bent away and outward from the plane formed by access door 122 thereby providing room for external wires 34 to access hollow interior 80 of housing 26. In the arrangement shown, as one example, hinge 176 is a living hinge much like that taught herein as hinge 146 of access door 122 and therefore all disclosure and teaching related to hinge 146 of access door 122 is hereby incorporated into and applies equally to hinge 176 of fingers 152, including all alternatives and other disclosure, unless stated otherwise. That is, hinge 176 of fingers 152 is shown as a living hinge that extends vertically at the forward edge 172 of fingers 152 thereby connecting fingers 152 to access door 122 however any other position for hinge 152 is hereby contemplated for use as is any other type of hinge such as a barrel hinge or any other type of hinge is hereby contemplated for use.

In the arrangement shown, as one example, fingers 172 are an integral part of access door 122 and thereby include a portion that is in line and in plane with exterior surface 132/interior surface 134 of access door 122 and include a portion that is in line and in plane with wrap-around section 148 of access door 122. In this way, unless fingers 152 are bent out of plane with access door 122 (to allow entry and/or exit of external wires 34 into hollow interior 80 of housing 26) fingers 152 enclose and cover access opening 112 when access door 122 is in a closed position. That is, when access door 122 is in a closed position, and fingers 172 are in a closed position, wrap around section 148 of fingers 152 extend rearward of and wrap around the outward edge of rear wall 64 of housing 26 much like the wrap around section of connection members 150. Similarly, in this way, when access door 122 is moved to an open position, so too moves fingers 152 thereby providing uninterrupted access to hollow interior 80 of housing 26 when access door 122 is in an open position.

In the arrangement shown, as one example, three fingers 152 are shown positioned in access door 122. These fingers 152 are shown positioned within and between connection members 150. In this way, when access door 122 is moved to a closed position, connection members 150 hold access door 122 in a closed position at the upper and lower, or outward edges, of access door 122. In this way, fingers 152 are positioned in a secure position between connection members 150. This secure position of fingers 152, between an upper-positioned and a lower-positioned connection member 150 ensures that when access door 122 is moved to a closed position, access door 122 is securely held in place even if external wires 34 project out of one or more fingers 152.

In the arrangement shown, as one example, fingers 152 and access door 122 may be used to facilitate the entry/exit of a single external wire 34 which may enter/exit the top-positioned finger 152, the bottom-positioned finger 152 or the middle-positioned finger 152 or any combination of the top, bottom, or middle-positioned finger 152. Similarly, in the arrangement shown, as one example, fingers 152 and access door 122 may be used to facilitate the entry/exit of a two external wire 34 which may enter/exit the same top-positioned finger 152, the same bottom-positioned finger 152, the same middle-positioned finger 152; or the two external wires 34 may enter/exit a combination of the top-positioned finger 152 and the bottom-positioned finger 152, or the top-positioned finger 152 and the middle-positioned finger 152, or the bottom-positioned finger 152 and the middle-positioned finger 152 or any other combination of the top, bottom or middle-positioned finger 152 may be used for any purposes.

However, any other size, shape and design and configuration is hereby contemplated for use for fingers 152.

Nail Ports 178: In the arrangement shown, as one example, electrical junction box system 10 includes one or more nail ports 178. Nail ports 178 are formed of any suitable size, shape and design and are configured to facilitate connection of nails 28 to housing 26.

In the arrangement shown, as one example, a nail port 178 is positioned on the exterior surface 48 of top wall 46 and a nail port 178 is positioned on the exterior surface 54 of bottom wall 52 of housing 26, however any other placement of nail ports 178 and/or configuration is hereby contemplated for use as is any other number of nail ports 178 such as one, two, three, four, five, six, seven, eight, nine, ten or more. In the arrangement shown, as one example, nail port 178 on top wall 46 and nail port 178 on bottom wall 52 are mirror images of one another, with nail port 178 on top wall 46 facing upward and nail port 178 on bottom wall 52 facing downward. However, any other configuration is hereby contemplated for use.

In the arrangement shown, as one example, nail ports 178 are formed of two pairs of flanges 180, a forward-facing flange 182 adjacent a rear-facing flange 184. In the arrangement shown as one example, flanges 180 rise up and outward of housing 26 with an exterior surface 186 that extends at an angle to the plane formed by top wall 46 or bottom wall 52. In the arrangement shown, as one example, exterior surface 186 of flanges 180 are generally flat and planar and extends at an angle to the plane of housing 26 that it rises out. In the arrangement shown, as one example, interior surface 188 of flanges 180 are curved or concave in shape so as to receive the rounded shaft 190 of nails 28 held within flanges 180. In the arrangement shown, as one example, adjacent forward-facing flanges 180 and rear-facing flanges 184 form a generally cylindrical opening 192 when flanges 180 are viewed from the side. This cylindrical opening 192 of nail ports 178 are configured to receive and hold the shaft 190 of nails 28 under frictional engagement. Care is taken to properly size and shape flanges 180 so as to provide adequate frictional engagement on shaft 190 of nails 28 to hold nails 28 in place, while allowing shaft 190 to slid through cylindrical opening 192 when electrical junction box system 10 is installed (generally by way of hammering in nails 28).

In the arrangement shown, as one example, a pair of flanges 180 is positioned toward each outward side of housing 26. In the arrangement shown, as one example, a space is positioned at the middle of housing 26 between the pairs of flanges 180. In the arrangement shown, as one example, the outward positioned flange 180 is a forward-facing flange 182 and the inward positioned flange 180 is a rear-facing flange 184.

In the arrangement shown, as one example, nail ports 178 are positioned at an angle relative to the front side 18 and back side 20 of electrical junction box system 10. That is, nail ports 178, and nail 28 held within nail ports 178 angle slightly from the front side 18 to the back side 20. This slight angle eases installation as it is easier to hammer in nail 28 when it is at a slight angle. In the arrangement shown, as one example, nail ports 178 are configured to receive the head 194 of nail 28 at the left side of housing 26 and the tip 196 of nail 28 at the right side of housing 26, however the inverse is hereby contemplated for use as is an arrangement where nail ports 178 hold nails 28 at a generally perpendicular angle to housing 26.

However, any other size, shape or design is hereby contemplated for use for nail ports 178.

Alignment Flange 198: In the arrangement shown, as one example, electrical junction box system 10 includes an alignment flange 198. Alignment flange 198 formed of any suitable size, shape and design and is configured to facilitate connection and alignment of housing 26 to structure 32, such as a 2×4 or 2×6 conventionally used in construction.

In the arrangement shown, as one example, alignment flange 198 is positioned on the right-side of housing 26 (although the opposite left-side is hereby contemplated for use as well) and extends approximately perpendicularly outward from the exterior surface 60 of sidewall 58. In the arrangement shown, as one example, alignment flange 198 is a generally flat and planar member having a generally flat front-facing surface 200 and a generally flat rear-facing surface 202 that extend in approximate parallel spaced alignment to one another. In the arrangement shown, as one example, alignment flange 198 extends form an inward edge 204, that connects to sidewall 58, and an outward edge 206 that terminates as a free end. In the arrangement shown, as one example, alignment flange 198 extends from an upper edge 208 to a lower edge 210. In the arrangement shown, as one example, upper edge 208 and lower edge 210 angle slightly inward toward one another as they extend from inward edge 204 to outward edge 206 thereby making outward edge 206 slightly smaller than inward edge 204.

In the arrangement shown, as one example, alignment flange 198 includes a plurality of openings 212. In the arrangement shown, as one example, openings 212 are generally circular holes in alignment flange 198 that have a counter-sunk profile that are configured to allow the shaft of a screw or nail to pass therethrough while retaining the head of the nail or screw. In the arrangement shown, as one example, three openings 212 are positioned in alignment flange 198, a centrally positioned opening 212 and an upper and lower positioned opening, however any number of openings 212 and any placement of openings 212 are hereby contemplated for use.

In the arrangement shown, as one example, when housing 26 is viewed from above or below, alignment flange 198 is positioned a distance rearward from the front peripheral edge 70. This distance is approximately the distance or thickness of drywall 38. As such, by attaching alignment flange 198 to the front racing edge of structure 32, when drywall 38 is installed around housing 26, the front peripheral edge 70 of housing 26 is positioned in perfect alignment to the exterior surface of drywall 38.

When installing electrical junction box system 10, a user may use nails 28 held in nail ports 178 or they may use nails or screws to attach alignment flange 198 to structure 32, or a combination of both nails 28 in nail ports 178 and screws or nails in alignment flange 198 may be used for extra strength of attachment.

Irrespective of whether screws or nails are used to attach alignment flange 198 to structure 32, a user aligns the rear-facing surface 202 of alignment flange 198 on the forward facing surface of structure 32. This alignment positions the peripheral edge 70 at the appropriate distance forward of the forward facing surface of structure 32 to accommodate for the added thickness of drywall 38. Once in this position, the user may nail in nails 28 held by nail ports 178. Once nails 28 are nailed into structure 32, housing 26 is held in place and additional nails or screws can be inserted through openings 212 in alignment flange 198 if desired.

If alignment flange 198 is not desired, a user may remove alignment flange 198 by merely applying a pair of plyers to alignment flange and bending alignment flange 198 forward and backward which will cause alignment flange 198 to break off adjacent inward edge 204 thereby leaving a generally flat and flush exterior surface 60 of sidewall 58 for flush mount applications or other applications where alignment flange 198 is not desired.

Any other size, shape or design is hereby contemplated for use for alignment flange 198.

Access Tabs 110: In the arrangement shown, as one example, electrical junction box system 10 includes a plurality of access tabs 110. Access tabs 110 are formed of any suitable size, shape and design and is configured to facilitate entry and/or exit of external wires 34 into and/or out of hollow interior 80 of housing 26 in a flexible, efficient, fast, easy, and convenient manner.

In the arrangement shown, as one example, a pair of access tabs 110 are generally flat and planar members having an exterior surface 214 and an exterior surface 216 that extend in approximate parallel spaced relation to one another. In the arrangement shown, as one example, while generally planar in shape, access tabs 110 include a curved section 218 at their rearward most end and/or their inward most end.

In the arrangement shown, as one example, a pair of access tabs 110 are positioned at the upper and rearward section of housing 26, and a pair of access tabs 110 are positioned at the lower and rearward section of housing 26. In the arrangement shown, as one example, access tabs are positioned adjacent one another in a pair without any intervening components, members or other objects or things between adjacent access tabs 110. This adjacent relationship without any intervening components, members or other objects or things allows for increased flexibility of use as the pairs of access tabs 110 may be take on a plurality of configurations. These configurations include:

Fully closed—wherein both adjacent access tabs 110 are in their original state and that is fully attached, parallel and adjacent to one another thereby enclosing the opening they cover.

Fully opened—wherein both adjacent access tabs 110 are fully removed thereby removing them from housing 26 and providing an uninhibited opening where adjacent access tabs 110 were originally present, this provides access into and out of hollow interior 80 of housing 26 for one or multiple external wires 34.

Left Access Tab Tilted Out-Of Plane—wherein the left-positioned access tab 110 remains present but is rotated or tilted out of plane, this provides access into and out of hollow interior 80 of housing 26 for one or multiple external wires 34 at the location of left access tab 110.

Right Access Tab Tilted Out-Of Plane—wherein the right-positioned access tab 110 remains present but is rotated or tilted out of plane, this provides access into and out of hollow interior 80 of housing 26 for one or multiple external wires 34 at the location of right access tab 110.

Right and Left Access Tabs Tilted Out-Of Plane—wherein the right-positioned and left positioned access tabs 110 remain present but are rotated or tilted out of plane, this provides access into and out of hollow interior 80 of housing 26 for one or multiple external wires 34 at the location of right access tab 110 and left access tab 110 and because there are no pieces, components, structures or things positioned between right access tab 110 and left access tab 110 the rotation of right access tab 110 and left access tab 110 provides an increased sized opening for external wires 34 to enter and exit hollow interior 80 of housing 26.

Left Access Tab Removed—wherein the left-positioned access tab 110 is fully removed from housing 26, this provides access into and out of hollow interior 80 of housing 26 for one or multiple external wires 34 at the location of left access tab 110 without left access tab 110 being present, this provides a slightly larger opening or access into hollow interior 80 as compared to simply tilting or rotating left access tab 110.

Right Access Tab Removed—wherein the right-positioned access tab 110 is fully removed from housing 26, this provides access into and out of hollow interior 80 of housing 26 for one or multiple external wires 34 at the location of right access tab 110 without right access tab 110 being present, this provides a slightly larger opening or access into hollow interior 80 as compared to simply tilting or rotating right access tab 110.

Each of these configurations may be used for the upper positioned pair of access tabs 110, the lower positioned pair of access tabs 110 and/or both the upper and lower positioned pairs of access tabs 110.

In the arrangement shown, as one example, upper positioned access tabs 110 are positioned between the lower end of upper-positioned partial rear wall 108 and at the upper end of rear wall 64 between sidewalls 58. In the arrangement shown, as one example, lower positioned access tabs 110 are positioned between the upper end of lower-positioned partial rear wall 108 and at the lower end of rear wall 64 between sidewalls 58.

In the arrangement shown, as one example, access tabs 110 connect to partial rear wall 108 and to rear wall 64 at strand 220. Strand 220 is formed of any suitable size, shape and design and is configured to connect access tabs 110 to partial rear wall 108 and/or rear wall 64 in a secure and durable manner while also facilitating the tilting or rotation of access tabs 110 as well as facilitating the selective removal of access tabs 110. In the arrangement shown, as one example, strand 220 is a single strand or narrow section of material that is generally centrally located from side-to-side on access tabs 110 and connects access tabs 110 to partial rear wall 108 on one end and connects access tabs 110 to rear wall 64 on the opposite end. Strand 220 facilitates a strong and secure connection of access tab 110 to partial rear wall 108 and rear wall 64 while also facilitating selective user-induced rotation of access tab 110 when desired while also facilitating selective user-induced removal of access tab 110.

In the arrangement shown, as one example, since strand 220 is generally centrally positioned at the upper and lower ends of access tab 110, access tab 110 may be rotated out of plane by pressing on the outward end of access tab 110. This causes access tab 110 to rotate upon strands 220 positioned at the upper and lower end of access tab 110. Once rotated, partial access is provided to hollow interior 80 of housing 26. If a larger opening is desired, access tab 110 may be removed by severing the connection between access tab 110 and housing 26 by breaking strand 220 at the upper and lower ends of access tab 110 thereby breaking the connection to partial rear wall 108 and rear wall 64. This can be done by simply grasping access tab 110 with a pair of pliers and pulling/pushing access tab 110 and/or taking another tool and pressing on access tab 110 or shearing/cutting strand 220.

The configuration of a pair of access tabs 110 being positioned immediately adjacent one another without any intervening members, components, objects or things, where each access tab 110 may be rotated or removed independent of the other access tab 110 may be referred to as "French Doors" as a reference to two doors that are adjacent one another and can open independent of one another and form a greater opening when both doors are opened.

The configuration of access tabs 110 allow external wires 34 to enter the hollow interior 80 of housing 26 from the top of housing 26, from the bottom of housing 26, or both from the top and the bottom of housing 26. Furthermore, with flexible fingers 152 of access door 122 also providing access into and out of hollow interior 80 for external wires 34 through access opening 112 from sidewall 58, electrical junction box system 10 provides more flexibility and more potential configurations than any other prior exiting electrical box.

Any other size, shape or design is hereby contemplated for use for access tabs 110.

Electrical Device 12: In the arrangement shown, as one example, electrical junction box system 10 is configured to receive one or more electrical device(s) 12. Electrical device 12 is formed of any suitable size, shape and design and is configured to facilitate an electrical purpose and perform an electrical function. In the arrangement shown, as one example, electrical device 12 and may be a conventional electrical receptacle (e.g. a plug), a switch (e.g. a light switch), a dimmer, an electrical interface, a touch screen device, a remote control device or input, an electrical connector, a low voltage device, a sensor (such as a light sensor, motion sensor, a sound sensor, or the like), a data or communications device, or any other form or style or type or configuration of an electrical device or an electrical component that may be contained or housed within housing 26 or any combination thereof. It should also be noted that while a standard receptacle or plug is shown, any form or style of an electrical device may be used including standard switches and plugs, Decora switches and plugs, or any other style of switches, plugs or other electrical devices. This is because the electrical junction box system 10 is agnostic regarding the manufacturer or type or style of the electrical device 12 used because any faceplate may be used with the system 10.

In the arrangement shown, as one example, electrical device 12 is a conventional receptacle or plug. However, this is just one example of countless examples and the disclosure is not limited to use of electrical junction box system 10 in association with receptacles or plugs, although this is a common use-case and is demonstrative of the capabilities of the system. In the arrangement shown, as one example electrical device 12 has a face 222 that faces forward having a peripheral edge 224. When installed properly, face 222 a peripheral edge 224 are configured to protrude from the peripheral edge 70 of housing 26 as well as protrude from the front surface of drywall 38.

In the arrangement shown, as one example, electrical device 12 has a main body 226. Main body 226 is configured to be held within hollow interior 80 of housing 26 and houses and holds the electrical components of the electrical device 12. In the arrangement shown, as one example, main body 226 of electrical device 12 includes a pair of tabs 102. In the arrangement shown, as one example, tabs 102 are generally centrally positioned within electrical device 12 with one tab 102 extending upward from the upper end of electrical device 12 and one tab 102 extending downward from the lower end of electrical device 12.

In the arrangement shown, as one example, tabs 102 include a generally centrally positioned hole 228 that is configured to receive a fastener 100 that is configured to secure electrical device 12 to housing 26. More specifically, in the arrangement shown, as one example, fastener 100 is configured to pass through hole 228 in tab 102 and into hole 98 of device supports 92 of housing 26 thereby affixing electrical device 12 to housing 26 in a flat, flush, and secure manner.

Conventionally, electrical devices 12 include a pair of ears 230 that are connected to tabs 102. In the arrangement shown, as one example, ears 230 extends outward and away from the outward end of tabs 102. That is, for the upper-positioned tab 102, ears 230 extend upward and outward from the upper end of the upper-positioned tab 230; and for the lower-positioned tab 102, ears 230 extend downward and outward from the lower end of the lower-positioned tab 230. Conventionally these ears 230 are used to engage and/or extend past the peripheral edge 70 of housing 26 of an electrical junction box so as to ensure proper alignment of electrical device 12 with housing 26. Since, conventionally, ears 230 are configured to extend past peripheral edge 80 of housing 26, a portion of ears 230 are configured to engage with or overlap the exterior surface of drywall 38 positioned around housing 26. In this way, ears 230 and their overlapping nature with housing 26 and a portion of drywall 38 are configured to ensure that when electrical device 12 is installed within housing 26, electrical device 12 is properly spaced and aligned. In the arrangement shown, as one example, ears 230 include holes 232 therein. Also, conventionally, a seam or fracture-point is positioned between tab 102 and ears 230 so as to facilitate the easy removal of ears 230 from tab 102 when desired.

In the arrangement shown, as one example, when electrical device 12 is installed in a conventionally-sized housing 26 (as opposed to an over-sized housing 26 otherwise known as a Hi-Box), ears 230 are removed prior to installation. This is because ears 230 are configured to extend past the peripheral edge 70 of conventionally-sized boxes because electrical device 12 is configured to be installed into housing 26 after drywall 38 is installed. As such, in that conventional application it is desirable to have ears 230 overlap with a portion of drywall 38 so as to ensure face 222 is properly aligned with drywall 38. However, in the application of the present disclosure, electrical device 12 is configured to be installed within housing 26 prior to installation of drywall 38. As such, it is undesirable to have ears 230 extend past the outward edge of peripheral edge 70 of housing 26. As such, in this application, ears 230 are configured to be removed prior to installation of electrical device 12 within housing 26. When ears 230 are removed and electrical device 12 is installed within housing 26, the upper edge of the upper-positioned tab 102 is flush with or just recessed to the upper outward edge of peripheral edge 70; and the lower-positioned tab 102 is flush with or just recessed to the lower outward edge of peripheral edge 70. That is, when electrical device 12 is installed within housing 26 and fasteners 100 extend through tabs 102 and into hole 98 of device support 92 the outward edges of tabs 102 are flush with or slightly recessed to the exterior surface of housing 26. This configuration is particularly well shown in FIG. 20. (In contrast, when using a Hi-Box configuration, which is a taller housing 26, ears 230 do not need to be removed as ears 230 fit within the peripheral edge 70 of the Hi-Box housing 26, which is shown in FIG. 79, FIG. 83A and FIG. 83B).

In addition, when referring to a "Hi-Box" sized housing, while it is noted that the ears 230 of the electrical component can be within the peripheral of the box, it should noted that this is not limiting, and that the reference to the Hi-Box housing includes such a height of the housing such that the ears 230 protrude beyond the outer periphery of the housing at least some amount. For example, if the Hi-Box were 4-inches high, the ears 230 may extend a portion (for example, approximately ⅛-inch) beyond the periphery, without affecting the operation and functionality of any of the embodiments. Therefore, it should be appreciated that the Hi-Box does not require the ears 230 of any electrical component to be fully within an outer periphery and that any of the aspects of any of the embodiments of the present disclosure consider and include dimensions wherein the ears 230 do extend at least partially beyond such periphery. Furthermore, there is no limitation on the amount of extension of the ears beyond the periphery of the housing that would be limiting on the disclosure.

In this way, no portion of electrical device 12 extends past housing 26. As such, since no portion of electrical device 12 extends past housing 26 (or at least not in any significant manner) no portion of electrical device 12 can interfere with the installation of drywall 38. Furthermore, since no portion of electrical device 12 extends past housing 26 (or at least not in any significant manner) ears 230 or tabs 102 of electrical device 12 cannot get trapped behind or in drywall 38 during installation (which would prevent post drywall-installation adjustment of electrical device 12).

In the arrangement shown, as one example, electrical device 12 includes a plurality of electrical terminal screws including a positive or hot screw 234 which is conventionally shown as a brass screw and receives a black wire of external wire 34, a neutral screw 236 which is conventionally shown as a silver screw and receives a white wire of external wire 34, and a ground screw 238 which is conventionally shown as a green screw and receives a ground wire, bare wire or green wire of external wire 34.

In some applications, housing 26 is installed with electrical device 12 pre-installed within hollow interior 80 of housing 26. When used in this configuration, conductor wires 35 (also known as pigtails) are electrically connected to hot screw 234, neutral screw 236 and ground screw 238. Conductor wires 35 (pigtails) are formed of any suitable size, shape and design and are configured to electrical connect to the terminal screws of electrical device 12 (hot screw 234, neutral screw 236 and ground screw 238) and extend a length long enough so that the ends of conductor wires 35 (pigtails) may be pulled out of access opening 112 to facilitate connection to external wires 34, while being short enough so that they can be stored within hollow interior 80.

In the arrangement shown, as one example, conductor wires 35 (pigtails) extend a length between opposing ends 240. In the arrangement shown, as one example, conductor wires 35 (pigtails) have a sheath 242 that covers a conductor (e.g., wire) except for a portion at ends 240. Or said another way, ends 240 of conductor wires 35 (pigtails) have sheath 242 removed thereby exposing the underlying conductor so as to facilitate quick and easy installation and use without the need for an electrician to remove sheath 242 at the free ends which requires some skill and the proper tooling and is time consuming. More specifically, in the arrangement shown, as one example, three conductor wires 35, or pigtails are used, one for each terminal screw. In this arrangement, a black conductor wire 35B is used to connect to the hot terminal screw 234; a white conductor wire 35W is used to connect to the neutral terminal screw 236; and a green conductor wire 35G is used to connect to the ground terminal screw 238. When one end of conductor wires 35 (pigtails) are connected to electrical device 12, this results in the opposite end being a free end or unattached end.

In one arrangement, conductor wires 35 (pigtails) are formed of lengths of the individual wires that are contained within external wires 34. However, any other suitable type of wire is hereby contemplated for use for conductor wires 35 (pigtails).

Prior to electrical device 12 being installed within housing 26, conductor wires 35 (pigtails) are connected to terminal screws, with black conductor wire 35B connected at one end to the hot terminal screw 234, white conductor wire 35W connected at one end to the neutral terminal screw 236 and green conductor wire 35G connected at one end to the ground terminal screw 238. When electrical device 12 is installed within housing 26 conductor wires 35 (pigtails) are folded or bent and positioned inside hollow interior 80 of housing 26. After housing 26 is installed onto structure 32, access door 122 is opened and the free ends of conductor wires 35 (pigtails) are pulled through access opening 112 to facilitate connection to external wires 34. Since the free ends 240 of conductor wires 35 (pigtails) are exposed and have the sheath 242 removed, a user can quickly and easily connect the free ends 240 to the proper wire of external wires 34. Furthermore, because conductor wires 35 (pigtails) are properly color coded, (with black conductor wire 35B connected at one end to the hot terminal screw 234, white conductor wire 35W connected at one end to the neutral terminal screw 236 and green conductor wire 35G connected at one end to the ground terminal screw 238) a user can quickly and easily color code the connection of conductor wires 35 (pigtails) with external wires 34, which increases the speed and accuracy of the connection in a relatively foolproof manner.

In the arrangement shown, as one example, conductor wires 35 (pigtails) are several inches long. Long enough to be pulled out of access opening 112, but not too long where they take up too much room within hollow interior 80. In one arrangement, conductor wires 35 (pigtails) are approximately 4 to 9 inches long, with a length of approximately 5 to seven inches being tested with success, as well as a length of approximately 6 inches being tested with success.

The use of conductor wires 35 (pigtails) in association with access opening 112 and access door 122 allows for electrical device 112 to be installed within housing 26 and never removed during the installation. Instead, housing 26 with pre-installed electrical device 12 is installed on structure 32 and external wires 34 are connected to conductor wires 35 (pigtails) through access provided by access opening 112 and access door 122.

In the arrangement shown, as one example, once electrical device 12 is installed within housing 26, electrical device 112 is covered and protected by cover 30.

Cover 30:

In the arrangement shown, as one example, electrical junction box system 10 includes a cover 30. Cover 30 is formed of any suitable size, shape and design and is configured to cover and protect electrical device 12 after it is installed in housing 26, and cover 30 is configured to be removed after drywall 38 is installed thereby protecting the electrical device 12 during the construction process making the installation process quicker, easier, cleaner with less errors, faults and issues, with better connections and better alignment and additional protection for the electrical device 12 during the installation process, among many other benefits and improvements as is described further herein.

In the arrangement shown, as one example, cover 30 is formed of a generally square or rectangular member that is sized and shaped to match the peripheral shape of housing 26, however any other size shape and design is hereby contemplated for use. In the arrangement shown, cover 30 includes a front wall 244, a top wall 246, a bottom wall 248, opposing sidewalls 250, a peripheral edge 252 thereby forming a hollow interior 254, among other features.

Front Wall 244: In the arrangement shown, as one example, cover 30 includes a front wall 244. Front wall 244 is formed of any suitable size shape and design and is configured to partially or fully enclose the front side of cover 30 while providing strength and rigidity to cover 30 and protecting electrical device 12 when it is installed onto housing 26. In the arrangement shown as one example, front wall 244 has an exterior surface 256 and an opposing interior surface 258 that extend in approximate parallel spaced relation to one another. In the arrangement shown, as one example, front wall 244 and its exterior surface 256 and interior surface 258 are generally flat surfaces.

Top Wall 246: In the arrangement shown, as one example, cover 30 includes a top wall 246. Top wall 246 is formed of any suitable size shape and design and is configured to partially or fully enclose the top side of cover 30 while providing strength and rigidity to cover 30 and protecting electrical device 12 when it is installed onto housing 26. In the arrangement shown as one example, top wall 246 has an exterior surface 260 and an opposing interior surface 262 that extend in approximate parallel spaced relation to one another. In the arrangement shown, as one example, top wall 246 and its exterior surface 260 and interior surface 262 are generally flat surfaces.

Bottom Wall 248: In the arrangement shown, as one example, cover 30 includes a bottom wall 248. Bottom wall 248 is formed of any suitable size shape and design and is configured to partially or fully enclose the bottom side of cover 30 while providing strength and rigidity to cover 30 and protecting electrical device 12 when it is installed onto housing 26. In the arrangement shown as one example, bottom wall 248 has an exterior surface 264 and an opposing interior surface 266 that extend in approximate parallel spaced relation to one another. In the arrangement shown, as one example, bottom wall 248 and its exterior surface 264 and interior surface 266 are generally flat surfaces.

Sidewalls 250: In the arrangement shown, as one example, cover 30 includes a pair of opposing sidewalls 250. Opposing sidewalls 250 are formed of any suitable size shape and design and is configured to partially or fully enclose the sides of cover 30 while providing strength and rigidity to cover 30 and protecting electrical device 12 when it is installed onto housing 26. In the arrangement shown as one example, sidewalls 250 have an exterior surface 268 and an opposing interior surface 270 that extend in approximate parallel spaced relation to one another. In the arrangement shown, as one example, sidewalls 250 and its exterior surface 268 and interior surface 270 are generally flat surfaces.

Peripheral Edge 252: In the arrangement shown, as one example, cover 30 includes a peripheral edge 252. Peripheral edge 252 is formed of any suitable size shape and design and is configured to form the rear edge of cover 30. In the arrangement shown, as one example, peripheral edge 252 is a generally flat edge that extends around the entire periphery of the rear side of cover 30. This generally flat edge formed by peripheral edge 252 is generally sized and shaped to match peripheral edge 70 of housing 26 and allows for a generally flat and flush alignment to and engagement with peripheral edge 70 of housing 26. In the arrangement shown, as one example, in some installation applications, the forward most edge of housing 26 (the peripheral edge 70) and the rearward most edge of cover 30 (the peripheral edge 252) are in alignment with the front surface of drywall 38 during the installation process. In the arrangement shown, as one example, peripheral edged 252 is formed in part at its top side by a termination of the rearward end of top wall 246;

peripheral edged 252 is formed in part at its bottom side by a termination of the rearward end of bottom wall 248; peripheral edged 252 is formed in part at its sides by a termination of the rearward end of opposing sidewalls 250. In the arrangement shown, as one example, peripheral edge 252 forms a continuous and seamless generally flat edge that, when viewed from rear side 20 is generally square or rectangular in shape with a generally straight top edge, a generally straight bottom edge and generally straight side edges. Any other size, shape and design is hereby contemplated for use as peripheral edge 252.

In the arrangement shown, as one example, cover 30 includes a pair of recesses 272. Recesses 272 are formed of any suitable size, shape and design and are configured to provide a space to receive tabs 102 and/or ears 230 of electrical device 12. In the arrangement shown, as one example, a recess 272 is generally centrally positioned in peripheral edge 252 of top wall 246 and bottom wall 248 and is generally sized deep enough and wide enough to provide space to receive tabs 102 and/or ears 230 of electrical device 12. This is because in a conventional application, electrical device 12 is placed on the front side 18 of housing 26 and screwed into housing 26 with the outward ends of tabs 102 and/or ears 230 in flat and flush overlapping condition with forward peripheral edge 70 of housing 26. As such, recesses 272 provide enough clearance to receive tabs 102 and/or ears 230 of electrical device 12. Care is taken to make recesses 272 deep enough for tabs 102 and/or ears 230 and wide enough for tabs 102 and/or ears 230, but not so deep or wide as to provide much excess space as this additional or excess space may allow for the entry of dirt, dust, debris, drywall mud, paint, or other contaminants from the building process. When cover 30 is installed on housing 26, recesses 272 provide adequate space for tabs 102 and/or ears 230 of electrical device 12 installed into housing 26 and therefore allow for a flat and flush mating engagement between peripheral edge 70 of housing 26 and peripheral edge 252 of cover 30.

In the arrangement shown, as one example, peripheral edge 252, and cover 30 includes an upper left corner 274, which is formed at the intersection of the left side of top wall 246 and the upper end of the left sidewall 250. In the arrangement shown, as one example, peripheral edge 252, and cover 30 includes an upper right corner 276, which is formed at the intersection of the right side of top wall 246 and the upper end of the right sidewall 250. In the arrangement shown, as one example, peripheral edge 252, and cover 30 includes a lower left corner 278, which is formed at the intersection of the left side of bottom wall 248 and the lower end of the left sidewall 250. In the arrangement shown, as one example, peripheral edge 252, and cover 30 includes a lower right corner 280, which is formed at the intersection of the right side of bottom wall 248 and the lower end of the right sidewall 250.

In the arrangement shown, as one example, top wall 246 is formed of a generally flat and planar member that extends from its back edge at peripheral edge 252 forward before connecting at the upper end of front wall 244 and extends side-to-side from the upper end of left sidewall 250 at upper left corner 274 to the upper end of right sidewall 250 at upper right corner 276.

In the arrangement shown, as one example, bottom wall 248 is formed of a generally flat and planar member that extends from its rear edge at peripheral edge 252 forward before connecting at the lower end of front wall 244 and extends side-to-side from the lower end of left sidewall 250 at lower left corner 278 to the lower end of right sidewall 250 at lower right corner 280.

In the arrangement shown, as one example, left sidewall 250 is formed of a generally flat and planar member that extends from its rear edge at peripheral edge 252 forward before connecting at the left end of front wall 244, and extends vertically from the left end of top wall 246 at upper left corner 274 to the left end of bottom wall 248 at lower left corner 278.

In the arrangement shown, as one example, right sidewall 250 is formed of a generally flat and planar member that extends from its rear edge at peripheral edge 252 forward before connecting at the right end of front wall 244 and extends vertically from the right end of top wall 246 at upper right corner 276 to the right end of bottom wall 248 at lower right corner 278.

In the arrangement shown, as one example, top wall 246 and bottom wall 248 extend in generally parallel spaced relation to one another from their rearward end, at peripheral edge 252 to their forward end end, at front wall 244. In the arrangement shown, as one example, opposing sidewalls 252 extend in generally parallel spaced relation to one another from their rearward end, at peripheral edge 252 to their forward end, at front wall 244. In the arrangement shown, as one example, top wall 246 and bottom wall 248 extend in approximate perpendicular alignment to opposing sidewalls 250. In the arrangement shown, as one example, front wall 244 extends in approximate perpendicular alignment to top wall 246 and bottom wall 248. In the arrangement shown, as one example, front wall 244 extends in approximate perpendicular alignment to opposing sidewalls 250. In this way, top wall 246, bottom wall 248, sidewalls 250 and front wall 244 form a generally square or rectangular member having a hollow interior 254.

While it is stated that top wall 246 and bottom wall 248 extend in approximate parallel spaced relation to one another, and while it is stated that opposing sidewalls 250 extend in approximate parallel spaced relation to one another, for purposes of mold manufacturing, it is hereby contemplated that top wall 246 and bottom wall 248, and opposing sidewalls 250, angle slightly toward one another as they extend from peripheral edge 252 at their rear edge, to front wall 244 at their forward edge. This slight tapering facilitates removal of the cover 30 from the mold during mold manufacturing.

Hollow Interior 254: In the arrangement shown, as one example, cover 30 forms a hollow interior 254. Hollow interior 254 is formed of any suitable size, shape and design and is configured to provide adequate space to house and hold the front side of electrical device 12 and any portion that protrudes therefrom or protrudes forward from peripheral edge 70 of housing 26 when electrical device 12 is installed into housing 26. These protruding portions of electrical device 12 may include the protruding portions of a receptacle or plug, the protruding portions of a switch, the protruding portions of a sensor (such as a light sensor or motion sensor), the protruding portions of a dimmer, the protruding portions of a control device (such as a volume control), or any protruding portion of any electrical device 12 installed in housing 26. In the arrangement shown, as one example, hollow interior 254 is defined by peripheral edge 252 at its rear side and by interior surface 258 of front wall 244 at its front side, interior surface 262 of top wall 246 at its top side, interior surface 266 of bottom wall 248 at its bottom side and interior surfaces 270 of opposing sidewalls 250 at its sides.

Cover Supports 282: In the arrangement shown, as one example, cover 30 includes one or more cover supports 282. Cover supports 282 are formed of any suitable size, shape and design and are configured to facilitate connection of cover 30 to housing 26. In the arrangement shown, as one example, cover 30 includes a pair of cover supports 282, one positioned in the upper right corner 276 of cover 30 and one positioned in the lower left corner 278 of cover 30. However, any number of cover supports 282 are hereby contemplated for use, such as one, two, three, four or more. As one example, it is contemplated that all four corners, upper left corner 274, upper right corner 276, lower left corner 278 and lower right corner 280, may include a cover support 282. As another example, it is contemplated that the upper left corner 274 and lower right corner 280 include a cover support 282. Any other number of and arrangement of cover supports 282 is hereby contemplated for use.

In the arrangement shown, as one example, cover supports 282 of cover 30 are configured to match and mate with cover supports 28 of housing 26 with the same general size, shape and placement and positioning. In the arrangement shown, as one example, cover supports 282 are formed of a mass of material, or shoulder, which extends inward from the interior surface of upper right corner 276 and lower left corner 278 and into hollow interior 254 of cover 30 from peripheral edge 252 at its rearward side to interior surface 258 of front wall 244. In the arrangement shown, as one example, cover supports 282 have an extended rear surface area that is flush with the rearward edge of peripheral edge 252. In the arrangement shown, as one example, the upper right cover supports 282 has a lower edge that extends approximately horizontally inward into hollow interior 252 approximately perpendicular to the interior surface 270 of right sidewall 250 and another inward edge that extends approximately vertically inward into hollow interior 254 approximately perpendicular to interior surface 262 of top wall 246. In the arrangement shown, as one example, the lower left cover supports 282 has an upper edge that extends approximately horizontally inward into hollow interior 254 approximately perpendicular to the interior surface 270 of left sidewall 250 and another inward edge that extends approximately vertically inward into hollow interior 254 approximately perpendicular to interior surface 266 of bottom wall 248. These edges of cover support 282 connect to one another at a rounded corner positioned at the inward most end of the horizontal edge and vertical edge of cover supports 282. In this way, cover supports 282 are formed of a mass of additional material positioned at upper right corner 276 and lower left corner 278 and form an increased surface area that is flush with the rearward edge of peripheral edge 252 which facilitates increased area of connection for mounting or attachment of cover 30 to housing 26.

In the arrangement shown, as one example, cover supports 282 include a hole 284. Hole 284 is formed of any suitable size, shape and design and is configured to receive the shaft of fastener 86 of cover 30, which in the arrangement shown, is a conventional screw. In the arrangement shown, as one example, hole 284 is circular opening that is approximately centrally positioned within cover support 282. In the arrangement shown, as one example, cover 30 is attached to housing 26 by aligning peripheral edge 252 of cover 30 with peripheral edge 70 of housing 26 and passing fasteners 86 through holes 284 of cover support 282 of cover 30 and into hole 84 of cover support 82 of housing 26 thereby affixing cover 30 to housing 26 in a flat, flush, and secure manner. In the arrangement shown, as one example, when cover 30 is installed on housing 26, peripheral edge 252 of cover 30 is in flat, flush, parallel, mating, matching, and in some cases sealing engagement around the entire peripheral edge 252 of cover 30 with the peripheral edge 70 of housing 26 except for where recesses 272 are present (which provide space to receive tabs 102 and/or ears 230 of electrical device 12). This flat and flush surface-to-surface engagement between peripheral edge 252 of cover 20 and peripheral edge 70 of housing 26 prevents, eliminates and/or reduces the entry of dirt, dust, debris, paint, drywall mud or other contaminants from entering hollow interior 254 of cover 30 and/or hollow interior 80 of housing 26 as well as prevents contamination of electrical device 12 held within and between housing 26 and cover 30 during the construction process.

In the arrangement shown, as one example, cover 30 includes a relief 286 positioned in exterior surface 256 of front wall 244 of cover 30 opposite cover supports 282 of cover 30. In the arrangement shown, as one example, reliefs 286 of cover 30 recess inward a distance into exterior surface 256 of front wall 244 of cover 30 and provide adequate space for the head of fastener 86 such that when fasteners 86 are installed and connect cover 20 to housing 26 the head of fastener 86 does not protrude past the generally flat plane formed by exterior surface 256 of cover 30. In the arrangement shown, where cover supports 282 are positioned in the upper right corner 276 and lower left corner 278 of cover 30 so too are reliefs 286. Like cover supports 282, any number of reliefs 286 are contemplated for use. It is contemplated that a cover support 286 is present on the front side of cover 30 whenever a cover support 282 is present on the back side of cover 30.

In the arrangement shown, as one example, it is contemplated that cover 30 may include any number of structural supports 288. Structural supports 288 are formed of any suitable size, shape and design and are configured to provide additional strength, rigidity, durability, and structural support to cover 30. In the arrangement shown, as one example, a structural support 288 extends across the interior surface 258 of front wall 244 from top wall 246 to bottom wall 248. However, any other number of structural supports 288 as well as any other configuration of structural supports 288 are hereby contemplated for use in association with cover 30.

Any other configuration is hereby contemplated for use for cover supports 282 and reliefs 286 of cover 30.

Alternative Arrangement of Cover 30: With reference to FIG. 75A, FIG. 75B and FIG. 75C an alternative arrangement of a cover 30 is presented. This alternative arrangement of cover 30 is similar to the other configurations of cover 30 presented herein and performs the same function as the other configurations of cover 30 presented herein, and as such all of the disclosure and teaching related to cover 30 presented herein applies to the alternative embodiment of cover 30 unless stated otherwise.

In the arrangement shown, with reference to FIG. 75A, FIG. 75B and FIG. 75C an alternative arrangement of a cover 30 is presented that is configured to connect to, engage and hold onto housing 26 without the use of conventional fasteners 86 such as screws. In the arrangement shown as one example, alternative embodiment of cover 30 includes a plurality of protrusions 296 that extend rearward from alternative embodiment of cover 30 that are configured to connect to and form a mating engagement with housing 26 that holds alternative embodiment of cover 30 onto housing 26 without the use of a conventional fastener, such as a screw (however in the arrangement shown, fasteners 86 (such as a conventional screw) can also be used to provide an even stronger and more-secure engagement.

Protrusions 296 are formed of any suitable size, shape and design and are configured to engage housing 26 and hold cover 30 onto housing 26 without the use of conventional fasteners, such as a screw of bolt. In the arrangement shown, as one example, a pair of protrusions 296 are spaced from one another and extend rearward from peripheral edge 252 from sidewalls 250. These protrusions 296 are spaced inward a distance from the corners of alternative embodiment of cover 30 with a space positioned between the two protrusions 296 of each pair.

In the arrangement shown, as one example, protrusions 296 are generally flat elongated rectangular members that are connected to and/or extend inward from and/or are positioned at or inward from interior surface 270 of sidewalls 250. When alternative embodiment of cover 30 is connected to housing 26, peripheral edge 252 of alternative embodiment of cover 30 is in flat and flush engagement with peripheral edge 70 of housing 26, as such, care is taken to ensure protrusions 296 are positioned just inward from the interior edge of peripheral edge 252 so as to ensure there is no interference between alternative embodiment of cover 30 and housing 26 upon assembly. As such, when alternative embodiment of cover 30 is installed upon housing 26, protrusions 296 fit just inward of the interior edge of peripheral edge 70 of housing 26.

In the arrangement shown, as one example, protrusions 296 extend rearward from alternative embodiment of cover 30 a length before terminating at an end 297. In the arrangement shown, as one example, a feature 298 is positioned on the exterior surface pf protrusions 296 adjacent end 297. Feature 298 is formed of any suitable size, shape and design and is configured to engage, friction-fit with and lock to housing 26, or more specifically the interior surface 62 of sidewalls 58 of housing 26. In one arrangement, feature 298 is rounded protrusion the curves from a pointed tip at end 297 outward before curving back toward the exterior surface of protrusion 296 and terminating at a lip or edge on the exterior surface of protrusions 297. In this way, features 298 for a thicker portion of protrusions 296 at the outward end of protrusions 296. Said another way, features 298 extend outward at the end 297 of protrusions 296, In the arrangement shown, as one example, protrusions 296 extend a width between opposing sides 300.

When alternative embodiment of cover 30 is installed on housing 26 the angled end 297 of protrusions 296 aid installation of cover 30 onto housing 26 by directing the relatively rigid but slightly pliable or flexible protrusions 296 inward when the pointed ends 297 engage peripheral edge 70 of housing 26. As protrusions 296 flex inward, engagement occurs between features 298 and the interior surface 62 of sidewalls 58. As a pair of protrusions 296 are positioned on opposing sidewall 250 the combined forces hold alternative embodiment of cover 30 onto housing 26.

In one arrangement, to increase the strength of hold between alternative embodiment of cover 30 and housing 26, features 302 are positioned on the interior surface 62 of sidewalls 58 of housing 26. Features 302 of interior surface 62 of sidewalls 58 of housing 26 are sized and shaped to receive, hold and/or mate with features 298 of protrusions 296. In one arrangement features 302 of interior surface 62 of sidewalls 58 of housing 26 are pockets or recesses on the interior surface 62 of sidewalls 58 that are sized and shaped to receive features 298 of protrusions 296 of alternative embodiment of cover 30. In this configuration, as alternative embodiment of cover 30 is pushed onto housing 26, protrusions 296 flex inward with features 298 engaging the interior surface 62 of sidewalls 58 of housing 26 until features 298 of protrusions 296 reach the recesses or pockets of features 302 of interior surface 62 of sidewalls 58 of housing 26 at which point the protrusions 296 flex outward as the features 298 of protrusions 296 are received into features 302 of interior surface 62 of sidewalls 58 of housing 26 which adds increased strength of hold between alternative embodiment of cover 30 and housing 26.

In this arrangement, to remove alternative embodiment of cover 30 from housing 26 all a user has to do is to pull alternative embodiment of cover 30 away from housing 26 with the application of a force greater than the force of hold between features 298 of protrusions 296 interior surface 62 of sidewalls 58 of housing 26 (including the engagement between features 298 of protrusions 296 and features 302 of interior surface 62 of sidewalls 58 of housing 26 when present).

It should be noted that this installation and removal of alternative embodiment of cover 30 onto and from housing 26 may be performed by hand and without any tools thereby improving the ease and speed of installation and removal.

It should be noted that while two protrusions 296 are shown connected to the interior surface 270 of sidewalls 250 of alternative embodiment of cover 30 any number of protrusions 296 are hereby contemplated for use. Similarly, any other placement of protrusions 296 are hereby contemplated for use. Such as on top wall 246 and bottom wall 248 or at any other placement along sidewalls 250. Any other configuration of alternative embodiment of cover 30 that facilitates tool-free installation and removal of alternative embodiment of cover 30 onto and off of housing 26 is hereby contemplated for use.

Runner 290: In the arrangement shown, as one example, electrical junction box system 10 includes a runner 290. Runner 290 is formed of any suitable size, shape and design and is configured to connect housing 26 and cover 30 during the manufacturing process.

In the arrangement shown, as one example, runner 290 is a strip of material that connects at its lower end 292 to the exterior surface 48 of top wall 46 of housing 26 and connects at its upper end 294 to exterior surface 264 of bottom wall 248 of cover 30, however any other configuration is hereby contemplated for use.

In the arrangement shown, as one example, runner 290 connects at its lower end 292 to the exterior surface 48 of top wall 46 of housing 26 at the rearward end of top wall 46, just prior to partial rear wall 108. In the arrangement shown, as one example, runner 290 connects at its upper end 292 to the exterior surface 264 of bottom wall 248 of cover 30 adjacent peripheral edge 252. In this configuration, the hollow interior 80 of housing 26 and the hollow interior 254 of cover 30 face the same direction during molding/manufacturing. This allows the drafts of the tooling to be aligned so as to facilitate proper separation between the parts and the tooling during manufacturing.

In the arrangement shown as one example, housing 26 and cover 30 may be quickly and easily separated by simply breaking runner 290 off at the intersection between runner 290 and cover 30 and at the intersection between runner 290 and housing 26. Housing 26 may be separated from runner 290 by bending or rotating runner 290 relative to housing 26 which causes runner 290 to separate from housing 26 at the intersection between runner 290 and housing 26. This separation may be accomplished by engineering a weak-point or fraction point at this intersection. Similarly, cover 30 may be separated from runner 290 by bending or rotating runner 290 relative to cover 30 which causes runner 290 to separate from cover 30 at the intersection between runner 290 and cover 30. This separation may be accomplished by engineering a weak-point or fraction point at this intersection.

Cover 30 and housing 26 may be sold as a single unit connected by runner 290. In this configuration, connecting housing 26 and cover 30 may provide a level of convenience to the user by keeping cover 30 and housing 26 connected as a single unit during transport. The user may then install electrical device 12 into housing 26 and break the housing 26 and cover 30 apart, removing runner 290, and then installing cover 30 onto housing 26 after electrical device 12 is installed into housing 26.

Alternatively, cover 30 and housing 26 may be sold as a pre-assembled unit with electrical device 12 already installed into housing 26 and covered by cover 30. In this configuration, runner 290 is removed and discarded prior to the end user receiving housing 26 and cover 30.

Alternative Embodiment of Housing 26—Hi-Box: With reference to FIG. 1A through 13C and FIG. 17A through 59 a relatively standard-sized or conventionally-sized electrical junction box system 10 and/or housing 26 is presented. As discussed herein, to avoid electrical device 12 from being pinched or trapped behind drywall 38, to avoid ears 230 of tabs 102 from extending past the peripheral edge 70 of housing 26 ears 230 are removed from electrical device 12. In some applications this may seem to be an unnecessary and undesirable step and/or modification of electrical device 12.

With reference to FIG. 60A through FIG. 72D and FIG. 76A through FIG. 83B, an alternative embodiment of electrical junction box system 10 and/or housing 26 is presented known colloquially as the Hi-Box or extended-box. This alternative arrangement of electrical junction box system 10 and/or housing 26 is similar to the other configurations of electrical junction box system 10 and/or housing 26 presented herein and performs the same function as the other configurations of electrical junction box system 10 and/or housing 26 presented herein, and as such all of the disclosure and teaching related to electrical junction box system 10 and/or housing 26 presented herein applies to the alternative embodiment of electrical junction box system 10 and/or housing 26 unless stated otherwise.

In the arrangement shown, as one example, with reference to FIG. 60A through FIG. 72D and FIG. 76A through FIG. 83B, an alternative arrangement of electrical junction box system 10 and/or housing 26 is presented which is known colloquially as the Hi-Box or extended-box. As compared to the relatively standard-sized or conventionally-sized electrical junction box system and/or housing 26 presented in FIG. 1A through 13C and FIG. 17A through 59 the electrical junction box system and/or housing 26 presented in FIG. 60A through FIG. 72D and FIG. 76A through FIG. 83B is larger in size.

In the arrangement shown, as one example housing 26 is vertically elongated. That is, sidewalls 58 of housing 26 of the Hi-Box are longer than the sidewalls 58 of the standard sized housing 26. This additional length is to accommodate the height of ears 230 of tabs 102 of electrical device 12 such that when electrical device 12 is installed into housing 26 of the Hi-Box, ears 230 are recessed to, in alignment with/flush with, and/or do not protrude past the exterior peripheral edge 70 of housing 26. This configuration, wherein ears 230 of electrical device 12 are slightly recessed to peripheral edge 70, is shown in FIGS. 83A and 83B as one example.

Conventionally sized electrical junction boxes are configured to intentionally have ears 230 of electrical device 12 extend past the exterior peripheral edge 70 of housing 26 a distance. This is because conventionally electrical device 12 is installed in housing 26 after drywall 38 is installed. As such, in this conventional installation, ears 230 are intended to extend past the exterior peripheral edge 70 of the conventionally sized housing 26 and are intended to overlap with a portion of drywall 38 with the back side of ears 230 of electrical device engaging the exterior surface of drywall 38. In this configuration, the engagement between ears 230 and drywall 38 helps to facilitate alignment of electrical device 12 with the exterior surface of drywall 38.

In contrast, the electrical junction box system 10 presented herein (be it a conventionally sized housing 26 or the larger Hi-Box) the housing 26 and electrical device 12 are configured to be installed prior to installation of drywall 38. As such, it is important to have ears 230 of tabs 102 of electrical device 12 not extend past the exterior peripheral edge 70 of housing 26 so as to prevent electrical device 12 from being trapped behind or within drywall 38, mud 40, paint 42 or any other portion or component of the construction process thereby preventing adjustment of electrical device 12. By having ears 230 contained within exterior peripheral edge 70 of housing 26 (as is shown in FIGS. 83A and 83B), ears 230 are unencumbered and this allows for adjustment of electrical device 12 relative to housing 26 after installation of drywall 38 for alignment purposes.

Another benefit of the Hi-Box configuration of electrical junction box system 10 presented in FIG. 60A through FIG. 72D and FIG. 76A through FIG. 83B as one example, is that the additional size and volume of housing 26 provides additional space within the hollow interior 80 of housing 26 to receive external wires 34, conductor wires 35, electrical connectors 36 as well as electrical device 12. This additional volume or room makes installation and assembly easier, as well as provides additional space for heat dissipation, among many other advantages.

In the arrangement shown, as one example, since ears 230 are contained within and/or parallel with peripheral edge 70, this causes ears 230 to be generally unsupported within hollow interior 80 of housing 26. To alleviate this situation and to provide support for ears 230 and electrical device 12 in general, in the arrangement shown, as one example housing 26 includes a pair of orientation adjustment guides 304.

Orientation adjustment guides 304 are formed of any suitable size, shape and design and are configured to provide support for ears 230 and/or electrical device 12 within housing 26. In the arrangement shown, as one example, orientation adjustment guides 304, are formed of a pair of protrusions that extend inward from the interior surface 50 of top wall 46 and the interior surface 56 of bottom wall 52. In the arrangement shown, as one example, each of these orientation adjustment guides 304 are positioned an equal-distance away from the center of top wall 46 and bottom wall 52 and are centered upon device support 92.

In the arrangement shown, as one example, orientation adjustment guides 304 are protrusions that have a forward end that is in approximate flat and flush alignment with the front peripheral edge 70 of housing 26 and they extend rearward into the hollow interior 80 of housing 26 a distance along the interior surface 50 of top wall 46 and the interior surface 56 of bottom wall 52.

In the arrangement shown, as one example, the orientation adjustment guides 304 provide support for the rearward side of ears 230 of tabs 102 of electrical device 12 when electrical device 12 is installed into hollow interior 80 of housing 26. In this arrangement, a portion of the rearward surface of ears 230 engages the forward end of orientation adjustment guides 304 at peripheral edge 70 thereby ensuring proper alignment between housing 26 and electrical device 12.

It is hereby contemplated that orientation adjustment guides 304 may take on any other size, shape, or design.

Another modification of the Hi-Box design is the elongation of device support 92. Due to the elongation of sidewalls 58, however the length of electrical device 12 remains the same this requires modifications to the manner in which electrical device 12 connects with housing 26.

In the arrangement shown, as one example, device support 92 that extend inward from the interior surface 50 of top wall 46 and the interior surface 56 of bottom wall 52 are vertically elongated to accommodate the extended length/height of housing 26. This elongation of device support 92 essentially maintains the relative position of holes 98 of opposing device supports 92.

In the arrangement shown, as one example, device supports 92 of the elongated HI-Box configuration include a second hole 306 positioned outward of hole 98. This second hole 306 is configured to provide passage to fasteners that are used to attach a faceplate 44 to electrical device 12 and/or housing 26. In the arrangement shown, hole 306 is positioned in elongated device support 92 between hole 98 and peripheral edge 70.

One of the benefits of the Hi-Box configuration, as is shown as one example, in FIG. 60A through FIG. 72D and FIG. 76A through FIG. 83B, is that the ears 230 extend outward from tabs 102 of electrical device 12 and engage orientation adjustment guides 304. Notably, ears 230 could also or alternatively engage portions of peripheral edge 70 or any other portion of housing 26. Ears 23 are rigid but malleable/bendable. As such, in the event that the housing 26 is not installed perfectly square to the exterior surface of drywall 38, the ears 230 can be bent so as to angularly adjust the exterior face 222 of electrical device so that it extends at the proper alignment to the exterior surface of drywall 38. This is an improved functionality over the standard or conventionally sized housing 26 shown in FIG. 1A through 13C and FIG. 17A through 59 where ears 230 are removed. This mis-alignment may be due to faulty installation, twisted supports/studs/2×4s/2×6s or the like, among many other reasons.

IN OPERATION: The following include non-limiting examples of installation of an assembly such as that shown and described, and which correspond to the figures discussed herein.

EXAMPLE 1: Pre-installation of an electrical device 12 within hollow interior 80 of housing 26.

Step 1: The user selects the desired electrical device 12 for the application. Electrical device 12 may be a conventional electrical receptacle (e.g. a plug), a switch (e.g. a light switch), a dimmer, an electrical interface, a touch screen device, a remote control device or input, an electrical connector, a low voltage device, a sensor (such as a light sensor, motion sensor, a sound sensor, or the like), a data or communications device, or any other form or style or type or configuration of an electrical device or an electrical component that may be contained or housed within housing 26.

Step 2: If cover 30 is connected to housing 26 by runner 290, the user separates cover 30 from housing 26. This is accomplished by bending cover 30 and housing 26 relative to one another thereby causing runner 290 to snap off and/or separate from housing 26 at lower end 292 and snap off and/or separate from cover 30 at upper end 294.

Step 3: The user attaches conductor wires 35 (pigtails) to electrical device 12. In one arrangement, the user attaches a black conductor wire 35B to the hot terminal screw 234; a white conductor wire 35W to the neutral terminal screw 236; and a green conductor wire 35G to the ground terminal screw 238. This is accomplished by wrapping the exposed portion of one end of the respective conductor wire 35 around the respective terminal screw 234/236/238. Alternatively, the user may use the "back-stabbing" technique wherein the user inserts the exposed portion of the respective conductor wire 35 into the respective opening or hole in the back side of electrical device 12. Any other manner of electrical connection is hereby contemplated for use. In one arrangement, to ease installation of electrical device 12 with attached conductor wires 35 (pigtails) into hollow interior 80 of housing 26, the user bends conductor wires 35 into a S-shape at the rearward side of electrical device 12 so as to prevent or reduce interference of conductor wires 35 (pigtails) during installation into housing 26.

Step 4: Once electrical conductor wires 35 are electrically connected to electrical device 12 the user installs electrical device 12 into housing 26.

Standard Sized/Conventionally Sized Housing 26: When housing 26 is a relatively standard sized or conventionally sized hosing 26, such as that shown with reference to FIG. 1A through 13C and FIG. 17A through 59, the user first must remove ears 230 from tabs 120 so as to prevent ears 230 from expanding past peripheral edge 70 of housing 26 and eventually getting hit by a cutting bit when the drywall is cut out around housing 26 and/or to prevent ears from getting trapped behind drywall 38 and/or within mud 40 during the building process. This may be accomplished by snipping, clipping, cutting, or otherwise removing ears 230 from tabs 102. Once ears 230 are removed, electrical device 12 (with attached conductor wires 35 (pigtails)) is inserted into hollow interior 80 of housing 26. Upon insertion the holes 228 of tabs 102 are aligned with holes 98 of device support 92 of housing 26 and fasteners 100 are passed through holes 228 in tabs 102 and into holes 98 of device support 92 and tightened thereby affixing electrical device 12 to housing 26. In this position, the outward ends of tabs 102 are recessed to, flush with or only slightly or barely protruding from the exterior edge of peripheral edge 70 so as to prevent interference with cutting the exterior peripheral edge of housing 26 through drywall 38 and to prevent electrical device 12 from being trapped behind drywall 38.

Over-Sized/Hi-Box Housing 26: When housing 26 is an over-sized or Hi-Box sized housing 26, such as that shown with reference to FIG. 60A through FIG. 72D and FIG. 76A through FIG. 83B, the user does not need to remove ears 230 from tabs 102 prior to installation. This is because housing 26 is sized and shaped to receive ears 230 with the ears 230 within, at, or slightly past peripheral edge 70 of housing 26 (however, as noted herein, the disclosure does allow for the ears to extend at least some amount beyond the peripheral edge 70 and still function accordingly). As ears 230 are within, at, or slightly past the peripheral edge 70, this prevents ears from getting damaged by a cutting bit when the drywall is cut out around housing 26 and/or prevents ears from getting trapped behind drywall 38 and/or within mud 40 during the building process. Electrical device 12 (with attached conductor wires 35 (pigtails)) is inserted into hollow interior 80 of housing 26. Upon insertion the holes 228 of tabs 102 are aligned with holes 98 of device support 92 of housing 26 and fasteners 100 are passed through holes 228 in tabs 102 and into holes 98 of device support 92 and tightened thereby affixing electrical device 12 to housing 26.

In this position, the outward ends of ears 230 are recessed to, flush with or only slightly or barely protruding from the exterior edge of peripheral edge 70 so as to prevent interference with cutting the exterior peripheral edge of housing 26 through drywall 38 and to prevent electrical device 12 from being trapped behind drywall 38. Also, in this position, the outward ends of ears 230 engage and/or rest upon the forward-most end of orientation adjustment guides 304, which provides support to ears 230 and allows for adjustment of the orientation, angle, depth, and position of electrical device 12.

Step 5: Once electrical device 12, with attached conductor wires 35, is installed into the hollow interior 80 of housing 26, cover 30 is placed over electrical device 12 and housing 26. Installation of cover 30 is accomplished by aligning the rear peripheral edge 252 of cover with the front peripheral edge 70 of housing 26, which aligns holes 284 in cover 30 with holes 84 in cover supports 82 of housing 26. Once this alignment is accomplished, fasteners 86 are passed through holes 248 in v over 30 and into holes 84 in cover supports 82 thereby removably affixing cover 30 to housing 26 while covering electrical device 12. Once cover 30 is in place over housing 26, the electrical junction box system 10 is fully pre-assembled and ready for use.

EXAMPLE 2: Installation of a fully assembled electrical junction box system 10 with an electrical device 12 pre-installed within the hollow interior 80 of the housing 26 and a cover 30 covering the electrical device 12 and the housing 26. In this configuration, conductor wires 35 (pigtails) are pre-installed and electrically connected to electrical device 12 with the loose ends folded and held within the hollow interior 80 of housing 26 and covered by access door 122. In this configuration, external wires enter the housing 26 through access tabs 110 in the top and/or bottom of housing 26.

Notably, in this configuration, the user may purchase the fully assembled electrical junction box system 10 with an electrical device 12 pre-installed within the hollow interior 80 of the housing 26, or alternatively, the user may purchase empty housings 26 and covers 30 and pre-install electrical device 12 in hollow interior 80 of housing 26 themselves.

Step 1: The user aligns the rear-facing surface 202 of alignment flange 198 adjacent the front-facing side of structure 32, such as a 2×4 or 2×6 of a wall during construction, and the user aligns the exterior surface 60 of the sidewall 58 (opposite access door 122) against the side of structure 32.

Step 2: Once in this position, which aligns peripheral edge 70 at the appropriate depth relative to structure 32 for drywall 38 to be installed around housing 26, the user pounds in the nails 28 attached to housing 26 by way of nail ports 178 thereby affixing housing 26 to structure 32. Optionally, the user may also pass fasteners (such as screws or nails) through openings 212 in alignment flange 198 and into the front-facing surface of structure 32 thereby increasing the strength of connection between housing 26 and structure 32.

Step 3: Once housing 26 is affixed to structure 32, external wires 34 are electrically connected to electrical device 12. This can be accomplished by a plurality of manners.

Step 3A—Top Insertion: External wires 34 are inserted into the hollow interior 80 of housing 26 by entering the upper-rear side of housing 26 through access tabs 110 positioned at the upper rear side of housing 26. This may be accomplished by a number of ways.

With Reference to FIG. 32 through FIG. 36 and FIG. 51, FIG. 72C and FIG. 72D the upper right access tab 110 may be tilted or twisted out of alignment thereby creating an opening and providing access into hollow interior 80 of housing 26 through which external wire 34 enters housing 26.

With Reference to FIG. 37 through FIG. 41, the upper left access tab 110 may be tilted or twisted out of alignment thereby creating an opening and providing access into hollow interior 80 of housing 26 through which external wire 34 enters housing 26.

With Reference to FIG. 42 through FIG. 46, and FIG. 72A and FIG. 72B, both the upper left access tab 110 and upper right access tab 110 may be simultaneously tilted or twisted out of alignment thereby creating an opening and providing access into hollow interior 80 of housing 26 through which external wire 34 enters housing 26. Rotating both access tabs 110 creates a larger access opening as compared to rotating only a single access tab 110. In the arrangement shown, as one example, the adjacent access tabs 110 are twisted inward toward one another, however it is hereby contemplated that the access tabs 110 may be twisted away from one another thereby creating a similar sized access into hollow interior 80.

With Reference to FIG. 71A and FIG. 71B, the upper right access tab 110 may be completely removed from housing 26 by detaching or severing strands 220 that connect access tab 110 to housing 26 thereby creating an unencumbered opening and providing access into hollow interior 80 of housing 26 through which external wire 34 enters housing 26. Removing access tabs 110 provides a slightly larger opening as compared to simply rotating access tabs 110 out of alignment.

With Reference to FIG. 72A and FIG. 72B, the upper left access tab 110 may be completely removed from housing 26 by detaching or severing strands 220 that connect access tab 110 to housing 26 thereby creating an unencumbered opening and providing access into hollow interior 80 of housing 26 through which external wire 34 enters housing 26. Removing access tabs 110 provides a slightly larger opening as compared to simply rotating access tabs 110 out of alignment.

Both the upper right access tab 110 and the upper left access tab 110 may be completely removed from housing 26 by detaching or severing strands 220 that connect access tab 110 to housing 26 thereby creating an unencumbered opening and providing access into hollow interior 80 of housing 26 through which external wire 34 enters housing 26. By removing both access tabs 110 this provides a larger opening as compared to simply rotating one or both access tabs 110 out of alignment. By removing both access tabs 110 this provides a larger opening as compared to simply removing one access tab 110.

Step 3B—Bottom Insertion: External wires 34 are inserted into the hollow interior 80 of housing 26 by entering the lower-rear side of housing 26 through access tabs 110 positioned at the lower rear side of housing 26. This may be accomplished by a number of ways, similar to the manners described above in Step 3A only with use of the lower-positioned access tabs 110.

The lower right access tab 110 may be tilted or twisted out of alignment thereby creating an opening and providing access into hollow interior 80 of housing 26 through which external wire 34 enters housing 26.

The lower left access tab 110 may be tilted or twisted out of alignment thereby creating an opening and providing access into hollow interior 80 of housing 26 through which external wire 34 enters housing 26.

Both the lower left access tab 110 and lower right access tab 110 may be simultaneously tilted or twisted out of alignment thereby creating an opening and providing access into hollow interior 80 of housing 26 through which external wire 34 enters housing 26. Rotating both access tabs 110 creates a larger access opening as compared to rotating only a single access tab 110. In the arrangement shown, as one example, the adjacent access tabs 110 are twisted inward toward one another, however it is hereby contemplated that the access tabs 110 may be twisted away from one another thereby creating a similar sized access into hollow interior 80.

The lower right access tab 110 may be completely removed from housing 26 by detaching or severing strands 220 that connect access tab 110 to housing 26 thereby creating an unencumbered opening and providing access into hollow interior 80 of housing 26 through which external wire 34 enters housing 26. Removing access tabs 110 provides a slightly larger opening as compared to simply rotating access tabs 110 out of alignment.

The lower left access tab 110 may be completely removed from housing 26 by detaching or severing strands 220 that connect access tab 110 to housing 26 thereby creating an unencumbered opening and providing access into hollow interior 80 of housing 26 through which external wire 34 enters housing 26. Removing access tabs 110 provides a slightly larger opening as compared to simply rotating access tabs 110 out of alignment.

Both the lower right access tab 110 and the lower left access tab 110 may be completely removed from housing 26 by detaching or severing strands 220 that connect access tab 110 to housing 26 thereby creating an unencumbered opening and providing access into hollow interior 80 of housing 26 through which external wire 34 enters housing 26. By removing both access tabs 110 this provides a larger opening as compared to simply rotating one or both access tabs 110 out of alignment. By removing both access tabs 110 this provides a larger opening as compared to simply removing one access tab 110.

Step 4: Whether entering from the top or the bottom of housing 26, through one or both access tabs 110 being tilted or removed, access door 122 is opened by prying connection members 150 of access door 122 away from connection members 160 of housing 26. Once connection members 150 of access door 122 release from their connection with connection members 160 of housing 26 access door 122 is allowed to swing open upon hinge 146 thereby revealing access opening 112 in sidewall 58 of housing 26. Once access opening 112 is exposed by opening access door 122, external wires 34 are pulled through hollow interior 80 and out access opening 112. Also, the free ends of conductor wires 35 attached to electrical device 12 are pulled out of hollow interior 80 through access opening 112.

Step 5: Once external wires 34 and conductor wires 35 are pulled out of the hollow interior 80 of housing 26 electrical connections are made between external wires 34 and conductor wires 35. These electrical connections are made outside of the hollow interior 80 of housing 26 as there is not adequate space within hollow interior 80 for a user's hands to work and move and make secure electrical connections. Care is taken to ensure that the correct wires are connected to one another. When external wires 34 and conductor wires 35 are color coded the hot/black wires are connected to one another, the neutral/white wires are connected to one another and the ground/green wires are connected to one another. In one arrangement, as one example, electrical connectors 36 are used to connect external wires 34 and conductor wires 35 such as conventional wire nuts, WAGO wire connectors, or any other form of a wire connector or the like. This configuration is shown in FIG. 18A.

Step 6: Once electrical connections are made between external wires 34 and conductor wires 35, the connected external wires 34 and conductor wires 35 are pushed back into hollow interior 80 of housing 26. This configuration is shown in FIG. 18B.

Step 7: Once electrically connected external wires 34 and conductor wires 35 are pushed back into hollow interior 80 of housing 26, access door 122 is again closed. This is accomplished by rotating access door 122 upon hinge 146 until connection members 150 of access door 122 engage and lock onto connection members 160 of housing 26, at which point access door 122 is locked shut.

Step 8: Since cover 30 is already in place over electrical device 12 and housing 26, after electrically connecting external wires 34 to conductor wires 35 and closing access door 122, electrical junction box system 10 is fully assembled and protects the electrically connected electrical device 12 held within hollow interior 80 of housing 26 and as such the rest of the construction steps can occur without fear of damaging electrical device 12. These additional construction steps include insulation, drywalling, mudding, texturing, trimming, and painting, among other steps.

Step 9: Once the construction steps are complete, insulation, drywalling, mudding, texturing, trimming, and painting, among other steps, the cover 30 is removed by removing fasteners 86 and pulling cover 30 away from housing 26 thereby exposing electrical device 12, which is then covered by a conventional cover plate thereby completing the installation process.

EXAMPLE 3: Installation of a fully assembled electrical junction box system 10 with an electrical device 12 pre-installed within the hollow interior 80 of the housing 26 and a cover 30 covering the electrical device 12 and the housing 26. In this configuration, conductor wires 35 (pigtails) are pre-installed and electrically connected to electrical device 12 with the loose ends folded and held within the hollow interior 80 of housing 26 and covered by access door 122. In this configuration, external wires enter the housing 26 through fingers 152 of access door 122.

Notably, in this configuration, the user may purchase the fully assembled electrical junction box system 10 with an electrical device 12 pre-installed within the hollow interior 80 of the housing 26, or alternatively, the user may purchase empty housings 26 and covers 30 and pre-install electrical device 12 in hollow interior 80 of housing 26 themselves.

Step 1: The user aligns the rear-facing surface 202 of alignment flange 198 adjacent the front-facing side of structure 32, such as a 2×4 or 2×6 of a wall during construction, and the user aligns the exterior surface 60 of the sidewall 58 (opposite access door 122) against the side of structure 32.

Step 2: Once in this position, which aligns peripheral edge 70 at the appropriate depth relative to structure 32 for drywall 38 to be installed around housing 26, the user pounds in the nails 28 attached to housing 26 by way of nail ports 178 thereby affixing housing 26 to structure 32. Optionally, the user may also pass fasteners (such as screws or nails) through openings 212 in alignment flange 198 and into the front-facing surface of structure 32 thereby increasing the strength of connection between housing 26 and structure 32.

Step 3: Access door 122 is opened by prying connection members 150 of access door 122 away from connection members 160 of housing 26. Once connection members 150 of access door 122 release from their connection with connection members 160 of housing 26 access door 122 is allowed to swing open upon hinge 146 thereby revealing access opening 112 in sidewall 58 of housing 26. Once access opening 112 is exposed by opening access door 122, the free ends of conductor wires 35 attached to electrical device 12 are pulled out of hollow interior 80 through access opening 112.

Step 4: Once conductor wires 35 are pulled out of the hollow interior 80 of housing 26 electrical connections are made between external wires 34 and conductor wires 35. These electrical connections are made outside of the hollow interior 80 of housing 26 as there is not adequate space within hollow interior 80 for a user's hands to work and move and make secure electrical connections. Care is taken to ensure that the correct wires are connected to one another. When external wires 34 and conductor wires 35 are color coded the hot/black wires are connected to one another, the neutral/white wires are connected to one another and the ground/green wires are connected to one another. In one arrangement, as one example, electrical connectors 36 are used to connect external wires 34 and conductor wires 35 such as conventional wire nuts, WAGO wire connectors, or any other form of a wire connector or the like. Note, in this configuration, external wires 34 have not-yet entered hollow interior 80 of housing 26. Instead, external wires 34 have remained external to housing 26.

Step 5: Once electrical connections are made between external wires 34 and conductor wires 35, the connected conductor wires 35 and a sufficient portion of external wires 34 and are pushed back into hollow interior 80 of housing 26. In one arrangement, a sufficient portion of external wires 34 is enough of external wires 34 to cover the connected areas of external wires 34 and conductor wires 35. In one arrangement, a sufficient portion of external wires 34 is enough of external wires 34 such that any portion of the sheathing of external wires 34 that was cut to facilitate electrical connections is contained within hollow interior 80 of housing 26 such that only fully intact and uncut portions of external wires 34 extend out of housing 26. In one arrangement, a sufficient portion of external wires 34 is one, two, three, four or so inches of external wires 34 contained within hollow interior 80 of housing 26.

Step 6: Once electrical connections are made between external wires 34 and conductor wires 35 and the connected conductor wires 35 and a sufficient portion of external wires 34 and are pushed back into hollow interior 80 of housing 26, access door 122 is closed thereby enclosing hollow interior 80 of housing 26 and covering access opening 112. However, due to the fact that in this arrangement external wires 34 did not enter hollow interior 80 prior to electrically connecting to conductor wires 35, external wires 34 extend outward through access opening 112. Upon closing access door 122, one or more fingers 152 flex to allow the outward passage of external wires 35 when access door 122 is closed. In one arrangement, the upper-positioned finger 152 flexes outward to allow the passage of external wires 34, an example of this arrangement is shown in FIG. 53. In one arrangement, the lower-positioned finger 152 flexes outward to allow the passage of external wires 34, an example of this arrangement is shown in FIG. 57. In one arrangement, the middle-positioned finger 152 flexes outward to allow the passage of external wires 34. In one arrangement, the upper and middle positioned fingers 152 flex outward to allow the passage of external wires 34. In one arrangement, the lower and middle positioned fingers 152 flex outward to allow the passage of external wires 34. In one arrangement, the lower and upper positioned fingers 152 flex outward to allow the passage of external wires 34, an example of this arrangement is shown in FIG. 59. Any other combination and/or configuration is hereby contemplated for use.

Step 8: Since cover 30 is already in place over electrical device 12 and housing 26, after electrically connecting external wires 34 to conductor wires 35 and closing access door 122, electrical junction box system 10 is fully assembled and protects the electrically connected electrical device 12 held within hollow interior 80 of housing 26 and as such the rest of the construction steps can occur without fear of damaging electrical device 12. These additional construction steps include insulation, drywalling, mudding, texturing, trimming, and painting, among other steps.

Step 9: Once the construction steps are complete, insulation, drywalling, mudding, texturing, trimming, and painting, among other steps, the cover 30 is removed by removing fasteners 86 and pulling cover 30 away from housing 26 thereby exposing electrical device 12, which is then covered by a conventional cover plate thereby completing the installation process.

Note: In any of the preceding examples, it should be appreciated that the access door 122 can be any of the sort disclosed herein. This includes the door 122 being connected to the housing, such as via a hinge, or completely separate from the housing and selectively attached, adhered, or otherwise connected thereto, but fully removal. Any of the examples could include that the door 122 is located on any of the sidewalls or the top or bottom of the housing, and that the orientation of the door, such as when connected via a hinge, could include any of the orientations provided herein. In addition, when the door is connected via a hinge, the hinge could be a living hinge or separate hinge. The connection without a hinge could be via mechanical or non-mechanical fastening means, including friction fittings or snaps. Still further, as noted herein, the disclosure does allow for the ears to extend at least some amount beyond the peripheral edge 70 and still function accordingly.

Alternative Embodiment of Housing 26—Rear Hinge: With reference to FIG. 84 through FIG. 97C an alternative embodiment of electrical junction box system 10 and/or housing 26 is presented. This alternative arrangement of electrical junction box system 10 and/or housing 26 is similar to the other configurations of electrical junction box system 10 and/or housing 26 presented herein and performs the same function as the other configurations of electrical junction box system 10 and/or housing 26 presented herein, and as such all of the disclosure and teaching related to electrical junction box system 10 and/or housing 26 presented herein applies to the alternative embodiment of electrical junction box system 10 and/or housing 26 unless stated otherwise.

In the arrangement shown, as one example in FIG. 84 through FIG. 97C, electrical junction box system 10 and/or housing 26 shows hinge 146 connecting access door 122 to housing 26 positioned adjacent the back side 20 of housing 26. In the arrangement shown as one example, hinge 146 extends vertically along housing 26 and protrudes outward from the left side 22 of housing 26, however any other configuration or position is hereby contemplated for use. This configuration essentially swaps the position of hinge 146 from adjacent front side 18 of electrical junction box system 10 and/or housing 26 to back side 20 of electrical junction box system 10 and/or housing 26.

In the arrangement shown, as one example, access door 122 is generally flat and planar in shape when viewed from above or below and extends from top edge 124 down to bottom edge 126 and extends from front edge 128 to rear edge 130 with a generally flat and planar exterior surface 132 and opposing interior surface 134. In the arrangement shown, as one example, hinge 146 connects to rear edge 130 which connects adjacent back side 20 of housing 26 just rearward of rear edge 120 of access opening 112.

In the arrangement shown, as one example, top edge 124 and bottom edge 126 of access door 122 extend slightly outward as they extend from rear edge 130 to front edge 128. As such, front edge 128 of access door 122 is larger than rear edge 130 of access door.

In the arrangement shown, as one example, a connection member 150 is positioned at the intersection of top edge 124 and front edge 128 of access door 122, and a connection member 150 is positioned at the intersection of bottom edge 126 and front edge 128 of access door 122. The extended length of front edge 128, as compared to rear edge 130 of access door 122, provides enough length or distance for these opposing connection members 150 to wrap around the exterior surface of housing 26 to facilitate connection of access door 122 in a closed position. That is, hinge 146 connects rear edge 130 of access door 122 to housing 26 and connection members 150 connect front edge 128 of access door 122 to housing 26.

Connection members 150 are formed of any suitable size, shape and design and are configured to releasably connect access door 122 in a closed position while also allowing a user to open access door 122 when desired. In the arrangement shown, as one example, connection members 150 include a wrap-around section that bends at an approximately ninety degree corner to the generally planar shape of access door 122 inward and toward interior surface 134 of access door 122 and toward housing 26. As such, in this arrangement, when access door 122 is in a closed position, the upper positioned connection member 150 overlaps with a portion of top wall 46 of housing 26 and the lower positioned connection member 150 overlaps with a portion of bottom wall 52 of housing 26 thereby facilitating connection between access door 122 and housing 26.

More specifically, in the arrangement shown, as one example, connection members 150 include an angled feature that overlaps with connection member 160 of housing 26, which in the arrangement shown, is a generally rectangular protrusion. In this arrangement, as access door 122 is closed, the wrap-around section of connection members 150 begin to overlap the exterior surface of top wall 46 and bottom wall 52 of housing 26. As wrap-around sections of connection members 150 of access door 122 begin to overlap the exterior surface of top wall 46 and bottom wall 52 of housing 26 the angled feature or surface of connection members 150 of access door 122 engage the generally square or rectangular connection members 160 of housing 26. As the angled connection members 150 of access door 122 engage the generally square or rectangular connection members 160 of housing 26 the connection members 150 of access door 122 begin to flex or deflect outward as the angled surface of connection members 150 of access door 122 slide over and past the connection members 160 of housing 26. This sliding and outward flexing of connection members 150 over connection members 160 continues until connection members 150 of access door slide fully past connection members 160 of housing 26 and lock into place until the vertical outward walls of connection members 150 of access door 122 are in flat and flush and locked engagement with the vertical inward walls of connection members 160 of housing 26 as is shown in FIG. 96A and FIG. 96B as one example. This is similar, albeit in a different configuration, to that shown in FIG. 48A and FIG. 48B.

When access door 122 is closed and locked on housing 26, the engagement of connection members 150 of access door 122 with connection members 160 of housing 26 provide an extremely strong, durable, and reliable lock thereby securely holding access door 122 in a closed position. That being said, access door 122 can quickly and easily be opened by a user by prying the inward edge of connection members 150 of access door 122 upward while pressing access door 122 outward and away from housing 26. Once connection member 150 of access door 122 clears engagement with connection members 160 of housing 26, access door 122 can be swung open upon hinge 146 thereby providing access to access opening 112 and the contents of housing 26.

The configuration and alternative embodiment of electrical junction box system 10 and/or housing 26 shown in FIG. 84 through FIG. 97C provides an improvement over other embodiments in that access door 122 opens from the front side 18 of housing 26 and hinge 146 is positioned on the back side 20 of housing 26. This opening from the front side 18 of housing 26 allows the user easier access to access opening 112 in the often cramped spaces where electrical junction box system 10 is used. This opening from the front side 18 of housing 26 allows for additional light to enter access opening 112 and removes access door 122 as an object in the way of user as they are making electrical connections, pulling, or inserting wires, or performing other tasks. This opening from the front side 18 of housing 26 also eliminates the need for a user to "break-the-back" of hinge 146 by overly bending access door 122 out of the way, as can happen when hinge 146 is positioned adjacent front side 18 of housing 26. This opening from the front side 18 of housing 26 also positions connection members 150 of access door 122 toward the front edge 128 of access door 122 which places them in an easier position for a user to disengage connection members 150 and open access door 122 when needed. As such, for these and many other reasons, the configuration and alternative embodiment of electrical junction box system 10 and/or housing 26 shown in FIG. 84 through FIG. 97C provides an improvement over other embodiments of housing 26 and access door 122.

Notably, in the arrangement shown, as one example in FIG. 84 through FIG. 97C fingers 152 of access door 122 are not present. It is contemplated that fingers 152 may be present in other configurations. The removal of fingers 152 simplifies the configuration and strengthens access door 122.

Notably, while the figures show use of this configuration with a single box, it is hereby contemplated that this configuration may be used on double, triple, quadruple, or larger boxes. Similarly, while this configuration shows use in a left-side configuration it is hereby contemplated that this configuration may be used in a right-side, left-side, top-side and/or bottom-side configuration or any combination of these configurations such as left-side and right-side, or top-side and bottom-side, or all four sides or any other configuration or combination.

Alternative Embodiment of Housing 26—Separate Access Door: With reference to FIG. 98 through FIG. 127C an alternative embodiment of electrical junction box system 10 and/or housing 26 is presented. This alternative arrangement of electrical junction box system 10 and/or housing 26 is similar to the other configurations of electrical junction box system 10 and/or housing 26 presented herein and performs the same function as the other configurations of electrical junction box system 10 and/or housing 26 presented herein, and as such all of the disclosure and teaching related to electrical junction box system 10 and/or housing 26 presented herein applies to the alternative embodiment of electrical junction box system 10 and/or housing 26 unless stated otherwise.

The alternative embodiment of electrical junction box system 10 and/or housing 26 shown in FIG. 98 through FIG. 127C is most similar to the configuration shown in FIG. 84 through FIG. 97C with the primary difference being that hinge 146 is removed making access door 122 a separate piece from housing 126. This configuration simplifies the configuration of housing 26 as well as simplifies the configuration of access door 122, thereby allowing the molds and molding of these components to be simplified, sped-up, and ruggedized. This configuration also eliminates the weaknesses and limitations of hinge 146, namely its propensity to break over time when flexed in excess of its allowable range of motion and/or its allowable number of movements between open and closed.

In the arrangement shown, as one example, the rear edge 130 of access door 122 includes a pair of connection members 308 that connect to connection members 310 of housing 26. Connection members 308 of access door 122 are formed of any suitable size, shape and design and are configured to facilitate connection of access door 122 to housing 26 as well as removal of access door 122 from housing 26. Similarly, connection members 310 of housing 26 are formed of any suitable size, shape and design and are configured to facilitate connection of access door 122 to housing 26 as well as removal of access door 122 from housing 26.

In the arrangement shown, as one example, connection members 308 of access door 122 are a pair of generally rectangular protrusions the extend outward from rear edge 130 of access door 122. However, connection members 308 may be formed of any other suitable size, shape, and design.

In the arrangement shown, as one example, connection members 310 of housing 26 are a pair of generally rectangular protrusions that include a generally rectangular opening 312 the extend outward from housing 26 adjacent back side 20 of housing 26 rear of access opening 112. However, connection members 310 may be formed of any other suitable size, shape, and design.

In the arrangement shown, as one example the openings 312 of connection members 310 of housing 26 are sized and shaped to receive the protrusions of connection members 308 of access door 122 with tight and close tolerances so as to facilitate a tight and secure hold of the rear edge 130 of access door 122 to housing 26 when connection members 308 are connected to connection members 310 of housing 26.

In the configuration shown, as one example, connection members 308 of access door 122 are generally rectangular protrusions and openings 312 of connection members 310 of housing 26 are generally rectangular in shape such that the connection members 308 of access door 122 engage openings 312 of connection members 310 of housing 26 in a mating arrangement. However, any other size, shape, design, and configuration is hereby contemplated for use such as a square, round, oval, or any other shape. Also, it is contemplated that the configuration may be swapped, that is the openings may be in the access door 122 and the protrusions may be in the housing 26, or alternatively both the access door 122 and the housing 26 may include a mating arrangement of protrusions and openings. Similarly, any other form, a method, a configuration, or a manner of securely connecting two components together is hereby contemplated for use for connection members 308 of access door 122 and connection members 310 of housing 26.

Also, in the arrangement shown, as one example, one upper connection member 308 is positioned in rear edge 130 of access door 122 adjacent the top edge 124 of access door, and a lower connection member 308 is positioned in rear edge 130 of access door 122 adjacent the bottom edge 126 of access door 122 for a total of two connection members 308. A similar configuration of connection members 310 is shown in housing 26. This configuration facilitates secure locking of the access door 122 to housing 126 by locking the rearward upper edge and the rearward lower edge of access door 122 to housing 126, however any other number of connection members 308/310 are hereby contemplated for use such as one centrally positioned connection member 308/310, or three, four, five, six, seven, eight, nine, ten or more connection members 308/310 or any other configuration is hereby contemplated for use for connection member 308/310.

In the arrangement shown, as one example, by having access door 122 be a completely separate piece from housing 26, not only does this simplify the mold and molding process of both access door 122 and housing 26, but this also completely removes access door 122 from being an obstruction to a user during installation. Once a user is completed installing housing 26 and making the necessary electrical connections, the user simply installs access door 122 by sliding the rearward edge of access door 122 toward housing 26 until the protrusions of connection members 308 of access door 122 are fully inserted within the openings 312 of connection members 310 of housing 26. Once connection members 308 of access door 122 are in full mating engagement with connection members 310 of housing 26 the front edge 128 of access door 122 is pressed toward housing 26 until the connection members 150 in the top edge 124 and bottom edge 126 of the front edge 128 of access door 122 engage and lock onto the connection members 160 of housing 26 thereby fully locking the removable access door 122 onto housing 26.

In the arrangement shown, as one example, separate access door 122 may be removed from housing 26 by prying connection members 150 in the front edge of access door 122 away from connection members 160 of housing 160 until they are disengaged from one another. Thereafter, the user may simply slide access door 122 forward relative to housing 26 thereby separating the engagement of protrusions of connection members 308 of access door 122 from the openings 312 of connection members 310 of housing 26.

The configuration and alternative embodiment of electrical junction box system 10 and/or housing 26 shown in FIG. 98 through FIG. 127C provides an improvement over other embodiments in that access door 122 is completely separate from housing 26 yet it is easily and securely installed upon housing 26 and it is easily removed from housing 26. This separate configuration of access door 122 and housing 26 allows the user easier access to access opening 112 in the often cramped spaces where electrical junction box system 10 is used. This separate configuration of access door 122 and housing 26 allows for additional light to enter access opening 112 and removes access door 122 as an object in the way of user as they are making electrical connections, pulling, or inserting wires, or performing other tasks. This separate configuration of access door 122 and housing 26 also eliminates the need for a user to "break-the-back" of hinge 146 by overly bending access door 122 out of the way, as can happen when hinge 146 is positioned adjacent front side 18 of housing 26. This separate configuration of access door 122 and housing 26 completely eliminates all the weaknesses of hinge 146 by completely eliminating hinge 146 and replaces hinge 146 with a stronger, simpler, and more secure connection arrangement between access door 122 and housing 26. This separate configuration of access door 122 and housing 26 also positions connection members 150 of access door 122 toward the front edge 128 of access door 122 which places them in an easier position for a user to disengage connection members 150 and open access door 122 when needed. As such, for these and many other reasons, the configuration and alternative embodiment of electrical junction box system 10 and/or housing 26 shown in FIG. 98 through FIG. 127C provides an improvement over other embodiments of housing 26 and access door 122.

Notably, in the arrangement shown, as one example in FIG. 84 through FIG. 97C fingers 152 of access door 122 are not present. It is contemplated that fingers 152 may be present in other configurations. The removal of fingers 152 simplifies the configuration and strengthens access door 122.

Notably, while the figures show use of this configuration with a single box, it is hereby contemplated that this configuration may be used on double, triple, quadruple, or larger boxes. Similarly, while this configuration shows use in a left-side configuration it is hereby contemplated that this configuration may be used in a right-side, left-side, top-side and/or bottom-side configuration or any combination of these configurations such as left-side and right-side, or top-side and bottom-side, or all four sides or any other configuration or combination.

Therefore, as has been included, many of the components can be used separately or together. For example, a pre-assembled combination of the junction box and electrical device can be utilized that more efficiently allows the installation of the pre-assembled box and device. However, as noted, the electrical device can be added after the installation of the box as well, and still be covered by the disclosure.

In addition, as can be appreciated, any and all of the embodiments, including aspects thereof, provide numerous advantages and meet many of the goals and/or objectives stated, including that internal components/parts of electrical equipment being protected such that there is mitigation or prevention of damage or contamination by foreign materials such as paint, plaster, cleaners, abrasives, or corrosive residues. Such mitigation or prevention of damaged parts ensures that there are no internal components that could adversely affect safe operation or mechanical strength of the equipment to mitigate or prevent parts that are broken, bent, cut, or deteriorated by corrosion, chemical action, or over-heating. The aspects of the embodiments ensure that outlets and device boxes are protected to mitigate or prevent entrance of foreign matter.

In any sense, it should be noted that the methods, examples, and procedures provided by way of the examples would all ensure satisfactory compliance with all standards, including, but not limited to, NFPA 70, the American National Standards Institute (ANSI), Underwriters Labora-tories (UL) standards, the Institute of Electrical and Elec-tronics Engineers (IEEE), National Electrical Codes (NEC), and other building and electrical codes from authorities having jurisdiction.

For example, it is noted that many building and electrical codes for authorities having jurisdiction include certain standards for electrical junction boxes, and the installation thereof. This includes, but is not limited to, internal parts of electrical equipment shall not be damaged or contaminated by foreign materials such as paint, plaster, cleaners, abra-sives, or corrosive residues. There shall be no damaged parts that may adversely affect safe operation or mechanical strength of the equipment such as parts that are broken; bent; cut or deteriorated by corrosion, chemical action, or over-heating. Outlet and device boxes shall be protected to prevent entrance of foreign matter. Plaster and debris shall be thoroughly cleaned from the box before the conductors are installed. Plaster, drywall, or plasterboard surfaces that are broken or incomplete shall be repaired so there will be no gaps or spaces greater than 3 mm (⅛") at the edge of the box or fitting. For example, The cover of the present disclosure also serves as a jig that a drywaller uses to cut the opening around the box. Drywall bits are ⅛" in diameter, so by using the cover as a jig, the process results in a much smoother and cleaner ⅛" gap between the drywall and box.

It should be appreciated that any of the embodiments and/or aspects thereof as has been provided herein satisfy such building and electrical codes from the authorities having jurisdiction. This is an additional benefit and/or advantage of the present disclosure, as the systems, meth-ods, and/or apparatus provided help builders, contractors, or other users to meet such compliance and satisfy the require-ments.

Furthermore, it should be appreciated that the junction box and cover may be formed generally of any acceptable, rigid material. However, generally, the components will be molded, pressed, or otherwise formed of a polymer material.

The invention claimed is:

1. An electrical junction box system with a preinstalled electrical device and cover, the system comprising:
   an electrical junction box;
      the electrical junction box having a wall and forming a hollow interior;
      the electrical junction box having an access door;
   an electrical device;
      a plurality of conductor wires;
      wherein the connected end of the plurality of conductor wires are electrically connected to the electrical device;
   a cover;
      the cover configured to removably connect to the electrical junction box;
      wherein the electrical device is installed into the elec-trical junction box and the cover is installed over the electrical junction box and wherein the access door provides access to the conductor wires when the electrical device is installed into the electrical junc-tion box; and
   orientation adjustment guides on an interior of the elec-trical junction box;
   wherein the orientation adjustment guides comprise one or more protrusions extending internally from the wall; and
   wherein the one or more protrusions interact with a tab of the electrical device to adjust the orientation of the electrical device relative to the electrical junction box.

2. The system of claim 1, wherein a free end of the conductor wires is configured to be pulled out of the hollow interior of the electrical junction box when the access door is opened.

3. The system of claim 1, wherein after the electrical junction box is installed onto a structure, a free end of the conductor wires is configured to be pulled out of the hollow interior of the electrical junction box when the access door is opened.

4. The system of claim 1, wherein after the electrical junction box is installed onto a structure, a free end of the conductor wires is configured to be pulled out of the hollow interior of the electrical junction box when the access door is opened and electrically connected to an external wire.

5. The system of claim 1, wherein after the electrical junction box is installed onto a structure, a free end of the conductor wires is configured to be pulled out of the hollow interior of the electrical junction box when the access door is opened and electrically connected to an external wire and an intersection of the conductor wires and the external wire is configured to be inserted into the hollow interior of the electrical junction box and the access door closed.

6. The system of claim 1, wherein when the electrical device is installed into the electrical junction box, a face of the electrical device protrudes forward from the peripheral edge of the electrical junction box while simultaneously a body of the electrical junction box protrudes into the hollow interior of the electrical junction box.

7. The system of claim 1, wherein the cover is removably connected to the electrical junction box by mechanical fasteners.

8. The system of claim 1, wherein the cover is removably connected to the electrical junction box by one or more screws.

9. The system of claim 1, wherein the electrical junction box comprises French-door style breakaway tabs at the closed end.

10. The system of claim 1, wherein the electrical junction box comprises a pair of breakaway tabs at the closed end; wherein the pair of breakaway tabs are positioned immediately adjacent one another without any components between the adjacent breakaway tabs.

11. The system of claim 1, wherein the electrical junction box comprises a pair of breakaway tabs at the closed end; wherein the pair of breakaway tabs are positioned immediately adjacent one another thereby providing unimpeded access into the electrical junction box in the area between the breakaway tabs.

12. The system of claim 1, the access door further comprising at least one connection member that is configured to releasably connect the access door in a closed configuration.

13. The system of claim 1, wherein the access door comprises one or more movable fingers to allow for an opening into the hollow interior of the electrical junction box when the access door is in the closed configuration.

14. The system of claim 1, wherein the electrical device is an electrical receptacle.

15. The system of claim 1, wherein the electrical device is a switch.

16. A system, comprising:
an electrical junction box;
    the electrical junction box having a peripheral edge and a top wall, a bottom wall, a pair of side walls and a rear wall forming a hollow interior;
    an access opening;
    the access opening positioned in the electrical junction box;
an access door;
    the access door configured to removably connect to the electrical junction box;
    wherein when the access door is connected to the electrical junction box, the access door covers the access opening;
    wherein when the access door is removed from the electrical junction box, the access door provides access into the hollow interior of the electrical junction box through the access opening wherein the access door has a front side and a rear side, wherein the access door includes a first set of connection members positioned adjacent the front side of the access door, and wherein the access door includes a second set of connection members that are positioned adjacent the rear side of the access door;
an electrical device;
    the electrical device connected to and at least partially disposed within the electrical junction box;
a cover;
    the cover having a front wall, a top wall, a bottom wall, and a pair of side walls and a peripheral edge forming a hollow interior;
    the cover configured to removably connect to the electrical junction box thereby covering the electrical device when the electrical device is installed into the electrical junction box.

17. The system of claim 16, wherein the access door is formed as a separate component from the electrical junction box.

18. The system of claim 16, wherein the access door connects to the electrical junction box adjacent the rear side.

19. The system of claim 16, wherein the access door connects to the electrical junction box adjacent the front side.

20. The system of claim 16, wherein the access door connects to the electrical junction box adjacent the rear side by at least one protrusion that fits within an opening in the electrical junction box.

21. The system of claim 16 wherein the access door connects to the electrical junction box adjacent the front side by at least one connection member that frictionally engages at least one connection member of the electrical junction box.

22. The system of claim 16, wherein the first set of connection members frictionally engage a first set of connection members of the electrical junction box, and wherein the second set of connection members frictionally engage a second set of connection members of the electrical junction box.

23. The system of claim 16, wherein the access door is generally flat and planar in shape.

24. The system of claim 16, wherein the access door is generally flat and planar in shape and the second set of connection members comprises a pair of protrusions positioned adjacent the rear side of the access door that are configured to be inserted within openings in the electrical junction box.

25. The system of claim 16, wherein the access door is generally flat and planar in shape and the first set of connection members comprises a pair of connection members positioned adjacent the front side of the access door that are configured to fit over and frictionally engage connection members of the electrical junction box.

26. The system of claim 16, wherein the access door is generally flat and planar in shape and the second set of connection members includes a pair of protrusions positioned adjacent the rear side of the access door that are configured to be inserted within openings in the electrical junction box and the first set of connection members includes a pair of connection members positioned adjacent the front side of the access door that are configured to fit over and frictionally engage connection members of the electrical junction box.

* * * * *